US012619310B2

(12) United States Patent
Kim et al.

(10) Patent No.: US 12,619,310 B2
(45) Date of Patent: May 5, 2026

(54) INPUT FEEDBACK BASED SMART PEN AND PROTRUDING FEEDBACK BASED SMART TABLET

(71) Applicant: DOT INCORPORATION, Seoul (KR)

(72) Inventors: Ju Yoon Kim, Gimpo-si (KR); Ji Ho Kim, Gimpo-si (KR); Hyeon Cheol Park, Gwangmyeong-si (KR); Hee Su Lee, Siheung-si (KR)

(73) Assignee: DOT INCORPORATION, Seoul (KR)

( * ) Notice: Subject to any disclaimer, the term of this patent is extended or adjusted under 35 U.S.C. 154(b) by 24 days.

(21) Appl. No.: 18/663,510

(22) Filed: May 14, 2024

(65) Prior Publication Data

US 2024/0295929 A1    Sep. 5, 2024

Related U.S. Application Data

(63) Continuation of application No. 17/596,515, filed as application No. PCT/KR2019/017414 on Dec. 10, 2019, now Pat. No. 12,019,805.

(30) Foreign Application Priority Data

Sep. 6, 2019    (KR) ........................ 10-2019-0110786

(51) Int. Cl.
*G06F 3/01*       (2006.01)
*G06F 3/0354*     (2013.01)
(Continued)

(52) U.S. Cl.
CPC .......... *G06F 3/016* (2013.01); *G06F 3/03545* (2013.01); *G06F 3/038* (2013.01); *G06F 3/04883* (2013.01); *G06V 30/347* (2022.01)

(58) Field of Classification Search
CPC .. G06F 3/016; G06F 3/04883; G06F 3/03545; G06F 3/041; G06F 3/0488; H04M 2250/22
See application file for complete search history.

(56) References Cited

U.S. PATENT DOCUMENTS

2014/0160089 A1*  6/2014  Fletcher ................ G06F 3/0383
                                                345/179
2015/0091815 A1*  4/2015  Michaelis ............... G06F 3/041
                                                345/173
(Continued)

FOREIGN PATENT DOCUMENTS

JP          59-166985 A      9/1984
JP          2005-010729 A    1/2005
(Continued)

OTHER PUBLICATIONS

International Search Report for PCT/KR2019/017414 dated Jun. 5, 2020 [PCT/ISA/210].
(Continued)

*Primary Examiner* — Mirza F Alam
(74) *Attorney, Agent, or Firm* — Sughrue Mion, PLLC

(57)    ABSTRACT

Provided is an input feedback-based smart pen including: a main body having a shape that enables manipulation of a user; an input unit connected to the main body and performing an input operation by a manipulation of the user; an input information recognition unit configured to recognize information input by a user through the manipulation of the input unit; and an expression unit including one or more expression members formed in an area of an outer surface of the main body to be detectable by the user to express information corresponding to input information recognized by the input information recognition unit.

5 Claims, 107 Drawing Sheets

(51) Int. Cl.

| | | |
|---|---|---|
| *G06F 3/038* | (2013.01) | |
| *G06F 3/04883* | (2022.01) | |
| *G06V 30/32* | (2022.01) | |

(56) References Cited

U.S. PATENT DOCUMENTS

| | | | | |
|---|---|---|---|---|
| 2016/0357274 A1* | 12/2016 | Ahn | ........................ | G06F 3/0383 |
| 2019/0204940 A1* | 7/2019 | Lee | ........................ | G06F 3/0488 |
| 2019/0324546 A1* | 10/2019 | Lee | ..................... | G06F 3/04842 |

FOREIGN PATENT DOCUMENTS

| | | | |
|---|---|---|---|
| JP | 2009-031469 A | 2/2009 | |
| KR | 10-2007-0097415 A | 10/2007 | |
| KR | 10-2009-0067423 | 6/2009 | |
| KR | 10-2011-0031945 A | 3/2011 | |
| KR | 10-2015-0027088 A | 3/2015 | |
| KR | 10-2016-0037394 A | 4/2016 | |
| KR | 10-2019-0017855 A | 2/2019 | |
| KR | 10-2019-0028682 A | 3/2019 | |
| KR | 10-2019-0056565 A | 5/2019 | |

OTHER PUBLICATIONS

Office Action issued in parent U.S. Appl. No. 17/596,515 on Sep. 21, 2023.
Notice of Allowance issued in parent U.S. Appl. No. 17/596,515 on Feb. 15, 2024.
Office Action issued in the Korean Patent Office in corresponding KR Patent Application No. 10-2023-0059894 on Jun. 16, 2023.

* cited by examiner

INPUT FEEDBACK BASED SMART PEN AND PROTRUDING FEEDBACK BASED SMART TABLET

CROSS REFERENCE TO RELATED APPLICATIONS

This application is a continuation of U.S. application Ser. No. 17/596,515 filed Dec. 13, 2021, which is a National Stage of International Application No. PCT/KR2019/017414 filed Dec. 10, 2019, claiming priority based on Korean Patent Application No. 10-2019-0110786 filed Sep. 6, 2019 and Korean Patent Application No. 10-2019-0110787 filed Sep. 6, 2019.

TECHNICAL FIELD

The present disclosure relates to an input feedback-based smart pen and a protruding feedback-based smart tablet.

BACKGROUND ART

Users may perceive information in various ways. For this purpose, various types of information output devices are used.

For example, an apparatus for outputting visual information using printed materials, an apparatus for outputting audio information through sound, etc. are being used.

Meanwhile, users may perform input operations through manipulations in various forms according to their intentions. For example, a user may write or draw on paper by using a pen.

As a result of such an input operation, for example, text or a drawing may be visually recognized.

However, when a result of such an input operation is directly sensed, for example, there are cases in which it is difficult to visually detect a text or a drawing written on paper. and thus there is a limit of improving user convenience regarding sensing of a result of an input operation of a user.

On the other hand, due to technological development and diversification of lifestyles, various types of information output formats are required.

In addition, it is required to output such that the content input by the user can be detected at the time of such output.

For example, various information output devices may be demanded according to situations of users, and more particularly, it is demanded to tactilely output information as a feedback to an input content for a user with a specific sensory handicap, e.g., visual handicap. When information is output tactilely, it is difficult to control the output easily and stably, and thus there is a limit of improving user conveniences through the improvement of information output devices.

DESCRIPTION OF EMBODIMENTS

Technical Problem

Embodiments of the present disclosure provide an input feedback-based smart pen capable of improving user convenience by facilitating a feedback on a user's input operation.

Embodiments of the present disclosure provide a protruding feedback-based smart tablet that allows a user to easily sense output information corresponding to an input and improves user convenience.

Solution to Problem

According to an embodiment of the present disclosure, an input feedback-based smart pen includes a main body having a shape that enables manipulation of a user; an input unit connected to the main body and performing an input operation by a manipulation of the user; an input information recognition unit configured to recognize information input by a user through the manipulation of the input unit; and an expression unit including one or more expression members formed in an area of an outer surface of the main body to be detectable by the user to express information corresponding to input information recognized by the input information recognition unit.

According to the present embodiment, the input feedback-based smart pen may further include an information processing unit configured to process one or more pieces of information by using contents recognized by the input information recognition unit and delivers processed information to the expression unit.

According to the present embodiment, the input feedback-based smart pen may further include an operation control unit formed to be manipulated by a user to control one or more operations regarding the expression unit.

According to the present embodiment, the expression unit may include a plurality of expression members, and different information may be delivered to a user according to protruding shapes of the plurality of expression members.

According to the present embodiment, the input feedback-based smart pen may further include a speaker configured to output the one or more pieces of information.

According to an embodiment of the present disclosure, a protruding feedback-based smart tablet includes one or more output units, wherein the protruding feedback-based smart tablet includes an expression area in which one or more output units are arranged, and the one or more output units each includes an expression unit formed and disposed to be sensible by a user and formed to protrude in response to a movement of an input pen when the user performs an input operation on the expression area by using the input pen.

According to the present embodiment, the input pen may include one or more magnetic bodies, and the expression unit may move by a magnetic field generated by the one or more magnetic bodies.

According to the present embodiment, the output unit may include a magnetic body to generate a magnetic field together with the one or more magnetic bodies of the input pen.

According to the present embodiment, the expression unit protruded by the input pen of the user may maintain a protruding state even when the input pen of the user is removed.

According to the present embodiment, the protruding feedback-based smart tablet may further include a reset member configured to release a protruding state of the expression unit to maintain a non-protruding state of the expression unit.

According to the present embodiment, the reset member may control a movement for the expression unit by using a magnetic field.

According to the present embodiment, the reset member may simultaneously release a protruding state of a plurality of expression units to maintain a non-protruding state of the expression units.

Other aspects, features, and advantages will become apparent from the following drawings, claims, and detailed description of the invention.

Effects of the Invention

An input feedback-based smart pen according to the present embodiment may improve user convenience by facilitating feedback on a user's input operation.

A protruding feedback-based smart tablet according to the present embodiment may facilitate a user to sense output information corresponding to an input by the user and improve user convenience.

BRIEF DESCRIPTION OF DRAWINGS

FIG. 59 is a schematic perspective view for describing the driving unit of FIG. 56.

MODE OF DISCLOSURE

Figure 1:
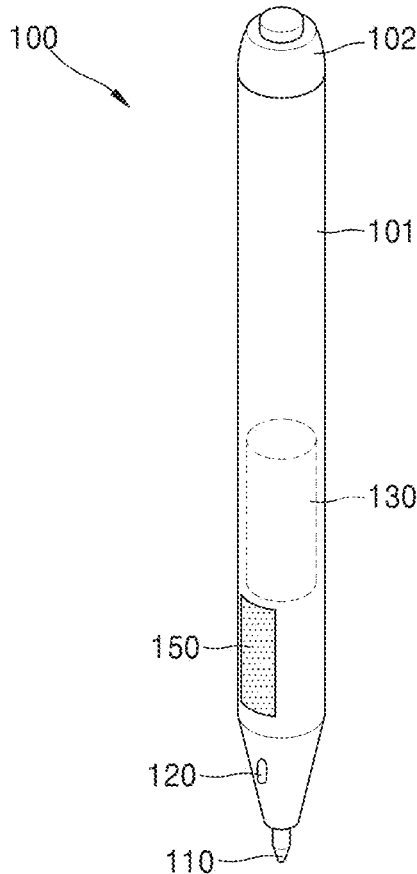
FIG. 1 is a diagram showing an input feedback-based smart pen according to an embodiment of the present disclosure.

The present disclosure may include various embodiments and modifications, and embodiments thereof will be illustrated in the drawings and will be described herein in detail. The effects and features of the present disclosure and the accompanying methods thereof will become apparent from the following description of the embodiments, taken in conjunction with the accompanying drawings. However, the present disclosure is not limited to the embodiments described below, and may be embodied in various modes.

Reference will now be made in detail to embodiments, examples of which are illustrated in the accompanying drawings. In the drawings, the same elements are denoted by the same reference numerals, and a repeated explanation thereof will not be given.

It will be understood that although the terms "first", "second", etc. may be used herein to describe various elements, these elements should not be limited by these terms. These elements are only used to distinguish one element from another.

As used herein, the singular forms "a," "an" and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components.

Sizes of elements in the drawings may be exaggerated for convenience of explanation. In other words, since sizes and thicknesses of components in the drawings are arbitrarily illustrated for convenience of explanation, the following embodiments are not limited thereto.

In the following examples, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

When a certain embodiment may be implemented differently, a specific process order may be performed differently from the described order. For example, two consecutively described processes may be performed substantially at the same time or performed in an order opposite to the described order.

FIG. 1 is a diagram showing an input feedback-based smart pen according to an embodiment of the present disclosure.

An input feedback-based smart pen 100 of the present embodiment may include a main body 101, an input unit 110, an input information recognition unit 120, and an expression unit 150.

The main body 101 may have a shape that enables manipulation of a user. For example, the main body 101 may have a pillar-like shape to be held by a user, and, as a specific example, may have a cylindrical shape, a prismatic shape, or an elliptical pillar-like shape.

Alternatively, to facilitate a user to perform an input operation, the main body 101 may have various shapes and employ shapes of various types of pens.

When a user manipulates an input feedback main body 101, the user may hold the main body 101 by a hand, and, in this case, a top end 102 including an uppermost region located over the upper portion of the main body 101.

According to an optional embodiment, the top end 102 may include a region formed to be thinner than the main body 101, and, although not shown, according to another embodiment, a hook or a handle may be further formed at the top end 102 to improve user convenience.

The input unit 110 is connected to the main body 101 and may perform an input operation by a manipulation of a user. The input unit 110 may allow visual expression of forms like characters or drawings on a medium like paper. For example, the input unit 110 may have a shape similar to a portion of a ballpoint pen lead, a pencil lead, or a felt pen.

According to an optional embodiment, a result of an input operation of the input unit 110 may not be visually displayed on a medium like paper. For example, when there is an input operation of a user using the input unit 110, information regarding changes due to the movement of the input unit 110 may be recognized by the input information recognition unit 120 to be described later as a result of the input operation.

In this case, the input unit 110 may not need to separately provide a lead like a pencil lead, a ballpoint pen lead, or a felt pen.

The input information recognition unit 120 may recognize information input by a user by manipulating the input unit 110.

For example, when a user draws letters and/or drawings or performs various input operations on paper by using the input unit 110, the input information recognition unit 120 may recognizes visually identifiable information like letters, drawings, or figures drawn on the paper.

As an optional embodiment, the input information recognition unit 120 may include an optical member, for example, a photographing member.

As shown in FIG. 1, the input information recognition unit 120 may be formed in one area of the main body 101. For example, the input information recognition unit 120 may be formed at the bottom end of the main body 101.

Figure 2:
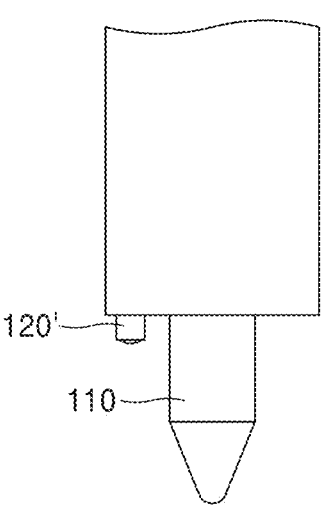
FIG. 2 is a diagram showing a modified example of an input recognition unit of the input feedback-based smart pen of FIG. 1.

FIG. 2 is a diagram showing a modified example of an input recognition unit of the input feedback-based smart pen of FIG. 1.

Referring to FIG. 2, the input information recognition unit 120' may be disposed adjacent to the input unit 110 and may be disposed to face the input unit 110.

For example, the input information recognition unit 120' may be formed at the bottom end of the main body 101. In detail, the input information recognition unit 120' may be formed in one area of the bottom portion of the main body 101.

Figure 3:
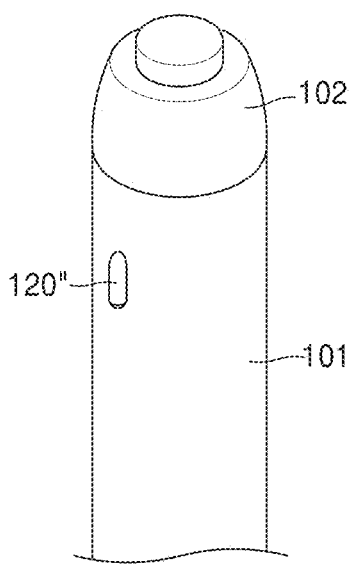
FIG. 3 is a diagram showing another modified example of an input recognition unit of the input feedback-based smart pen of FIG. 1.

FIG. 3 is a diagram showing another modified example of an input recognition unit of the input feedback-based smart pen of FIG. 1.

Referring to FIG. 3, an input information recognition unit 120" may be disposed above the input unit 110. For example, the input information recognition unit 120" may be disposed in an area adjacent to the top end 102.

According to an optional embodiment, the input information recognition unit 120" may be formed to be located above a user's hand to not to overlap the user's hand when the user holds the main body 101.

Input information recognition units 120, 120', and 120" of FIGS. 1 to 3 may each include a photographing member for recognizing visual information as described above, and, in this case, at least one member, e.g., an imaging device, may be disposed inside the main body 101.

According to an optional embodiment, the input information recognition unit 120 may include a motion detecting sensor to detect an input by the input unit 110. For example, when a user moves the input unit 110 to write a character by using the input unit 110, the movement of the input unit 110 may be detected. According to an optional embodiment, as described above, a result of an input operation using the input unit 110 may not be visually displayed. In this case, the input information recognition unit 120 including the motion detecting sensor may easily detect an input made by using the input unit 110.

The selective embodiment of FIGS. 2 and 3 may be applied to the input information recognition unit 120 including such a motion detecting sensor. However, for precise detection of the movement of the input unit 110 through a user's motion, the motion detection sensor of the input information recognition unit 120 may be provided close to the input unit 110.

According to an optional embodiment, the motion detecting sensor of the input information recognition unit 120 may not be exposed to the outside. For example, the motion detecting sensor may be disposed inside the main body 101.

Alternatively, the input information recognition unit 120 may be formed inside or on one side of the input unit 110 through fine formation.

Figure 4:
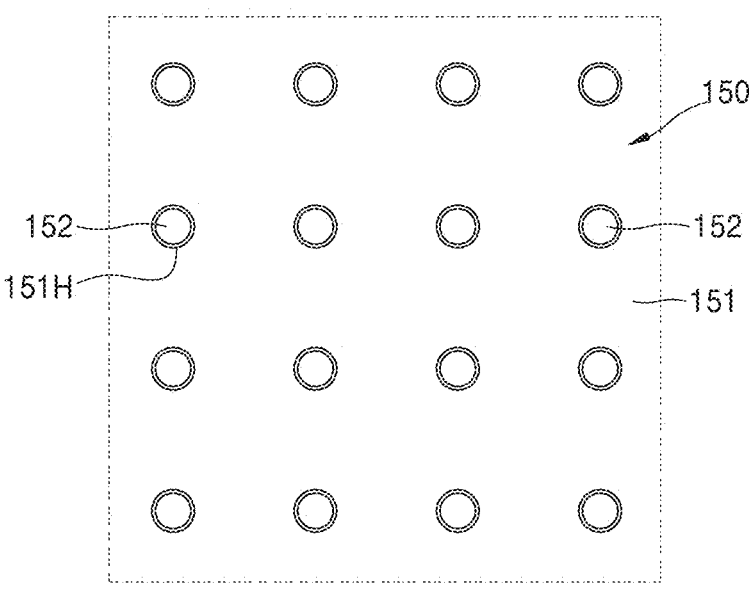
FIG. 4 is an enlarged view to describe an expression unit of the input feedback-based smart pen of FIG. 1.
Figure 5:
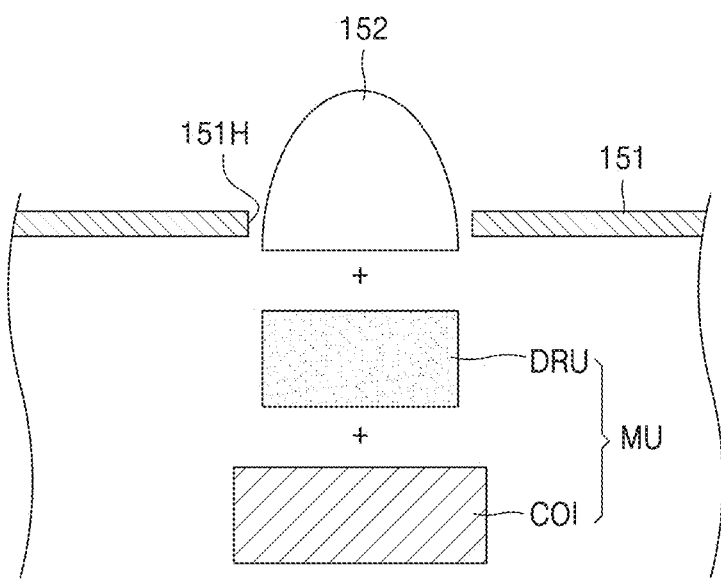
FIG. 5 is a cross-sectional view taken along a line V-V of FIG. 4.

FIG. 4 is an enlarged view to describe an expression unit of the input feedback-based smart pen of FIG. 1, and FIG. 5 is a cross-sectional view taken along a line V-V of FIG. 4.

The expression unit 150 may be disposed on an area of the outer surface of the main body 101 to express information corresponding to input information recognized by the input information recognition unit 120.

The expression unit 150 may be formed to be recognizable by a user. For example, the expression unit 150 may be formed in correspondence to a finger of a user.

The expression unit 150 may include one or more expression members 152 to be recognizable by a user. For example, the expression unit 150 may include a plurality of expression members 152.

The expression member 152 may be formed to be recognizable by a user by moving to protrude toward at least one area of a finger of the user.

The expression unit 150 may express content input by a user through the input unit 110. For example, when a user inputs a character through the input unit 110, the input information recognition unit 120 may recognize the input in various ways as described above. Recognized information may be expressed by the expression unit 150, and the user may sense an expression of the expression unit 150.

Therefore, the user may sense information about contents input through the input unit 110.

According to an optional embodiment, when a user is visually handicapped with no vision or very weak eyes, it may not be easy to visually confirm even content that the user inputs through the input unit 110. According to the present embodiment, in such a case, the expression unit 150 may allow a user to confirm an input by allowing the user to sense information about the input through protrusion of the expression member 152.

As a specific example, when a user intends to input the character "san (mountain)" through the input unit 110, the input information recognition unit 120 may recognize content of the input through the input unit 110, the expression unit 150 may express the content to allow the user to sense an expression thereof, and, even when it is difficult for the user to visually confirm the input made by the user due to visual handicap, the user may confirm the input by sensing protrusion of the expression member 152 of the expression unit 150. The protrusion of the expression member 152 may correspond to a type of Braille. For example, when "san (mountain)" is input through the input unit 110, the expression member 152 of the expression unit 150 may have a protruding shape to express "mountain" in Braille.

According to an optional embodiment, an information processing unit 130 may be further provided, and the information processing unit 130 may process various information by using information recognized by the input information recognition unit 120 and transmit processed information to the expression unit 150.

For example, the information processing unit 130 may process Braille information regarding an input made by a user.

Also, according to another embodiment, the information processing unit 130 may process voice information regarding an input made by a user.

According to an optional embodiment, the information processing unit 130 may include a storage unit for storing one or more pieces of Braille data information.

According to an optional embodiment, the information processing unit 130 may include a character determiner, a figure determiner, etc. for determining an input made by a user and may include a database for this purpose.

Also, as an additional example, the information processing unit 130 may include a text information conversion control unit for converting input information into text information.

According to an optional embodiment, when a user inputs a character, the information processing unit 130 may process expression information for a correct answer or an incorrect answer by determining whether the character input by the user is a correct character or not.

The expression unit 150 may be implemented in various forms. For example, the plurality of expression members 152 of the expression unit 150 may be arranged in correspondence to through holes 151H of a base 151, respectively, and may be sensed by fingers of a user by protruding out of the through holes 151H or receding into the through holes 151H.

Referring to FIG. 5, for example, the expression member 152 may be moved by a drive providing member MU.

According to an optional embodiment, the drive providing member MU may include one or more drive sources COI, e.g., a coil. Also, according to an optional embodiment, the drive sources COI may include a magnet. As a specific example, the drive sources COI may include a coil surrounding a magnet.

According to an optional embodiment, the drive providing member MU may include a moving member DRU that is moved by the drive source COI, and the expression member 152 may protrude through the movement of the moving member DRU.

According to an optional embodiment, for example, a current may be applied to the coil of the drive source COI including a coil of the drive providing member MU, and the moving member DRU may be moved by a magnetic field generated around the coil of the drive source COI at this time.

According to an optional embodiment, the moving member DRU may include a magnetic unit. According to another embodiment, the moving member DRU may include a magnet.

According to an optional embodiment, the moving member DRU may be integrally formed with the expression member 152 or the moving member DRU may be disposed inside the expression member 152.

Figure 6:
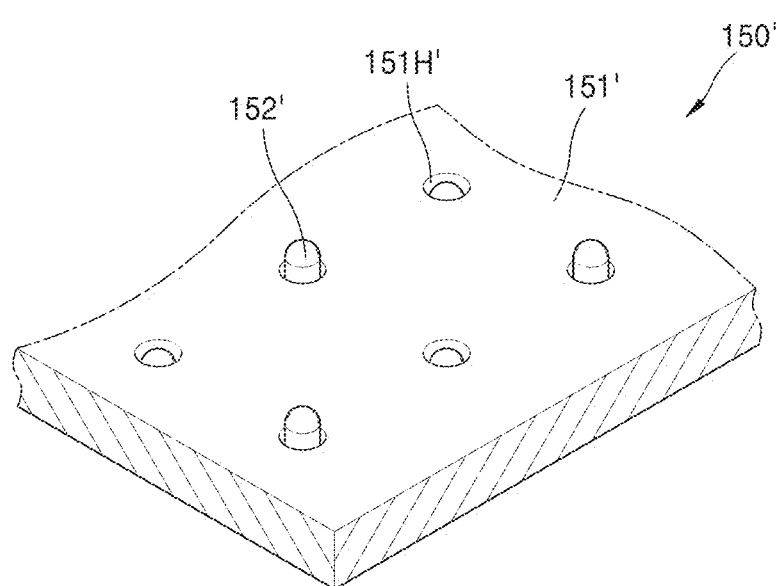
FIG. 6 is a diagram showing an optional embodiment of the expression unit of FIG. 4.
Figure 7:
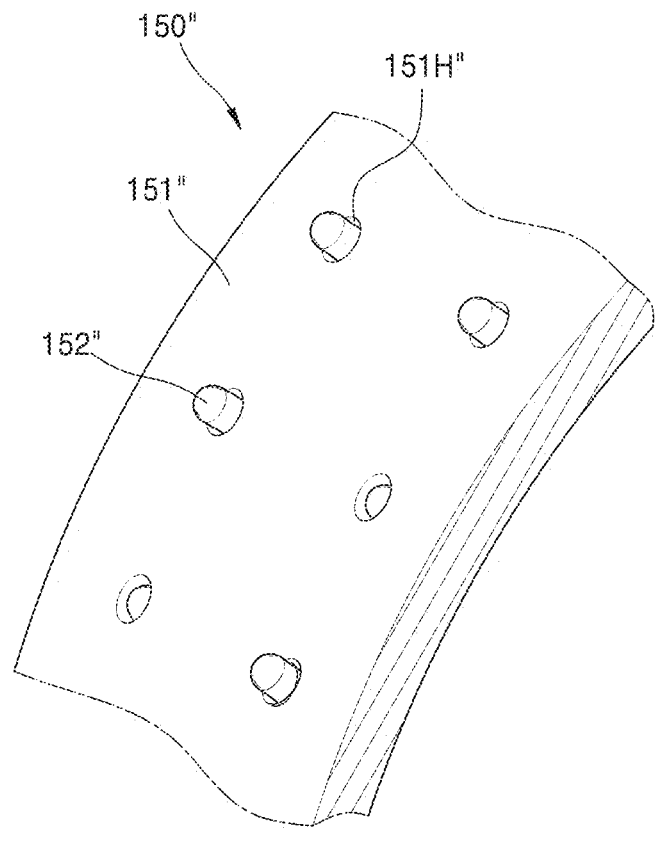
FIG. 7 is a diagram showing another selective embodiment of the expression unit of FIG. 4.

FIG. 6 is a diagram showing an optional embodiment of the expression unit of FIG. 4, and FIG. 7 is a diagram showing another selective embodiment of the expression unit of FIG. 4.

Referring to FIG. 6, an expression unit 150' may include a plurality of expression members 152' formed to be spaced apart from one another on one surface of a base 151'.

The plurality of expression members 152' may be arranged in correspondence with a plurality of through holes 151H' of the base 151' and may be arranged to be spaced apart from one another.

Referring to FIG. 7, an expression unit 150" may include a plurality of expression members 152" formed to be spaced apart from one another on one surface of a base 151".

The plurality of expression members 152" may be arranged in correspondence with a plurality of through holes 151H" of the base 151" and may be arranged to be spaced apart from one another.

The base 151" may include a curved surface. For example, the base 151" may include a curved surface in correspondence with a curved surface of the outer surface of the main body 101 shown in FIG. 1, and the plurality of expression members 152" may be arranged along the curved surface.

Figure 8:
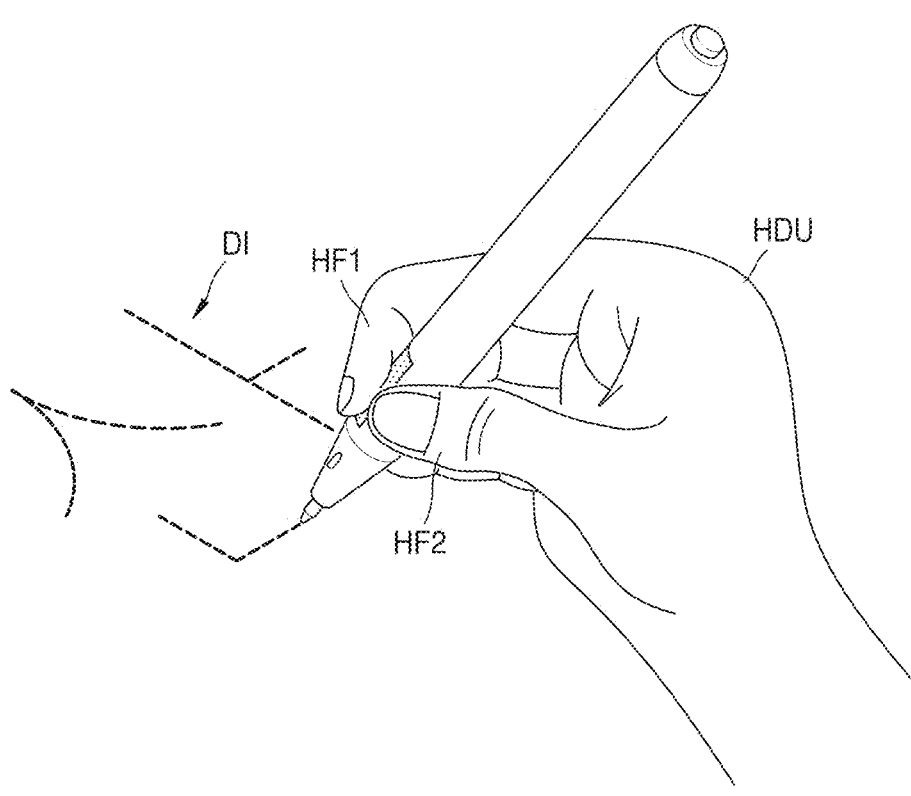
FIG. 8 is a diagram showing an example in which a user uses the user input feedback-based smart pen of FIG. 1.
Figure 9:
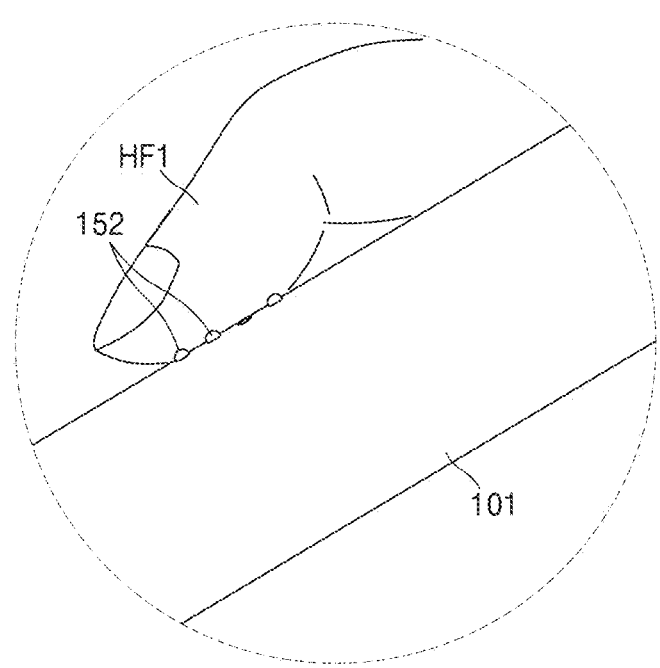
FIG. 9 is an enlarged view of an area of FIG. 8.

FIG. 8 is a diagram showing an example in which a user uses the user input feedback-based smart pen of FIG. 1, and FIG. 9 is an enlarged view of an area of FIG. 8.

FIGS. 8 and 9 shows that a user performs an input operation by manipulating the input feedback-based smart pen 100 using a hand HDU. FIG. 8 shows that an input content DI includes, for example, a character, and specifically, a character "san (mountain)".

As a result of an input operation by manipulating the input feedback-based smart pen 100, the input content DI may be visually confirmed. For example, the input content DI may be displayed by the input unit 110 to be visually recognizable on a medium like a piece of paper.

Also, according to an optional embodiment, the input content DI may not be visible even when the input unit 110 is operated by manipulating the input feedback-based smart pen 100, and information regarding a movement of the input unit 110 for inputting the input content DI, e.g., a position of the input unit 110, a trace of the movement of the input unit 110, etc., may be recognized by the input information recognition unit 120.

The input information recognition unit 120 may recognize the input content DI input through the input unit 110, and the expression unit 150 may express such information to be recognized by the user.

For example, the expression unit 150 may control the protrusion of the plurality of expression members 152 of the expression unit 150, and the protrusion of the expression member 152 may be sensed by the user. For example, a finger from between fingers HF1 and HF2 of the user, (more specifically, the index finger HF1) may sense the protrusion. For example, by using the protrusion of the plurality of expression members 152, a user may recognize the input content DI (more specifically, information "san (mountain)") through the index finger HF1.

According to an optional embodiment, the meaning of "mountain" may be delivered in the form of Braille through the plurality of expression members 152.

Also, according to an optional embodiment, instead of directly delivering the meaning of "mountain" through the plurality of expression members 152, indirect information (as specific examples, "correct answer" or "incorrect answer") may be delivered. This may correspond to a case of notifying a user of "correct" when the input content DI input by the user using the input unit 110 includes correctly written character "san (mountain)" and notifying "wrong" otherwise.

In addition, according to an optional embodiment, after allowing a user to input an answer for a set problem, the meaning of a correct answer or an incorrect answer for an input content may be delivered. In this case, such a set problem may be delivered through voice. In another example, such a set problem may also be delivered, for example, through the expression members 152 of the expression unit 150, e.g., in the form of Braille.

An input feedback-based smart pen of the present embodiment enables a user to hold a main body, thereby facilitating an input operation through an input unit. At this time, as a result of the input operation, an input content may be visually displayed on paper like in the case of using an actual pencil or pen or may not be displayed. An input information recognition unit may recognize such input contents, and an expression unit may express recognized information. According to an optional embodiment, one or more pieces of processed information, e.g., Braille information, information indicating a correct answer or an incorrect answer, etc., may be transmitted to an expression unit based on information recognized by an input information recognition unit and made recognizable by a user through protrusion of one or more expression members of an expression unit.

With respect to a content input by a user through an input unit, the user may confirm information input by the user by detecting a protruding shape of expression members of an expression unit immediately or a short time after the input. For example, it may not be easy for a user with visual handicap to confirm information input by the user. In this case, an expression unit facilitates confirmation of the information.

Also, even a user who has not yet mastered characters may easily sense whether an input is correct or incorrect in the course of practicing characters through an expression unit. Here, the expression unit may express a correct answer and an incorrect answer in different pre-set protruding shapes of expression members other than in the form of Braille, thereby facilitating a user to recognize an expression indicating a correct answer or an incorrect answer.

Through this, it is possible to easily provide feedbacks on information input by users in various conditions, thereby improving user convenience of confirming and learning information.

Although not shown, a power supply for the operation of an expression unit or an input information recognition unit may be included, wherein the power supply may include a built-in battery, a rechargeable battery, or an external power connection unit.

Figure 10:
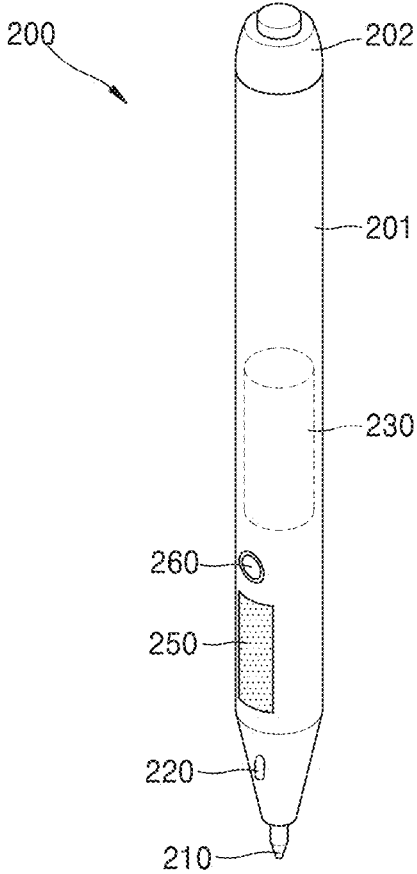
FIG. 10 is a diagram showing an input feedback-based smart pen according to another embodiment of the present disclosure.

FIG. 10 is a diagram showing an input feedback-based smart pen according to another embodiment of the present disclosure.

An input feedback-based smart pen 200 of the present embodiment may include a main body 201, an input unit 210, an input information recognition unit 220, an expression unit 250, and an operation control unit 260.

For convenience of explanation, descriptions below will focus on differences from the above-described embodiment.

The main body 201 may have a shape that enables manipulation of a user. For example, the main body 201 may have a pillar-like shape to be held by a user, and, as a specific example, may have a cylindrical shape, a prismatic shape, or an elliptical pillar-like shape.

When a user manipulates an input feedback main body 201, the user may hold the main body 201 by a hand, and, in this case, a top end 202 including an uppermost region located over the upper portion of the main body 201.

According to an optional embodiment, the top end 202 may include a region formed to be thinner than the main body 201, and, although not shown, according to another embodiment, a hook or a handle may be further formed at the top end 202 to improve user convenience.

The input unit 210 is connected to the main body 201 and may perform an input operation by a manipulation of a user. The input unit 210 may allow visual expression of forms like characters or drawings on a medium like paper. For example, the input unit 210 may have a shape similar to a portion of a ballpoint pen lead, a pencil lead, or a felt pen.

According to an optional embodiment, a result of an input operation of the input unit 210 may not be visually displayed on a medium like paper. For example, when there is an input operation of a user using the input unit 210, information regarding changes due to the movement of the input unit 210 may be recognized by the input information recognition unit 220 to be described later as a result of the input operation.

In this case, the input unit 210 may not need to separately provide a lead like a pencil lead, a ballpoint pen lead, or a felt pen.

The input information recognition unit 220 may recognize information input by a user by manipulating the input unit 210.

For example, when a user draws letters and/or drawings or performs various input operations on paper by using the input unit 210, the input information recognition unit 220 may recognizes visually identifiable information like letters, drawings, or figures drawn on the paper.

According to an optional embodiment, the input information recognition unit 220 may include an optical member, e.g., a photographing member.

As shown in FIG. 10, the input information recognition unit 220 may be formed in one area of the main body 201. For example, the input information recognition unit 220 may be formed at the bottom end of the main body 201.

According to an optional embodiment, the examples of FIGS. 2 and 3 may be applied.

According to an optional embodiment, the input information recognition unit 220 may include a motion detecting sensor to detect an input by the input unit 210. For example, when a user moves the input unit 210 to write a character by using the input unit 210, the movement of the input unit 210 may be detected. According to an optional embodiment, as described above, a result of an input operation using the input unit 210 may not be visually displayed. In this case, the input information recognition unit 220 including the motion detecting sensor may easily detect an input made by using the input unit 210.

According to an optional embodiment, the motion detecting sensor of the input information recognition unit 220 may not be exposed to the outside. For example, the motion detecting sensor may be disposed inside the main body 201. Alternatively, the input information recognition unit 220 may be formed inside or on one side of the input unit 210 through fine formation.

The expression unit 250 may be disposed on an area of the outer surface of the main body 201 to express information corresponding to input information recognized by the input information recognition unit 220.

The expression unit 250 may be formed to be recognizable by a user. For example, the expression unit 250 may be formed in correspondence to a finger of a user.

The expression unit 250 may include one or more expression members to be recognizable by a user. For example, the expression unit 250 may include a plurality of expression members.

The expression member may be formed to be recognizable by a user by moving to protrude toward at least one area of a finger of the user.

Although not shown, the structures of FIGS. 4 and 5 may also be applied to the present embodiment.

The expression unit 250 may express content input by a user through the input unit 210. For example, when a user inputs a character through the input unit 210, the input information recognition unit 220 may recognize the input in various ways as described above. Recognized information may be expressed by the expression unit 250, and the user may sense an expression of the expression unit 250.

Therefore, the user may sense information about contents input through the input unit 210.

According to an optional embodiment, when a user is visually handicapped with no vision or very weak eyes, it may not be easy to visually confirm even content that the user inputs through the input unit 210. According to the present embodiment, in such a case, the expression unit 250 may allow a user to confirm an input by allowing the user to sense information about the input through protrusion of the expression member.

As a specific example, when a user intends to input the character "san (mountain)" through the input unit 210, the input information recognition unit 220 may recognize content of the input through the input unit 210, the expression unit 250 may express the content to allow the user to sense an expression thereof, and, even when it is difficult for the user to visually confirm the input made by the user due to visual handicap, the user may confirm the input by sensing protrusion of the expression member (not shown) of the expression unit 250. The protrusion of the expression member (not shown) may correspond to a type of Braille. For example, when "san (mountain)" is input through the input unit 210, the expression member (not shown) of the expression unit 250 may have a protruding shape to express "mountain" in Braille.

According to an optional embodiment, an information processing unit 230 may be further provided, and the information processing unit 230 may process various information by using information recognized by the input information recognition unit 220 and transmit processed information to the expression unit 250.

For example, the information processing unit 230 may process Braille information regarding an input made by a user.

Also, according to another embodiment, the information processing unit 230 may process voice information regarding an input made by a user.

According to an optional embodiment, the information processing unit 230 may include a storage unit for storing one or more pieces of Braille data information.

According to an optional embodiment, the information processing unit 230 may include a character determiner, a figure determiner, etc. for determining an input made by a user and may include a database for this purpose.

Also, as an additional example, the information processing unit 130 may include a text information conversion control unit for converting input information into text information.

According to an optional embodiment, when a user inputs a character, the information processing unit 230 may process expression information for a correct answer or an incorrect answer by determining whether the character input by the user is a correct character or not.

The expression unit 250 may be implemented in various forms. For example, the plurality of expression members (not shown) of the expression unit 250 may be arranged in correspondence to through holes (not shown) of a base (not shown), respectively, and may be sensed by fingers of a user by protruding out of the through holes (not shown) or receding into the through holes (not shown).

Also, although not shown, the structure of FIG. 6 or FIG. 7 may be applied as an optional embodiment.

The operation control unit 260 may control one or more operations of the expression unit 250 through a user's manipulation.

For example, the operation control unit 260 may initiate an operation of initializing the expression members (not shown) of the expression unit 250. More specifically, when the expression members (not shown) are being protruded, all of the expression members (not shown) may be returned to an original state, that is, non-protruding state, by manipulation of a user.

According to an optional embodiment, the operation control unit 260 may generate a preparation signal for the expression unit 250. For example, a user may operate the operation control unit 260 before making an input through the input unit 210. Only when a preparation signal of the operation control unit 260 is generated, the input information recognition unit 220 may perform recognition on an input operation of the input unit 210, and the expression unit 250 may perform an expression using a recognized content. Therefore, the efficiency of the operation of the input feedback-based smart pen 200 may be improved and power consumption may be reduced.

As described above, for example, as shown in FIGS. 8 and 9, a user may manipulate the input feedback-based smart pen 200 by using his/her hand to perform an input operation, an input content may be recognized by the input information recognition unit 220 as a result of the input operation, the protrusion of a plurality of expression members of the expression unit 250 may be controlled in response thereto, and the user may sense the protrusion of the expression members. For example, one of the user's fingers (more specifically, the index finger) may sense the protrusion.

An input feedback-based smart pen of the present embodiment enables a user to hold a main body, thereby facilitating an input operation through an input unit. At this time, as a result of the input operation, an input content may be visually displayed on paper like in the case of using an actual pencil or pen or may not be displayed. An input information recognition unit may recognize such input contents, and an expression unit may express recognized information. According to an optional embodiment, one or more pieces of processed information, e.g., Braille information, information indicating a correct answer or an incorrect answer, etc., may be transmitted to an expression unit based on information recognized by an input information recognition unit and made recognizable by a user through protrusion of one or more expression members of an expression unit.

With respect to a content input by a user through an input unit, the user may confirm information input by the user by detecting a protruding shape of expression members of an expression unit immediately or a short time after the input. For example, it may not be easy for a user with visual handicap to confirm information input by the user. In this case, an expression unit facilitates confirmation of the information.

Also, even a user who has not yet mastered characters may easily sense whether an input is correct or incorrect in the course of practicing characters through an expression unit. Here, the expression unit may express a correct answer and an incorrect answer in different pre-set protruding shapes of expression members other than in the form of Braille, thereby facilitating a user to recognize an expression indicating a correct answer or an incorrect answer.

Through this, it is possible to easily provide feedbacks on information input by users in various conditions, thereby improving user convenience of confirming and learning information.

In addition, it is possible to efficiently perform a continuous input operation and a feedback thereto by controlling the operation of the expression unit, for example, initialization through the operation control unit.

Also, since an operation control unit initiates recognition through an input information recognition unit and the operation of an expression unit regarding the recognition only when necessary, the efficiency and power consumption reduction characteristics of an input feedback-based smart pen may be improved.

Figure 11:
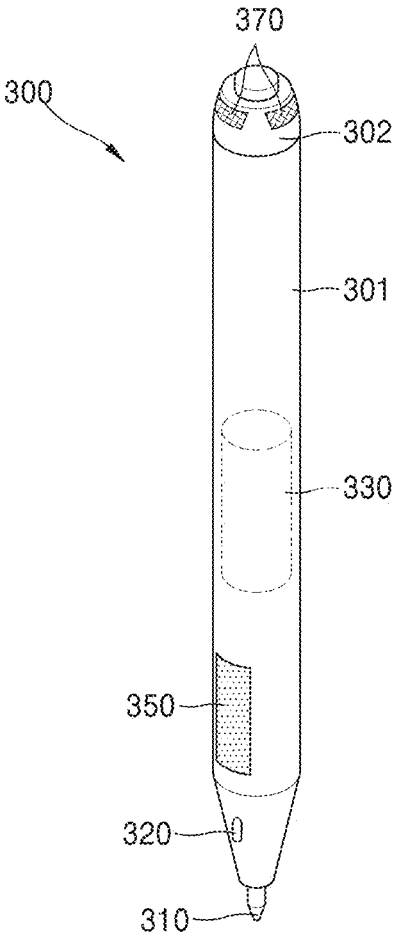
FIG. 11 is a diagram showing an input feedback-based smart pen according to another embodiment of the present disclosure.

FIG. 11 is a diagram showing an input feedback-based smart pen according to another embodiment of the present disclosure.

An input feedback-based smart pen 300 of the present embodiment may include a main body 301, an input unit 310, an input information recognition unit 320, an expression unit 350, and a speaker 370.

For convenience of explanation, descriptions below will focus on differences from the above-described embodiment.

The main body 301 may have a shape that enables manipulation of a user. For example, the main body 301 may have a pillar-like shape to be held by a user, and, as a specific example, may have a cylindrical shape, a prismatic shape, or an elliptical pillar-like shape.

When a user manipulates an input feedback main body 301, the user may hold the main body 301 by a hand, and, in this case, a top end 302 including an uppermost region located over the upper portion of the main body 301.

According to an optional embodiment, the top end 302 may include a region formed to be thinner than the main body 301, and, although not shown, according to another embodiment, a hook or a handle may be further formed at the top end 302 to improve user convenience.

The input unit 310 is connected to the main body 301 and may perform an input operation by a manipulation of a user. The input unit 310 may allow visual expression of forms like characters or drawings on a medium like paper. For example, the input unit 310 may have a shape similar to a portion of a ballpoint pen lead, a pencil lead, or a felt pen.

According to an optional embodiment, a result of an input operation of the input unit 310 may not be visually displayed on a medium like paper. For example, when there is an input operation of a user using the input unit 310, information regarding changes due to the movement of the input unit 310 may be recognized by the input information recognition unit 320 to be described later as a result of the input operation.

In this case, the input unit 310 may not need to separately provide a lead like a pencil lead, a ballpoint pen lead, or a felt pen.

The input information recognition unit 320 may recognize information input by a user by manipulating the input unit 310.

For example, when a user draws letters and/or drawings or performs various input operations on paper by using the input unit 310, the input information recognition unit 320 may recognizes visually identifiable information like letters, drawings, or figures drawn on the paper.

According to an optional embodiment, the input information recognition unit 320 may include an optical member, e.g., a photographing member.

As shown in FIG. 10, the input information recognition unit 320 may be formed in one area of the main body 301. For example, the input information recognition unit 320 may be formed at the bottom end of the main body 301.

According to an optional embodiment, the examples of FIGS. 2 and 3 may be applied.

According to an optional embodiment, the input information recognition unit 320 may include a motion detecting sensor to detect an input by the input unit 310. For example, when a user moves the input unit 310 to write a character by using the input unit 310, the movement of the input unit 310 may be detected. According to an optional embodiment, as described above, a result of an input operation using the input unit 310 may not be visually displayed. In this case, the input information recognition unit 320 including the motion detecting sensor may easily detect an input made by using the input unit 310.

According to an optional embodiment, the motion detecting sensor of the input information recognition unit 320 may not be exposed to the outside. For example, the motion detecting sensor may be disposed inside the main body 301. Alternatively, the input information recognition unit 320 may be formed inside or on one side of the input unit 310 through fine formation.

The expression unit 350 may be disposed on an area of the outer surface of the main body 301 to express information corresponding to input information recognized by the input information recognition unit 320.

The expression unit 350 may be formed to be recognizable by a user. For example, the expression unit 350 may be formed in correspondence to a finger of a user.

The expression unit 350 may include one or more expression members (not shown) to be recognizable by a user. For example, the expression unit 350 may include a plurality of expression members (not shown).

The expression member (not shown) may be formed to be recognizable by a user by moving to protrude toward at least one area of a finger of the user.

Although not shown, the structures of FIGS. 4 and 5 may also be applied to the present embodiment.

The expression unit 350 may express content input by a user through the input unit 310. For example, when a user inputs a character through the input unit 310, the input information recognition unit 320 may recognize the input in various ways as described above. Recognized information may be expressed by the expression unit 350, and the user may sense an expression of the expression unit 350.

Therefore, the user may sense information about contents input through the input unit 310.

According to an optional embodiment, when a user is visually handicapped with no vision or very weak eyes, it may not be easy to visually confirm even content that the user inputs through the input unit 310. According to the present embodiment, in such a case, the expression unit 350 may allow a user to confirm an input by allowing the user to sense information about the input through protrusion of the expression member (not shown).

As a specific example, when a user intends to input the character "san (mountain)" through the input unit 310, the input information recognition unit 320 may recognize content of the input through the input unit 310, the expression unit 350 may express the content to allow the user to sense an expression thereof, and, even when it is difficult for the user to visually confirm the input made by the user due to visual handicap, the user may confirm the input by sensing protrusion of the expression member (not shown) of the expression unit 350. The protrusion of the expression member (not shown) may correspond to a type of Braille. For example, when "san (mountain)" is input through the input unit 310, the expression member (not shown) of the expression unit 350 may have a protruding shape to express "mountain" in Braille.

According to an optional embodiment, an information processing unit 330 may be further provided, and the information processing unit 330 may process various information by using information recognized by the input information recognition unit 320 and transmit processed information to the expression unit 350.

For example, the information processing unit 330 may process Braille information regarding an input made by a user.

Also, according to another embodiment, the information processing unit 330 may process voice information regarding an input made by a user.

According to an optional embodiment, the information processing unit 330 may include a storage unit for storing one or more pieces of Braille data information.

According to an optional embodiment, the information processing unit 330 may include a character determiner, a figure determiner, etc. for determining an input made by a user and may include a database for this purpose.

Also, as an additional example, the information processing unit 130 may include a text information conversion control unit for converting input information into text information.

According to an optional embodiment, when a user inputs a character, the information processing unit 330 may process expression information for a correct answer or an incorrect answer by determining whether the character input by the user is a correct character or not.

The expression unit 350 may be implemented in various forms. For example, the plurality of expression members (not shown) of the expression unit 350 may be arranged in correspondence to through holes (not shown) of a base (not shown), respectively, and may be sensed by fingers of a user by protruding out of the through holes (not shown) or receding into the through holes (not shown).

Also, although not shown, the structure of FIG. 6 or FIG. 7 may be applied as an optional embodiment.

The speaker 370 is formed to generate a sound (e.g., a voice) including one or more pieces of information to a user and, for example, may be formed in one area of the top end 302.

For example, after a content is input through the input unit 310, the input information recognition unit 320 may recognize the content, and the expression unit 350 may express a recognized content through the speaker 370, wherein the recognized content may be expressed in voice by the expression unit 350. For example, the expression unit 350 may inform the recognized content to a user by a voice "san (mountain)".

Also, a user may be informed of a set problem through the speaker 370 by voice. As a result of an input operation of the user for the set problem through the input unit 310, the input information recognition unit 320 may recognize an input content input by the user, and the expression unit 350 or the speaker 370 may feedback the input content input by the user.

At this time, the input content may be directly fed back to be sensed (e.g., an expression corresponding to "san (mountain)") or it may be indirectly fed back by expressing "correct" or "incorrect" based on whether a correct input for the set problem is input, wherein such expressions may be made by pre-set protruding shapes of expression members of the expression unit 350.

Through this, it is possible to expand the operation and usability of the input feedback-based smart pen 300 and increase user convenience.

An input feedback-based smart pen of the present embodiment enables a user to hold a main body, thereby facilitating an input operation through an input unit. At this time, as a result of the input operation, an input content may be visually displayed on paper like in the case of using an actual pencil or pen or may not be displayed. An input information recognition unit may recognize such input contents, and an expression unit may express recognized information. According to an optional embodiment, one or more pieces of processed information, e.g., Braille information, information indicating a correct answer or an incorrect answer, etc., may be transmitted to an expression unit based on information recognized by an input information recognition unit and made recognizable by a user through protrusion of one or more expression members of an expression unit.

With respect to a content input by a user through an input unit, the user may confirm information input by the user by detecting a protruding shape of expression members of an expression unit immediately or a short time after the input. For example, it may not be easy for a user with visual handicap to confirm information input by the user. In this case, an expression unit facilitates confirmation of the information.

Also, even a user who has not yet mastered characters may easily sense whether an input is correct or incorrect in the course of practicing characters through an expression unit. Here, the expression unit may express a correct answer and an incorrect answer in different pre-set protruding shapes of expression members other than in the form of Braille, thereby facilitating a user to recognize an expression indicating a correct answer or an incorrect answer.

Through this, it is possible to easily provide feedbacks on information input by users in various conditions, thereby improving user convenience of confirming and learning information.

Also, an input feedback-based smart pen may be used for various purposes by notifying a user of various information (e.g., content expressed by an expression unit for information input by the user) by voice through a speaker or by informing the user of a set problem in advance.

For example, an input feedback-based smart pen may facilitate character learning of a user. As a specific example, after a problem is given through speaker and the user inputs a character corresponding to the problem, the user may receive a direct feedback indicating whether the input character is correctly input.

Therefore, it is possible to increase the convenience of users in the process of learning characters or users having visual handicap.

Figure 12:
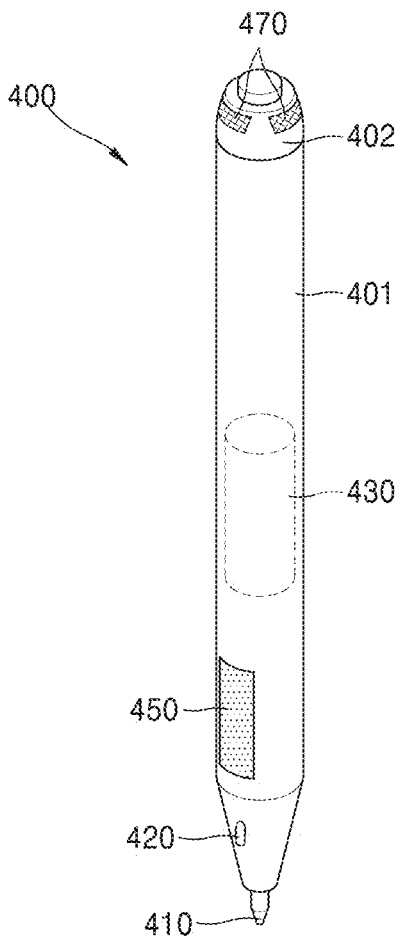
FIG. 12 is a diagram showing an input feedback-based smart pen according to another embodiment of the present disclosure.

FIG. 12 is a diagram showing an input feedback-based smart pen according to another embodiment of the present disclosure.

FIGS. 13 to 17 are diagrams showing examples of use of the input feedback-based smart pen of FIG. 12.

An input feedback-based smart pen 400 of the present embodiment may include a main body 401, an input unit 410, an input information recognition unit 420, an expression unit 450, and a speaker 470.

For convenience of explanation, descriptions below will focus on differences from the above-described embodiment.

The main body 401 may have a shape that enables manipulation of a user. For example, the main body 401 may have a pillar-like shape to be held by a user, and, as a specific example, may have a cylindrical shape, a prismatic shape, or an elliptical pillar-like shape.

When a user manipulates an input feedback main body 401, the user may hold the main body 401 by a hand, and, in this case, a top end 402 including an uppermost region located over the upper portion of the main body 401.

According to an optional embodiment, the top end 402 may include a region formed to be thinner than the main body 401, and, although not shown, according to another embodiment, a hook or a handle may be further formed at the top end 402 to improve user convenience.

The input unit 410 is connected to the main body 401 and may perform an input operation by a manipulation of a user. The input unit 410 may allow visual expression of forms like characters or drawings on a medium like paper. For example, the input unit 410 may have a shape similar to a portion of a ballpoint pen lead, a pencil lead, or a felt pen.

According to an optional embodiment, a result of an input operation of the input unit 410 may not be visually displayed on a medium like paper. For example, when there is an input operation of a user using the input unit 410, information regarding changes due to the movement of the input unit 410 may be recognized by the input information recognition unit 420 to be described later as a result of the input operation.

In this case, the input unit 410 may not need to separately provide a lead like a pencil lead, a ballpoint pen lead, or a felt pen.

The input information recognition unit 420 may recognize information input by a user by manipulating the input unit 410.

For example, when the user inputs a character or a drawing or performs other various input operations on paper using the input unit 410, the input information recognition unit 420 recognizes visually verifiable information such as characters, pictures, or figures written on the paper.

According to an optional embodiment, the input information recognition unit 420 may include an optical member, e.g., a photographing member.

As shown in FIG. 12, the input information recognition unit 420 may be formed in one area of the main body 401. For example, the input information recognition unit 420 may be formed at the bottom end of the main body 401.

According to an optional embodiment, the examples of FIGS. 2 and 3 may be applied.

According to an optional embodiment, the input information recognition unit 420 may include a motion detecting sensor to detect an input by the input unit 410. For example, when a user moves the input unit 410 to write a character by using the input unit 410, the movement of the input unit 410 may be detected. According to an optional embodiment, as described above, a result of an input operation using the input unit 410 may not be visually displayed. In this case, the input information recognition unit 420 including the motion detecting sensor may easily detect an input made by using the input unit 410.

According to an optional embodiment, the motion detecting sensor of the input information recognition unit 420 may not be exposed to the outside. For example, the motion detecting sensor may be disposed inside the main body 401. Alternatively, the input information recognition unit 420 may be formed inside or on one side of the input unit 410 through fine formation.

The expression unit 450 may be disposed on an area of the outer surface of the main body 401 to express information corresponding to input information recognized by the input information recognition unit 420.

The expression unit 450 may be formed to be recognizable by a user. For example, the expression unit 450 may be formed in correspondence to a finger of a user.

The expression unit 450 may include one or more expression members (not shown) to be recognizable by a user. For example, the expression unit 450 may include a plurality of expression members (not shown).

The expression member (not shown) may be formed to be recognizable by a user by moving to protrude toward at least one area of a finger of the user.

Although not shown, the structures of FIGS. 4 and 5 may also be applied to the present embodiment.

The expression unit 450 may express content input by a user through the input unit 410. For example, when a user inputs a character through the input unit 410, the input information recognition unit 420 may recognize the input in various ways as described above. Recognized information may be expressed by the expression unit 450, and the user may sense an expression of the expression unit 450.

Therefore, the user may sense information about contents input through the input unit 410.

According to an optional embodiment, when a user is visually handicapped with no vision or very weak eyes, it may not be easy to visually confirm even content that the user inputs through the input unit 410. According to the present embodiment, in such a case, the expression unit 450 may allow a user to confirm an input by allowing the user to sense information about the input through protrusion of the expression member (not shown).

As a specific example, when a user intends to input the character "san (mountain)" through the input unit 410, the input information recognition unit 420 may recognize content of the input through the input unit 410, the expression unit 450 may express the content to allow the user to sense an expression thereof, and, even when it is difficult for the user to visually confirm the input made by the user due to visual handicap, the user may confirm the input by sensing protrusion of the expression member (not shown) of the expression unit 450. The protrusion of the expression member (not shown) may correspond to a type of Braille. For example, when "san (mountain)" is input through the input unit 410, the expression member (not shown) of the expression unit 450 may have a protruding shape to express "mountain" in Braille.

According to an optional embodiment, an information control unit 430 may be further provided, and the information control unit 430 may process various information by using information recognized by the input information recognition unit 420 and transmit processed information to the expression unit 450.

For example, the information control unit 430 may process Braille information regarding an input made by a user.

Also, according to another embodiment, the information control unit 430 may process voice information regarding an input made by a user.

According to an optional embodiment, the information control unit 430 may include a storage unit for storing one or more pieces of Braille data information.

According to an optional embodiment, the information control unit 430 may include a character determiner, a figure determiner, etc. for determining an input made by a user and may include a database for this purpose.

Also, as an additional example, the information processing unit 130 may include a text information conversion control unit for converting input information into text information.

According to an optional embodiment, when a user inputs a character, the information control unit 430 may process expression information for a correct answer or an incorrect answer by determining whether the character input by the user is a correct character or not.

The expression unit 450 may be implemented in various forms. For example, the plurality of expression members (not shown) of the expression unit 450 may be arranged in correspondence to through holes (not shown) of a base (not shown), respectively, and may be sensed by fingers of a user by protruding out of the through holes (not shown) or receding into the through holes (not shown).

Also, the information control unit 430 may generate and handle a set problem. For example, a user may be asked to input a content for a set problem, and more specifically, a specific character, and such a set problem may be presented to the user through the expression unit 450 or through the speaker 470 according to an optional embodiment to be described later.

To this end, the information control unit 430 may include a storage unit including one or more characters, words, etc. or may be connected to such a storage unit. Also, according to an optional embodiment, the information control unit 430 may be connected to the storage unit wirelessly, and, as occasions demand, the information control unit 430 may receive information through data connection and communication using the web.

According to an optional embodiment, a wireless communication module connected to the information control unit 430 or a separate wireless communication module may be provided, and information about the a user's operation may be transmitted to an external device, such as a smartphone, through the wireless communication module.

According to an optional embodiment, an input feedback-based smart pen according to the present embodiment or the previous embodiment may be connected to an external terminal, e.g., a user's smartphone, for communication and output a content to be output from an expression unit to the smartphone.

Also, one or more pieces of information of the smartphone may be transmitted to the expression unit, such that the user may sense the information.

Also, although not shown, the structure of FIG. 6 or FIG. 7 may be applied as an optional embodiment.

The speaker 470 is formed to generate a sound (e.g., a voice) including one or more pieces of information to a user and, for example, may be formed in one area of the top end 402.

For example, after a content is input through the input unit 410, the input information recognition unit 420 may recognize the content, and the expression unit 450 may express a recognized content through the speaker 470, wherein the recognized content may be expressed in voice by the expression unit 450. For example, the expression unit 450 may inform the recognized content to a user by a voice "san (mountain)".

Also, as described above, when the information control unit 430 generates a set problem, a user may be informed of the set problem through the speaker 470 by voice. As a result of an input operation of the user for the set problem through the input unit 410, the input information recognition unit 420 may recognize an input content input by the user, and the expression unit 450 or the speaker 470 may feedback the input content input by the user.

At this time, it is possible to detect the content directly fed back, for example, "mountain", or mark it as "correct" or "wrong" by distinguishing whether the input for the set problem was indirectly correct or not. In this regard, it may be informed in the form of protrusions of the expression members of the expression unit 450 set in advance.

Therefore, the operation and the usability of the input feedback-based smart pen 400 may be expanded and user convenience may be improved.

Detailed descriptions thereof will be given with reference to FIGS. 13 to 17.

Figure 13:
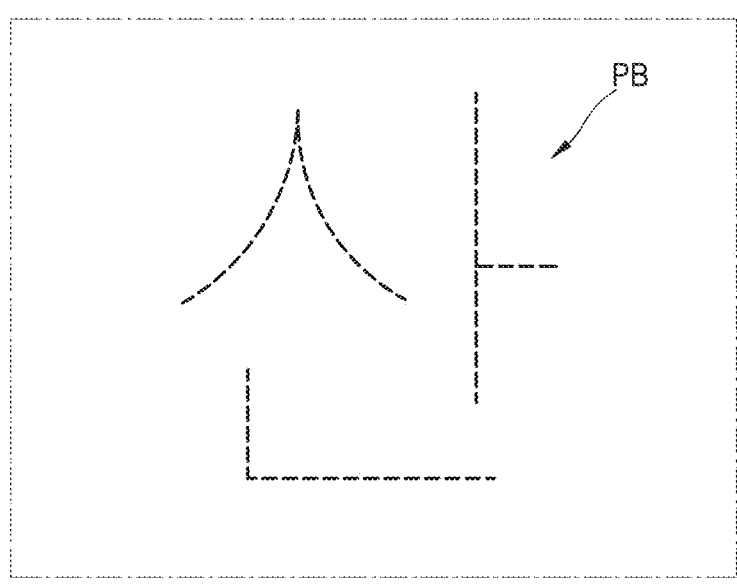
FIGS. 13 to 17 are diagrams showing examples of use of the input feedback-based smart pen of FIG. 12.

Referring to FIG. 13, the contents of the setting problem PB are displayed. For example, a set problem PB is a character "san (mountain)". This set problem PB may be generated by the information control unit 430 and may be output as voice through the speaker 470, such that a user may recognize it.

Also, according to an optional embodiment, the set problem PB may be recognized by a user through the protruding shape of the expression members of the expression unit 450, e.g., a Braille.

Figure 14:
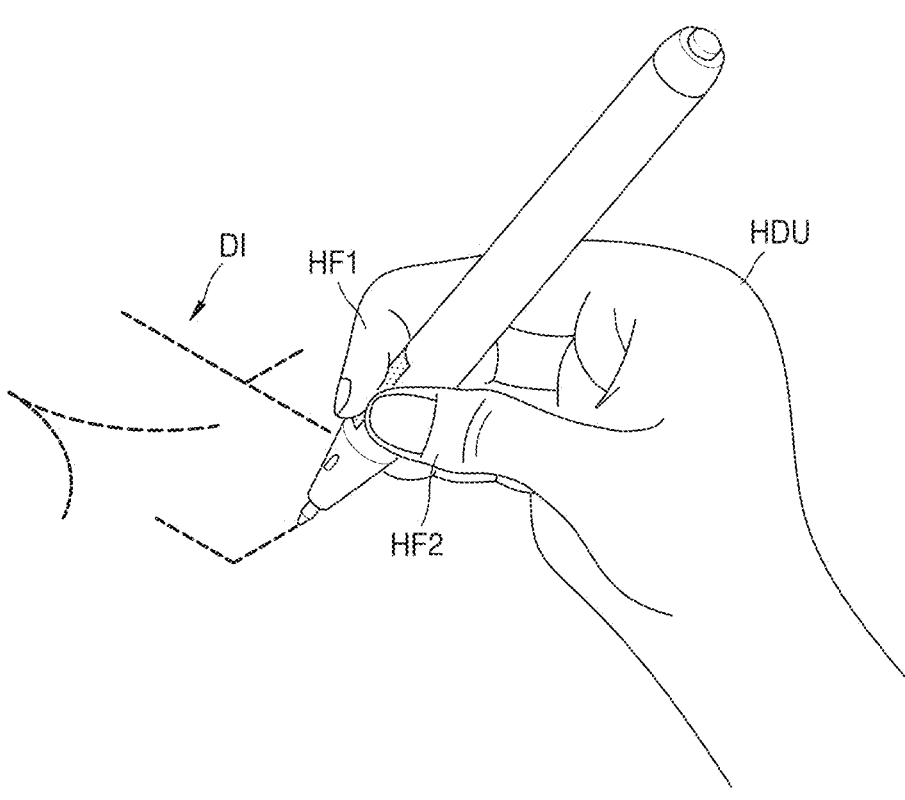

The user may sense such a set problem and input a content corresponding to the set problem. For example, as shown in FIG. 14, a content corresponding to a set problem may be input by manipulating the input feedback-based smart pen 400 by a hand.

Here, when the content input by the user through the input unit 410 matches with the set problem PB (for example, when the character "san (mountain)" is accurately written), the expression unit 450 may express the content, that is, "san (mountain)". The expression may be in the form of Braille form or may be in the form of other symbols. According to an optional embodiment, a voice "san (mountain)" may be output through the speaker 470.

Figure 15:
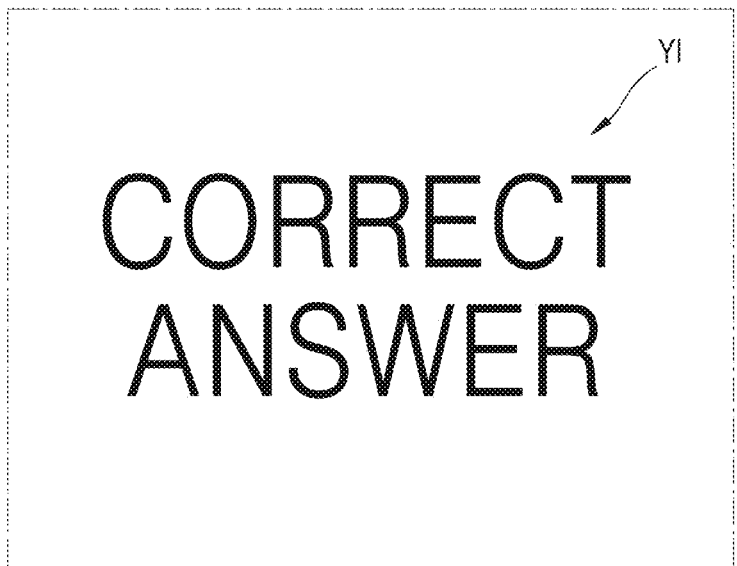

Also, according to an optional embodiment, information indicating that an input content matches with a set problem may be output. For example, matching information YI may be expressed as shown in FIG. 15. For example, the word "correct answer" may be expressed through the expression unit 450 or a voice "correct answer" may be output through the speaker 470.

On the other hand, a content input by a user may not match with a set problem.

Figure 16:
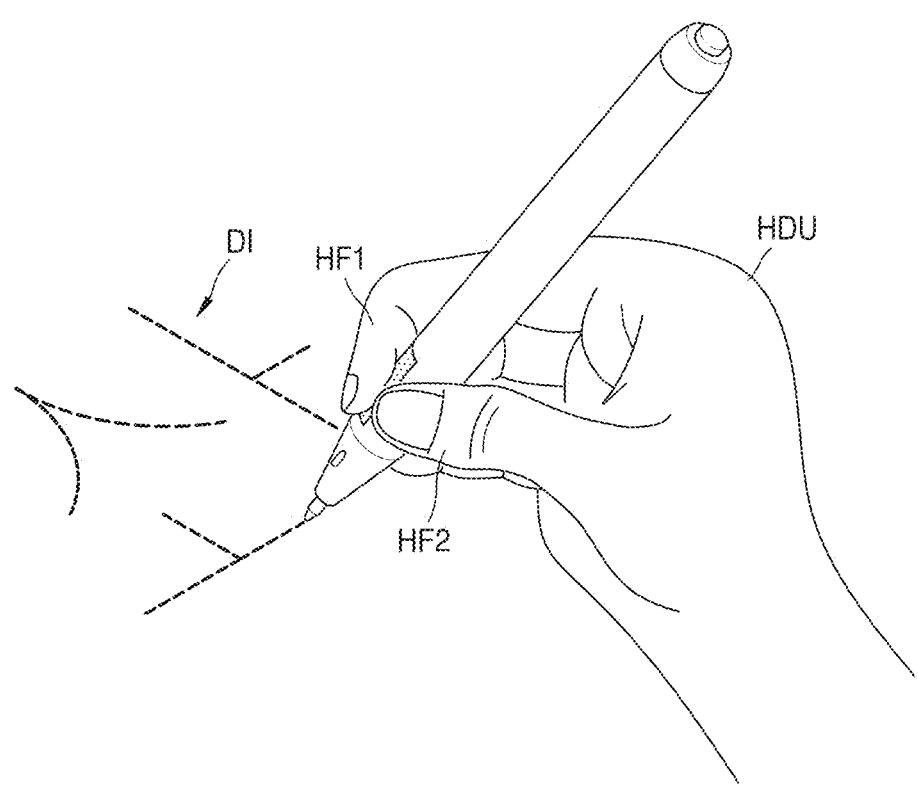

For example, as shown in FIG. 16, a content corresponding to the set problem PB may be input by manipulating the input feedback-based smart pen 400 by a hand and, when the input content does not match with the set problem PB (for example, when the character "san (mountain)" is incorrectly written and may not be read as "san"), the expression unit 450 may express that the input content is not recognizable or does not match with the set problem PB and, as a specific example, may express "not acceptable". The expression may be in the form of Braille form or may be in the form of other symbols. According to an optional embodiment, a voice "not acceptable" may be output through the speaker 470.

Figure 17:
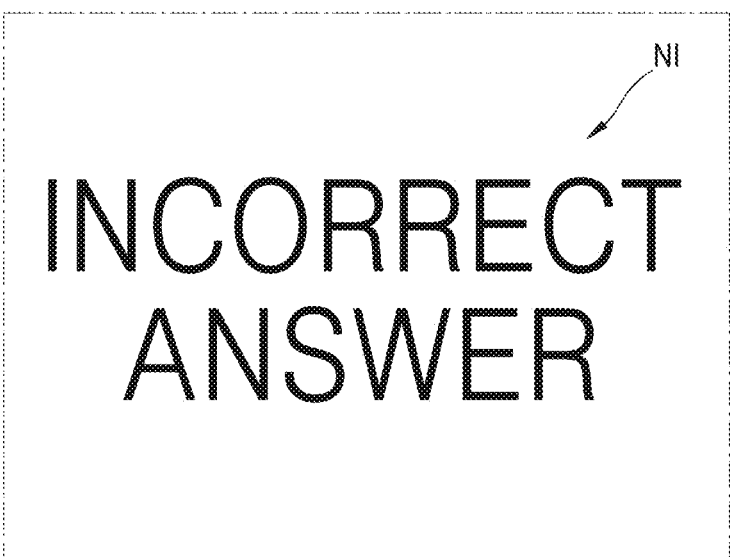

Also, according to an optional embodiment, information indicating that an input content does not match with a set problem may be output. For example, non-matching information NI may be expressed as shown in FIG. 17. For example, the word "incorrect answer" may be expressed through the expression unit 450 or a voice "incorrect answer" may be output through the speaker 470.

An input feedback-based smart pen of the present embodiment enables a user to hold a main body, thereby facilitating an input operation through an input unit. At this time, as a result of the input operation, an input content may be visually displayed on paper like in the case of using an actual pencil or pen or may not be displayed. An input information recognition unit may recognize such input contents, and an expression unit may express recognized information. According to an optional embodiment, one or more pieces of processed information, e.g., Braille information, information indicating a correct answer or an incorrect answer, etc., may be transmitted to an expression unit based on information recognized by an input information recognition unit and made recognizable by a user through protrusion of one or more expression members of an expression unit.

With respect to a content input by a user through an input unit, the user may confirm information input by the user by detecting a protruding shape of expression members of an expression unit immediately or a short time after the input. For example, it may not be easy for a user with visual handicap to confirm information input by the user. In this case, an expression unit facilitates confirmation of the information.

Also, even a user who has not yet mastered characters may easily sense whether an input is correct or incorrect in the course of practicing characters through an expression unit. Here, the expression unit may express a correct answer and an incorrect answer in different pre-set protruding shapes of expression members other than in the form of Braille, thereby facilitating a user to recognize an expression indicating a correct answer or an incorrect answer.

Through this, it is possible to easily provide feedbacks on information input by users in various conditions, thereby improving user convenience of confirming and learning information.

In addition, it is possible to easily receive feedback on the content entered by the user by generating and presenting a setting problem to the user, and expressing whether the user responds to the input as a correct or incorrect answer.

Therefore, the input feedback-based smart pen may facilitate character learning of a user. As a specific example, convenience of users in the process of learning characters or users having visual handicap may be improved.

Figure 18:
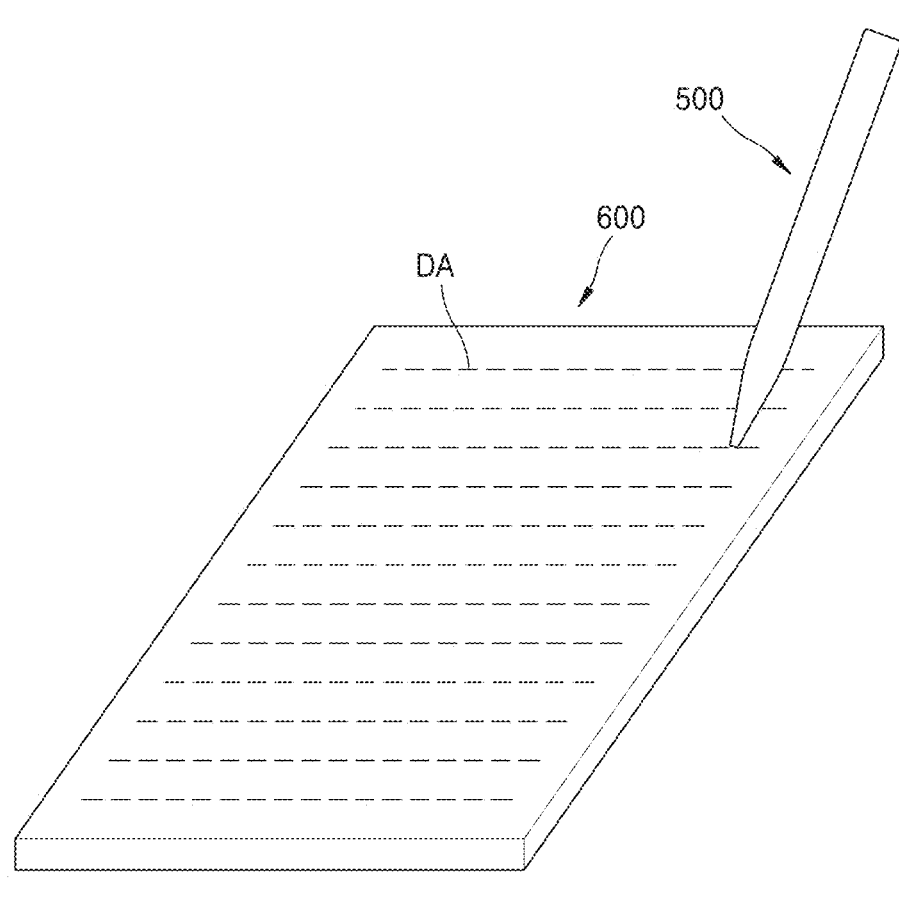
FIG. 18 is a diagram for schematically describing a protruding feedback-based smart tablet according to an embodiment of the present disclosure.
Figure 19:
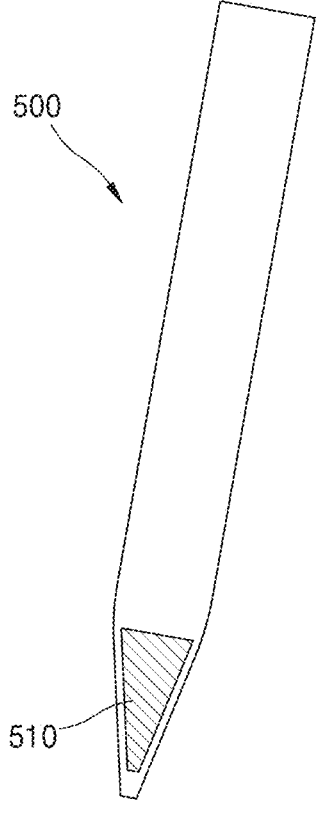
FIGS. 19 and 20 are views of an input pen shown in FIG. 18.
Figure 20:
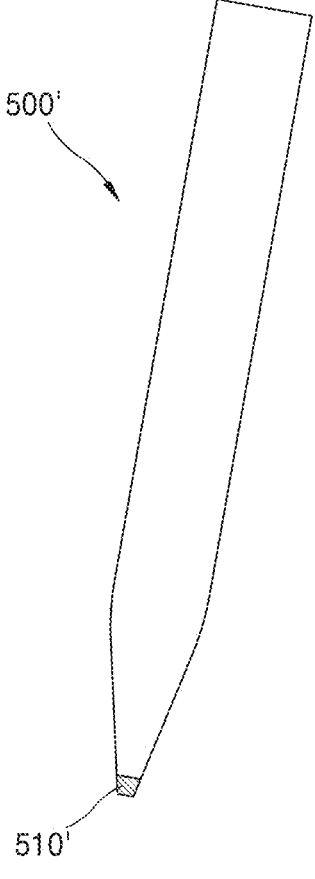

FIG. 18 is a diagram schematically showing a protruding feedback-based smart tablet according to an embodiment of the present disclosure, and FIGS. 19 and 20 are diagrams showing an input pen shown in FIG. 18.

Figure 21:
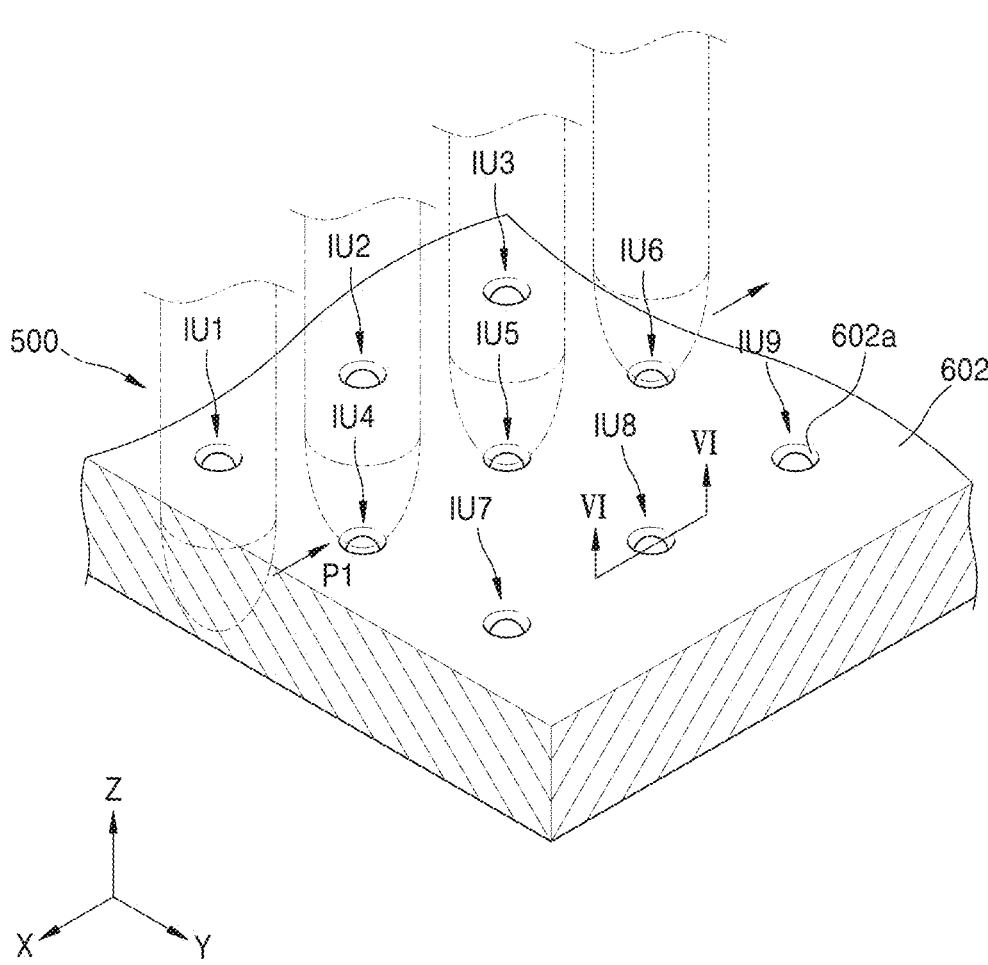
FIGS. 21 and 22 are diagrams for describing the operation of the protruding feedback-based smart tablet of FIG. 18.
Figure 22:
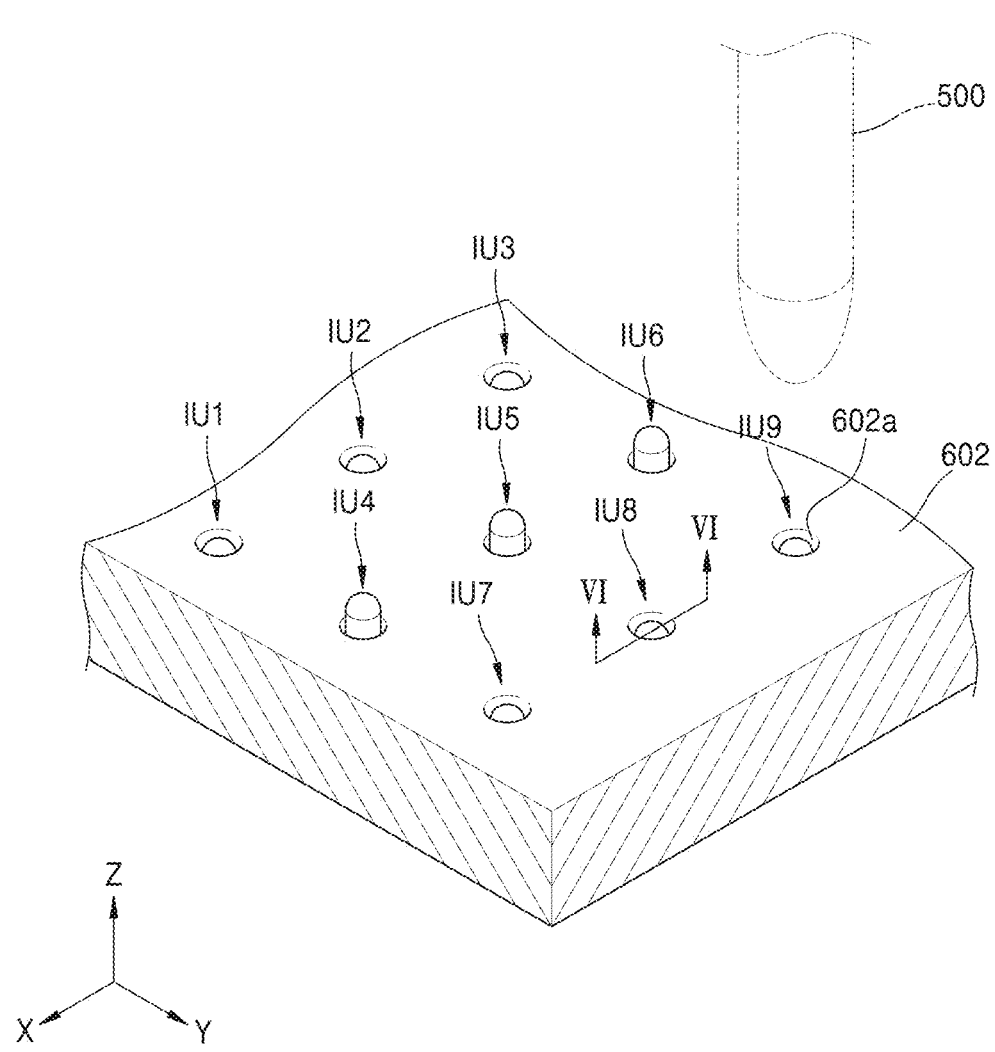

FIGS. 21 and 22 are diagrams for describing the operation of the protruding feedback-based smart tablet of FIG. 18.

Referring to FIG. 18, a protruding feedback-based smart tablet 600 of the present embodiment may include an expression area DA.

A plurality of output units (described later in FIG. 21 and the like) are formed in the expression area DA.

A user may make various inputs to the expression area DA by using an input pen 500. For example, a user may write characters, draw figures, and make inputs in various other forms.

A plurality of output units may protrude in the expression area DA according to a shape input by the user using the input pen 500, and a shape input by the user by using the input pen 500 (e.g., a character or a figure) may be output through a protruding shape. As a specific example, the user may visually or tactilely sense an output shape.

According to an embodiment, when a user inputs one character or a character string in the expression area DA by using the input pen 500, a plurality of output units may protrude in response to the input, and, after the user puts down the input pen 500, the user may confirm the character or the character string input by the user by tactilely sensing a protruding shape of the output units through a finger or a palm. The protruding shape may also be visually confirmed.

Therefore, after a user having visual handicap inputs a character by using the input pen 500, the user may tactilely sense the character written by the user through the protruding shape of a plurality of output units and check whether the character is correctly written by the user.

The input pen 500 may have various shapes.

Referring to FIG. 19, the input pen 500 may include a magnetic body 510. For example, the magnetic body 510 may be accommodated in the input pen 500, and the magnetic body 510 may include a permanent magnet.

Also, according to another embodiment, when a permanent magnet is included in an output unit to be described later, the magnetic body 510 may include, for example, iron, nickel, or a stainless steel-based alloy material.

According to an optional embodiment, the magnetic body 510 may be disposed to face an end of the input pen 500, and, for example, may be disposed to be located close to a lower end, that is, the expression area DA of the protruding feedback-based smart tablet 600, when the user holds the input pen 500 in his hand and makes an input.

Also, according to an optional embodiment, when the magnetic body 510 includes a permanent magnet, the permanent magnet may be disposed, such that one pole (e.g., an N pole or an S pole) faces an end of the input pen 500.

Through the movement of the input pen 500 including the magnetic body 510, the output units of the expression area DA of the protruding feedback-based smart tablet 600 may protrude by a magnetic field due to the magnetic body 510. Detailed descriptions thereof will be given later.

FIG. 20 is a modified example of FIG. 19, wherein an input pen 500' includes a magnetic body 510', and the magnetic body 510' may be disposed in a shape protruding to the outside. For example, at least one area of the magnetic body 510' may be disposed outside the input pen 500', and, as a specific example, may be exposed at the lower end of the input pen 500'.

Also, according to an optional embodiment, the magnetic body 510' may be connected or attached to the lower end of the input pen 500'.

FIGS. 21 and 22 are diagrams for describing the operation of the protruding feedback-based smart tablet of FIG. 18.

FIG. 21 is an enlarged view of an area of the expression area DA of the protruding feedback-based smart tablet 600 including a plurality of output units. For example, in FIG. 21, nine output units IU1 to IU9 are shown. However, it is for merely convenience of explanation, and the number of output units included in the expression area DA of the protruding feedback-based smart tablet 600 may vary in consideration of the size of the expression area DA, the resolution of an output shape, etc.

Referring to FIG. 21, all of the plurality of output units IU1 to IU9 of the protruding feedback-based smart tablet 600 have non-protruding shapes. For example, all of the output units IU1 to IU9 have shapes which do not protrude through an expression penetration portion 602a formed in a cover portion 602.

A user may hold the input pen 500 and makes an input by freely moving the input pen 500. For example, the user may draw a character, a figure, or a drawing.

For example, as shown in FIG. 21, a line shape may be input by moving the input pen 500 in a direction D1. As a specific example, the input may correspond to drawing a line on paper with a pen.

FIG. 22 shows that output units IU4, IU5, and IU6 from among the plurality of output units IU1 to IU9 protrude according to a user's input through the input pen 500.

For example, when the input pen 500 is moved on the expression area DA, and more specifically, on the expression area DA while in contact with at least one area of the expression area DA to draw a line, output units IU4, IU5, and IU6 corresponding to a moved path may protrude.

As described above, the output units IU4, IU5, and IU6 adjacent to the magnetic body 510 of the input pen 500 may be protruded by a magnetic field due to the magnetic body 510 of the input pen 500.

According to an optional embodiment, the output units IU4, IU5, and IU6 having a protruding shape may maintain the shape for a certain period of time. Therefore, a user may check a shape input by the user, e.g., the shape of a line, and, as a specific example, even a user having visual handicap may tactilely sense the shape of a line input by the user.

Also, by using a reset member (not shown), the output units IU4, IU5, and IU6 in a protruding state may be reset to their original state, that is, a non-protruding state. Such a reset member (not shown) may be disposed inside or on one surface of the protruding feedback-based smart tablet 600. According to another embodiment, the reset member (not shown) may be separately provided.

Also, according to an optional embodiment, a reset member (not shown) may be provided at the input pen 500.

Detailed descriptions of such a reset member (not shown) will be given later.

The output units IU1 to IU9 will be described below in detail. For convenience of explanation, one output unit will be described.

Figure 23:
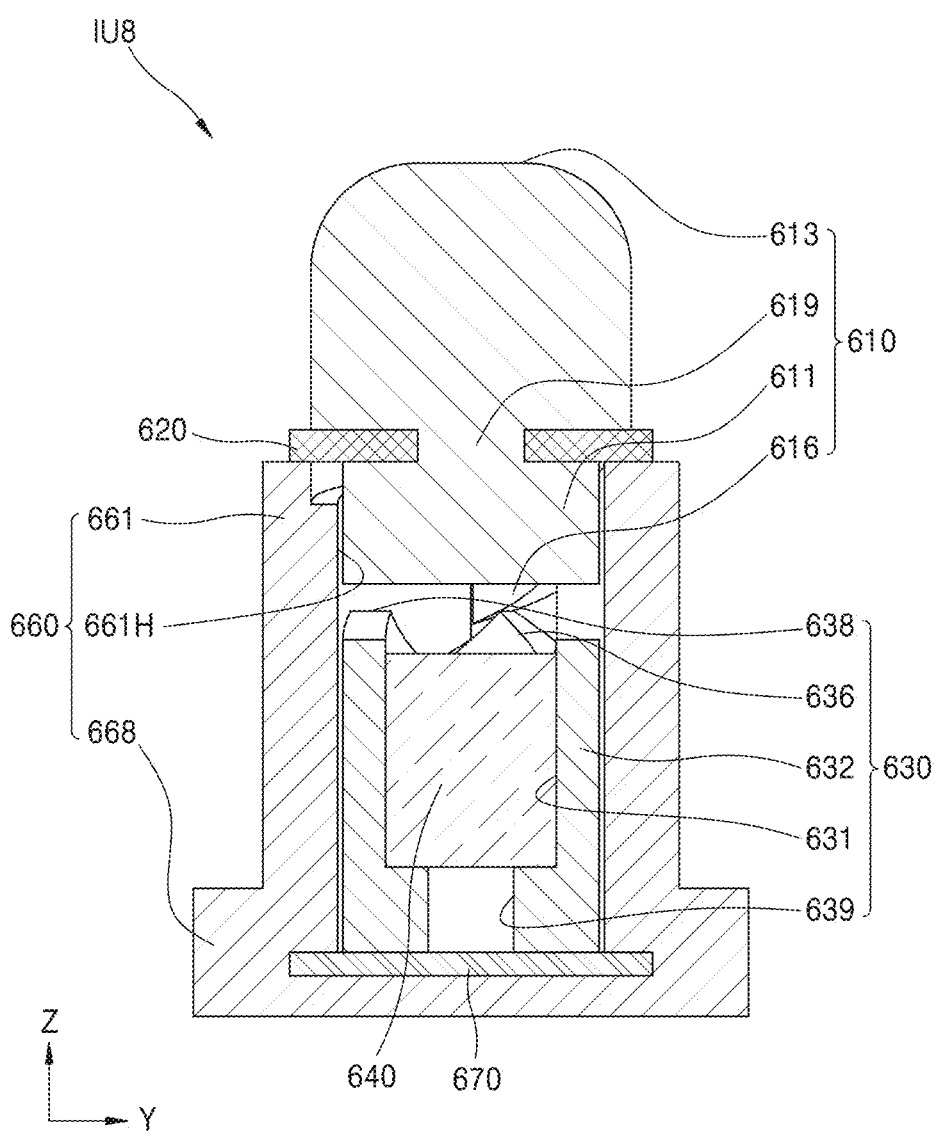
FIG. 23 is a cross-sectional view taken along a line VI-VI of FIG. 21.
Figure 24:
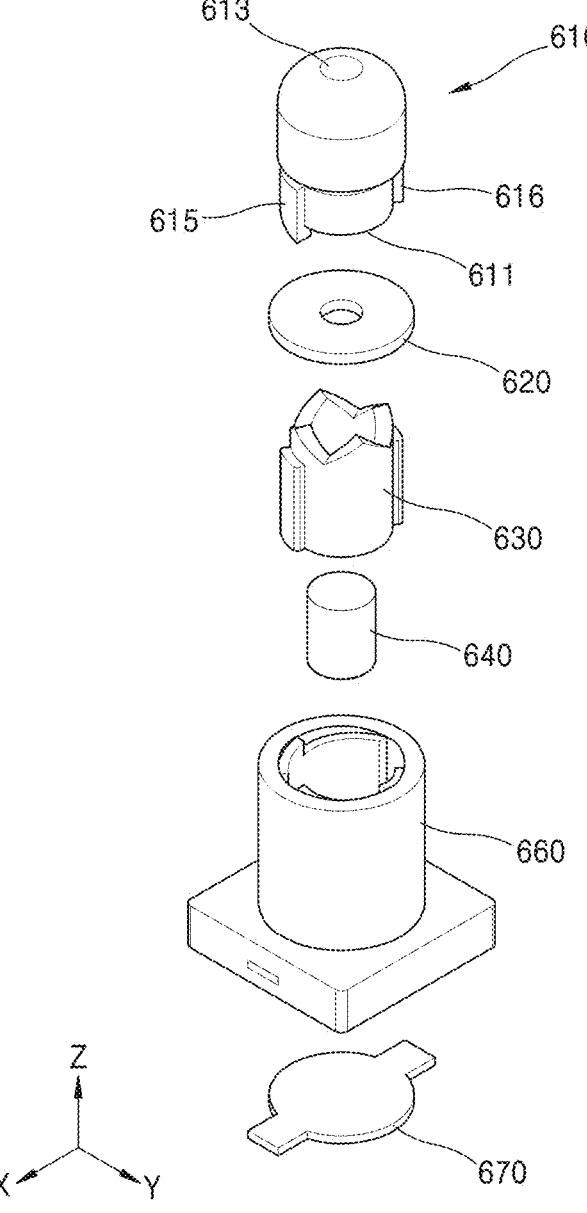
FIG. 24 is an exploded perspective view of one output unit of FIG. 21 for convenience of explanation.

FIG. 23 is a cross-sectional view taken along a line VI-VI of FIG. 21, and FIG. 24 is an exploded perspective view of one output unit of FIG. 21 illustrated for convenience of explanation.

An output unit IU8 may include an expression unit 610, a moving unit 630, a magnetic unit 640, and a base unit 660.

According to an optional embodiment, the output unit IU8 of the present embodiment may further include an expression unit insert 620.

According to an optional embodiment, the output unit IU8 may further include a base unit insert 670.

Each member will be described in detail with reference to the attached drawings.

Figure 25:
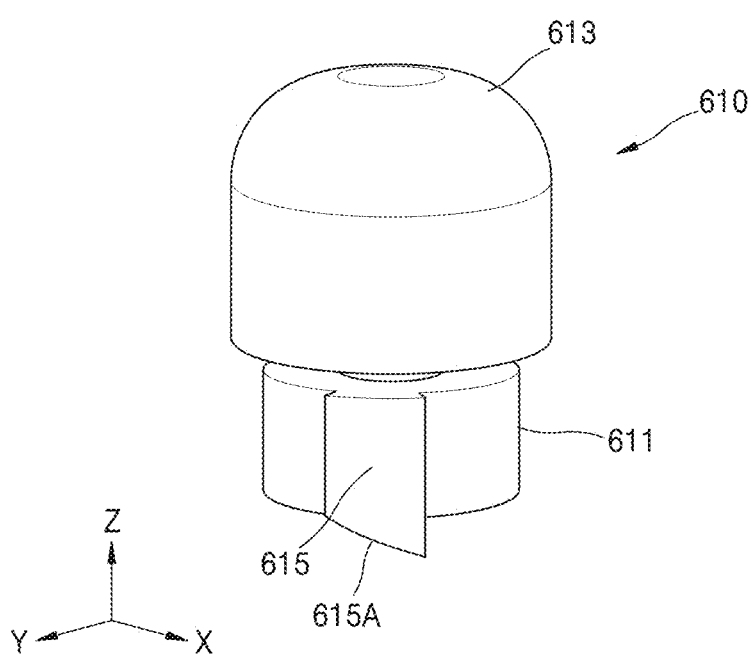
FIG. 25 is a schematic perspective view of an expression unit of an output unit of FIG. 23.
Figure 26:
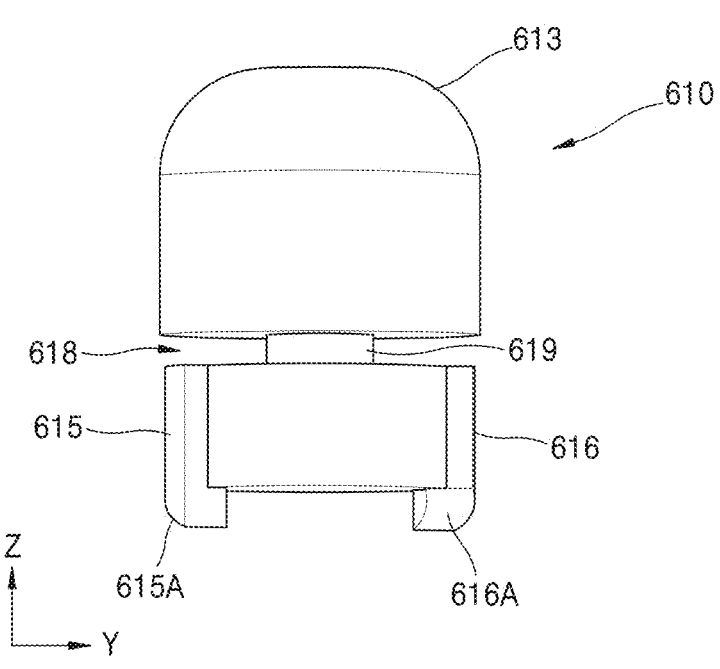
FIG. 26 is a schematic front view of the expression unit of the output unit of FIG. 23.
Figure 27:
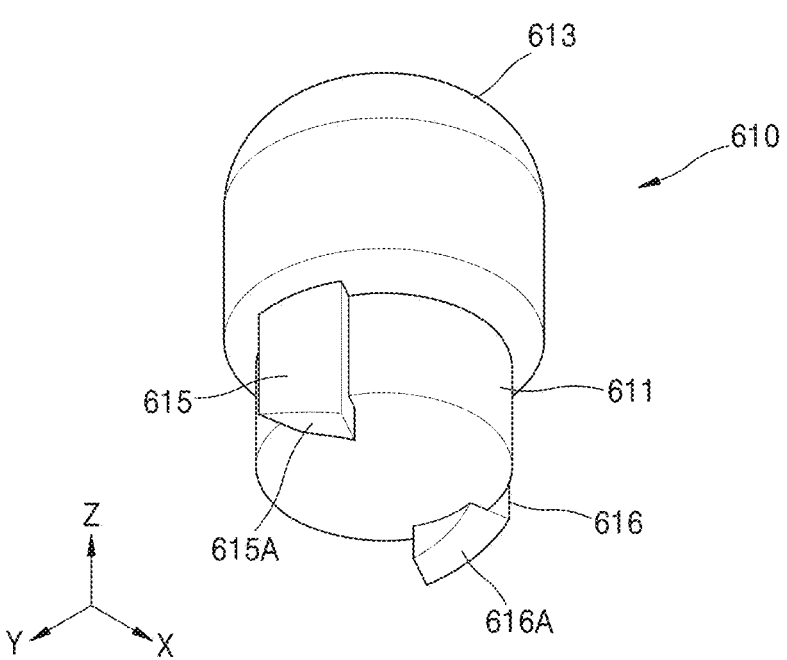
FIG. 27 is a perspective view taken in a direction different from that of FIG. 25.
Figure 28:
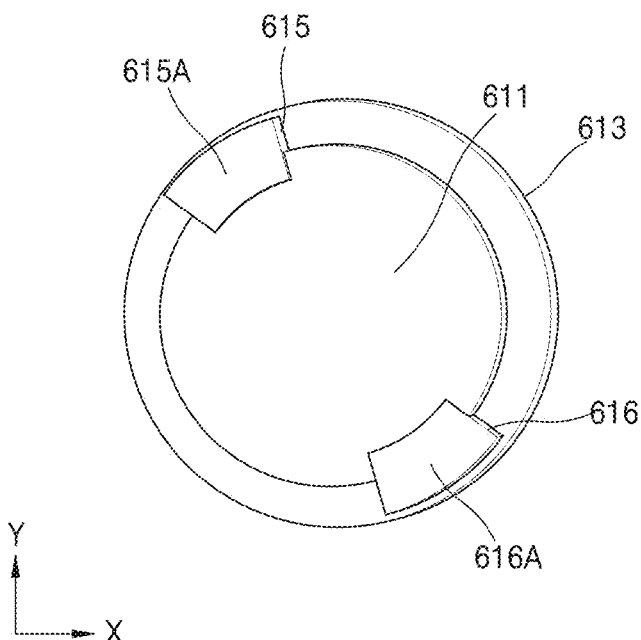
FIG. 28 is a schematic bottom view of the expression unit of the output unit of FIG. 23.

FIG. 25 is a schematic perspective view of an expression unit of an output unit of FIG. 23, FIG. 26 is a schematic front view of the expression unit of the output unit of FIG. 23, FIG. 27 is a perspective view of the expression unit of the output unit of FIG. 23 taken in a direction from that of FIG. 25, and FIG. 28 is a schematic bottom view of the expression unit of the output unit of FIG. 23.

The expression unit 610 may move according to the movement of the moving unit 630 to be described later and may move upward and downward at least in the lengthwise direction of the expression unit 610. Therefore, the expression unit 610 may be moved to protrude in one direction, and a user may sense the movement of the expression unit 610 tactilely or visually.

The expression unit 610 may include a body member 611, an expression member 613, and transmission members 615 and 616.

The body member 611 may constitute a lower portion of the expression unit 610 and support the expression member 613. Also, the body member 611 to be described later may be moved by a force transmitted through transmission members 615 and 616 and may also transmit the force to the expression member 613, such that the expression member 613 may be moved.

According to an optional embodiment, the body member 611 may have a pillar-like shape having a certain height and a certain width, may have a curved outer circumferential surface, and may include, for example, at least one area of a side surface of a cylinder.

The expression member 613 may be connected to the body member 611 and be moved by the body member 611. For example, the expression member 613 may move simultaneously with the body member 611. The expression member 613 may have a shape protruding in one direction. For example, the expression member 613 may have a pillar-like area and a protruding area connected thereto.

In this case, the protruding area of the expression member 613 may have a curved surface and may also have rounded corners.

The expression member 613 may include various materials and may include an insulating material as a light and durable material. For example, the expression member 613 may include a resin-based organic material. According to another embodiment, the expression member 613 may include an inorganic material, such as a ceramic material.

Also, according to another selective embodiment, the expression member 613 may include a material like a metal or glass.

According to an optional embodiment, a connection area 619 may be formed between the body member 611 and the expression member 613.

The connection area 619 has a width smaller than those of the body member 611 and the expression member 613, such that a separation space 618 is formed in a corresponding area adjacent to the connection area 619 and between the body member 611 and the expression member 613.

The transmission members 615 and 616 may have a shape extending from the body member 611 and have a shape protruding downward more than the body member 611. Therefore, the transmission members 615 and 616 may be located closer to the moving unit 630 than the body member 611.

According to an optional embodiment, a plurality of transmission members 615 and 616 may be provided. In other words, the transmission members 615 and 616 may include a first transmission member 615 and a second transmission member 616.

The first transmission member 615 may have various shapes. For example, the first transmission member 615 may have a shape that protrudes to pass the bottommost surface of the body member 611 in the lengthwise direction of the expression unit 610. In other words, the first transmission member 615 may have a shape elongated to pass through a surface of the body member 611 opposite an area facing the expression member 613 from among areas of the body member 611.

The first transmission member 615 may have a shape protruding from a side surface of the body member 611. Therefore, the side surface of the first transmission member 615 and the side surface of the body member 611 may form a curved shape without being coplanar with each other.

According to an optional embodiment, the first transmission member 615 may include a slide surface 615A at an end thereof. For example, the slide surface 615A may have a shape inclined in one direction.

The first transmission member 615 may correspond to guide grooves 663 and 664 of the base unit 660, and the slide surface 615A may correspond to an engaging sliding area 665 and a connecting sliding area 666. Detailed descriptions thereof will be given later.

The second transmission member 616 may have various shapes. For example, the second transmission member 616 may have a shape that protrudes to pass the bottommost surface of the body member 611 in the lengthwise direction of the expression unit 610. In other words, the second transmission member 616 may have a shape elongated to pass through a surface of the body member 611 opposite an area facing the expression member 613 from among areas of the body member 611.

The second transmission member 616 may have a shape protruding from a side surface of the body member 611. Therefore, the side surface of the second transmission member 616 and the side surface of the body member 611 may form a curved shape without being coplanar with each other.

According to an optional embodiment, the second transmission member 616 may include a slide surface 616A at an end thereof. For example, the slide surface 616A may have a shape inclined in one direction.

The second transmission member 616 may correspond to the guide grooves 663 and 664 of the base unit 660, and the slide surface 616A may correspond to the engaging sliding area 665 and the connecting sliding area 666. Detailed descriptions thereof will be given later.

The first transmission member 615 and the second transmission member 616 may be arranged at various locations. For example, the first transmission member 615 and the second transmission member 616 may be formed in correspondence to a first guide groove 663 and a second guide groove 664 of the base unit 660 to be described later.

According to an optional embodiment, the first transmission member 615 and the second transmission member 616 may have a symmetrical shape around the center of the expression unit 610.

For example, a distance from the first transmission member 615 to the second transmission member 616 in the clockwise direction may be the same as a distance therebetween in the counterclockwise direction.

According to another embodiment, when the body member 611 is rotated 180 degrees around a rotation axis, the first transmission member 615 and the second transmission member 616 may switch positions with each other, and, when the body member 611 is rotated 360 degrees, the first transmission member 615 and the second transmission member 616 may return to their original locations.

According to another selective embodiment, the expression unit 610 may include three, four, or more transmission members (not shown). In this case, that is, when the expression unit 610 includes three transmission members, when the expression unit 610 is rotated 120 degrees, the transmission members may each be moved to the location of an adjacent transmission member, When the expression unit 610 includes four transmission members, when the expression unit 610 is rotated 90 degrees, the transmission members may each be moved to the location of an adjacent transmission member, According to an optional embodiment, a direction in which the slide surface 615A of the first transmission member 615 is inclined may be the same as the direction in which the slide surface 616A of the second transmission member 616 is inclined.

For example, when the expression unit 610 is rotated about the rotation axis, the slide surface 615A of the first transmission member 615 and the slide surface 616A of the second transmission member 616 may be inclined in a direction in which the expression unit 610 is rotated.

According to an optional embodiment, the output unit IU8 may further include the expression unit insert 620.

Figure 29:
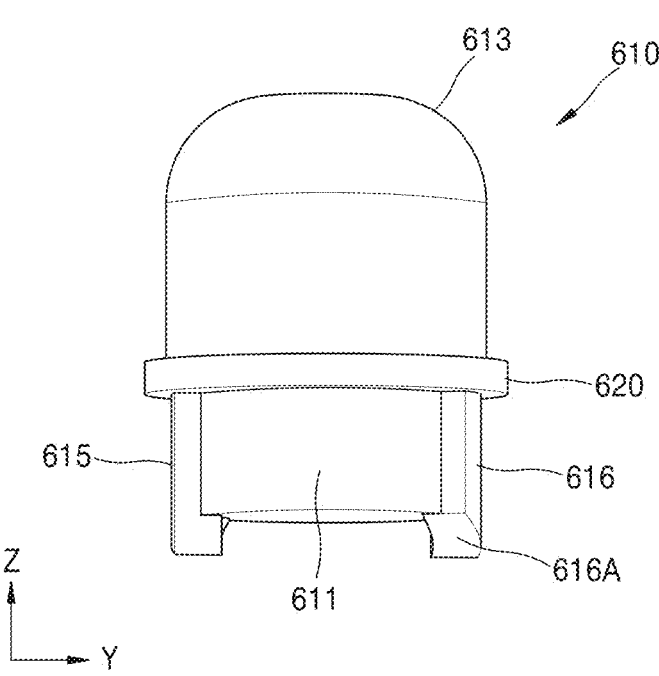
FIG. 29 is a front view of an expression unit and an expression unit insert of the output unit of FIG. 23.

FIG. 29 is a front view of an expression unit and an expression unit insert.

Referring to FIG. 29, the expression unit insert 620 may be disposed adjacent to the expression unit 610, and, according to an optional embodiment, may be disposed between the expression member 613 and the body member 611.

Also, as a specific example, the expression unit insert 620 may be disposed to surround the connection area 619 and correspond to the separation space 618.

The expression unit insert 620 may have a width greater than that of the expression member 613. For example, the expression unit insert 620 may be formed to have a wider area than the expression member 613.

According to an optional embodiment, the expression unit insert 620 may be formed to have a more protruding shape than the expression member 613, the body member 611, and the transmission members 615 and 616, thereby restricting the descending of the expression unit 610, that is, the movement of the expression unit 610 in a direction toward the bottom surface of the base unit 660.

The expression unit insert 620 may include various materials.

According to an optional embodiment, the expression unit insert 620 may include a magnetic material, e.g., iron, nickel, or a stainless steel-based alloy material.

The expression unit insert 620 may be manufactured in various ways. When the expression unit 610 is manufactured, the expression unit 610 in which the expression unit insert 620 is disposed may be easily manufactured through injection molding.

When the expression unit insert 620 includes a magnetic material, the expression unit insert 620 may interact with the magnetic unit 640 during the movement of the moving unit 630, which will be described later. For example, when the expression unit 610 and the moving unit 630 are moved upward, the expression unit 610 and the moving unit 630 are attracted by the magnetic field between the expression unit insert 620 and the magnetic unit 640, and thus the moving unit 630 may maintain its position while facing toward the expression unit 610. Alternatively, the moving unit 630 may still be prevented from rapidly descending.

Also, since the expression unit 610 may be disposed while maintaining a state of being fixed to face the moving unit 630, it is possible to facilitate stable movement of the expression unit 610.

In addition, when the expression unit insert 620 includes a magnetic material and the moving unit 630 to be described later moves, the efficiency of the movement of the moving unit 630 may be improved due to the influence of the magnetic unit 640.

Figure 30:
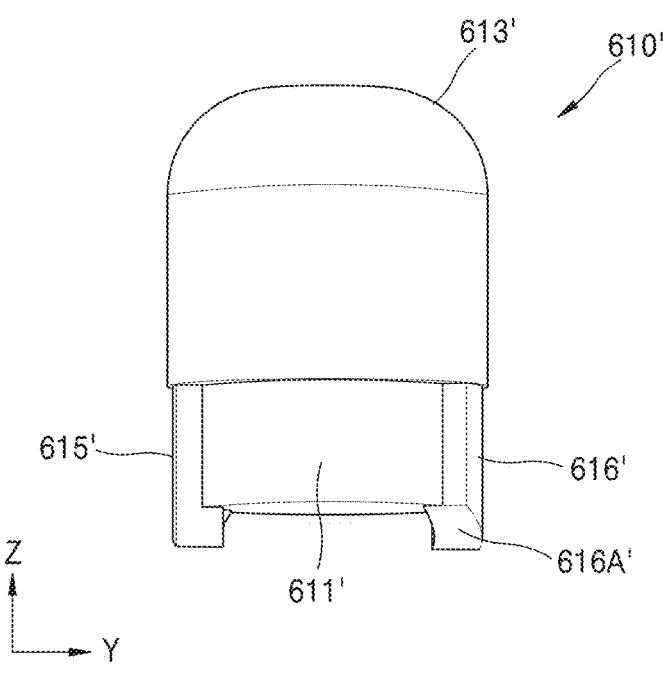
FIGS. 30 and 31 are front views of other modified examples of the expression unit of the output unit of FIG. 23.
Figure 31:
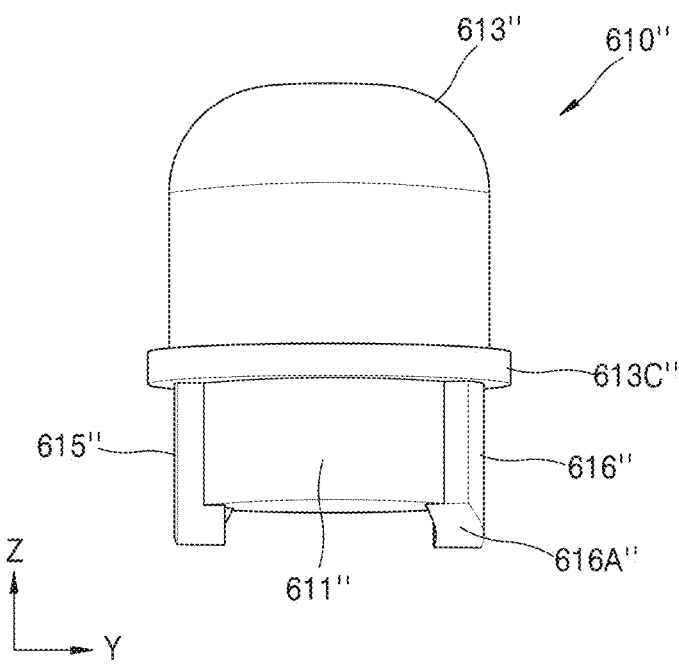

FIGS. 30 and 31 are front views of other modified examples of the expression unit of the output unit of FIG. 23.

The output unit IU8 of the present embodiment may include an expression unit 610' in which the expression unit insert 620 is not provided as shown in FIG. 30.

The expression unit 610' may include an expression member 613' and a body member 611', may have a shape that the expression member 613' and the body member 611' are elongated, and a connection area may be omitted. Also, a separation space may be omitted.

Also, as another modification example, FIG. 31 shows an expression unit 610" without the expression unit insert 620, wherein the expression unit 610" may include an expression member 613" and a body member 611", and a protruding portion 613C" may be formed on the side surface of the expression member 613". The protruding portion 613C" may serve as a stopper that limits the movement of the expression unit 610".

Figure 32:
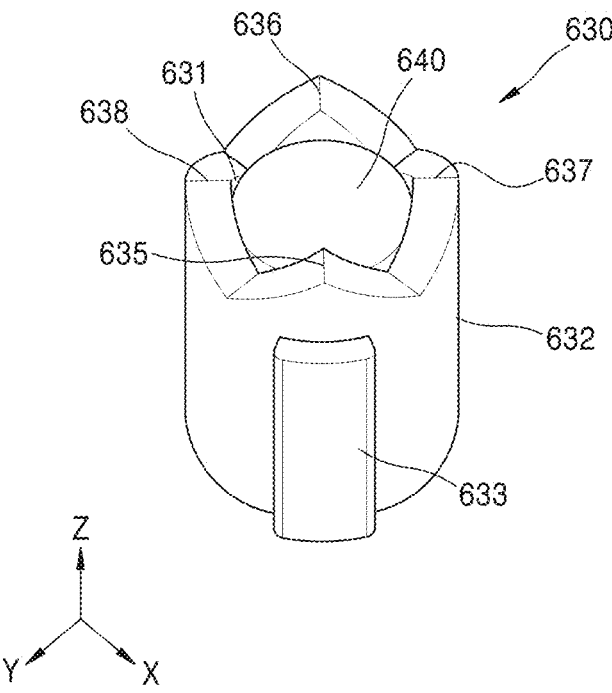
FIG. 32 is a schematic perspective view of a moving unit of the output unit of FIG. 23.
Figure 33:
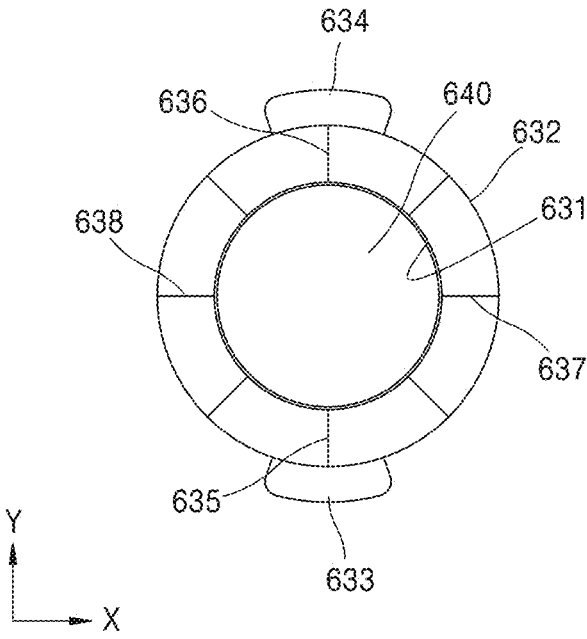
FIG. 33 is a schematic plan view of the moving unit of the output unit of FIG. 23.
Figure 34:
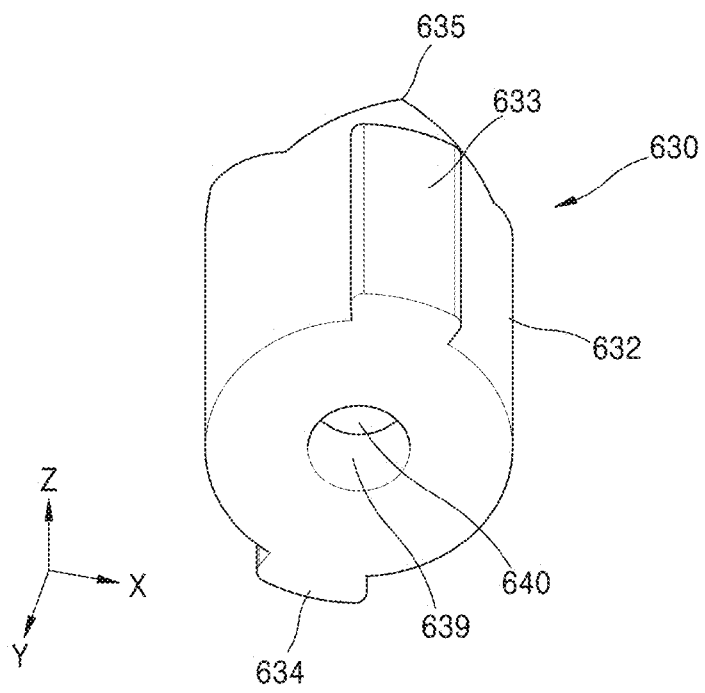
FIG. 34 is a perspective view taken in a direction different from that of FIG. 32.

FIG. 32 is a schematic perspective view of a moving unit of the output unit of FIG. 23, FIG. 33 is a schematic plan view of the moving unit of the output unit of FIG. 23, and FIG. 34 is a perspective view of the moving unit of the output unit of FIG. 23, taken in a direction different from that of FIG. 32.

The moving unit 630 may be formed to have at least an accommodation space 631. For example, the moving unit 630 may have a shape in which the accommodation space 631 is provided inside a main area 632.

Also, the magnetic unit 640 may be disposed in the accommodation space 631. The magnetic unit 640 includes a material having a magnetic force and may be formed to react with the magnetic body 510 of the above-stated input pen 500.

For example, the magnetic unit 640 may include a permanent magnet, such that an attractive force is applied as the magnetic unit 640 is in the proximity of the magnetic body 510 of the input pen 500.

According to an optional embodiment, when the magnetic body 510 of the input pen 500 includes a permanent magnet as described above, the magnetic unit 640 may include a permanent magnet, or, according to another selective embodiment, iron, nickel, or a stainless steel-based alloy material.

The magnetic unit 640 may be moved by a reaction with the magnetic body 510 of the input pen 500, that is, by magnetic fields of the magnetic unit 640 and the magnetic body 510, and the moving unit 630 may move together with the magnetic unit 640.

To facilitate the movement of the moving unit 630, the magnetic unit 640 and the moving unit 630 may be fixed. The accommodation space 631 of the moving unit 630 and the magnetic unit 640 may be in close contact with each other, and, according to another embodiment, the accommodation space 631 of the moving unit 630 and the magnetic unit 640 may be bonded to each other.

The moving unit 630 may make the expression unit 610 to move. For example, the moving unit 630 may push up the moving unit 630 while supporting the expression unit 610.

The moving unit 630 may include a plurality of support members 635, 636, 637, and 638.

For example, the moving unit 630 may include a first support member 635, a second support member 636, a third support member 637, and a fourth support member 638.

The plurality of support members 635, 236, 237, and 238 may have a shape protruding in the lengthwise direction of the moving unit 630. For example, the plurality of support members 635, 236, 237, and 238 may have a shape protruding in a direction toward the expression unit 610. Therefore, the plurality of support members 635, 636, 637, and 638 may move the expression unit 610 while supporting the expression unit 610 during the movement of the moving unit 630. For example, the plurality of support members 635, 636, 637, and 638 may push up the expression unit 610.

According to an optional embodiment, the plurality of support members 635, 636, 637, and 638 may transmit force to the transmission members 615 and 616 while supporting the transmission members 615 and 616 of the expression unit 610, such that the expression unit 610 may be moved.

According to an optional embodiment, two support members of the plurality of support members 635, 636, 637, and 638, e.g., the first support member 635 and the second support member 636, may respectively correspond to the transmission members 615 and 616 of the expression unit 610 and transmit force thereto, and, as the expression unit 610 moves, the third support member 637 and the fourth support member 638 may sequentially correspond to the transmission members 615 and 616 of the expression unit 610 and transmit force thereto.

According to an optional embodiment, the moving unit 630 may include one or more guides 633 and 634. For example, the moving unit 630 may include a plurality of guides, that is, a first guide 633 and a second guide 634.

The guides 633 and 634 may have a shape protruding laterally from the main area 632 of the moving unit 630, and, for example, may have a shape protrude from the main area 632 in a direction away from the accommodation space 631.

The first guide 633 and the second guide 634 may correspond to the first guide groove 663 and the second guide groove 664 of the base unit 660 to be described later, respectively.

The first guide 633 and the second guide 634 may have an elongated shape in correspondence to the first guide groove 663 and the second guide groove 664 and may be formed to not to be elongated past the plurality of support members 635, 636, 637, and 638.

The moving unit 630 may move while the first guide 633 and the second guide 634 are corresponding to the first guide groove 663 and the second guide groove 664 of the base unit 660, respectively, thereby controlling rotation or lateral movement of the moving unit 630.

Also, the precise movement of the expression unit 610 may be controlled through the constant movement of the moving unit 630.

According to an optional embodiment, the moving unit 630 may have a through portion 639. The through portion 639 may be formed to be connected to the accommodation space 631 and may be formed to face the base unit 660. In other words, when the magnetic unit 640 is disposed in the accommodation space 631, an area of one surface of the magnetic unit 640 may be exposed through the through portion 639.

The through portion 639 forms a space between the moving unit 630 and the base unit 660 when the moving unit 630 moves, and thus a resistance against the movement of the moving unit 630 due to an airflow formed between the moving unit 630 and the base unit 660 when the moving unit 630 moves up and down may be reduced.

Also, the through portion 639 may provide a space for applying pressure to remove the magnetic unit 640 when the magnetic unit 640 needs to be replaced or repaired.

Figure 35:
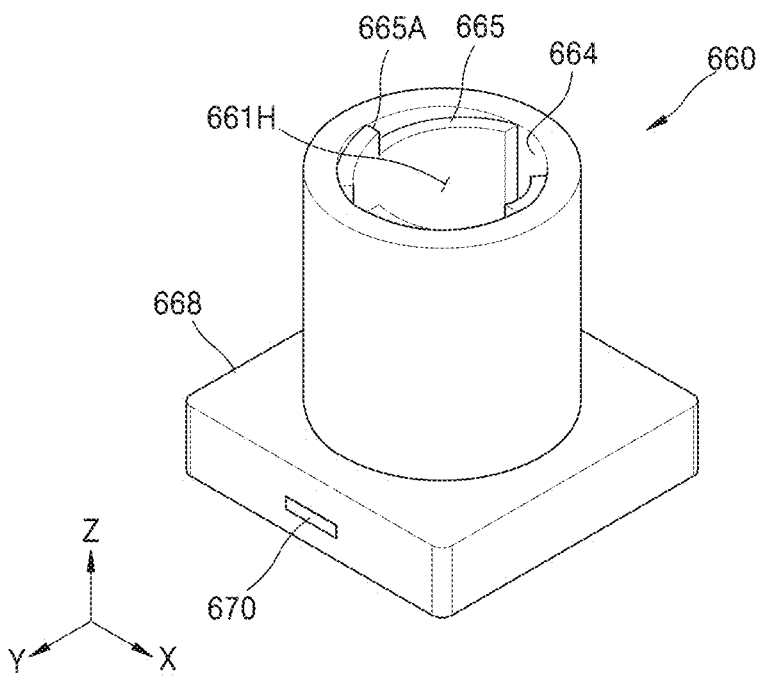
FIG. 35 is a schematic perspective view of a base unit of the output unit of FIG. 23.
Figure 36:
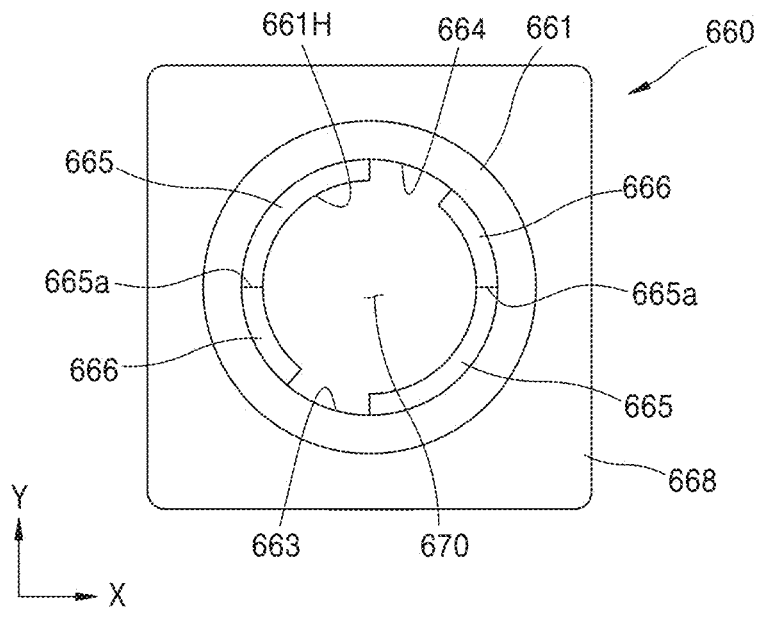
FIG. 36 is a schematic plan view of the base unit of the output unit of FIG. 23.
Figure 37:
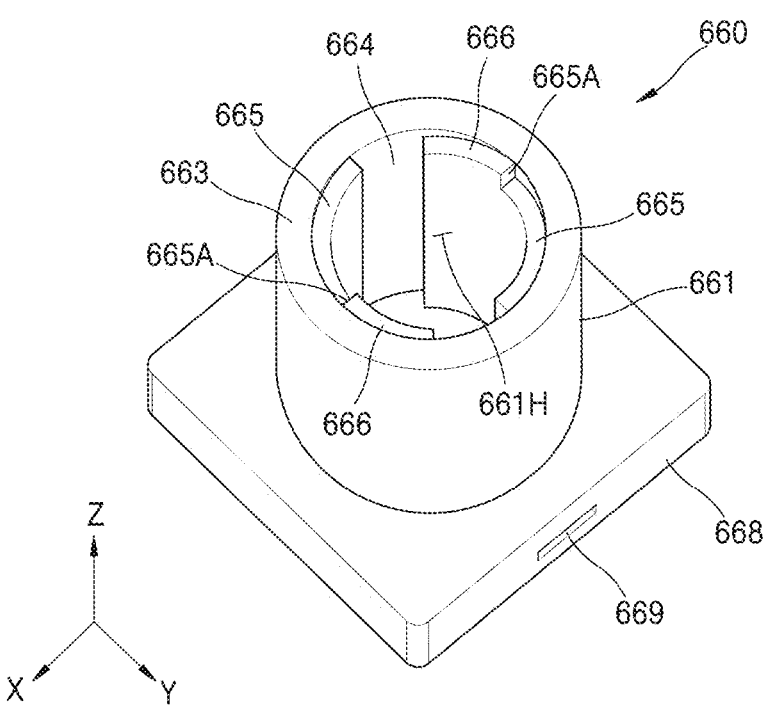
FIG. 37 is a perspective view taken in a direction different from that of FIG. 35.

FIG. 35 is a schematic perspective view of a base unit of the output unit of FIG. 23, FIG. 36 is a schematic plan view of the base unit of the output unit of FIG. 23, and FIG. 37 is a perspective view of the base unit of the output unit of FIG. 23, taken in a direction different from that of FIG. 35.

The base unit 660 may include a base space 661H. In other words, the base space 661H may be provided as a hollow space inside a body area 661. The moving unit 630 and the magnetic unit 640 as described above may be arranged in the base space 661H. Also, one area of the expression unit 610 may be disposed in the base space 661H according to the movement of the expression unit 610.

According to an optional embodiment, the base unit 660 may have a bottom area 668. The bottom area 668 may be formed to support the body area 661. For example, the bottom area 668 may be formed to have a width greater than that of the body area 661. As a more specific example, the bottom area 668 may have a larger area than the body area 661 and may be formed to surround the body area 661.

According to an optional embodiment, the base unit 660 may have an elongated shape. In this case, the base unit 660 may be formed in correspondence to a plurality of output units provided in the protruding feedback-based smart tablet 600.

According to an embodiment, the base unit 660 may be formed as a single body in correspondence to a plurality of output units. According to another embodiment, the base unit 660 may be formed independently for each output unit.

The base unit 660 may include one or more guide grooves 663 and 664. For example, the guide grooves 663 and 664 may include the first guide groove 663 and the second guide groove 664.

The guide grooves 663 and 664 may have a groove shape formed by removing a predetermined thickness from the base space 661H of the base unit 660.

As described above, the guide grooves 663 and 664 may correspond to the guides 633 and 634 of the moving unit 630, respectively. To this end, at least the width of the guide grooves 663 and 664 may be equal to or greater than the width of the guides 633 and 634.

The guide grooves 663 and 664 may have a shape elongated in the lengthwise direction of the base unit 660. In detail, the guide grooves 663 and 664 may be formed to reach ends of an inlet of the base space 661H of the base unit 660.

According to an optional embodiment, the base unit 660 may include the engaging sliding area 665 and the connecting sliding area 666.

The engaging sliding area 665 may have a shape formed by removing a predetermined thickness from the base space 661H and may be formed to be connected to one side of each of the guide grooves 663 and 664. In other words, one engaging sliding area 665 may be formed to be connected to a side surface of the first guide groove 663 in a first direction, and another engaging sliding area 665 may be formed to be connected to a side surface of the second guide groove 664 in the first direction.

The engaging sliding area 665 may be an area in which each of the first transmission member 615 and the second transmission member 616 of the expression unit 610 moves (that is, slides). In other words, when the first transmission member 615 and the second transmission member 616 move past the first guide groove 663 and the second guide groove 664 through the ascending movement of the expression unit 610, the first transmission member 615 and the second transmission member 616 may naturally move (e.g., slide) to the engaging sliding area 665, and thus the expression unit 610 may descend by a certain height.

According to an optional embodiment, the engaging sliding area 665 may have a sloped surface, wherein, when the slide surface 615A of the first transmission member 615 and the slide surface 616A of the second transmission member 616 have sloped surfaces, the sloped surface of the engaging sliding area 665 may be inclined in the same direction as the slide surface 615A of the first transmission member 615 and the slide surface 616A of the second transmission member 616.

In addition, an engaging portion 665A is formed at each end of the engaging sliding area 665, and thus the first transmission member 615 and the second transmission member 616 may be caught and stopped by engaging portions 665A without continuing the movements thereof. In other words, the expression unit 610 does not continuously descend and may maintain a stationary state even without support of the moving unit 630.

The connecting sliding area 666 may have a shape formed by removing a predetermined thickness from the base space 661H and may be formed to be connected to engaging sliding areas 665, e.g., engaging portions of the engaging sliding areas 665. Also, the connecting sliding area 666 may be formed to be connected to one side of each of the guide grooves 663 and 664.

In other words, one side of one connecting sliding area 666 may be connected to the engaging portion 665A of one engaging sliding area 665, and the other side of the one connecting sliding area 666 may be connected to a side surface of the first guide groove 663 in a second direction.

One side of the other one connecting sliding area 666 may be connected to the engaging portion 665A of one engaging sliding area 665, and the other side of the other one connecting sliding area 666 may be connected to a side surface of the second guide groove 664 in the second direction.

The connecting sliding area 666 may be an area in which each of the first transmission member 615 and the second transmission member 616 of the expression unit 610 moves (that is, slides).

In other words, as described above, when the first transmission member 615 and the second transmission member 616 move past the first guide groove 663 and the second guide groove 664 through the ascending movement of the expression unit 610, the first transmission member 615 and the second transmission member 616 may naturally move (e.g., slide) to the engaging sliding area 665 and ends thereof may be caught by the engaging portions 665A, thereby maintaining a stationary state.

Then, when the first transmission member 615 and the second transmission member 616 move past the engaging portions 665A through the ascending movement of the expression unit 610 by the moving unit 630, the first transmission member 615 and the second transmission member 616 may move (e.g., slide) to the connecting sliding area 666.

Also, the connecting sliding area 666 is connected to the first guide groove 663 and the second guide groove 664, and thus, after the first transmission member 615 and the second transmission member 616 move in the connecting sliding area 666, the first transmission member 615 and the second transmission member 616 may move from the first guide groove 663 to the second guide groove 664 and may descend toward the moving unit 630 without being supported by the moving unit 630.

According to an optional embodiment, the connecting sliding area 666 may have a sloped surface, wherein, when the slide surface 615A of the first transmission member 615 and the slide surface 616A of the second transmission member 616 have sloped surfaces, the sloped surface of the connecting sliding area 666 may be inclined in the same direction as the slide surface 615A of the first transmission member 615 and the slide surface 616A of the second transmission member 616.

Also, the direction in which the connecting sliding area 666 is inclined may be the same as the direction in which the engaging sliding area 665 is inclined.

According to an optional embodiment, the base unit insert 670 may be further included in an area inside the base unit 660.

As a specific example, the base unit insert 670 may be disposed in an insertion space 669 inside the bottom area 668 of the base unit 660. The base unit insert 670 may be disposed to be connected to the base space 661H as shown in FIG. 36.

The base unit insert 670 may include various materials.

According to an optional embodiment, the base unit insert 670 may include a magnetic material, e.g., iron, nickel, or a stainless steel-based alloy material.

The base unit insert 670 may be manufactured in various ways. When the base unit 660 is manufactured, the base unit 660 in which the base unit insert 670 is disposed may be easily manufactured through injection molding.

When the base insert 670 includes a magnetic material, attractive force is applied between the base unit insert 670 and the moving unit 630 by the magnetic field between the base unit insert 670 and the magnetic unit 640, thereby facilitating the movement of the moving unit 630 during the descending movement of the moving unit 630.

Also, when the moving unit 630 maintains a descended state, the moving unit 630 may stably maintain its position by the magnetic field between the magnetic unit 640 and the base unit insert 670.

When the base unit insert 670 includes a magnetic material and the moving unit 630 to be described later moves, the efficiency of the movement of the moving unit 630 may be improved due to the influence of the magnetic unit 640.

FIGS. 38A to 38E are diagrams for describing an example of the operation of the output unit of FIG. 23.

Figure 38A:
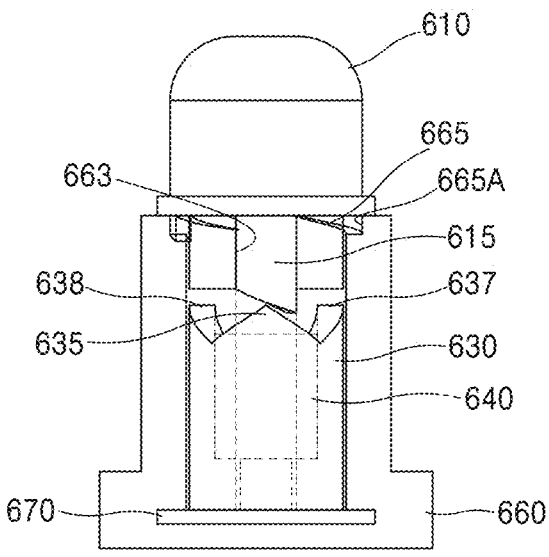
FIGS. 38A to 38E are diagrams for describing an example of the operation of the output unit of FIG. 23.

First, FIG. 38A shows a state in which the expression unit 610 is disposed at the lowest point, that is, the expression unit 610 is closest to the bottom surface of the base unit 660, for example, the bottom area 668.

At this time, the first transmission member 615 of the expression unit 610 may be in a state supported by the moving unit 630. For example, the first transmission member 615 may be in a state supported by the first support member 635. Also, although not shown, the second transmission member 616 may be supported by the second support member 636.

According to an optional embodiment, the first transmission member 615 and the first support member 635 may be separated from each other even when the expression unit 610 is disposed at the lowest point as the expression unit insert 620 with an increased width is caught by the top end of the base unit 660.

Meanwhile, the first transmission member 615 and the first support member 635 may correspond to the first guide groove 663 of the base unit 660.

Figure 38B:
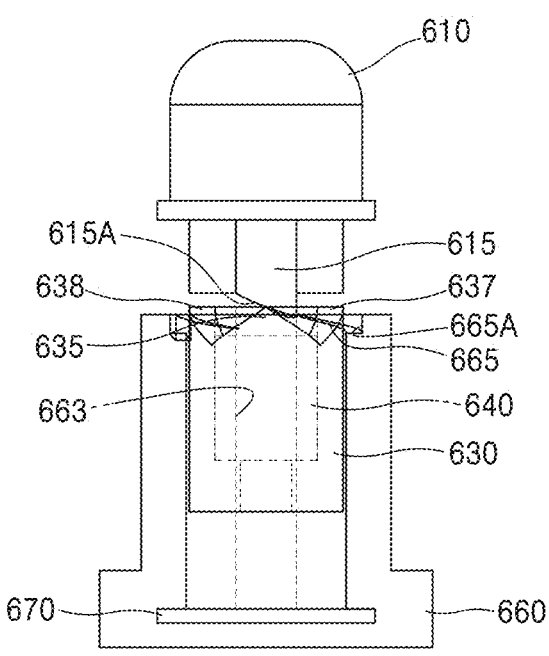

Next, referring to FIG. 38B, the expression unit 610 is in a state in which the expression unit 610 ascended, that is, moved in a direction away from the base unit 660. The expression unit 610 may ascend while maintaining a state of being supported by the moving unit 630, and more specifically, the expression unit 610 may have been ascended as the first support member 635 of the moving unit 630 supported and pushed up the first transmission member 615 of the expression unit 610.

Also, although not shown, the expression unit 610 may have been ascended as the second support member 636 of the moving unit 630 supported and pushed up the second transmission member 616 of the expression unit 610.

The movement of the moving unit 630 may be due to the magnetic unit 640, and the moving unit 630 may move together with the magnetic unit 640.

In detail, through a user's manipulation of the above-stated input pen 500, the magnetic unit 640 may react with the moving unit 630 and the moving unit 630 may move. As a specific example, the magnetic body 510 of the input pen 500 may react with the magnetic unit 640 (e.g., the magnetic body 510 of the input pen 500 and the magnetic unit 640 may attract each other), and thus the magnetic unit 640 may move.

Therefore, the expression unit 610 may reach the highest point, that is, may be in a state farthest away from the base unit 660.

The first support member 635 may ascend in correspondence to the first guide groove 663 of the base unit 660. Also, although not shown, the second support member 636 may ascend in correspondence to the second guide groove 664.

On the other hand, the first transmission member 615 may ascend and leave the first guide groove 663 of the base unit

660. In this case, the first transmission member 615 may be adjacent to the engaging sliding area 665 adjacent to one side of the first guide groove 663.

Also, although not shown, the second transmission member 616 may also ascend along the second guide groove 664 of the base unit 660 by the support of the second support member 636 and leave the second guide groove 664. In this case, the second transmission member 616 may be adjacent to the engaging sliding area 665 adjacent to one side of the second guide groove 664.

Figure 38C:
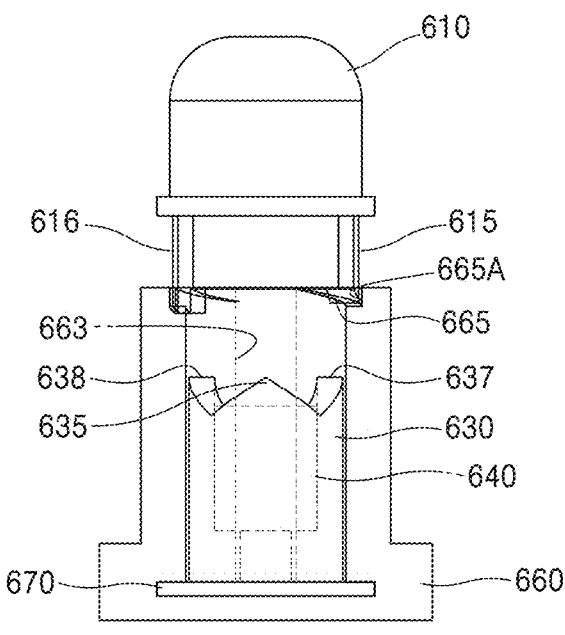

Then, referring to FIG. 38C, the first transmission member 615 of the expression unit 610 maintains a state of being caught and stopped by the engaging portion 665A after moving along the engaging sliding area 665 adjacent to the first guide groove 663.

Also, the moving unit 630 may be spaced apart from the expression unit 610 by maintaining a state of being descended again as shown in FIG. 38A.

Also, the second transmission member 616 of the expression unit 610 maintains a state of being caught and stopped by the engaging portion 665A after moving along the engaging sliding area 665 adjacent to the second guide groove 664.

In other words, the expression unit 610 of FIG. 38C is in a state lower than that of FIG. 38B, and more specifically, the expression unit 610 of FIG. 38C may be in a state of being located between the lowest point in FIG. 38A and the highest point in FIG. 38B.

Figure 38D:
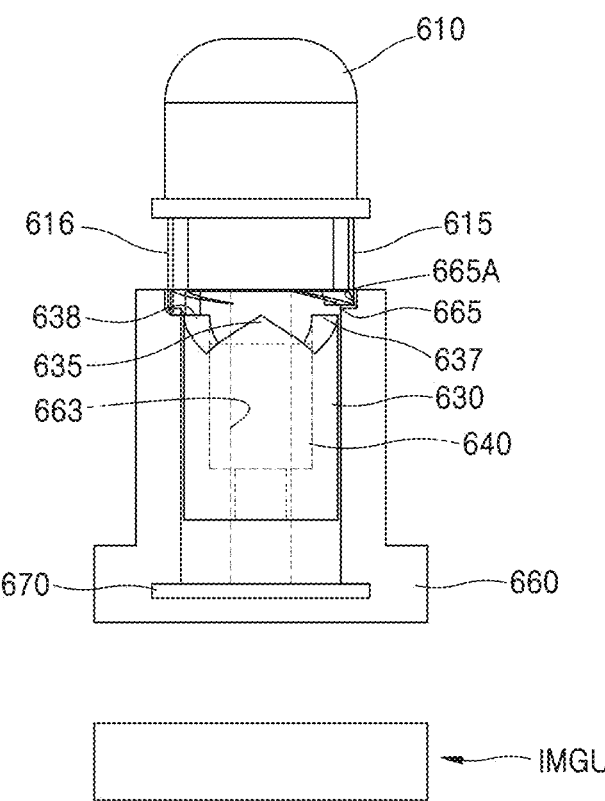

Next, referring to FIG. 38D, as compared to the state of FIG. 38C, the expression unit 610 is in a state in which the expression unit 610 ascended, that is, moved in a direction away from the base unit 660. The expression unit 610 may ascend while maintaining a state of being supported by the moving unit 630, and more specifically, the expression unit 610 may have been ascended as the third support member 637 of the moving unit 630 supported and pushed up the first transmission member 615 of the expression unit 610 and the fourth support member 638 of the moving unit 630 supported and pushed up the second transmission member 616.

Therefore, the expression unit 610 may reach the highest point, that is, may be in a state farthest away from the base unit 660.

The first support member 635 may ascend in correspondence to the first guide groove 663 of the base unit 660. Also, although not shown, the second support member 636 may ascend in correspondence to the second guide groove 664.

On the other hand, the first transmission member 615 may ascend and leave the engaging portion 665A of the base unit 660. In this case, the first transmission member 615 may be adjacent to the connecting sliding area 666 adjacent to one side of the engaging portion 665A.

Also, although not shown, the second transmission member 616 may ascend and leave the engaging portion 665A of the base unit 660. In this case, the second transmission member 616 may be adjacent to the connecting sliding area 666 adjacent to one side of the engaging portion 665A.

Such ascending movement may be performed by a reset member IMGU. The reset member IMGU may be formed to react with the magnetic unit 640. For example, the reset member IMGU may include a magnetic material to generate a magnetic field and, as a specific example, may include a permanent magnet.

The reset member IMGU may generate a magnetic field, and for example, the reset member IMGU may be formed, such that a repulsive force is applied to the magnetic unit 640. To this end, the polarity and the arrangement direction of the reset member IMGU may be controlled.

The arrangement and the operation of the reset member IMGU may be determined in various ways, and detailed descriptions thereof will be given later.

Figure 38E:
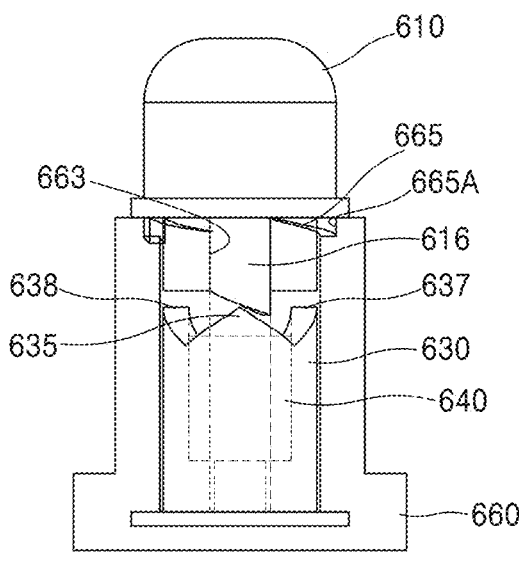

Then, FIG. 38E shows a state in which the expression unit 610 is disposed at the lowest point, that is, the expression unit 610 is closest to the bottom surface of the base unit 660, for example, the bottom area 668. For example, in the state of FIG. 38D, the expression unit 610 may descend without applying a separate force.

In detail, the first transmission member 615 may move along the connecting sliding area 666 and descend along the second guide groove 664 in correspondence to the second guide groove 664. In detail, the second transmission member 616 may move along the connecting sliding area 666 and descend along the first guide groove 663 in correspondence to the first guide groove 663.

After the expression unit 610 descends, the second transmission member 616 of the expression unit 610 may be in a state supported by the moving unit 630. For example, the second transmission member 616 may be in a state supported by the first support member 635. Also, although not shown, the first transmission member 615 may be supported by the second support member 636.

As compared to FIG. 38A, the height of the expression unit 610 is the same, and the expression unit 610 is rotated, wherein, instead of the first transmission member 615, the second transmission member 616 corresponds to the first guide groove 663.

In other words, through one cycle of ascending and descending of the expression unit 610, the expression unit 610 may maintain a state of being rotated by about 180 degrees, and, when another cycle of ascending and descending is performed, the expression unit 610 may return to its original state as shown in FIG. 38A.

As described above, by controlling the number of transmission members of an expression unit and the number of guide grooves corresponding thereto, the number of cycles in which the expression unit rotates and returns to its original state may be controlled.

According to an optional embodiment, the first transmission member 615 and the first support member 635 may be separated from each other even when the expression unit 610 is disposed at the lowest point as the expression unit insert 620 with an increased width is caught by the top end of the base unit 660.

Figure 39:
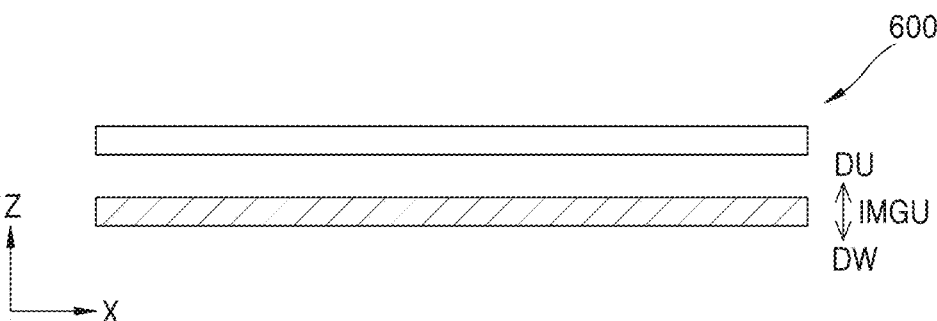
FIGS. 39 to 41 are diagrams for describing an example of arrangements and shapes of a reset member.
Figure 40:
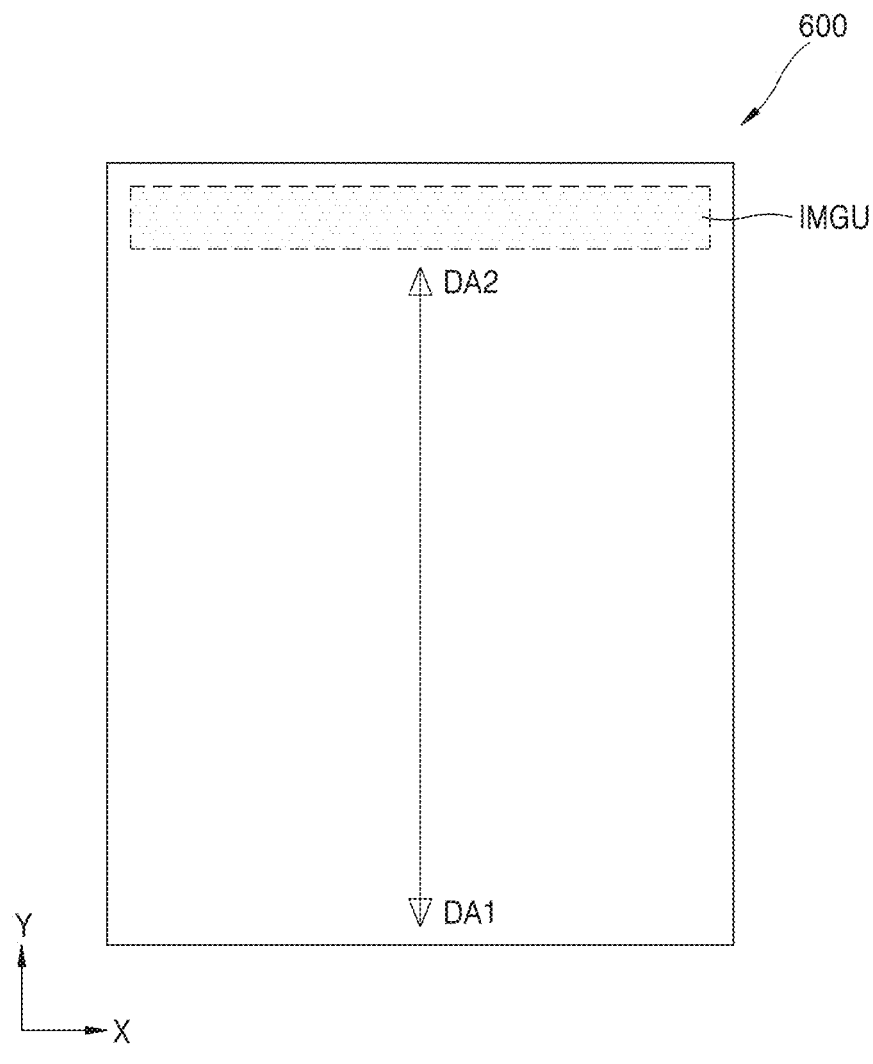
Figure 41:
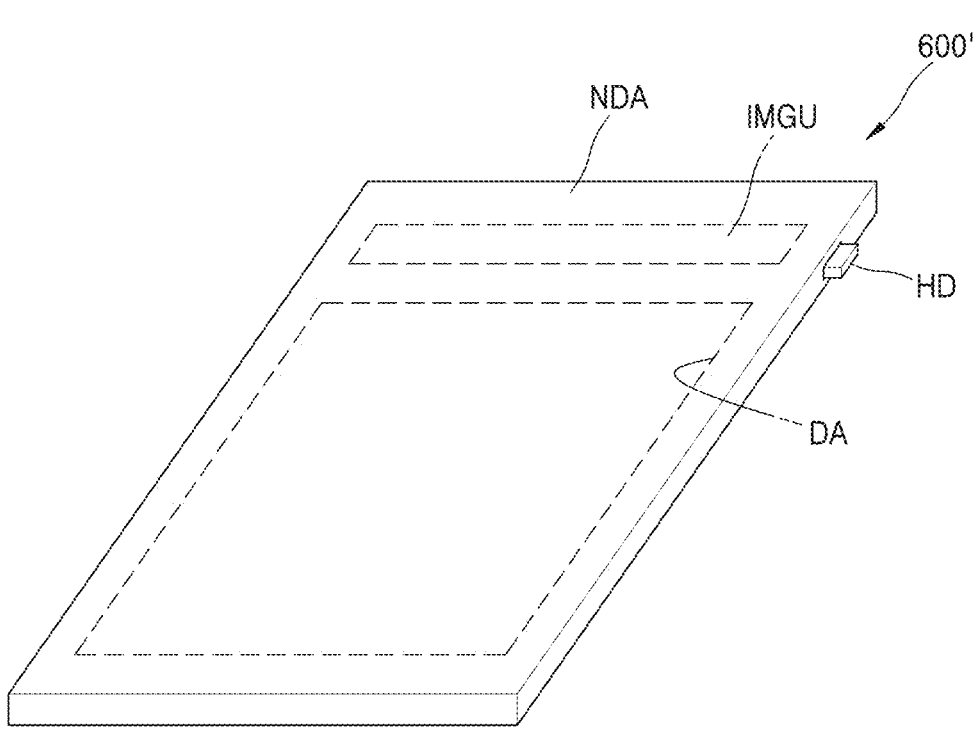

FIGS. 39 to 41 are diagrams for describing an example of arrangements and shapes of a reset member.

Referring to FIG. 39, the reset member IMGU may be disposed below the protruding feedback-based smart tablet 600.

Also, the reset member IMGU may be formed to move in a first direction DU toward the protruding feedback-based smart tablet 600 or in a second direction DW away from the protruding feedback-based smart tablet 600.

According to an optional embodiment, the reset member IMGU may correspond to a plurality of output units of the protruding feedback-based smart tablet 600 and initialize the plurality of output units at the same time. For example, the reset member IMGU may control protruding output units to descend again to return to a non-protruding state.

Also, according to an optional embodiment, the reset member IMGU may correspond to all of a plurality of output units of the protruding feedback-based smart tablet 600 and initialize the plurality of output units at the same time. For example, the reset member IMGU may control protruding output units to descend again to return to a non-protruding state.

Also, referring to FIG. 40, the reset member IMGU may be disposed below or inside the protruding feedback-based smart tablet 600.

Also, the reset member IMGU may have a shape extending in one direction and may be formed to move in a first direction DA1 and a second direction DA2 opposite thereto.

Therefore, a plurality of output units of the protruding feedback-based smart tablet 600 may be sequentially initialized in one direction. For example, protruding output units may be descended again to return to a non-protruding state.

Also, according to an optional embodiment, referring to FIG. 41, the reset member IMGU may be disposed in a non-expression area NDA adjacent to the expression area DA of a protruding feedback-based smart tablet 600'. At this time, the reset member IMGU may be disposed inside the protruding feedback-based smart tablet 600' and may be connected to a handle HD protruding to the outside.

The user may move the handle HD in one direction or a direction opposite thereto to move the reset member IMGU to the expression area DA, thereby sequentially initializing a plurality of output units in the expression area DA in one direction. For example, protruding output units may be descended again to return to a non-protruding state.

In a protruding feedback-based smart tablet of the present embodiment, one or more (e.g., a plurality of) output units may be arranged in an expression area to be spaced apart from one another.

The output units may protrude in response to a user's input. For example, the output units may protrude in response to an input pen manipulated by the user. As a specific example, a moving unit of each output unit may be moved by magnetic fields of the moving unit and the input pen.

An expression unit of the output unit may be moved by a moving unit and, as a specific example, may protrude. The user may easily sense a shape input by using the input pen by sensing the expression units of the protruding output units visually or tactilely. For example, a user having visual handicap may easily sense a character or a drawing input by the user by using an input pen by sensing a protruding shape of expression units of output units.

According to an optional embodiment, even when an input pen is removed, a moving unit supporting an expression unit may be configured to stay at a constant position, and thus a user may sense protruding expression units for a desired time.

Also, initialization may be performed by using a reset member when the user desires. For example, protruding expression units may be descended back to its original state, thereby facilitating an input operation of the user using an input pen.

Figure 42:
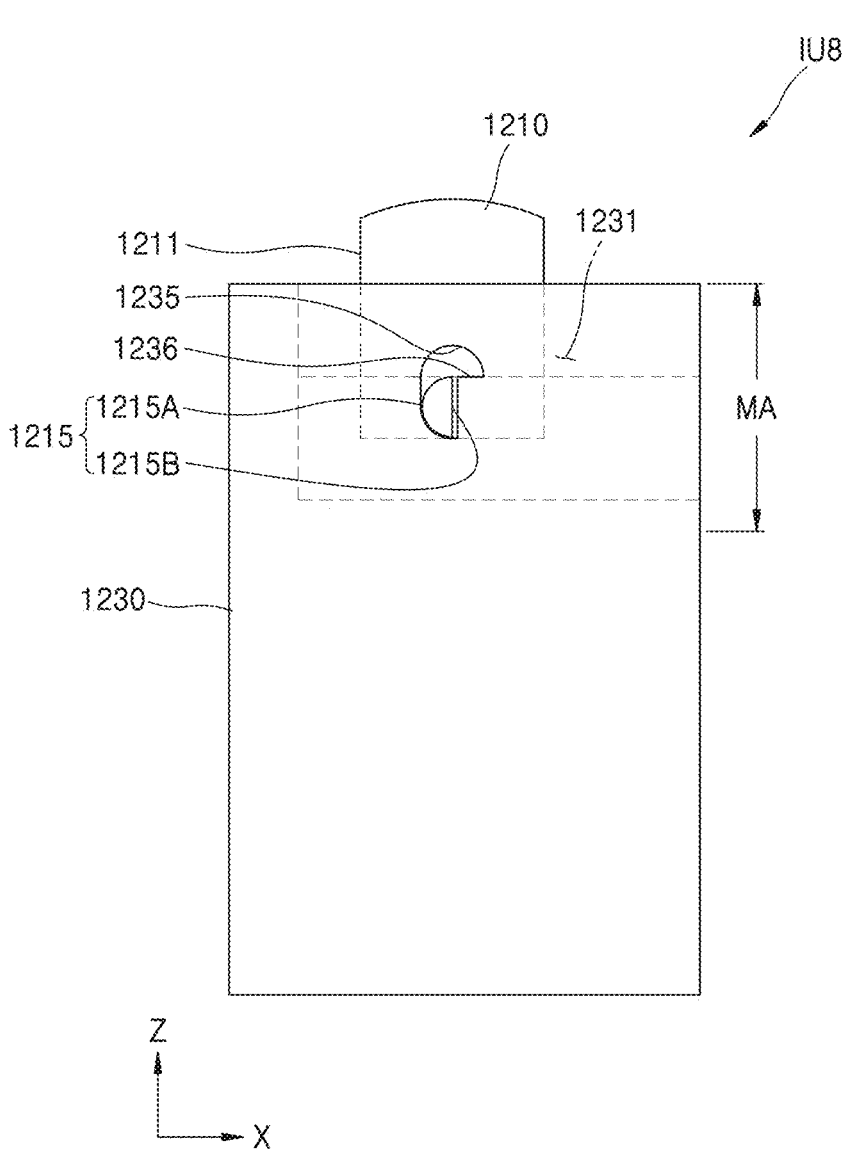
FIG. 42 is a diagram for explaining an output unit according to another embodiment of the present disclosure.
Figure 43:
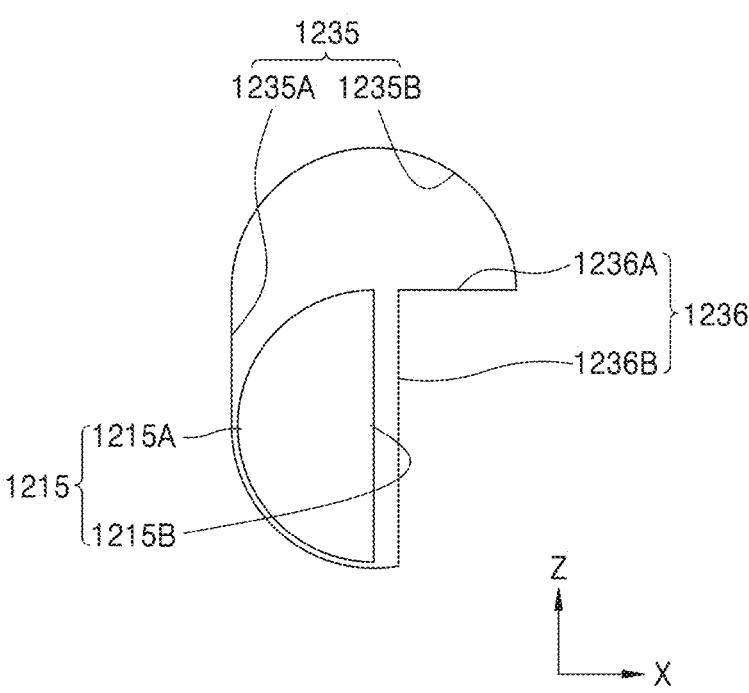
FIG. 43 is an enlarged view of a portion of FIG. 42.

FIG. 42 is a diagram for describing an output unit according to another embodiment of the present disclosure, and FIG. 43 is an enlarged view of a portion of FIG. 42.

The output unit IU8 may include a driving expression unit 1210 and a base unit 1230.

The driving expression unit 1210 may include a magnetic material.

According to an optional embodiment, the driving expression unit 1210 may include a magnetic body, e.g., a permanent magnet.

According to an optional embodiment, when the input feedback-based smart pen includes a permanent magnet as described above, the driving expression unit 1210 may include a permanent magnet, or, according to another selective embodiment, iron, nickel, or a stainless steel-based alloy material.

The driving expression unit 1210 may be moved by a reaction with a magnetic body of the input pen, that is, magnetic fields of the driving expression unit 1210 and the magnetic body 110.

Also, as a specific example, when the driving expression unit 1210 includes a permanent magnet, the N pole and S pole of the permanent magnet may be arranged in the lengthwise direction of the driving expression unit 1210, which may be the Z-axis direction in FIG. 42.

The driving expression unit 1210 may perform a rotational movement, e.g., an angular movement with a certain angle.

The driving expression unit 1210 may move to protrude in one direction, and the driving expression unit 1210 may be relocated through ascending and descending movements at least in the lengthwise direction of the driving expression unit 1210. Therefore, the driving expression unit 1210 may be moved to protrude in one direction, and a user may sense the movement of the driving expression unit 1210 tactilely or visually.

The driving expression unit 1210 may include a protrusion 1215 protruding from a side surface of a main body area 1211.

Although not shown, according to an optional embodiment, the driving expression unit 1210 may include two protrusions 1215 protruding from two side surfaces of the main body area 1211 opposite to each other.

The protrusion 1215 may include a side surface 1215A having at least a curved area and a fixing portion 1215B.

The fixing portion 1215B may have a flat surface in at least one area.

According to an optional embodiment, the main body area 1211 of the driving expression unit 1210 may have an elongated pillar-like shape.

In this case, an end of the driving expression unit 1210 may have a curved surface or the corners of the driving expression unit 1210 may be rounded.

The protrusion 1215 of the driving expression unit 1210 may be formed to be adjacent to an end portion of an area of the side surface of the main body area 1211 of the driving expression unit 1210 opposite to an end portion protruding toward a user in the lengthwise direction of the driving expression unit 1210.

The driving expression unit 1210 may be disposed in a first accommodation unit 1231 of the base unit 1230 to be described later.

The base unit 1230 may be formed to accommodate the driving expression unit 1210.

According to an optional embodiment, the base unit 1230 may include a first area MA corresponding to the driving expression unit 1210.

As a specific example, the base unit 1230 may include the first accommodation unit 1231.

The first accommodation unit 1231 may include a space for accommodating the driving expression unit 1210. The first accommodation unit 1231 may be a space having a shape corresponding to that of the base unit 1230 from which a certain width and a certain length are removed. The first accommodation unit 1231 may be opened toward at least one surface of the base unit 1230. Therefore, the driving expression unit 1210 accommodated in the first accommodation unit 1231 may maintain a protruding state while being accommodated in the first accommodation unit 1231.

According to an optional embodiment, the first accommodation unit 1231 may have a shape open toward the top surface of the base unit 1230 and one side surface of the base unit 1230 connected thereto.

The length of the first accommodation unit 1231 may correspond to or be greater than at least the length of the driving expression unit 1210. Therefore, the driving expression unit 1210 may be accommodated in the first accommodation unit 1231 not only when the driving expression unit 1210 moves in a first direction (e.g., ascending and descending in a direction opposite thereto), but also when the driving expression unit 1210 moves in a second direction intersecting with the first direction (e.g., the driving expression unit 1210 is laid by being rotated 90 degrees).

A driving groove 1235 may be formed to be connected to the first accommodation unit 1231. The protrusion 1215 of the driving expression unit 1210 may correspond to the driving groove 1235.

For example, when the driving expression unit 1210 is disposed in the first accommodation unit 1231, the protrusion 1215 of the driving expression unit 1210 may correspond to the driving groove 1235.

FIGS. 42 and 43 show that the driving groove 1235 have a shape penetrating through side surfaces of the base unit 1230. Although not shown, according to another embodiment, the driving groove 1235 may be connected to the first accommodation unit 1231 and may not penetrate through the side surfaces of the base unit 1230. In other words, the driving groove 1235 may have a groove shape instead of a penetrating shape.

The driving groove 1235 may include a first area 1235A and a second area 1235B. The first area 1235A may be disposed closer to a second accommodation unit 1232 than the second area 1235B is.

The first area 1235A may be formed to support the protrusion 1215 when the driving expression unit 1210 (e.g., the protrusion 1215 of the driving expression unit 1210) descends.

To this end, the first area 1235A may have an edge surface having a shape similar to that of the side surface 1215A of the protrusion 1215 of the driving expression unit 1210. For example, the first area 1235A may have a curved surface.

Also, the first area 1235A may have an appropriate width to facilitate the movement of the driving expression unit 1210 in the first direction (that is, an ascending direction) and the movement of returning in an opposite direction. Also, the first area 1235A may be formed to extend in the first direction to be connected to the second area 1235B.

The second area 1235B may be connected to the first area 1235A and may have a shape extending in a second direction intersecting with the first direction. As described above, the first direction is a direction in which the driving expression unit 1210 ascends or descends and is the Z-axis direction in FIGS. 42 and 43.

According to an optional embodiment, the second direction may be a direction orthogonal to the first direction, e.g., the X-axis direction in FIGS. 42 and 43.

For convenience of explanation, the first direction and the second direction will be used as the same meaning in descriptions below.

The second area 1235B may be formed to correspond to the protrusion 1215 when the driving expression unit 1210 moves in the first direction and then moves in the second direction.

In other words, when the driving expression unit 1210 rotates, the protrusion 1215 may ascend from the first area 1235A and then rotates by a certain angle to be disposed in the second area 1235B.

The second area 1235B may have a shape corresponding to a state in which the protrusion 1215 is rotated and disposed. For example, the second area 1235B may have a curved surface.

Also, the second area 1235B may have an appropriate width to facilitate the movement of the driving expression unit 1210 when the driving expression unit 1210 descends in a direction opposite to the first direction (e.g., rotating and descending) after the driving expression unit 1210 returns in the second direction.

Also, the second area 1235B may have a shape similar to that of the first area 1235A in a state in which the first area 1235A is rotated.

The base unit 1230 may include a locking protrusion 1236 to maintain a state of the driving expression unit 1210 after the driving expression unit 1210 is disposed in the second area 1235B. The locking protrusion 1236 includes a top surface 1236A and a side surface 1236B, wherein the top surface 1236A and the side surface 1236B of the locking protrusion 1236 may be connected to each other and correspond to the fixing portion 1215B of the protrusion 1215 according to the movement of the driving expression unit 1210.

In other words, in the state shown in FIG. 43, when no separate external force is applied, the movement of the fixing portion 1215B of the protrusion 1215 of the driving expression unit 1210, e.g., a rotating movement, may be limited by the side surface 1236B of the locking protrusion 1236.

Also, when the driving expression unit 1210 moves and the protrusion 1215 corresponds to the second area 1235B of the driving groove 1235, the movement of the fixing portion 1215B of the protrusion 1215 may be limited by the top surface 1236A of the locking protrusion 1236.

FIGS. 44A to 44D are diagrams for describing the operation of the output unit of FIG. 42.

An operation of an information output device will be described with reference to FIGS. 44A to 44D in order.

Figure 44A:
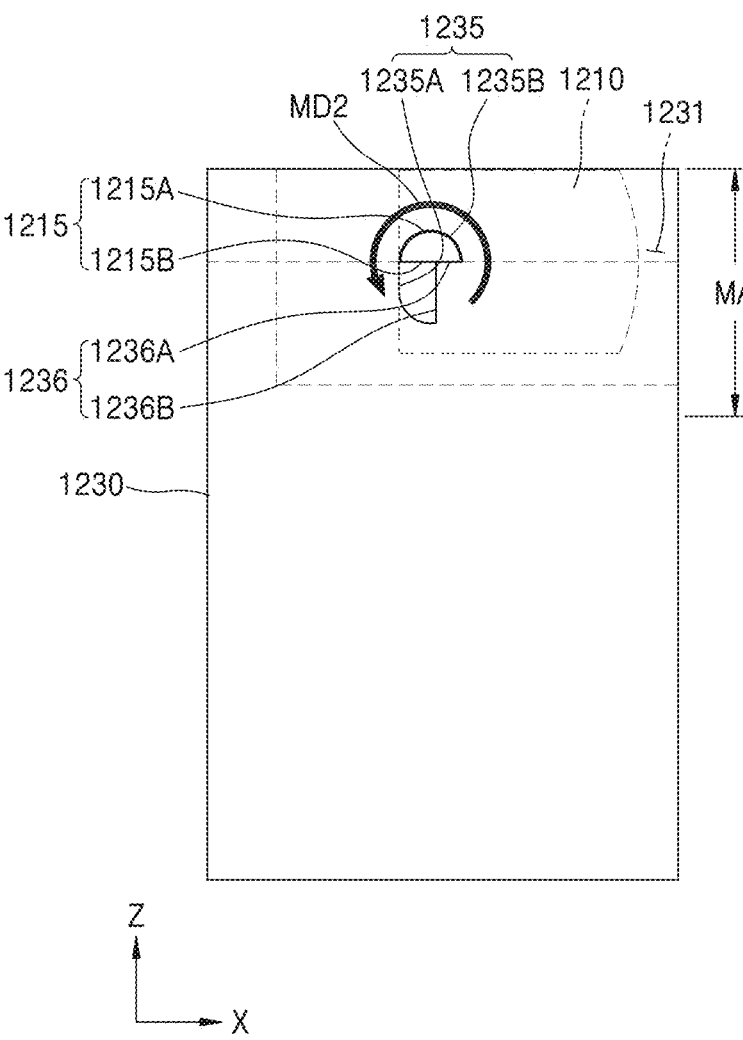
FIGS. 44A to 44D are diagrams for describing the operation of the output unit of FIG. 42.

FIG. 44A shows a state in which the driving expression unit 1210 is descended (that is, not protruded), which may be a state before a user manipulates the input pen 100. Alternatively, FIG. 44A may show a state after initialization is performed by using a reset member.

In the state, through a user's manipulation of the input pen 100 (e.g., when the input pen 100 is moved to be close to the driving expression unit 1210), an ascending force may be applied to the driving expression unit 1210 by a magnetic field, and the driving expression unit 1210 may be rotated in a direction MD1 direction by the protrusion 1215 and the driving groove 1235.

For example, when a force is transmitted in the first direction to the driving expression unit 1210 by a magnetic field generated between the input pen 100 and the driving expression unit 1210 (that is, a repulsive force on the input pen 100), the protrusion 1215 is disposed in the second area 1235B through the curved surface of the side surface 1215A of the protrusion 1215 and the curved surface of the second area 1235B of the driving groove 1235 or through curved surfaces of the first area 1235A and the second area 1235B, thereby facilitating rotation of the driving expression unit 1210.

Figure 44B:
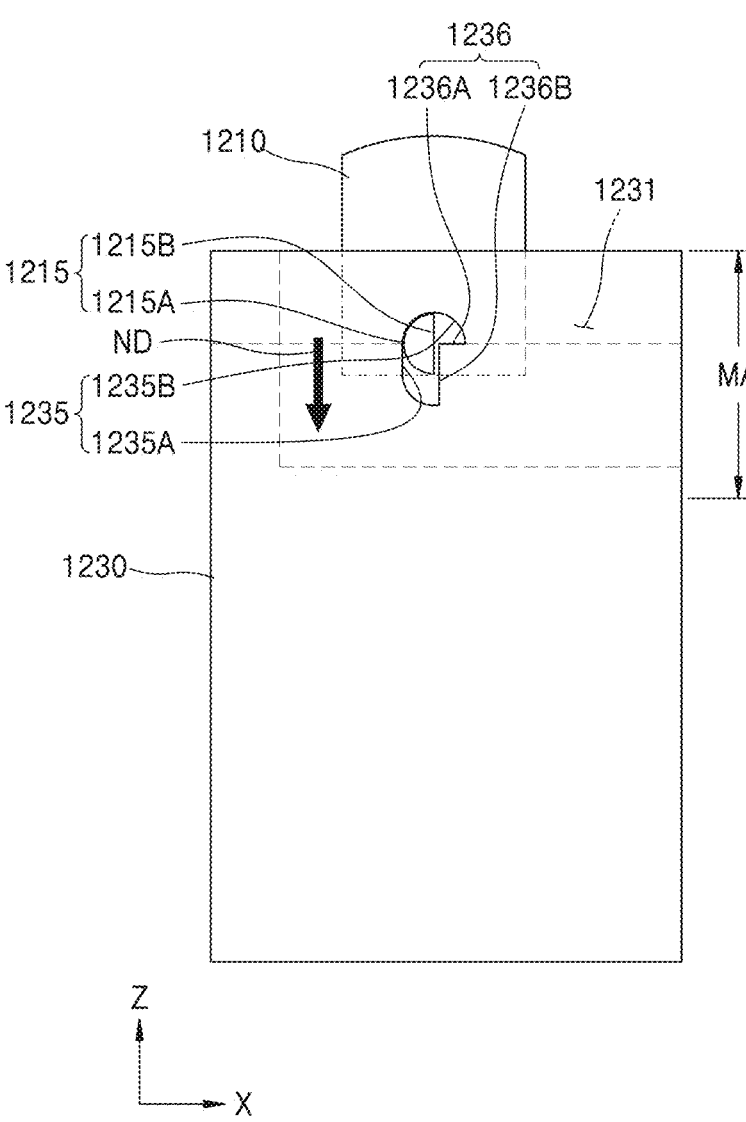

FIG. 44B shows a state in which the driving expression unit 1210 is rotated in the direction MD1 of FIG. 44A from the state of FIG. 44A.

Therefore, the driving expression unit 1210 may ascend more than the state shown in FIG. 44A and the driving expression unit 1210 may have a protruding shape.

Figure 44C:
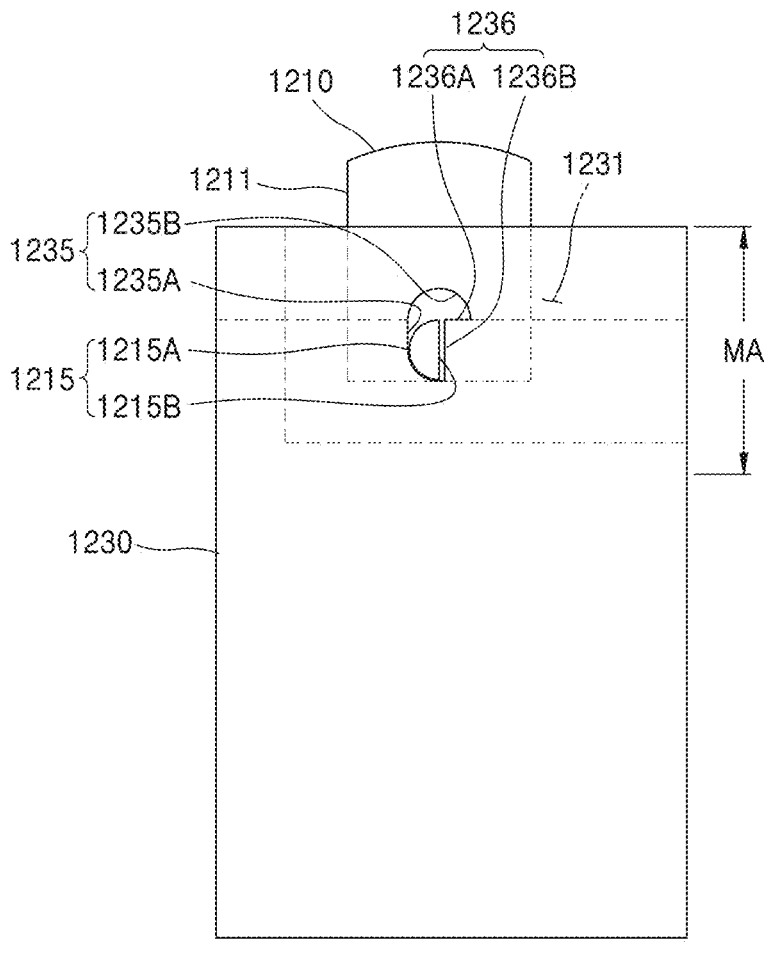
Figure 44C:
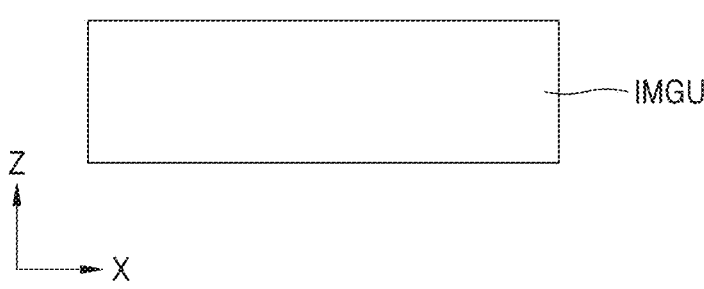

Then, FIG. 44C shows a state in which the driving expression unit 1210 is moved in a direction ND of FIG. 44B.

In other words, the driving expression unit 1210 may move in a direction opposite to the first direction from the state of FIG. 44B (e.g., descend) to have the state shown in FIG. 44C.

Also, according to an optional embodiment, even when no separate force is applied in the state of FIG. 44B, the driving expression unit 1210 may move to the state of FIG. 44C by descending by gravity.

Also, in this case, as long as no certain force is transmitted to the driving expression unit 1210 in the first direction, the movement of the driving expression unit 1210 may be controlled. For example, the movement of the driving expression unit 1210 in the second direction or the rotational movement of the driving expression unit 1210 may be controlled by the side surface 1236B of the locking protrusion 1236 of the base unit 1230.

According to an optional embodiment, the side surface 1236B of the locking protrusion 1236 may have a flat surface.

In this state, a user may sense a state in which the driving expression unit 1210 of the output unit IU8 is protruding, for example, visually or tactilely. Also, according to an optional embodiment, the protruding state may be maintained.

Thereafter, an initialization process may be performed.

This initialization process may be performed through the reset member IMGU. The reset member IMGU may be formed to react with the driving expression unit 1210. For example, the reset member IMGU may include a magnetic material to generate a magnetic field and, as a specific example, may include a permanent magnet.

The reset member IMGU may generate a magnetic field, and for example, the reset member IMGU may be formed, such that an attractive force or a repulsive force is applied driving expression unit 1210. To this end, the polarity and the arrangement direction of the reset member IMGU may be controlled.

The arrangement and the operation of the reset member IMGU may be determined in various ways, and detailed descriptions thereof are identical to those given above.

Figure 44D:
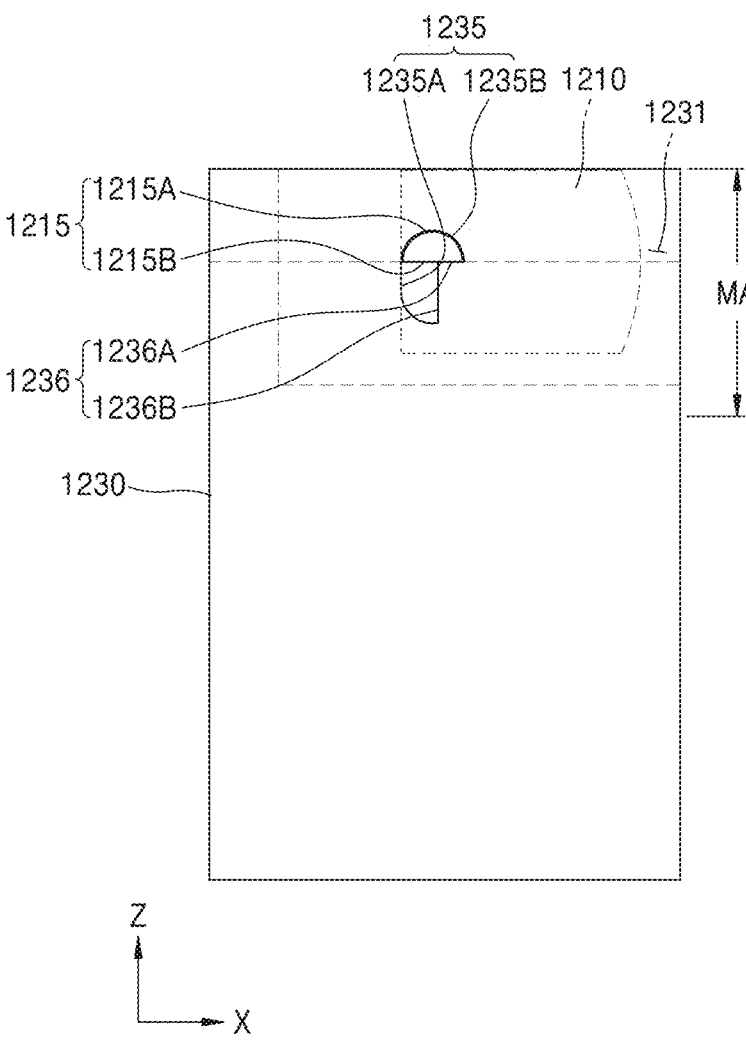

The driving expression unit 1210 may ascend by a magnetic field generated between the reset member IMGU and the driving expression unit 1210, may rotate by the configurations of the driving groove 1235 and the protrusion 1215, and may maintain a non-protruding state as shown in FIG. 44D.

In a protruding feedback-based smart tablet of the present embodiment, one or more (e.g., a plurality of) output units may be arranged in an expression area to be spaced apart from one another.

The output units may protrude in response to a user's input. For example, the output units may protrude in response to an input pen manipulated by the user. As a specific example, a moving unit of each output unit may be moved by magnetic fields of the moving unit and the input pen.

An expression unit of the output unit may be moved by a moving unit and, as a specific example, may protrude. The user may easily sense a shape input by using the input pen by sensing the expression units of the protruding output units visually or tactilely. For example, a user having visual handicap may easily sense a character or a drawing input by the user by using an input pen by sensing a protruding shape of expression units of output units.

According to an optional embodiment, even when an input pen is removed, a moving unit supporting an expression unit may be configured to stay at a constant position, and thus a user may sense protruding expression units for a desired time.

Also, initialization may be performed by using a reset member when the user desires. For example, protruding expression units may be descended back to its original state, thereby facilitating an input operation of the user using an input pen.

Also, in detail, a driving expression unit may easily move in a first direction (e.g., ascend) by a magnetic field and move in a second direction (e.g., clockwise rotation) by a protrusion and a driving groove of the driving expression unit. Also, as a fixing portion of the protrusion is supported by a locking protrusion of the driving groove, the rotational movement may be limited. Therefore, it is possible to easily maintain a state in which the protrusion of the driving expression unit is lowered (e.g., an OFF state).

Then, when a force is applied to the driving expression unit in a direction opposite to the first direction, the driving expression unit may rotate (e.g., rotate in the counterclockwise direction) by the protrusion and the driving groove of the driving expression unit, and, when the force is continuously applied or even when the force is removed, the driving expression unit may move in the direction opposite to the first direction. For example, the driving expression unit may descend. Also, as a fixing portion of the protrusion is supported by a locking protrusion of the driving groove, the rotational movement may be limited. Also, the protruding state of the driving expression unit may be maintained, e.g., an ON state.

Therefore, it is possible to easily switch and maintain ON and OFF states of the driving expression unit, reduce power consumption for movement of the driving expression unit, and improve the overall energy efficiency of an output unit.

Figure 45:
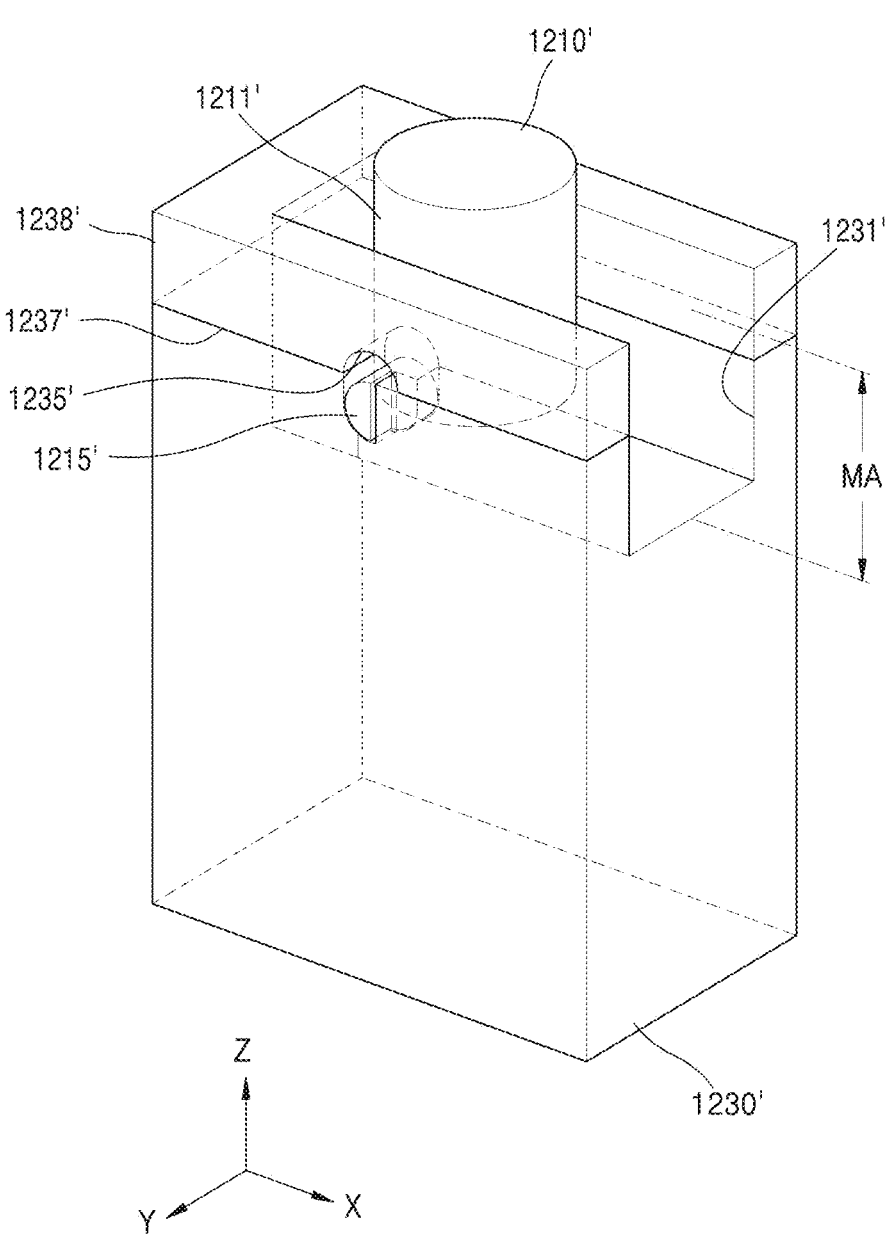
FIG. 45 is a perspective view of a modified example of the output unit of FIG. 42.
Figure 46:
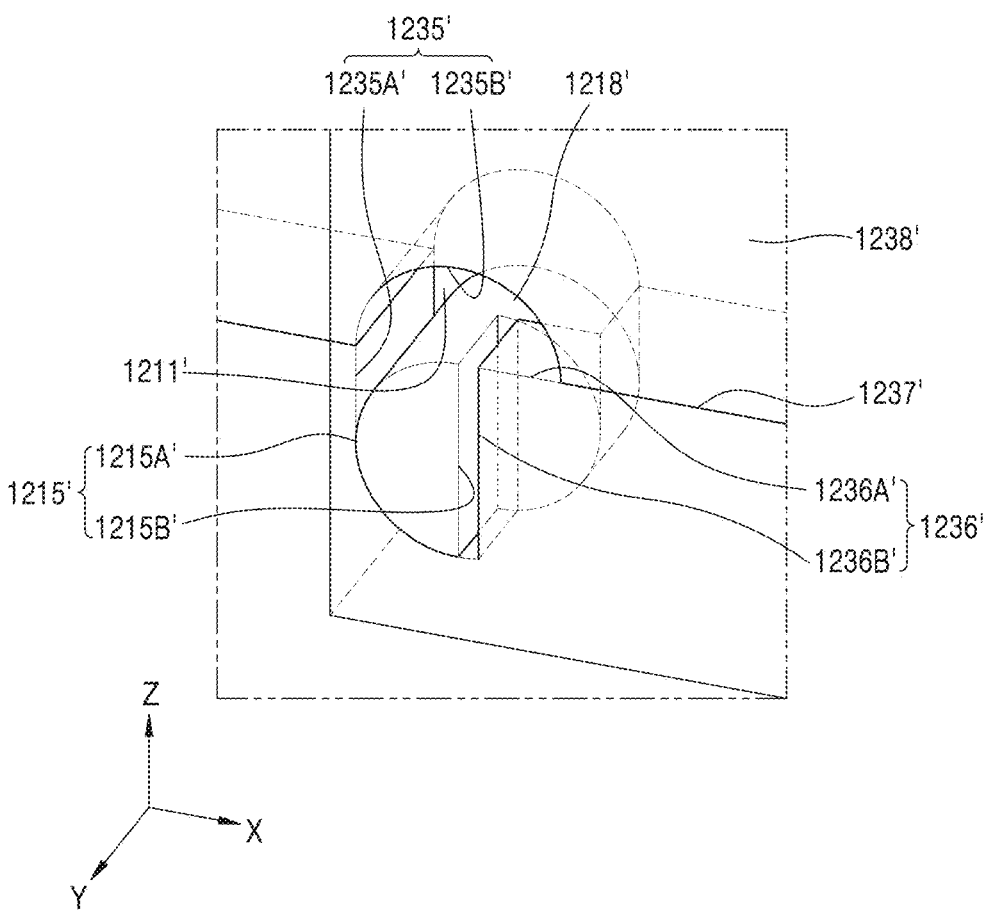
FIG. 46 is an enlarged view of a portion of FIG. 45.

FIG. 45 is a perspective view of a modified example of the one output unit of FIG. 42, and FIG. 46 is an enlarged view of a portion of FIG. 45. In detail, FIG. 46 is an enlarged view of a protrusion of a driving expression unit and a driving groove of a base unit of FIG. 45.

An output unit may include a driving expression unit 1210' and a base unit 1230'.

For convenience of explanation, descriptions below will focus on differences from the above-described embodiment.

According to an optional embodiment, the driving expression unit 1210' may include a magnetic body, e.g., a permanent magnet.

According to an optional embodiment, when the input feedback-based smart pen includes a permanent magnet as described above, the driving expression unit 1210' may include a permanent magnet, or, according to another selective embodiment, iron, nickel, or a stainless steel-based alloy material.

The driving expression unit 1210' may be moved by a reaction with a magnetic body of the input pen, that is, magnetic fields of the driving expression unit 1210' and the magnetic body 110.

At this time, as a specific example, when the driving expression unit 1210' includes a permanent magnet, the N pole and S pole of the permanent magnet may be arranged in the lengthwise direction of the driving expression unit 1210, which may be, for example, the first direction or the Z-axis direction in FIG. 45.

The driving expression unit 1210' may move to protrude in one direction, and the driving expression unit 1210' may be relocated through ascending and descending movements at least in the lengthwise direction of the driving expression unit 1210'. Therefore, the driving expression unit 1210' may be moved to protrude in one direction, and a user may sense the movement of the driving expression unit 1210' tactilely or visually.

The driving expression unit 1210' may include a protrusion 1215' protruding from a side surface of a main body area 1211'. Although not shown, according to an optional embodiment, the driving expression unit 1210' may include two protrusions 1215' protruding from two side surfaces of the main body area 1211' opposite to each other.

According to an optional embodiment, a protrusion connecting portion 1218' may be further included between protrusion 1215' and the main body area 1211'. The protrusion connecting portion 1218' protrudes from a side surface of the main body area 1211' and may have a width greater than that of the protrusion 1215'. The protrusion connecting portion 1218' may be disposed at a position to not to be caught by a locking protrusion 1236' of a base unit 1230' to be described later.

The protrusion connecting portion 1218' is formed between the main body area 1211' and the protrusion 1215' of the driving expression unit 1210' to have a width greater than that of the protrusion 1215' to distribute a force locally exerted on the protrusion 1215' during a rotation movement and a movement limitation by a driving groove 1235' and the locking protrusion 1236' to be described later, thereby reducing damage or deformation of the protrusion 1215' and facilitating rotation of the protrusion 1215'.

The protrusion 1215' may include a side surface 1215A' having at least a curved area and a fixing portion 1215B'.

The fixing portion 1215B' may have a flat surface in at least one area.

According to an optional embodiment, the main body area 1211' of the driving expression unit 1210' may have a pillar-like shape elongated in one direction, that is, the lengthwise direction.

In this case, an end of the driving expression unit 1210' may have a curved surface or the corners of the driving expression unit 1210' may be rounded.

The protrusion 1215' of the driving expression unit 1210' may be formed to be adjacent to an end portion of an area of the side surface of the main body area 1211' of the driving expression unit 1210' opposite to an end portion protruding toward a user in the lengthwise direction of the driving expression unit 1210'.

The driving expression unit 1210' may be disposed in a first accommodation unit 1231' of the base unit 1230' to be described later.

The base unit 1230' may be formed to accommodate the driving expression unit 1210'.

In an alternative embodiment, the base unit 1230' may include a first area 1MA' corresponding to the driving expression unit 1210'.

As a specific example, the base unit 1230' may include a first accommodation unit 1231'.

The first accommodation unit 1231' may include a space accommodating the driving expression unit 1210'. The first accommodation unit 1231' may be a space having a shape corresponding to that of the base unit 1230' from which a certain width and a certain length are removed. The first accommodation unit 1231' may be opened toward at least one surface of the base unit 1230'. Therefore, the driving expression unit 1210' accommodated in the first accommodation unit 1231' may maintain a protruding state while being accommodated in the first accommodation unit 1231'.

According to an optional embodiment, the first accommodation unit 1231' may have a shape open toward the top surface of the base unit 1230' and one side surface of the base unit 1230' connected thereto.

The length of the first accommodation unit 1231' may correspond to or be greater than at least the length of the driving expression unit 1210'. Therefore, the driving expression unit 1210' may be accommodated in the first accommodation unit 1231' not only when the driving expression unit 1210' moves in a first direction (e.g., ascending and descending in a direction opposite thereto), but also when the driving expression unit 1210' moves in a second direction intersecting with the first direction (e.g., the driving expression unit 1210' is laid by being rotated 90 degrees).

The base unit 1230' may include the driving groove 1235' and the locking protrusion 1236'.

The driving groove 1235' may be formed to be connected to the first accommodation unit 1231'. The protrusion 1215' of the driving expression unit 1210' may correspond to the driving groove 1235'.

For example, when the driving expression unit 1210' is disposed in the first accommodation unit 1231', the protrusion 1215' of the driving expression unit 1210' may correspond to the driving groove 1235'.

FIGS. 45 and 46 show that the driving groove 1235' have a shape penetrating through side surfaces of the base unit 1230'. Although not shown, according to another embodiment, the driving groove 1235' may be connected to the first accommodation unit 1231' and may not penetrate through the side surfaces of the base unit 1230'. In other words, the driving groove 1235' may have a groove shape instead of a penetrating shape.

The driving groove 1235' may include a first area 1235A' and a second area 1235B'. The first area 1235A' may be disposed closer to a second accommodation unit 1232' than the second area 1235B' is.

The first area 1235A' may be formed to support the protrusion 1215' when the driving expression unit 1210' (e.g., the protrusion 1215' of the driving expression unit 1210') descends.

To this end, the first area 1235A' may have an edge surface having a shape similar to that of the side surface 1215A' of the protrusion 1215' of the driving expression unit 1210'. For example, the first area 1235A' may have a curved surface.

Also, the first area 1235A' may have an appropriate width to facilitate the movement of the driving expression unit 1210' in the first direction (that is, an ascending direction) and the movement of returning in an opposite direction. Also, the first area 1235A' may be formed to extend in the first direction to be connected to the second area 1235B'.

The second area 1235B' may be connected to the first area 1235A' and may have a shape extending in a second direction intersecting with the first direction. As described above, the first direction is a direction in which the driving expression unit 1210' ascends or descends and is the Z-axis direction in FIGS. 45 and 46.

Also, according to an optional embodiment, the second direction may be a direction orthogonal to the first direction, e.g., the X-axis direction in FIG. 45.

The second area 1235B' may be formed to correspond to the protrusion 1215' when the driving expression unit 1210' moves in the first direction and then moves in the second direction.

In other words, when the driving expression unit 1210' rotates, the protrusion 1215' may ascend from the first area 1235A' and then rotates by a certain angle to be disposed in the second area 1235B'.

The second area 1235B' may have a shape corresponding to a state in which the protrusion 1215' is rotated and disposed. For example, the second area 1235B' may have a curved surface.

Also, the second area 1235B' may have an appropriate width to facilitate the movement of the driving expression unit 1210' when the driving expression unit 1210' descends in a direction opposite to the first direction (e.g., rotating and descending) after the driving expression unit 1210' returns in the second direction.

Also, the second area 1235B' may have a shape similar to that of the first area 1235A in a state in which the first area 1235A' is rotated.

The base unit 1230' may include a locking protrusion 1236' to maintain a state of the driving expression unit 1210' after the driving expression unit 1210' is disposed in the second area 1235B'. In other words, the fixing portion 1215B' of the protrusion 1215' of the driving expression unit 1210' is disposed on a top surface 1236A' of the locking protrusion 1236', and thus the driving expression unit 1210' may be fixed. According to an optional embodiment, the top surface 1236A' of the locking protrusion 1236' may have a flat surface.

According to an optional embodiment, the base unit 1230' may have a separation area 1238' based on a boundary line 1237' overlapping the driving groove 1235'. For example, when an edge of the separation area 1238' correspond to the boundary line 1237' and the separation area 1238' is separated from the remaining of the base unit 1230', the driving groove 1235' may have an open shape.

According to an optional embodiment, the driving expression unit 1210' may be disposed in the first accommodation unit 1231' before disposing or attaching the separation area 1238' in or to the remaining of the base unit 1230' and the separation area 1238' may be disposed in or attached to the remaining of the base unit 1230', and thus the driving expression unit 1210' may be easily disposed in the base unit 1230'.

The operation of the output unit of the present embodiment is similar to that of FIGS. 44A to 44D described above, and thus detailed descriptions thereof will be omitted.

Figure 47:
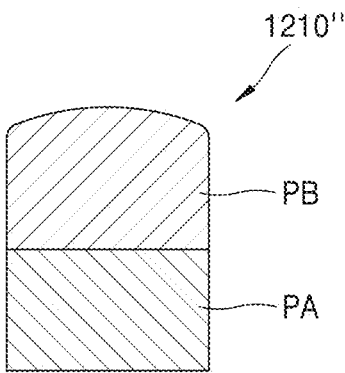
FIGS. 47 and 48 are views of modified examples of a driving expression unit.
Figure 48:
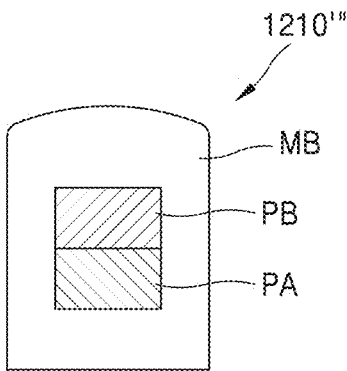

FIGS. 47 and 48 are views of modified examples of a driving expression unit.

Referring to FIG. 47, a driving expression unit 1210" may include a first magnetic unit 1PA' and a second magnetic unit 1PB'. The first magnetic unit 1PA' and the second magnetic unit 1PB' may have different polarities from each other. For example, the first magnetic unit 1PA' may have an N pole, and the second magnetic unit 1PB' may have an S pole. Alternatively, according to another embodiment, the first magnetic unit 1PA' may have an S pole and the second magnetic unit 1PB' may have an N pole.

Also, according to another embodiment, referring to FIG. 48, a driving expression unit 1210"" may include the first magnetic unit 1PA', the second magnetic unit 1PB', and a cover layer 1MB'.

The first magnetic unit 1PA' and the second magnetic unit 1PB' may have different polarities from each other. For example, the first magnetic unit 1PA' may have an N pole, and the second magnetic unit 1PB' may have an S pole. Alternatively, according to another embodiment, the first magnetic unit 1PA' may have an S pole and the second magnetic unit 1PB' may have an N pole.

The cover layer 1MB' may cover at least one surface of each of the first magnetic unit 1PA' and the second magnetic unit 1PB'. As a specific example, the cover layer 1MB' may be formed to surround the first magnetic unit 1PA' and the second magnetic unit 1PB'. Therefore, the cover layer 1MB' may protect the first magnetic unit 1PA' and the second magnetic unit 1PB', and the cover layer 1MB' may include various materials. For example, the cover layer 1MB' may include an organic layer or an inorganic layer, and more particularly, may include an organic material like a resin or an inorganic material like a ceramic.

The above-stated driving expression unit of FIGS. 47 and 48 may be selectively applied to the above-stated output unit of FIG. 43 or 45, and various modifications may be made therein.

Figure 49:
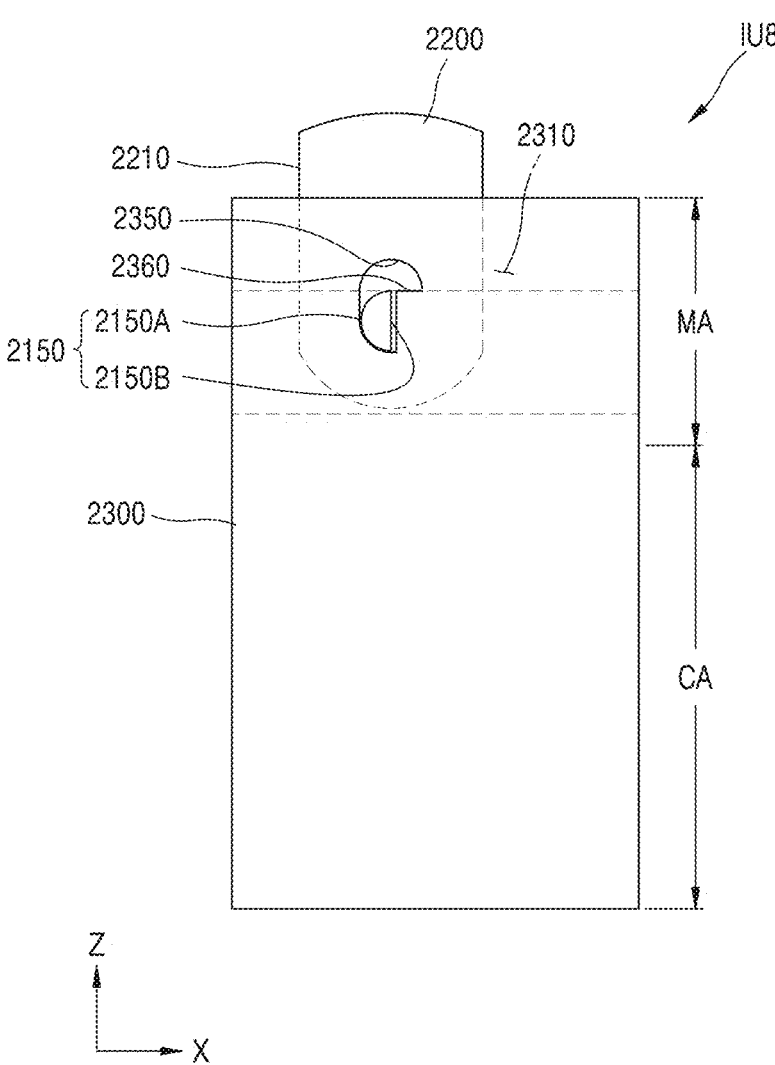
FIG. 49 is a schematic perspective front view of an output unit according to another embodiment of the present disclosure.
Figure 50:
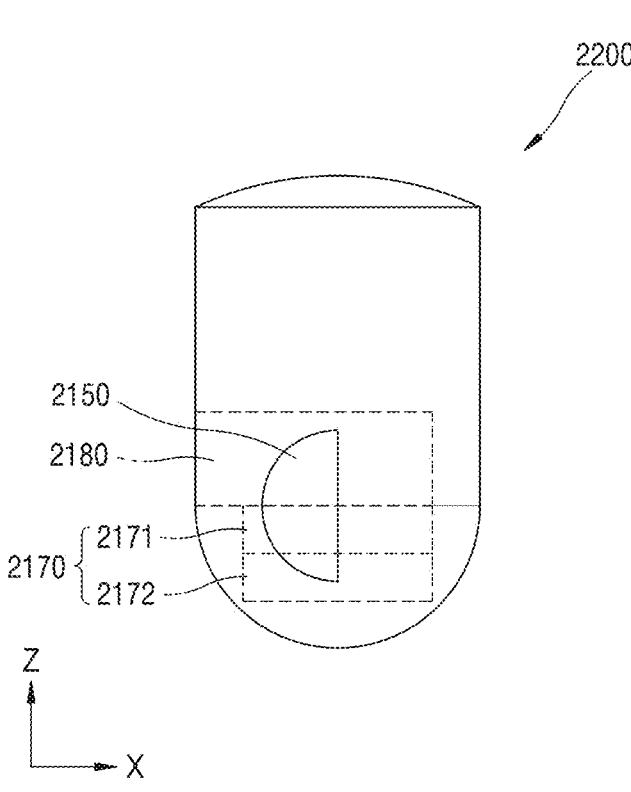
FIG. 50 is an enlarged view of a driving expression unit of FIG. 49.
Figure 51:
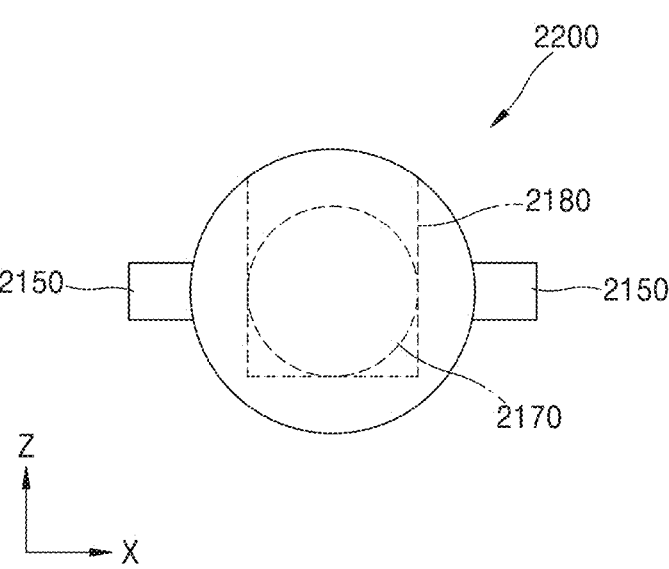
FIG. 51 is a perspective plan view of the driving expression unit of FIG. 49 viewed from above.

FIG. 49 is a schematic perspective front view of an output unit according to another embodiment of the present disclosure, FIG. 50 is an enlarged view of a driving expression unit of FIG. 49, and FIG. 51 is a perspective plan view of the driving expression unit of FIG. 49 viewed from above.

The output unit IU8 may include a driving expression unit 2200 and a base unit 2300.

The driving expression unit 2200 may include a magnetic material.

The driving expression unit 2200 will be described in detail with reference to FIGS. 50 and 51.

The driving expression unit 2200 may include a magnetic unit 2170 and a magnetic body 2180.

According to an optional embodiment, the magnetic unit 2170 may include a magnetic body, e.g., a permanent magnet.

The magnetic unit 2170 may include a first magnetic unit 2171 and a second magnetic unit 2172. In detail, the first magnetic unit 2171 and the second magnetic unit 2172 have different polarities from each other. For example, the first magnetic unit 2171 may have an N pole, and the second magnetic unit 2172 may have an S pole. Alternatively, according to another embodiment, the first magnetic unit 2171 may have an S pole, and the second magnetic unit 2172 may have an N pole.

The magnetic body 2180 has a property of being magnetized in a magnetic field, is, for example, adjacent to the magnetic unit 2170, and may be magnetized by the magnetic unit 2170 to influence the direction of a magnetic field generated by the magnetic unit 2170.

According to an optional embodiment, the magnetic body 2180 may include various materials. For example, the magnetic body 2180 may include iron, and, according to another embodiment, may include nickel or cobalt.

The magnetic body 2180 may be tilted at a certain angle with respect to the magnetic unit 2170.

According to an optional embodiment, the magnetic unit 2170 and the magnetic body 2180 may be arranged to be eccentric to each other. For example, the center axis of the magnetic unit 2170 and the center axis of the magnetic body 2180 may be misaligned from each other instead of being parallel with each other.

According to an optional embodiment, as shown in FIGS. 50 and 51, the magnetic unit 2170 may be disposed in the center area of the driving expression unit 2100, and the magnetic body 2180 may have a shape extending from the center area of the driving expression unit 2200 toward the outer surface of the driving expression unit 2100.

According to an optional embodiment, one side surface of the magnetic body 2180 may be exposed to one side surface of the driving expression unit 2100. Therefore, a shape in which the magnetic body 2180 is disposed inside the driving expression unit 2200 may be easily implemented.

According to an optional embodiment, the center axis of the magnetic unit 2170 may be parallel with the center axis of the driving expression unit 2100, and the center axis of the magnetic body 2180 may be misaligned to the center axis of the driving expression unit 2200 without being parallel therewith.

Due to the misalignment between the center axes of the magnetic unit 2170 and the magnetic body 2180 (that is, eccentricity), the axial direction of a magnetic field generated by a combination of the magnetic unit 2170 and the magnetic body 2180 or the magnetic axis direction of the driving expression unit 2200 may not be parallel with the center axis of the driving expression unit 2200 and may be tilted by a certain angle. Therefore, it is possible to easily generate the torque of the driving expression unit 2200 and control the smooth movement of the driving expression unit 2100, thereby improving the expression precision of the output unit IU8 and reduce power consumption thereof.

The driving expression unit 2200 may perform a rotational movement, e.g., an angular movement with a certain angle.

The driving expression unit 2200 may move to protrude in one direction, and the driving expression unit 2200 may be relocated through ascending and descending movements at least in the lengthwise direction of the driving expression unit 2100. Therefore, the driving expression unit 2200 may be moved to protrude in one direction, and a user may sense the movement of the driving expression unit 2200 tactilely or visually.

The driving expression unit 2200 may include a protrusion 2150 protruding from a side surface of a main body area 2210.

According to an optional embodiment, as shown in FIG. 51, the driving expression unit 2200 may include two protrusions 2150 protruding from side surfaces of the main body area 2210 opposite to each other.

The protrusion 2150 may include a side surface 2150A having at least a curved area and a fixing portion 2150B.

The fixing portion 2150B may have a flat surface in at least one area.

According to an optional embodiment, the main body area 2210 of the driving expression unit 2200 may have an elongated pillar-like shape.

In this case, an end of the driving expression unit 2200 may have a curved surface or the corners of the driving expression unit 2200 may be rounded.

For example, from among areas of the driving expression unit 2100, an end portion from which the driving expression unit 2200 protrudes toward a user may have a curved surface.

In addition, a bottom surface 2120 of the driving expression unit 2100, that is, a surface opposite to the end portion from which the driving expression unit 2200 protrudes toward a user may also have a curved surface. In other words, the shape that the width of the bottom surface 2120 of the driving expression unit 2200 decreases in the downward direction enables stable arrangement of the magnetic unit 2170. For example, the magnetic unit 2170 may be disposed in parallel with the center axis of the driving expression unit 2100.

The protrusion 2150 of the driving expression unit 2200 may be formed to be adjacent to an end portion of an area of the side surface of the main body area 2210 of the driving expression unit 2200 opposite to an end portion protruding toward a user in the lengthwise direction of the driving expression unit 2100.

The driving expression unit 2200 may be disposed in a first accommodation unit 2310 of the base unit 2300.

As a specific example, the base unit 2300 may include the first accommodation unit 2310.

The first accommodation unit 2310 may include a space accommodating the driving expression unit 2100. The first accommodation unit 2310 may be a space having a shape corresponding to that of the base unit 2300 from which a certain width and a certain length are removed. The first accommodation unit 2310 may be opened toward at least one surface of the base unit 2300. Therefore, the driving expression unit 2200 accommodated in the first accommodation unit 2310 may maintain a protruding state while being accommodated in the first accommodation unit 2310.

According to an optional embodiment, the first accommodation unit 2310 may have a shape open toward the top surface of the base unit 2300 and one side surface of the base unit 2300 connected thereto.

The length of the first accommodation unit 2310 may correspond to or be greater than at least the length of the driving expression unit 2100. Therefore, the driving expression unit 2200 may be accommodated in the first accommodation unit 2310 not only when the driving expression unit 2200 moves in a first direction (e.g., ascending and descending in a direction opposite thereto), but also when the driving expression unit 2200 moves in a second direction intersecting with the first direction (e.g., the driving expression unit 2200 is laid by being rotated 90 degrees).

The base unit 2300 may include a driving groove 2350 and a locking protrusion 2360.

The driving groove 2350 may be formed to be connected to the first accommodation unit 2310. The protrusion 2150 of the driving expression unit 2200 may correspond to the driving groove 2350.

For example, when the driving expression unit 2200 is disposed in the first accommodation unit 2310, the protrusion 2150 of the driving expression unit 2200 may correspond to the driving groove 2350.

FIG. 49 shows that the driving groove 2350 have a shape penetrating through side surfaces of the base unit 2300. Although not shown, according to another embodiment, the driving groove 2350 may be connected to the first accommodation unit 2310 and may not penetrate through the side surfaces of the base unit 2300. In other words, the driving groove 2350 may have a groove shape instead of a penetrating shape.

The driving groove 2350 may include a first area and a second area, which are the same as those described in the above-described embodiments, and thus detailed descriptions thereof will be omitted.

The base unit 2300 may include the locking protrusion 2360 to maintain a state of the driving expression unit 2200 after the driving expression unit 2200 is disposed in a second area of the driving groove 2350.

Figure 52:
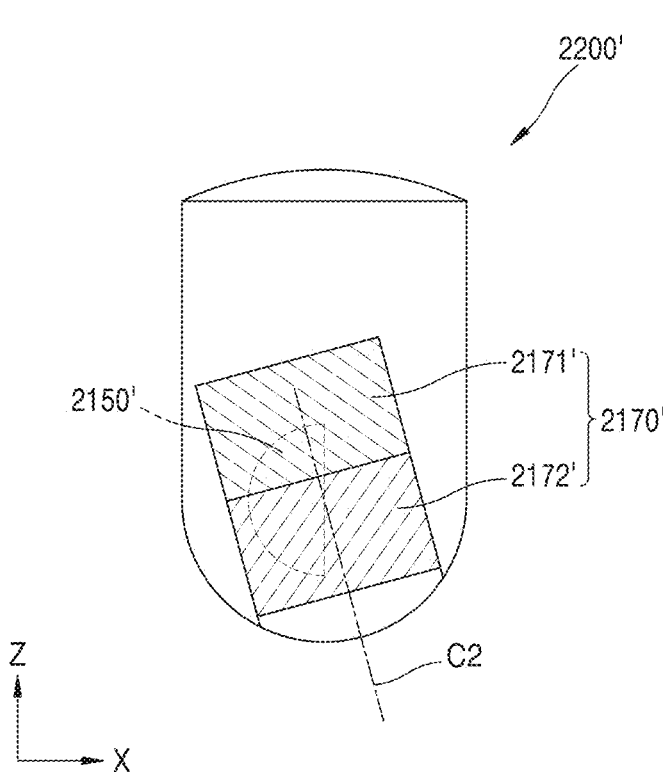
FIG. 52 is an enlarged view of a modified example of the driving expression unit of FIG. 49.

FIG. 52 is an enlarged view of a modified example of the driving expression unit of FIG. 49.

Referring to FIG. 52, a driving expression unit 2200' may include a magnetic unit 2170'. According to an optional embodiment, the magnetic unit 2170' may include a magnetic body, e.g., a permanent magnet.

The magnetic unit 2170' may include a first magnetic unit 2171' and a second magnetic unit 2172'. In detail, the first magnetic unit 2171' and the second magnetic unit 2172' have different polarities from each other. For example, the first magnetic unit 2171' may have an N pole, and the second magnetic unit 2172' may have an S pole. Alternatively, according to another embodiment, the first magnetic unit 2171' may have an S pole, and the second magnetic unit 2172' may have an N pole.

A direction C2' of the magnetic axis of the magnetic unit 2170' may be tilted at a certain angle with respect to the driving expression unit 2200'.

According to an optional embodiment, the direction C2' of the magnetic axis of the magnetic unit 2170' may be misaligned with the center axis of the driving expression unit 2200' without being parallel therewith.

According to an optional embodiment, the center axis of the magnetic unit 2170' may be tilted to form a certain angle instead of being parallel with the lengthwise direction of the driving expression unit 2200'.

Due to the misalignment between the direction C2' of the magnetic axis of the magnetic unit 2170' and the center axis of the driving expression unit 2200', it is possible to easily generate the torque of the driving expression unit 2200' and control the smooth movement of the driving expression unit 2200', thereby improving the expression precision of an information output device and reduce power consumption thereof.

The magnetic unit 2170' may be disposed to overlap at least the center point of the driving expression unit 2200' in the lengthwise direction.

According to an optional embodiment, the magnetic unit 2170' may have an extended length to reach the center point of the driving expression unit 2200' in the lengthwise direction.

Therefore, a torque may be easily generated at the driving expression unit 2200' by changing the center of gravity of the driving expression unit 2200'.

A movement of the driving expression unit 2200 or 2200' using an input pen (e.g., a protruding movement) is similar to the driving of the output unit of the above-stated embodiment, and more particularly, the embodiment of FIG. 42 or FIG. 49, and thus detailed descriptions thereof will be omitted.

Figure 53:
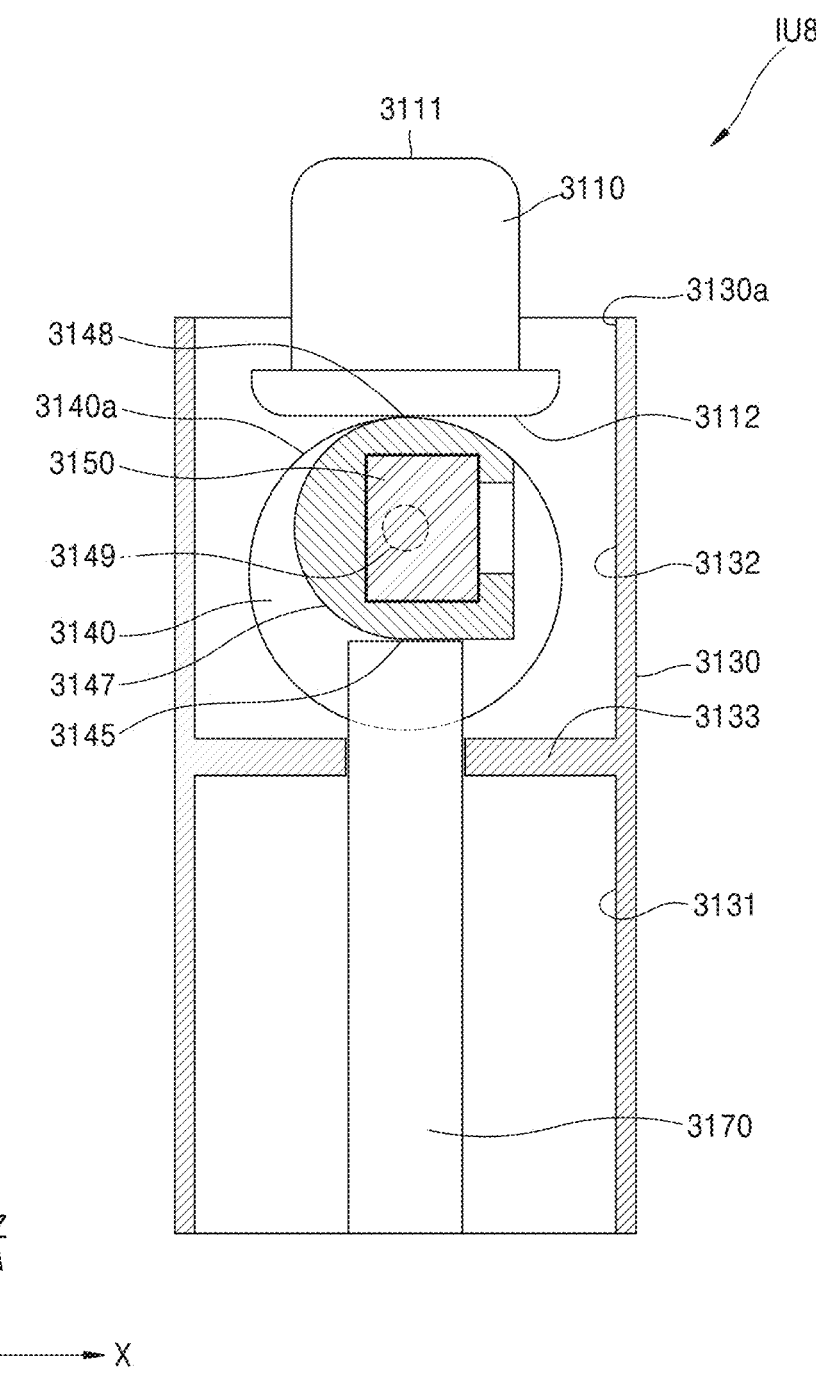
FIG. 53 is a schematic perspective front view of an output unit according to another embodiment of the present disclosure.
Figure 54:
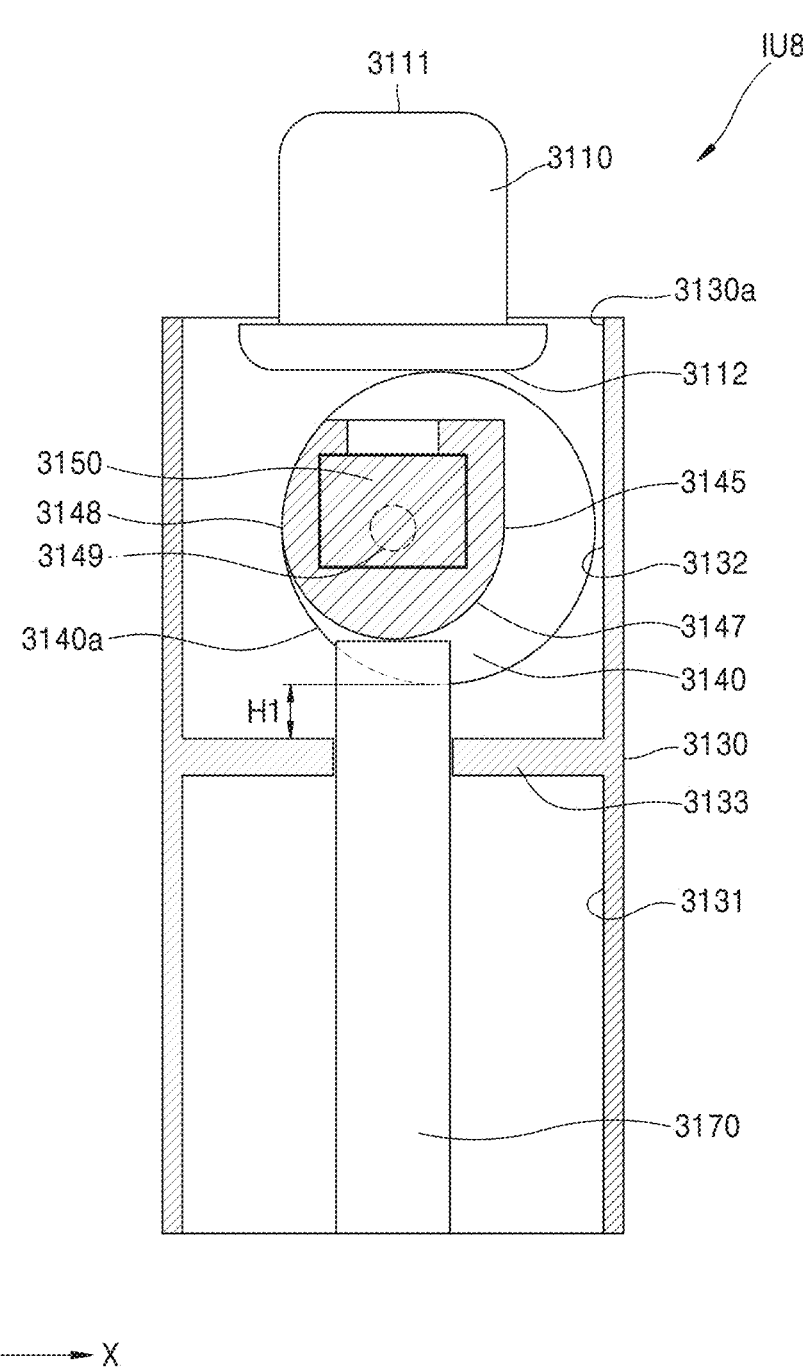
FIGS. 54 and 55 are diagrams for describing the operation of the output unit of FIG. 53.
Figure 55:
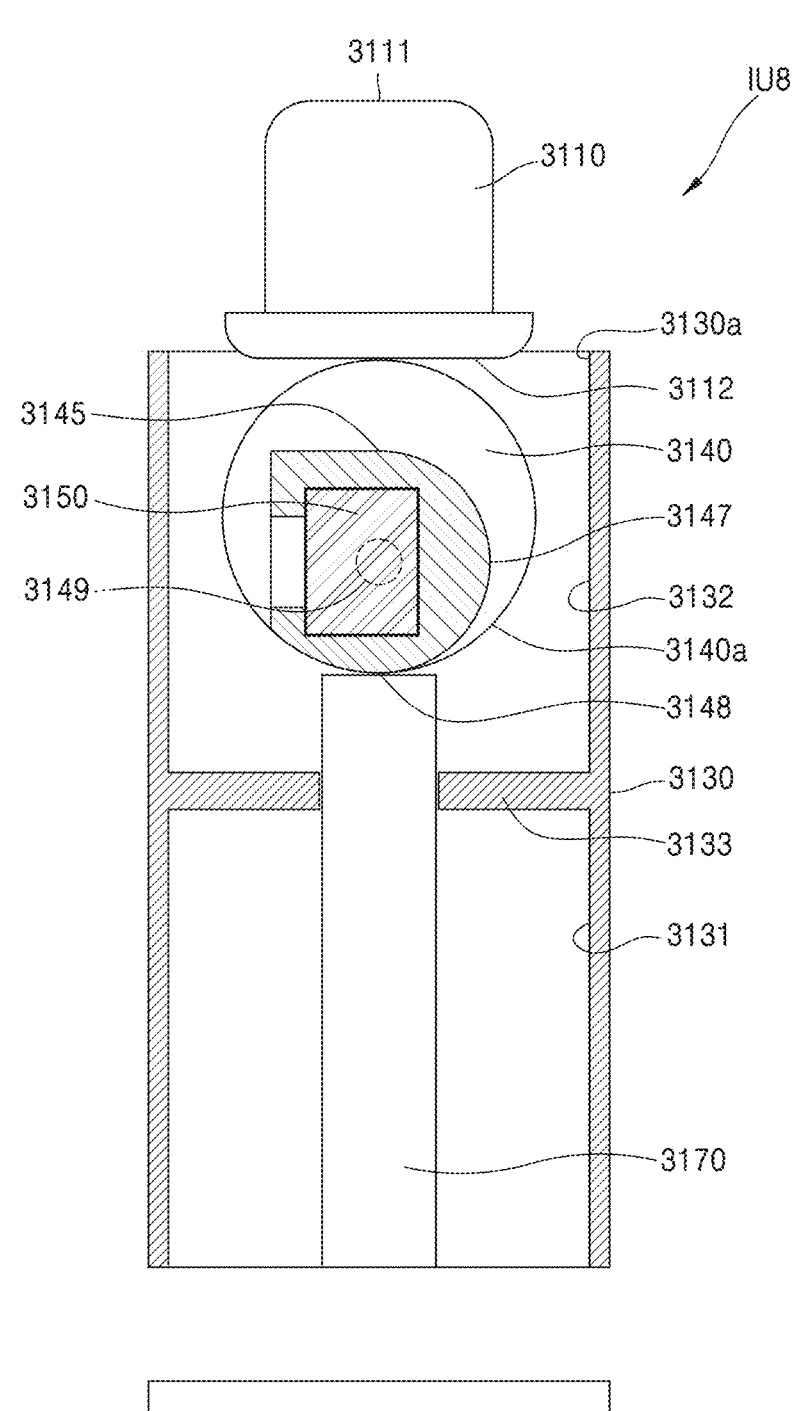
Figure 55:
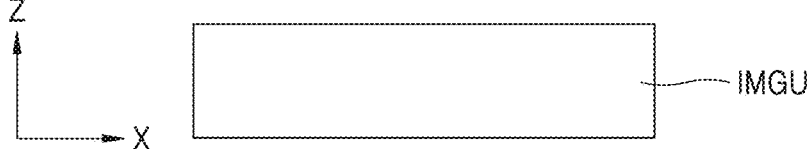

FIG. 53 is a schematic perspective front view of an output unit according to another embodiment of the present disclosure, and FIGS. 54 and 55 are diagrams for describing the operation of the output unit of FIG. 53.

The output unit IU8 of the present embodiment may include a base unit 3130, a driving unit 3140, and an expression unit 3110.

The expression unit 3110 may move according to the movement of the driving unit 3140 to be described later and may move upward and downward at least in the lengthwise direction of the expression unit 3110. Therefore, the expression unit 3110 may be moved to protrude in one direction, and a user may sense the movement of the expression unit 3110 tactilely or visually.

The expression unit 3110 may include an expression surface 3111 and a support surface 3112.

The support surface 3112 is a surface from among areas of the expression unit 3110 facing the driving unit 3140 and may constitute a lower area of the expression unit 3110 and contact the driving unit 3140. The driving unit 3140 may transmit a force to the expression unit 3110 through the support surface 3112. For example, a driving surface 3140a of the driving unit 3140 may contact the support surface 3112 and allow the support surface 3112 to move in a first direction, that is, the Z-axis direction in FIG. 53.

The expression surface 3111 is the outermost (e.g., the topmost) surface from among areas of the expression unit 3110 and may include an area to be recognized by a user.

For example, the entire area of the expression unit 3110 may be recognized by a user or only the expression surface 3111 may be recognized. For example, a user may sense the movement of the expression unit 3110 through contact with the expression surface 3111, and the user may easily sense the movement of the expression unit 3110 through visual sensing of the expression surface 3111.

According to an optional embodiment, the expression surface 3111 may include a curved surface.

The expression unit 3110 may have various shapes. The expression unit 3110 may include a pillar-like area. For example, the expression unit 3110 may include an area having a shape similar to that of a cylinder.

In this case, a protruding area of the expression unit 3110 may have a curved surface and may also have rounded corners.

The expression unit 3110 may include various materials and may include an insulating material as a light and durable material. For example, the expression unit 3110 may include a resin-based organic material. According to another embodiment, the expression unit 3110 may include an inorganic material, such as a ceramic material.

Also, according to another selective embodiment, the expression unit 3110 may include a material like a metal or glass.

According to an optional embodiment, a support unit 3170 may be further disposed. For example, the support unit 3170 may include an elongated area.

According to an optional embodiment, one end of the support unit 3170 may be extended to support the driving unit 3140 to be described later, and the movement of the driving unit 3140 may be performed while being supported by the one end of the support unit 3170.

According to an optional embodiment, the support unit 3170 may be formed in correspond to a through portion of the base unit 3130.

According to an optional embodiment, the support unit 3170 may include a magnetic material, thereby efficiently generating a magnetic field between the driving unit 3140 and an input pen or between the driving unit 3140 and a reset member to reduce the power consumption of the output unit IU8.

The base unit 3130 may include a first accommodation unit 3131 and a second accommodation unit 3132.

The first accommodation unit 3131 and the second accommodation unit 3132 may be arranged adjacent to each other and may not overlap each other.

According to an optional embodiment, the first accommodation unit 3131 and the second accommodation unit 3132 may be spaced apart from each other.

According to another selective embodiment, the first accommodation unit 3131 and the second accommodation unit 3132 may be connected through a through hole.

The above-stated support unit 3170 may be disposed in the first accommodation unit 3131, and one area of the support unit 3170 may be extended and disposed in the second accommodation unit 3132 through a through hole.

Although not shown, according to an optional embodiment, a driving groove (not shown) may be formed in the second accommodation unit 3132 of the base unit 3130. For example, driving grooves (not shown) may be formed on inner side surfaces of the second accommodation unit 3132 of the base unit 3130 facing each other.

The base unit 3130 may have an elongated shape to accommodate the driving unit 3140 and may be formed to completely surround the driving unit 3140.

According to an optional embodiment, the base unit 3130 may include a boundary 3133 between the first accommodation unit 3131 and the second accommodation unit 3132.

The first accommodation unit 3131 and the second accommodation unit 3132 may be separated by the boundary 3133.

According to an optional embodiment, a through hole may be formed at the boundary 3133, such that an area of the support unit 3170 extends and passes therethrough.

Also, the base unit 3130 may include an inlet 3130a, and the inlet 3130a may be connected to the second accommodation unit 3132. The expression unit 3110 may move, such that the length of a portion thereof protruding out of the base unit 3130 through the inlet 3130a varies.

The driving unit 3140 may be disposed at the base unit 3130. The driving unit 3140 may be disposed in the second accommodation unit 3132.

The driving unit 3140 may be driven by an input pen and perform an angular movement or a rotational movement. The expression unit 3110 may move up and down by the driving unit 3140.

According to an optional embodiment, a magnetic unit 3150 may be disposed in the driving unit 3140, for example, in the inner space of the driving unit 3140. For example, the magnetic unit 3150 may include a magnetic body, e.g., a permanent magnet.

The magnetic unit 3150 may include a first area (e.g., an N pole or an S pole) and a second area (e.g., an S pole or an N pole) having different polarities, and the first area and the second area having different polarities may be arranged in a direction toward the expression unit 3110 during a rotation of the driving unit 3140, e.g., the Z-axis direction.

For example, in FIG. 53, the first area and the second area of the magnetic unit 3150 having different polarities may be arranged in a direction toward the expression unit 3110, e.g., the Z-axis direction.

The driving unit 3140 may include the driving surface 3140a on at least the outer surface, and the driving surface 3140a may be formed to support the expression unit 3110, thereby providing a driving force for the vertical movement of the expression unit 3110.

According to an optional embodiment, the driving surface 3140a of the driving unit 3140 may include a curved surface as the outer surface. According to a more specific embodiment, the driving surface 3140a of the driving unit 3140 may include a boundary line having a circle-like shape.

The driving unit 3140 may include a driving control unit 3149.

The driving position of the driving unit 3140 may be controlled through the driving control unit 3149. For example, when the driving unit 3140 moves, the driving unit 3140 may perform an angular motion or a rotational motion around the driving control unit 3149.

According to an optional embodiment, the center axis of the driving unit 3140 and the center axis driving control unit 3149 may not be coaxial with each other and may be eccentric.

Also, according to an optional embodiment, the magnetic unit 3150 may not coaxial with the central axis of the driving unit 3140 and, for example, may be disposed to overlap an area of the driving control unit 3149.

Therefore, it is possible to easily generate the torque with respect to the driving unit 3140 to allow the driving unit 3140 to perform an angular movement or a rotational movement, thereby efficiently performing a movement with respect to the expression unit 3110 and improving the expression precision of the output unit IU8. Also, power consumption of the output unit IU8 may be reduced.

Although not shown, the driving unit 3140 may include a first driving member (not shown) and a second driving member (not shown) and may include a separation space (not shown) therebetween.

External surfaces of the first driving member (not shown) and the second driving member (not shown) may each include the driving surface 3140a on at least one surface to support the expression unit 3110 during a movement of the driving unit 3140, thereby providing a driving force to the expression unit 3110. For example, an outer boundary line (e.g., a circle) of the driving unit 3140 including the driving surface 3140a shown in FIG. 53 may be a boundary line of the first driving member (not shown) or the second driving member (not shown).

According to an optional embodiment, the outer surfaces of the first driving member (not shown) and the second driving member (not shown) may each include a curved surface. For example, the driving surface 3140a may include a curved surface.

For example, the first driving member (not shown) and the second driving member (not shown) may each have a shape similar to that of a rotating body and may each have a disk-like shape.

Therefore, a natural driving force may be provided to the support surface 3112 of the expression unit 3110 during a rotation or an angular movement of the first driving member (not shown) and the second driving member (not shown), thereby allowing the expression unit 3110 to efficiently perform a continuous and smooth movement.

The driving control unit 3149 may be disposed on at least one side surface (e.g., both side surfaces) of the driving unit 3140.

According to an optional embodiment, the driving control unit 3149 may protrude in a direction away from a side surface of the driving unit 3140 (a direction protruding outwardly in FIG. 53), and, according to an optional embodiment, the protruding shape of the driving control unit 3149 may correspond to a driving groove (not shown) when the base unit 3130 includes the driving groove (not shown).

For example, the driving unit 3140 may be moved by a magnetic field by an input pen manipulated by a user, and, as a specific example, the driving unit 3140 may move up and down due to a repulsive force and an attractive force with respect to the magnetic unit 3150 in the driving unit 3140. At this time, the driving unit 3140 may move up and down while rotating around the driving control unit 3149.

According to an optional embodiment, the driving unit 3140 may move while the driving control unit 3149 of the driving unit 3140 is being disposed in an area of the base unit 3130, e.g., a driving groove (not shown) of the second accommodation unit 3132.

A first movement area 3145 and a second movement area 3148 may be arranged in a space between the first driving member (not shown) and the second driving member (not shown).

The first movement area 3145 and the second movement area 3148 may be areas that become the references of the highest point and the lowest point during a movement of the driving unit 3140, respectively.

According to an optional embodiment, a connection area 3147 may be disposed between the first movement area 3145 and the second movement area 3148, and the connection area 3147 may include a curved surface.

For example, as shown in FIG. 53, when the first movement area 3145 is located at the bottom, the driving unit 3140 may be located at the lowest point, and thus the expression unit 3110 may also be in a state of being located at the lowest point, and more particularly, a state in which a protruding height of the expression unit 3110 from the base unit 3130 is the smallest. For example, it may be a state in which the expression unit 3110 of the output unit IU8 is arranged to be unrecognizable by a user, and more particularly, a state in which the expression unit 3110 does not protrude from a surrounding member (e.g., a housing) to not to be tactilely sensed.

In this case, the first movement area 3145 may be supported by the top end of the support unit 3170.

Next, as shown in FIG. 54, when a magnetic field is formed between an input used by a user and the driving unit 3140, the driving unit 3140 may move. For example, when an attractive force is applied between the magnetic unit 3150 disposed in the driving unit 3140 and the input pen, an end portion of the magnetic unit 3150 (an end portion corresponding to a polarity to which the attractive force is applied) may be disposed to be close to the input pen, and the connection area 3147 may be supported by the top end of the support unit 3170. Referring to FIG. 54, the driving unit 3140 may ascend, that is, the top surface of the driving unit 3140 may ascend. Therefore, the expression unit 3110 may also ascend slightly by a height H1 in FIG. 54.

According to an optional embodiment, since the driving unit 3140 rotates around the driving control unit 3149, the driving control unit 3149 may maintain its position.

Next, the driving unit 3140 may continuously move by a continuous magnetic field as shown in FIG. 55. For example, the second movement area 3148 may be supported by the top end of the support unit 3170. Referring to FIG. 55, the driving unit 3140 may ascend, that is, the top surface of the driving unit 3140 may ascend. Therefore, the expression unit 3110 may also ascend, and the state shown in FIG. 55 may indicate the highest point of the expression unit 3110.

According to an optional embodiment, since the driving unit 3140 rotates around the driving control unit 3149, the driving control unit 3149 may maintain its position.

According to an optional embodiment, a movement from the state of FIG. 53 to the state of FIG. 55 may be continuous. The state of FIG. 54 is for describing one process. When the state of FIG. 53 is changed to the state of FIG. 54, the driving unit 3140 and the expression unit 3110 may continue to move from the state of FIG. 54 without stopping and may be in the state of FIG. 55.

For example, FIGS. 53 and 55 may show states in which the expression unit 3110 may maintain a stationary state, and FIG. 54 may show a state in which the expression unit 3110 is moving.

According to an optional embodiment, the sequential moving process of FIGS. 53 to 55 may also be applied to embodiments to be described later.

In this state, a user may sense a state in which the driving expression unit 3110 of the output unit IU8 is protruding, for example, visually or tactilely. Also, according to an optional embodiment, the protruding state may be maintained.

Thereafter, an initialization process may be performed.

This initialization process may be performed through the reset member IMGU. The reset member IMGU may be formed to react with the driving unit 3140.

For example, the reset member IMGU may include a magnetic material to generate a magnetic field and, as a specific example, may include a permanent magnet.

The reset member IMGU may generate a magnetic field, and for example, the reset member IMGU may be formed, such that an attractive force is applied to an area of the driving unit 3140. To this end, the polarity and the arrangement direction of the reset member IMGU may be controlled.

The arrangement and the operation of the reset member IMGU may be determined in various ways, and detailed descriptions thereof are identical to those given above.

The driving unit 3140 rotates by a magnetic field generated between the reset member IMGU and the driving unit 3140, and thus the expression unit 3110 may descend. For example, the expression unit 3110 may maintain the state as shown in FIG. 53.

During a rotational movement of the driving unit 3140, the support unit 3170 may support at least one area of the connection area 3147 while supporting the first movement area 3145 and before supporting the second movement area 3148, Therefore, the driving unit 3140 may naturally move, and thus the movement of the expression unit 3110 may be precisely controlled.

A distance between the driving surface 3140a and the first movement area 3145 may be different from a distance between the driving surface 3140a and the second movement area 3148. For example, the distance between the driving surface 3140a and the first movement area 3145 may be greater than the distance between the driving surface 3140a and the second movement area 3148.

According to an optional embodiment, a distance between the first movement area 3145 from the center axis of the driving unit 3140 in terms of the shape of the driving unit 3140 may be smaller than a distance between the second movement area 3148 from the center axis of the driving unit 3140 in terms of the shape of the driving unit 3140.

According to an optional embodiment, a distance from the driving control unit 3149 to the first movement area 3145 may be the same as or similar to a distance from the driving control unit 3149 to the second movement area 3148. According to an additional selective embodiment, a distance from the driving control unit 3149 to the connection area 3147 may be the same or similar to a distance from the driving control unit 3149 to the second movement area 3145.

For example, the connection area 3147 may correspond to at least one area of a circumference having a radius around the center point of the driving control unit 3149, and the first movement area 3145 and the second movement area 3148 may have flat surfaces extending in parallel with each other from areas corresponding to the diameter of the circumference facing each other.

Therefore, when the driving unit 3140 rotates around the driving control unit 3149 and the support unit 3170 supports the first movement area 3145, the second movement area 3148, and the connection area 3147, the driving control unit 3149 may be maintained at the same position or similar positions.

Also, when supported by the support unit 3170, the connection area 3147 supported by the support unit 3170 includes a curved surface or a surface having a shape close to an arc, and thus a smooth movement of the driving unit 3140 may be efficiently performed.

Although not shown, the second accommodation unit 3132 of the base unit 3130 may include a groove that is at least larger than the driving control unit 3149 to accommodate the driving control unit 3149.

The above descriptions correspond to a case in which the first movement area 3145, the second movement area 3148, and the connection area 3147 are arranged in an area of the driving unit 3140 including the driving surface 3140a, e.g., a space between a first driving member (not shown) and a second driving member (not shown). This also applies to embodiments described below.

According to another selective embodiment, the first movement area 3145, the second movement area 3148, and the connection area 3147 may be arranged in an area of the driving unit 3140 including the driving surface 3140a, e.g., an outer surface of the first driving member (not shown) or the second driving member (not shown).

Also, according to another selective embodiment, there may be an area of the driving unit 3140 including the driving surface 3140a, e.g., one first driving member (not shown) or one second driving member (not shown). The first movement area 3145, the second movement area 3148, and the connection area 3147 may be arranged on both side surfaces thereof, and thus the driving control unit 3149 may be disposed in an area surrounded by the first movement area 3145, the second movement area 3148, and the connection area 3147.

Also, these various selective embodiments, that is, structures in which the first movement area 3145, the second movement area 3148, and the connection area 3147 are arranged on an outer surface of a shape smaller than the first driving member (not shown) or the second driving member (not shown) may include various modifications. Also, these various embodiments may also apply to embodiments described below.

In an information output unit of the present embodiment, a driving unit moves by a magnetic field generated between the driving unit and an input pen. Therefore, an expression unit may also easily move in a first direction (e.g., ascend) and may move and rotate while maintaining a certain area through a driving control unit.

For example, according to the polarity of a magnetic unit disposed inside the driving unit, the driving unit may rotate and ascend.

Therefore, ascending and descending of the driving unit become smooth, natural, and precise movements, thereby reducing the irregular intermittentness of ascending and descending of the expression unit and facilitating the control of flexible and precise movements.

Also, an initialization may be easily performed by making the driving unit to descend by using a reset member. Therefore, the expression unit may ascend and descend, thereby facilitating implementation of an ON state or an OFF state of an output unit.

Also, even when a force applied to the driving unit through support, e.g., support for a first movement area and a second movement area through a support unit, is removed during an ascending movement or a descending movement of the driving unit, the driving unit may maintain its state of movement.

In other words, after the driving unit ascends to a state in which a second movement area is supported by an extension of the driving unit from a state in which a first movement area is supported by the extension, the driving unit may maintain the state in which the second movement area is supported by the extension even when an input pen is removed.

Also, a driving control unit provided in a driving unit of the present embodiment is eccentric with the center axis of the driving unit. Therefore, a torque may be easily generated with respect to the driving unit to implement ascending and descending of the driving unit through rotational movements, thereby enabling precise, smooth, and natural movement control for an expression unit.

According to an optional embodiment, a magnetic unit provided in a driving unit may be disposed to overlap a driving control unit. For example, the center of the magnetic unit may overlap the driving control unit.

Figure 56:
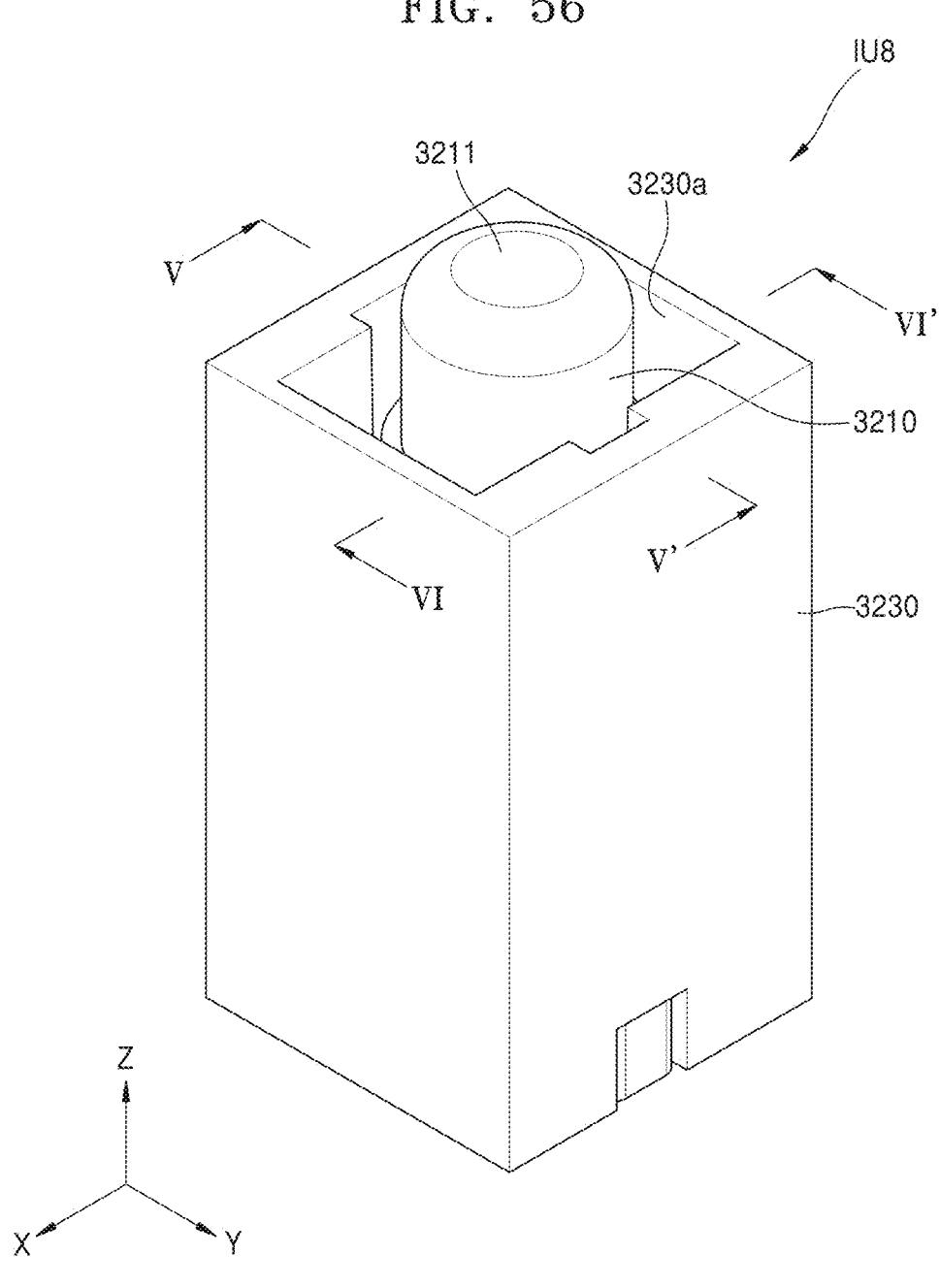
FIG. 56 is a schematic perspective view of an output unit according to another embodiment of the present disclosure.
Figure 57:
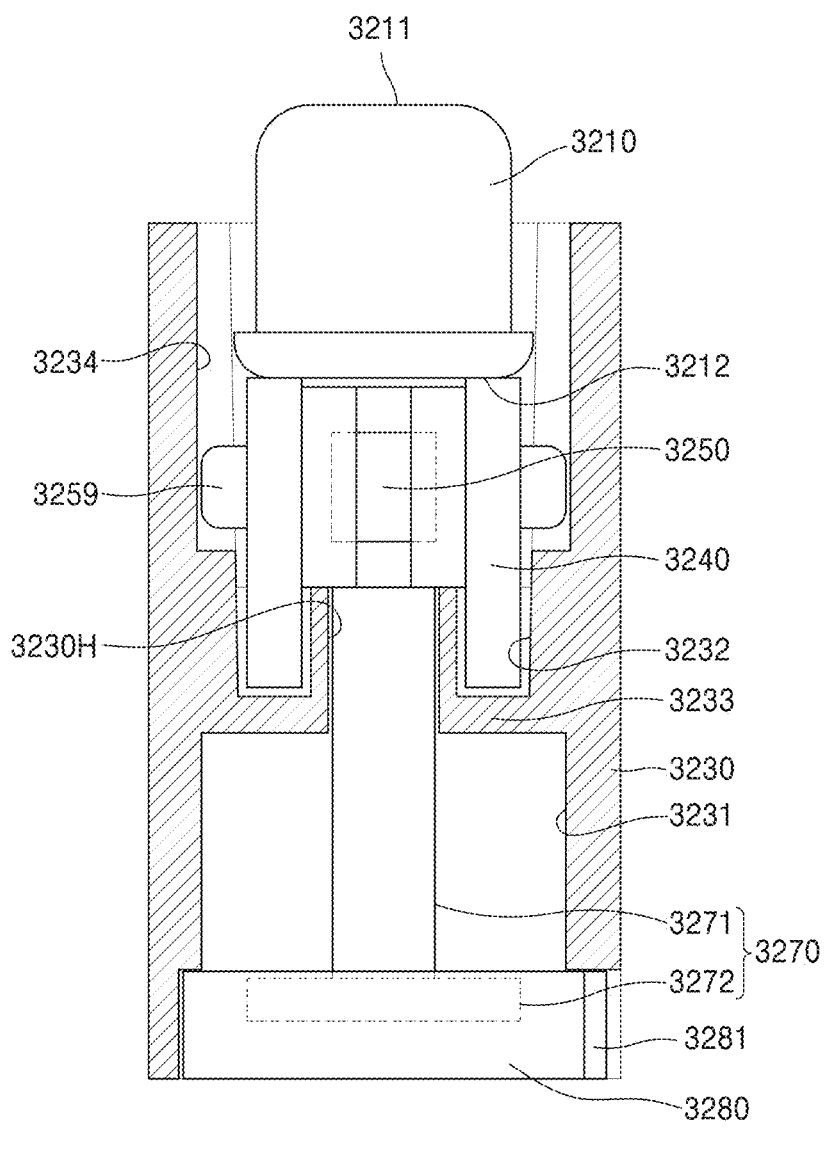
FIG. 57 is a cross-sectional view taken along a line V-V of FIG. 56.
Figure 57:
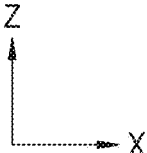
Figure 59:
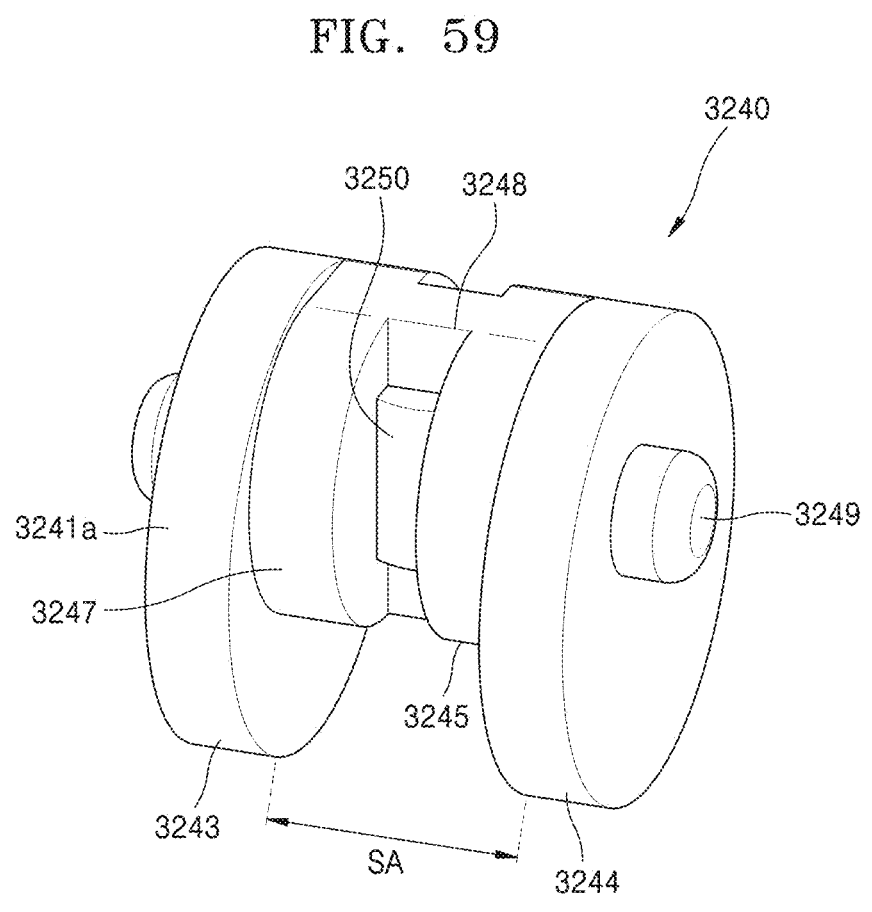
Figure 60:
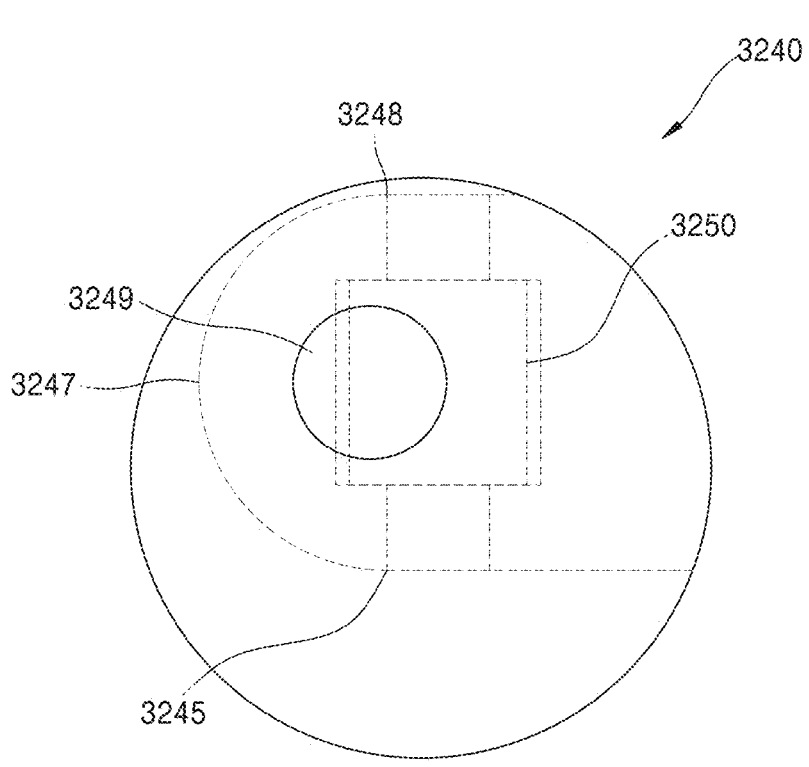
FIG. 60 is a front view of the driving unit viewed from one direction of FIG. 59.
Figure 61:
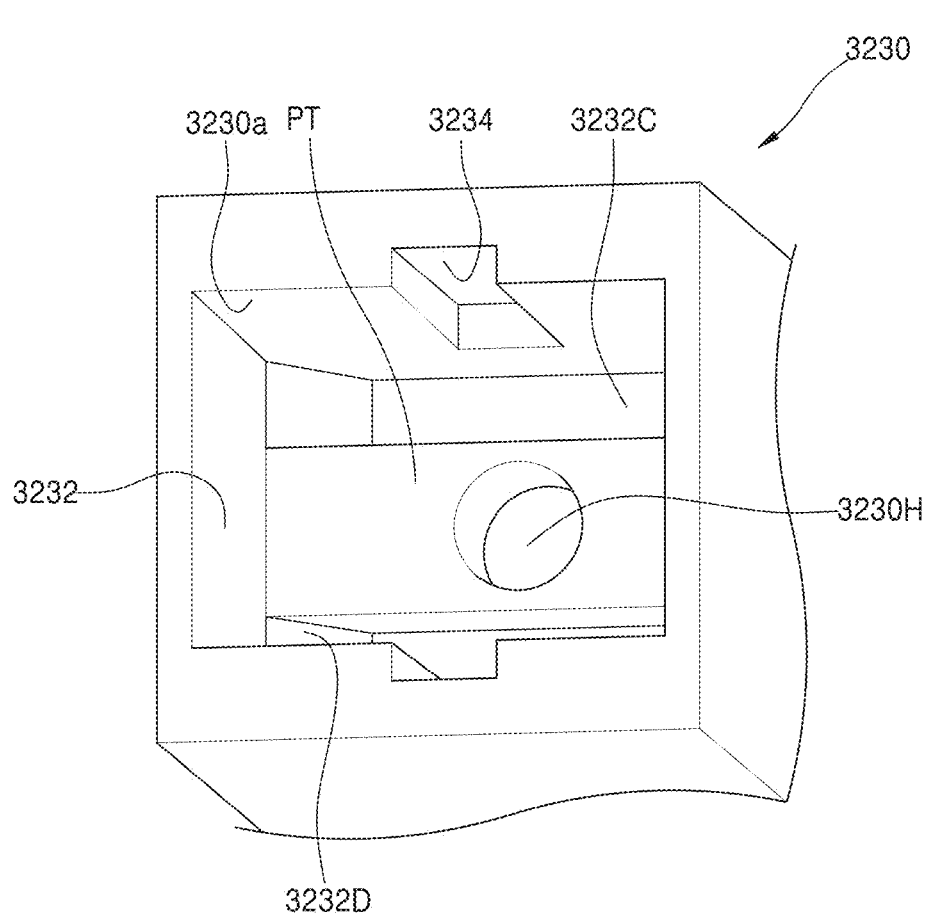
FIG. 61 is a partial perspective view of an area of a base unit of FIG. 56 viewed from one direction.

FIG. 56 is a schematic perspective view of an output unit according to another embodiment of the present disclosure, FIG. 57 is a cross-sectional view taken along a line V-V of FIG. 56, FIG. 59 is a schematic perspective view for describing a driving unit of FIG. 56, FIG. 60 is a front view of the driving unit viewed in one direction of FIG. 59, and FIG. 61 is a partial perspective view of an area of a base unit of FIG. 56 viewed in one direction.

Referring to FIGS. 56 to 61, the output unit IU8 of the present embodiment includes at least one information output unit, and FIG. 56 shows one information output unit. In other words, the output unit IU8 of FIG. 56 may be one information output unit.

The output unit IU8 may include a base unit 3230, a driving unit 3240, and an expression unit 3210.

The expression unit 3210 may move according to the movement of the driving unit 3240 to be described later and may move upward and downward at least in the lengthwise direction of the expression unit 3210. Therefore, the expression unit 3210 may be moved to protrude in one direction, and a user may sense the movement of the expression unit 3210 tactilely or visually.

The expression unit 3210 may include an expression surface 3211 and a support surface 3212.

The support surface 3212 is a surface from among areas of the expression unit 3210 facing the driving unit 3240 and may constitute a lower area of the expression unit 3210 and contact the driving unit 3240. The driving unit 3240 may transmit a force to the expression unit 3210 through the support surface 3212.

The expression surface 3211 may include the outermost surface from among areas of the expression surface 3211, e.g., an area to be recognized by a user.

For example, the entire area of the expression unit 3210 may be recognized by a user or only the expression surface 3211 may be recognized. For example, a user may sense the movement of the expression unit 3210 through contact with the expression surface 3211, and the user may easily sense the movement of the expression unit 3210 through visual sensing of the expression surface 3211.

According to an optional embodiment, the expression surface 3211 may include a curved surface.

The expression unit 3210 may have various shapes. The expression unit 3210 may include a pillar-like area. For example, the expression unit 3210 may include an area having a shape similar to that of a cylinder as shown in FIG. 56.

In this case, a protruding area of the expression unit 3210 may have a curved surface and may also have rounded corners.

The expression unit 3210 may include various materials and may include an insulating material as a light and durable material. For example, the expression unit 3210 may include a resin-based organic material. According to another embodiment, the expression unit 3210 may include an inorganic material, such as a ceramic material.

Also, according to another selective embodiment, the expression unit 3210 may include a material like a metal or glass.

According to an optional embodiment, a support unit 3270 may be further disposed.

According to an optional embodiment, one end of an extension 3271 of the support unit 3270 may be extended to support the driving unit 3240 to be described later, and the driving unit 3240 may move while being supported by the one end of the extension 3271.

According to an optional embodiment, the extension 3271 may be formed in correspond to a through hole 3230H of the base unit 3230.

According to an optional embodiment, the support unit 3270 may include a body unit 3272, and the body unit 3272 may be connected to the extension 3271.

According to an optional embodiment, the body unit 3272 and the extension 3271 of the support unit 3270 may be integrated with each other.

According to an optional embodiment, a base 3280 may be further included, such that the body unit 3272 is disposed thereon.

The base 3280 may be disposed to surround the bottom surface and the side surface of the body unit 3272.

According to an optional embodiment, the base 3280 may include a protrusion 3281 in one area, and one area of the protrusion 3281 may be exposed on the side surface of the base unit 3230 to facilitate handling of the base 3280.

The base unit 3230 includes an accommodation space. For example, the base unit 3230 may include a first accommodation unit 3231 and a second accommodation unit 3232.

The first accommodation unit 3231 and the second accommodation unit 3232 may be arranged adjacent to each other and may not overlap each other.

According to an optional embodiment, the first accommodation unit 3231 and the second accommodation unit 3232 may be spaced apart from each other.

According to another selective embodiment, the first accommodation unit 3231 and the second accommodation unit 3232 may be connected through the through hole 3230H.

The support unit 3270 or the base 3280 may be disposed in the first accommodation unit 3231.

According to an optional embodiment, a driving groove 3234 may be formed in the second accommodation unit 3232 of the base unit 3230. For example, driving grooves 3234 may be formed on inner side surfaces of the second accommodation unit 3232 of the base unit 3230 facing each other. According to an optional embodiment, the driving grooves 3234 may be formed in one direction, e.g., a downward direction.

According to an optional embodiment, the driving groove 3234 may be formed in the form of a groove or a penetrating area penetrating to the outside. When the driving groove 3234 does not penetrate to the outside of the base unit 3230 and is formed in the form of a groove by removing an inner area of the base unit 3230, the exposure of the base unit 3230 to the outside is reduced, thereby reducing contamination and damage of the driving unit 3240 and enabling precise control of the driving unit 3240.

The base unit 3230 may have an elongated shape to accommodate the driving unit 3240 and may be formed to completely surround the driving unit 3240.

According to an optional embodiment, the base unit 3230 may include a boundary 3233 between the first accommodation unit 3231 and the second accommodation unit 3232.

The first accommodation unit 3231 and the second accommodation unit 3232 may be separated by the boundary 3233.

According to an optional embodiment, the through hole 3230H may be formed at the boundary 3233.

Also, the base unit 3230 may include an inlet 3230*a*, and the inlet 3230*a* may be connected to the second accommodation unit 3232. The expression unit 3210 may move, such that the length of a portion thereof protruding out of the base unit 3230 through the inlet 3230*a* varies.

The driving unit 3240 may be disposed at the base unit 3230. The driving unit 3240 may be disposed in the second accommodation unit 3232.

According to an optional embodiment, a magnetic unit 3250 may be disposed in the driving unit 3240, for example, in the inner space of the driving unit 3240. For example, the magnetic unit 3250 may include a magnetic body, e.g., a permanent magnet.

The magnetic unit 3250 may include a first area (e.g., an N pole or an S pole) and a second area (e.g., an S pole or an N pole) having different polarities, and the first area and the second area having different polarities may be arranged in a direction toward the expression unit 3210 during a rotation of the driving unit 3240, e.g., the Z-axis direction.

Figure 58:
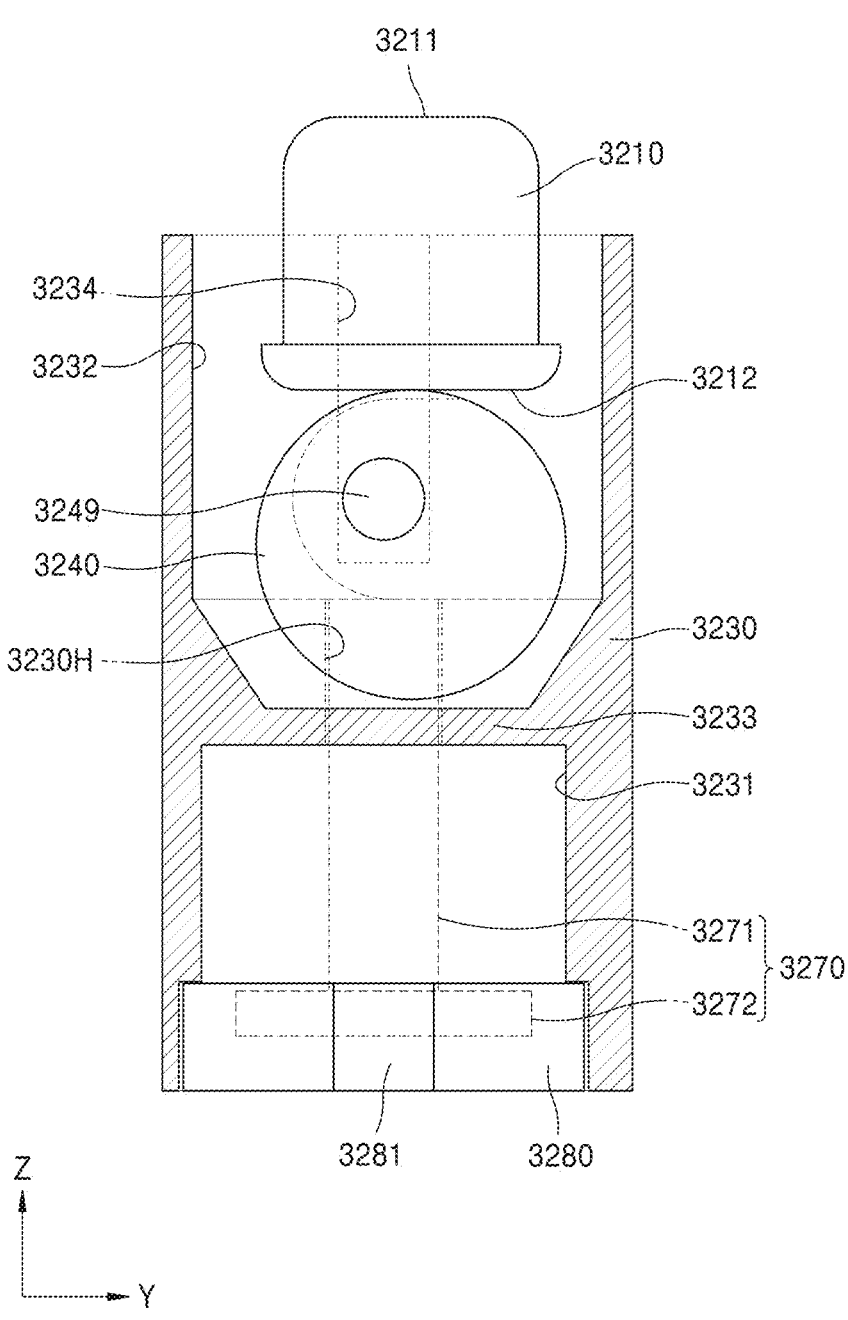
FIG. 58 is a cross-sectional view taken along a line VI-VI of FIG. 56.

For example, in FIGS. 57 and 58, the first area and the second area of the magnetic unit 3250 having different polarities may be arranged in a direction toward the expression unit 3210, e.g., the Z-axis direction.

The driving unit 3240 may include the driving surface 3241*a* on at least the outer surface, and the driving surface 3241*a* may be formed to support the expression unit 3210, thereby providing a driving force for the vertical movement of the expression unit 3210.

According to an optional embodiment, the driving surface 3241*a* of the driving unit 3240 may include a curved surface as the outer surface. According to a more specific embodiment, the driving surface 3241*a* of the driving unit 3240 may include a boundary line having a circle-like shape.

The driving unit 3240 may include a driving control unit 3249.

The driving position of the driving unit 3240 may be controlled through the driving control unit 3249. For example, when the driving unit 3240 moves, the driving unit 3240 may perform an angular motion or a rotational motion around the driving control unit 3249.

According to an optional embodiment, the center axis of the driving unit 3240 and the center axis driving control unit 3249 may not be coaxial with each other and may be eccentric.

Also, according to an optional embodiment, the magnetic unit 3250 may not coaxial with the central axis of the driving unit 3240 and, for example, may be disposed to overlap an area of the driving control unit 3249.

Therefore, it is possible to easily generate the torque with respect to the driving unit 3240 to allow the driving unit 3240 to perform an angular movement or a rotational movement, thereby efficiently performing a movement with respect to the expression unit 3210 and improving the expression precision of the output unit IU8. Also, power consumption of the output unit IU8 may be reduced.

The driving unit 3240 will be described in more detail with reference to FIGS. 59 to 61.

FIG. 59 is a schematic perspective view for describing the driving unit of FIG. 56, and FIG. 60 is a front view of the driving unit viewed from one direction of FIG. 59. FIG. 61 is a partial perspective view of an area of a base unit of FIG. 56 viewed from one direction.

Referring to FIGS. 59 and 60, the driving unit 3240 may include a first driving member 3243 and a second driving member 3244 and may include a separation space SA therebetween.

External surfaces of the first driving member 3243 and the second driving member 3244 may each include the driving surface 3241*a* on at least one surface to support the expression unit 3210 during a movement of the driving unit 3240, thereby providing a driving force to the expression unit 3210.

According to an optional embodiment, outer surfaces of the first driving member 3243 and the second driving member 3244 may include curved surfaces. For example, the first driving member 3243 and the second driving member 3244 may each have a shape similar to that of a rotating body and may each have a disk-like shape.

Therefore, a natural driving force may be provided to the support surface 3212 of the expression unit 3210 during a rotation or an angular movement of the first driving member 3243 and the second driving member 3244, thereby allowing the expression unit 3210 to efficiently perform a continuous and smooth movement.

Driving control units 3249 may be arranged on at least one side surfaces of the first driving member 3243 and the second driving member 3244, e.g., surfaces of the first driving member 3243 and the second driving member 3244 opposite to side surfaces of the first driving member 3243 and the second driving member 3244 facing each other.

According to an optional embodiment, the driving control unit 3249 may have a protruding shape, and the protruding shape may correspond to the driving groove 3234 of the base unit 3230.

For example, the driving unit 3240 may move by a magnetic field, and, as a specific example, the driving unit 3240 may move up and down due to a repulsive force and an attractive force with respect to the magnetic unit 3250 in the driving unit 3240. At this time, the driving unit 3240 may move up and down while rotating around the driving control unit 3249, wherein the driving unit 3240 may rotate while the driving control unit 3249 of the driving unit 3240 is being disposed in the driving groove 3234. For example, the driving control unit 3249 may rotate within the driving groove 3234. Also, according to an optional embodiment, a slight vertical movement may occur while the driving control unit 3249 rotates within the driving groove 3234.

A first movement area 3245 and a second movement area 3248 may be arranged in the separation space SA between the first driving member 3243 and the second driving member 3244.

The first movement area 3245 and the second movement area 3248 may be areas that become the references of the highest point and the lowest point during a movement of the driving unit 3240, respectively.

For example, when the first movement area 3245 is disposed at the bottom, the driving unit 3240 may be located at the lowest point, and thus the expression unit 3210 may also be located at the lowest point, and more particularly, may be in a state in which a protruding height of the expression unit 3210 from the base unit 3230 is the smallest.

Also, when the second movement area 3248 is disposed at the bottom, the driving unit 3240 may be located at the highest point, and thus the expression unit 3210 may also be located at the highest point, and more particularly, may be in a state in which a protruding height of the expression unit 3210 from the base unit 3230 is the largest.

According to an optional embodiment, the first movement area 3245 and the second movement area 3248 may be supported by the above-stated extension 3271. In other words, when the driving unit 3240 is moving, the extension 3271 is disposed in correspondence to the separation space SA between the first driving member 3243 and the second driving member 3244, thereby supporting the first movement area 3245 and the second movement area 3248 at corresponding time points.

According to an optional embodiment, a connection area 3247 may be disposed between the first movement area 3245 and the second movement area 3248, and the connection area 3247 may include a curved surface.

During a rotational movement of the driving unit 3240, the extension 3271 may support at least one area of the connection area 3247 while supporting the first movement area 3245 and before supporting the second movement area 3248, Therefore, the driving unit 3240 may naturally move, and thus the movement of the expression unit 3210 may be precisely controlled.

A distance between the driving surface 3241$a$ and the first movement area 3245 may be different from a distance between the driving surface 3241$a$ and the second movement area 3248. For example, the distance between the driving surface 3241$a$ and the first movement area 3245 may be greater than the distance between the driving surface 3241$a$ and the second movement area 3248.

According to an optional embodiment, a distance between the first movement area 3245 from the center axis of the driving unit 3240 in terms of the shape of the driving unit 3240 may be smaller than a distance between the second movement area 3248 from the center axis of the driving unit 3240 in terms of the shape of the driving unit 3240.

According to an optional embodiment, a distance from the driving control unit 3249 to the first movement area 3245 may be the same as or similar to a distance from the driving control unit 3249 to the second movement area 3248. According to an additional selective embodiment, a distance from the driving control unit 3249 to the connection area 3247 may be the same or similar to a distance from the driving control unit 3249 to the second movement area 3245.

For example, the connection area 3247 may correspond to at least one area of a circumference having a radius around the center point of the driving control unit 3249, and the first movement area 3245 and the second movement area 3248 may have shapes of flat surfaces extending in parallel with each other from areas corresponding to the diameter of the circumference facing each other.

Therefore, when the driving unit 3240 rotates around the driving control unit 3249 and the support unit 3270 supports the first movement area 3245, the second movement area 3248, and the connection area 3247, the driving control unit 3249 may be maintained at the same position or similar positions.

Also, when supported by the support unit 3270, the connection area 3247 includes a curved surface or a surface having a shape close to an arc, and thus a smooth movement of the driving unit 3240 may be efficiently performed.

Referring to FIG. 61, the second accommodation unit 3232 of the base unit 3230 may include a first groove 3233$c$ and a second groove 3233$d$.

The first groove 3233$c$ and the second groove 3233$d$ may extend long. The first driving member 3243 and the second driving member 3244 may be arranged in correspondence to the first groove 3233$c$ and the second groove 3233$d$, respectively. Therefore, when a driving force is transmitted to the driving unit 3240 through an input pen or a reset member, the driving unit 3240 may perform an angular movement or a rotational movement while the first driving member 3243 and the second driving member 3244 of the driving unit 3240 are being respectively arranged in correspondence to the first groove 3233$c$ and the second groove 3233$d$. As a result, the driving unit 3240 may stably move, thereby facilitating precise control of the movement of the expression unit 3210.

As an alternative embodiment, a protrusion area PT may be formed between the first groove 3233$c$ and the second groove 3233$d$. For example, the above-described through hole 3230H may be formed in the protrusion area PT.

The extension 3271 of the support unit 3270 may correspond to the through hole 3230H. At this time, the extension 3271 may protrude through the through hole 3230H and protrude more than the protrusion area PT. In this case, the first movement area 3245 and the second movement area 3248 may be supported by the extension 3271 at corresponding time points.

According to an optional embodiment, the extension 3271 may not protrude more than the protrusion area PT. In this case, the first movement area 3245 and the second movement area 3248 may be supported by the protrusion area PT at corresponding time points.

Also, according to an optional embodiment, the extension 3271 or the protrusion area PT may not support the driving unit 3240 or may only temporarily support the driving unit 3240. In this case, the driving control unit 3249 may be supported by an area of the second accommodation unit 3232, e.g., an boundary surface of the driving groove 3234.

Figure 62A:
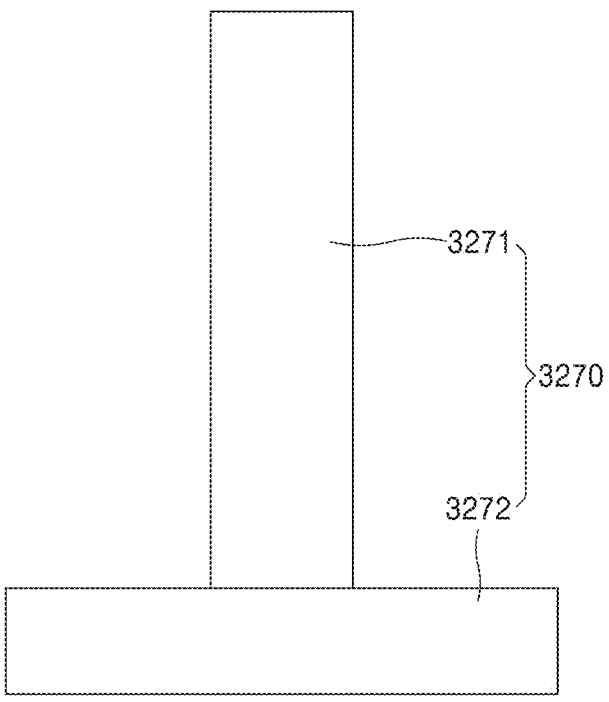
FIGS. 62A and 62B are views of a support unit of the output unit of FIG. 56 and a modified example thereof.
Figure 62B:
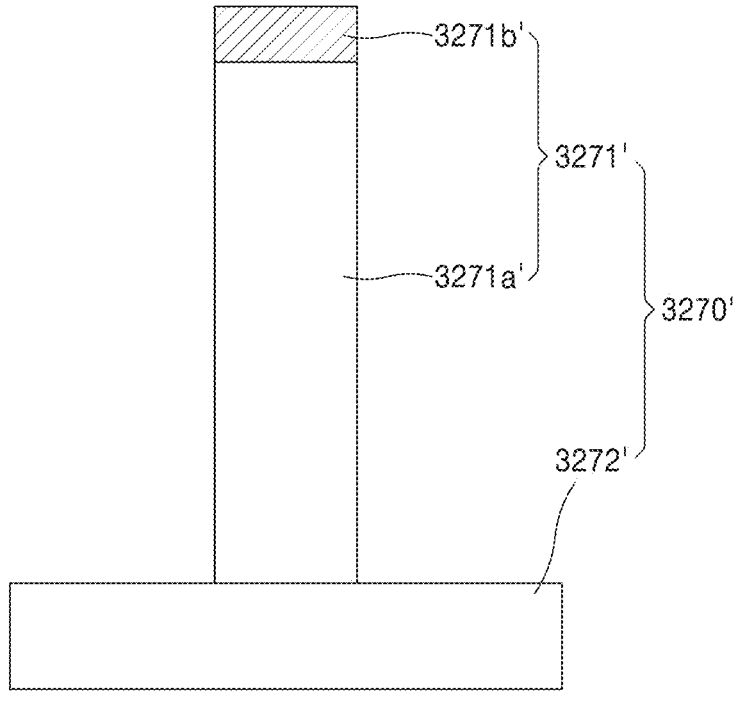

FIGS. 62A and 62B are views of a support unit of the output unit of FIG. 56 and a modified example thereof.

Referring to FIG. 62A, as described above, the support unit 3270 of the present embodiment may include the body unit 3272, wherein the body unit 3272 may be connected to the extension 3271 and has a plate-like shape widely extending in directions intersecting with a direction in which the extension 3271 extends.

Also, as a modified example, referring to FIG. 62B, a support unit 3270' includes a body unit 3272', wherein the body unit 3272' may be connected to an extension 3271', a top end member 3271$b'$ may be formed at one end of the extension 3271', and the top end member 3271$b'$ may include a material different from a material constituting the extension 3271'.

According to an optional embodiment, the top end member 3271$b'$ may include a material, such as a plastic or a ceramic. For example, the extension 3271' may include a magnetic material and the top end member 3271$b'$ may include a plastic.

Figure 63:
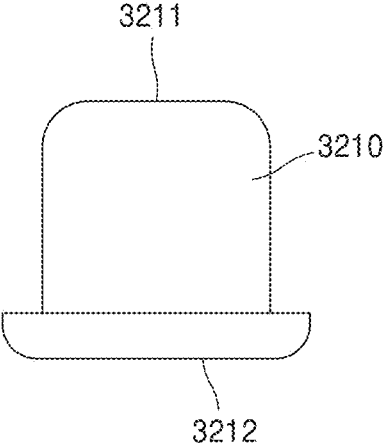
FIGS. 63 and 64 are views of an expression unit of FIG. 56 and a modified example thereof.
Figure 64:
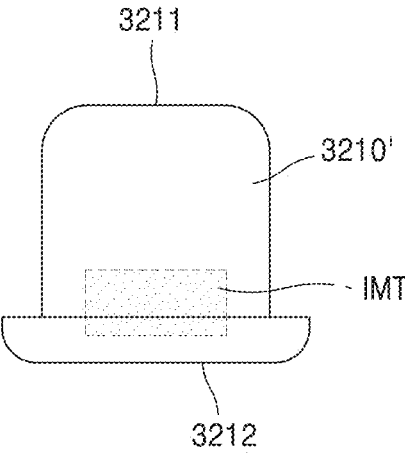

FIGS. 63 and 64 are views of an expression unit of FIG. 56 and a modified example thereof.

Referring to FIG. 63, the expression unit 3210 of the present embodiment described above may include an expression surface 3211 and a support surface 3212.

Also, as a modified example, referring to FIG. 64, an expression unit 3210' may include an expression surface 3211' and a support surface 3212' and may include a magnetic body IMT therein. The driving of the expression unit 3210' through the driving unit 3240 may be performed more efficiently through the magnetic body IMT of the expression unit 3210', and power consumption therefor may be reduced.

Figure 65:
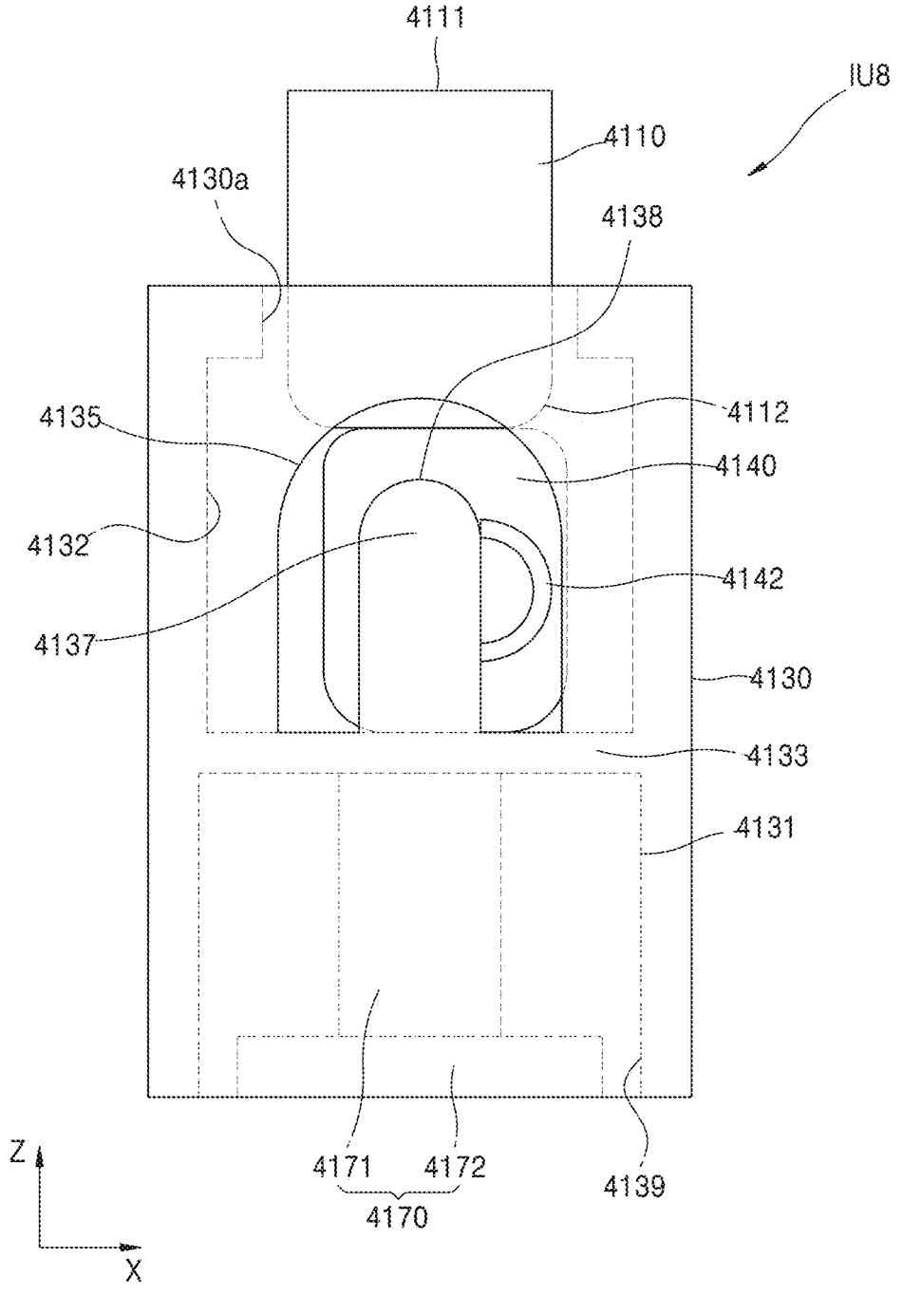
FIG. 65 is a schematic perspective front view of an output unit according to another embodiment of the present disclosure.
Figure 66:
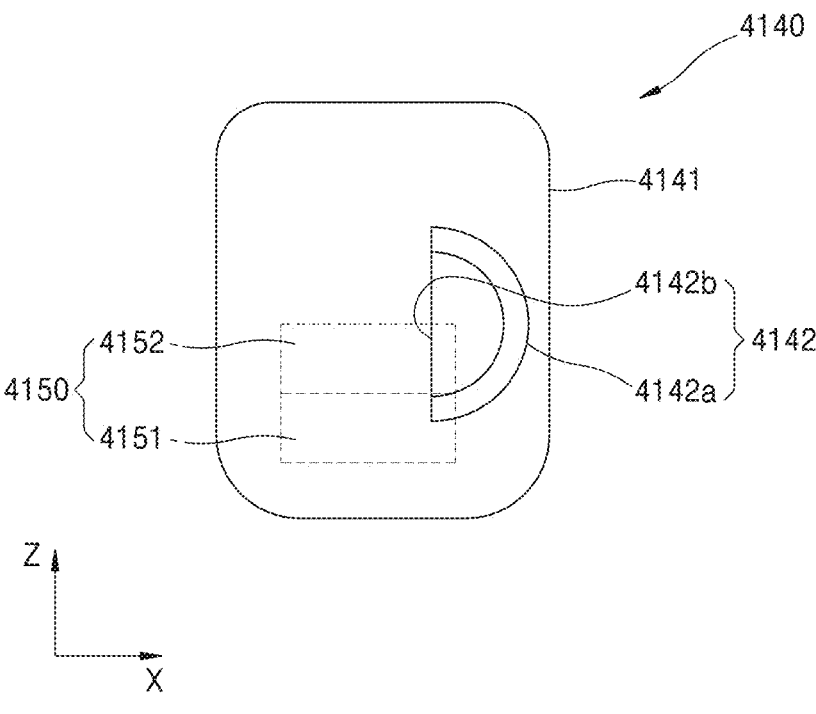
FIG. 66 is a diagram for describing a driving unit of FIG. 65.
Figure 67:
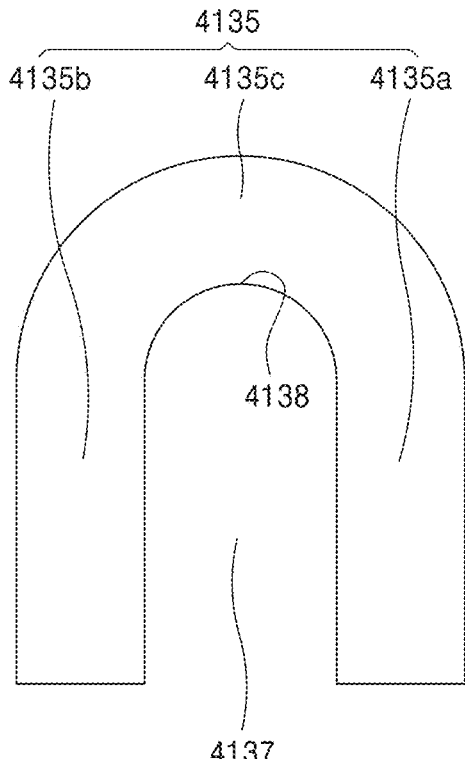
FIG. 67 is a diagram for describing a guide groove of the output unit of FIG. 65.

FIG. 65 is a schematic perspective front view of an output unit according to another embodiment of the present disclosure, FIG. 66 is a diagram for describing a driving unit of FIG. 65, and FIG. 67 is a diagram for describing a guide groove of the output unit of FIG. 65.

The output unit IU8 of the present embodiment may include a base unit 4130, a driving unit 4140, and an expression unit 4110.

Also, the base unit 4130 may include one or more guide grooves 4135.

The expression unit 4110 may move according to the movement of the driving unit 4140 to be described later and may move upward and downward at least in the lengthwise direction of the expression unit 4110.

Therefore, the expression unit 4110 may be moved to protrude in one direction, and a user may sense the movement of the expression unit 4110 tactilely or visually.

The expression unit 4110 may include an expression surface 4111 and a support surface 4112.

The support surface 4112 is a surface from among areas of the expression unit 4110 facing the driving unit 4140 and may constitute a lower area of the expression unit 4110 and contact the driving unit 4140. The driving unit 4140 may transmit a force to the expression unit 4110 through the support surface 4112. For example, a driving surface 4140a of the driving unit 4140 may contact the support surface 4112 and allow the support surface 4112 to move in a first direction, that is, the Z-axis direction in FIG. 65.

The expression surface 4111 is the outermost (e.g., the topmost) surface from among areas of the expression unit 4110 and may include an area to be recognized by a user.

For example, the entire area of the expression unit 4110 may be recognized by a user or only the expression surface 4111 may be recognized. For example, a user may sense the movement of the expression unit 4110 through contact with the expression surface 4111, and the user may easily sense the movement of the expression unit 4110 through visual sensing of the expression surface 4111.

According to an optional embodiment, the expression surface 4111 may include a curved surface.

The expression unit 4110 may have various shapes. The expression unit 4110 may include a pillar-like area. For example, the expression unit 4110 may include an area having a shape similar to that of a cylinder.

In this case, a protruding area of the expression unit 4110 may have a curved surface and may also have rounded corners.

The expression unit 4110 may include various materials and may include an insulating material as a light and durable material. For example, the expression unit 4110 may include a resin-based organic material. According to another embodiment, the expression unit 4110 may include an inorganic material, such as a ceramic material.

Also, according to another selective embodiment, the expression unit 4110 may include a material like a metal or glass.

According to an optional embodiment, a support unit 4170 may be further disposed.

For example, the support unit 4170 may include an extension member 4171.

According to an optional embodiment, one end of the extension member 4171 may be extended to overlap or support one area of the driving unit 4140 to be described later.

According to an optional embodiment, the support unit 4170 may include a body member 4172, and the extension member 4171 may be connected to the body member 4172.

As a specific example, the extension member 4171 may have a shape extending from the body member 4172 in a direction close to the expression unit 4110.

According to an optional embodiment, the body member 4172 and the extension member 4171 of the support unit 4170 may be integrated with each other.

Although not shown, according to an optional embodiment, a base (not shown) may be further included to support the body member 4172, and the body member 4172 may be disposed on the base (not shown).

According to an optional embodiment, the support unit 4170 may include a magnetic material, and, as a specific example, the extension member 4171 may include a magnetic material. Therefore, in the case of generating a magnetic field for the driving unit 4140, the magnitude of the magnetic field may be increased, and the power consumption of the output unit IU8 may be reduced by efficiently generating the magnetic field.

The base unit 4130 may include a first accommodation unit 4131, a second accommodation unit 4132, and the guide groove 4135.

The first accommodation unit 4131 and the second accommodation unit 4132 may be arranged adjacent to each other and may not overlap each other.

According to an optional embodiment, the first accommodation unit 4131 and the second accommodation unit 4132 may be spaced apart from each other.

According to another selective embodiment, the first accommodation unit 4131 and the second accommodation unit 4132 may be connected through a through hole.

According to an optional embodiment, the above-stated support unit 4170 may be disposed in the first accommodation unit 4131. Although not shown, according to another additional embodiment, an area of the support unit 4170, e.g., an area of the extension member 4171, may be extended and disposed in the second accommodation unit 4132 through the through hole.

The guide groove 4135 may be formed in the second accommodation unit 4132. For example, the guide grooves 4135 may be formed on inner side surfaces of the second accommodation unit 4132 of the base unit 4130 facing each other. According to another selective embodiment, the guide groove 4135 may be formed on only one of the inner side surfaces.

The guide groove 4135 may have a shape of a through-hole. According to another embodiment, the guide groove 4135 may have a shape of a groove that is not exposed to the outside of the base unit 4130.

Referring to FIG. 67, the guide groove 4135 may include a first groove 4135a, a second groove 4135b, and a connection groove 4135c.

The first groove 4135a and the second groove 4135b may be spaced apart from each other, and, according to an optional embodiment, an intermediate portion 4137 may be formed between the first groove 4135a and the second groove 4135b.

The first groove 4135a and the second groove 4135b may be formed to be parallel with each other. As a specific example, the first groove 4135a and the second groove 4135b may be arranged side by side in a direction parallel to one of directions in which the expression unit 4110 moves up and down.

The connection groove 4135c may be formed to interconnect between the first groove 4135a and the second groove 4135b. According to an optional embodiment, the connection groove 4135c may include a curved surface.

According to an optional embodiment, a top surface 4138 of the intermediate portion 4137, that is, the surface of an area closest to the expression unit 4110 may include a curved surface, and, as a specific example, may have a curved surface parallel to the connection groove 4135c.

Therefore, at least one area of the connection groove 4135c may have a shape similar to an arc, and, according to an optional embodiment, the connection groove 4135c may include an area having a shape corresponding to a semicircular arc.

According to an optional embodiment, the guide groove 4135 may have a shape similar to the alphabet "U".

The base unit 4130 may have an elongated shape to accommodate the driving unit 4140 and may be formed to completely surround the driving unit 4140.

According to an optional embodiment, the base unit 4130 may include a boundary 4133 between the first accommodation unit 4131 and the second accommodation unit 4132.

The first accommodation unit 4131 and the second accommodation unit 4132 may be separated by the boundary 4133.

Although not shown, according to an optional embodiment, a through hole may be formed in the boundary 4133, and an area of the support unit 4170 may be disposed to extend and pass therethrough.

Also, the base unit 4130 may include an inlet 4130*a*, and the inlet 4130*a* may be connected to the second accommodation unit 4132. The expression unit 4110 may move, such that the length of a portion thereof protruding out of the base unit 4130 through the inlet 4130*a* varies.

According to an optional embodiment, the base unit 4130 may include an open area 4139. In detail, the open area 4139 may be formed to be connected to the first accommodation unit 4131.

The open area 4139 may facilitate placement, replacement, or repair of the support unit 4170.

The driving unit 4140 may be disposed at the base unit 4130. The driving unit 4140 may be disposed in the second accommodation unit 4132.

The driving unit 4140 may be driven by a magnetic field generated between the driving unit 4140 and an input pen (or a reset member) and perform an angular movement or a rotational movement. The expression unit 4110 may move up and down by the driving unit 4140.

According to an optional embodiment, referring to FIG. 66, a magnetic unit 4150 may be disposed in the driving unit 4140, e.g., in the inner space. For example, the magnetic unit 4150 may include a magnetic body, e.g., a permanent magnet.

The magnetic unit 4150 may include a first area 4151 (e.g., an N pole or an S pole) and a second area 4152 (e.g., an S pole or an N pole) having different polarities, and the first area 4151 and the second area 4152 having different polarities may be arranged in a direction toward the expression unit 4110 during a rotation of the driving unit 4140, e.g., the Z-axis direction.

According to an optional embodiment, when the driving unit 4140 is at the lowest point, the center axis of the magnetic unit 4150 may not coaxial with the center axis of the expression unit 4110 and may be misaligned. When the driving unit 4140 is driven by a magnetic field, a torque may be generated at the driving unit 4140, thereby facilitating a rotational movement or an angular movement of the driving unit 4140.

For example, in FIG. 65, the first area and the second area of the magnetic unit 4150 having different polarities may be arranged in a direction toward the expression unit 4110, e.g., the Z-axis direction.

According to an optional embodiment, the outer surface of the driving unit 4140 may include a driving surface, and at least an area thereof (e.g., a corner area) may include a curved surface. Also, the outer surface of the driving unit 4140 may be formed to support the expression unit 4110, thereby providing a driving force for the vertical movement of the expression unit 4110.

Therefore, the movement of the expression unit 4110 may be efficiently performed, and the expression precision of the output unit IU8 may be improved. Also, power consumption of the output unit IU8 may be reduced.

The driving unit 4140 may include a driving control unit 4142.

The driving position of the driving unit 4140 may be controlled through the driving control unit 4142. For example, when the driving unit 4140 moves, the driving unit 4140 may move while the driving control unit 4149 is being disposed in the guide groove 4135.

According to an optional embodiment, the driving control unit 4142 may perform a movement similar to the shape of the guide groove 4135, e.g., the shape of the alphabet "U".

The driving control unit 4142 may have a protruding shape. For example, the driving control unit 4142 may have a shape protruding from a side surface of the driving unit 4140, and the driving control unit 4142 may be disposed in the guide groove 4135.

According to an optional embodiment, the driving control unit 4142 may include an outer surface 4142*a* and an inner surface 4142*b*.

The outer surface 4142*a* is a surface facing a surface close to the outer surface of the guide groove 4135, e.g., the outer surface of the base unit 4130, when the driving unit 4140 is disposed in the guide groove 4135.

The inner surface 4142*b* is a surface facing an inner surface of the guide groove 4135, e.g., the intermediate portion 4137, when the driving unit 4140 is disposed in the guide groove 4135.

According to an optional embodiment, the outer surface 4142*a* may include a curved surface. Therefore, when the driving unit 4140 moves in the guide groove 4135, the outer surface 4142*a* may stably move in the first groove 4135*a*, the second groove 4135*b*, and the connection groove 4135*c*. According to an optional embodiment, when the connection groove 4135*c* includes a curved surface or at least one area of an arc, friction with the outer surface 4142*a* may be reduced, thereby facilitating smooth movement of the driving unit 4140 and improving efficiency of the movement of the driving unit 4140.

According to an optional embodiment, at least one area of the inner surface 4142*b* may include a flat surface. Therefore, the driving unit 4140 may stably move. For example, when the driving control unit 4142 ascends and is disposed on the top surface 4138 of the intermediate portion 4137, the driving control unit 4142 may be stably placed on the top surface 4138 of the intermediate portion 4137.

Figure 68A:
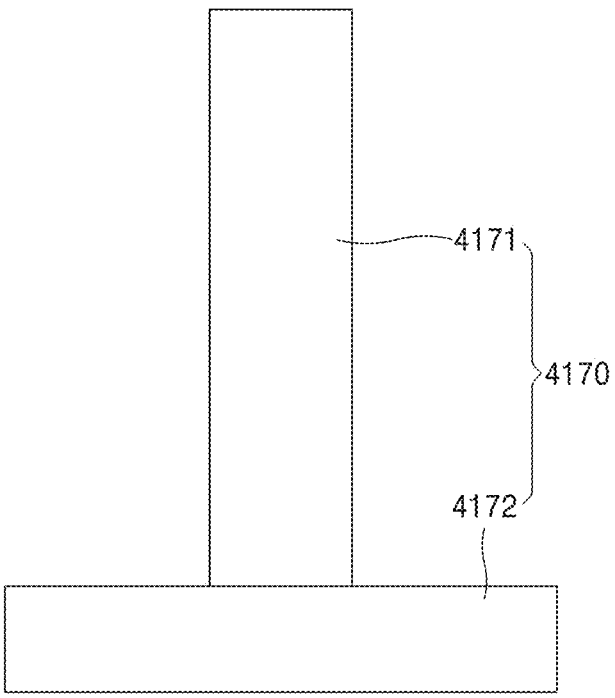
FIGS. 68A and 68B are views of a support unit of the output unit of FIG. 65 and a modified example thereof.
Figure 68B:
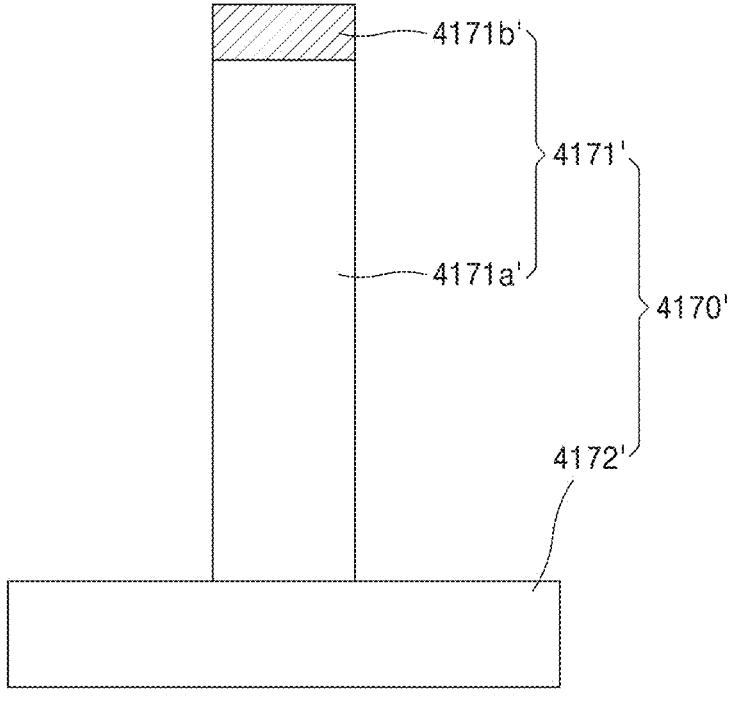

FIGS. 68A and 68B are views of a support unit of the output unit of FIG. 65 and a modified example thereof.

Referring to FIG. 68*a*, as described above, the support unit 4170 of the present embodiment may include the body member 4172, and the body member 4172 may be disposed to be connected to the extension member 4171 and to support the extension member 4171.

Also, as a modified example, referring to FIG. 68B, a support unit 4170' may include a body unit 4172', and the body unit 4172' may be disposed to be connected to an extension 4171'. Also, a top end member 4171*b'* may be formed at one end of the extension 4171', and the top end member 4171*b'* may include a material different from a material constituting the extension 4171'.

According to an optional embodiment, the top end member 4171*b'* may include a material, such as a plastic or a ceramic. For example, the extension 4171' may include a magnetic material and the top end member 4171*b'* may include a plastic.

Figure 69A:
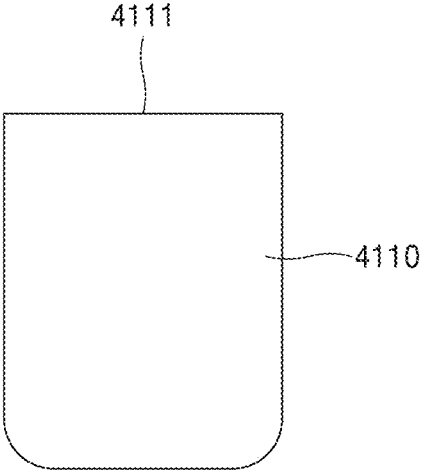
FIGS. 69A and 69B are views of an expression unit of the output unit of FIG. 65 and a modified example thereof.
Figure 69B:
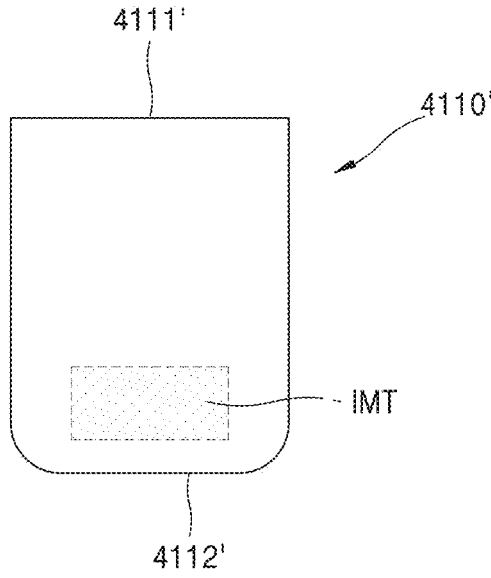

FIGS. 69A and 69B are views of an expression unit of the output unit of FIG. 65 and a modified example thereof.

Referring to FIG. 69A, the expression unit 4110 of the present embodiment described above may include the expression surface 4111 and the support surface 4112.

Also, as a modified example, referring to FIG. 69B, an expression unit 4110' may include an expression surface 4111' and a support surface 4112' and may include the magnetic body IMT therein. The driving of the expression unit 4110' through the driving unit 4140 may be performed more efficiently through the magnetic body IMT of the expression unit 4110', and power consumption therefor may be reduced.

FIGS. 70 to 73 are diagrams for describing the operation of the output unit of FIG. 65.

Figure 70:
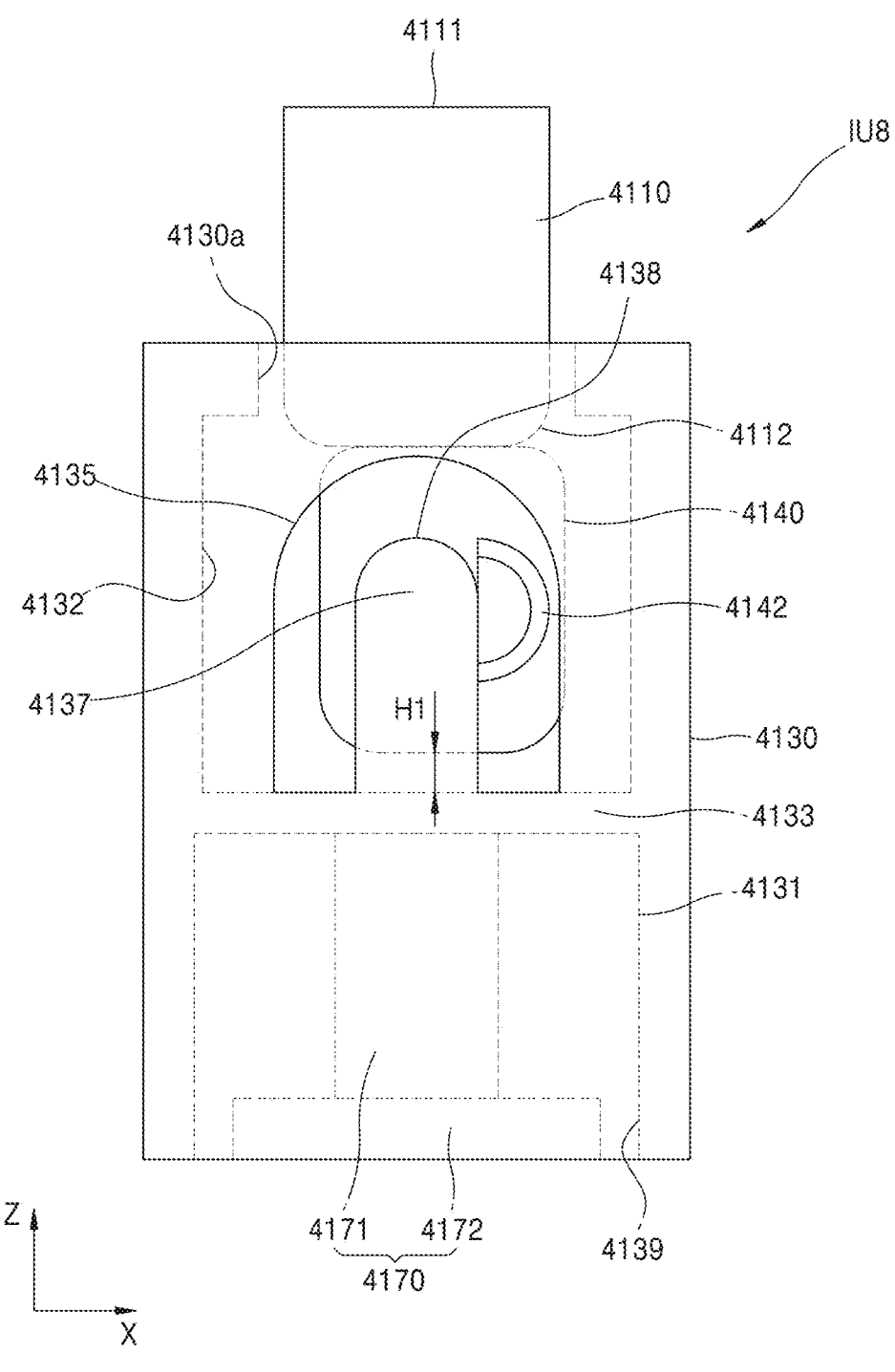
FIGS. 70 to 73 are diagrams for describing the operation of the output unit of FIG. 65.

FIG. 70 shows that, as compared to FIG. 65, the driving unit 4140 ascends, and thus the expression unit 4110 also ascends.

For example, when an input pen is located in the proximity of the driving unit 4140 through a user's manipulation of the input pen, the driving unit 4140 may move as a magnetic field is generated between the driving unit 4140 and the input pen. For example, when an attractive force is applied between the second area 4152 of the magnetic unit 4150 disposed in the driving unit 4140 and the input pen, the driving unit 4140 may ascend by the attractive force between the magnetic unit 4150 and the input pen. For example, the driving unit 4140 may ascend by the height H1.

Figure 71:
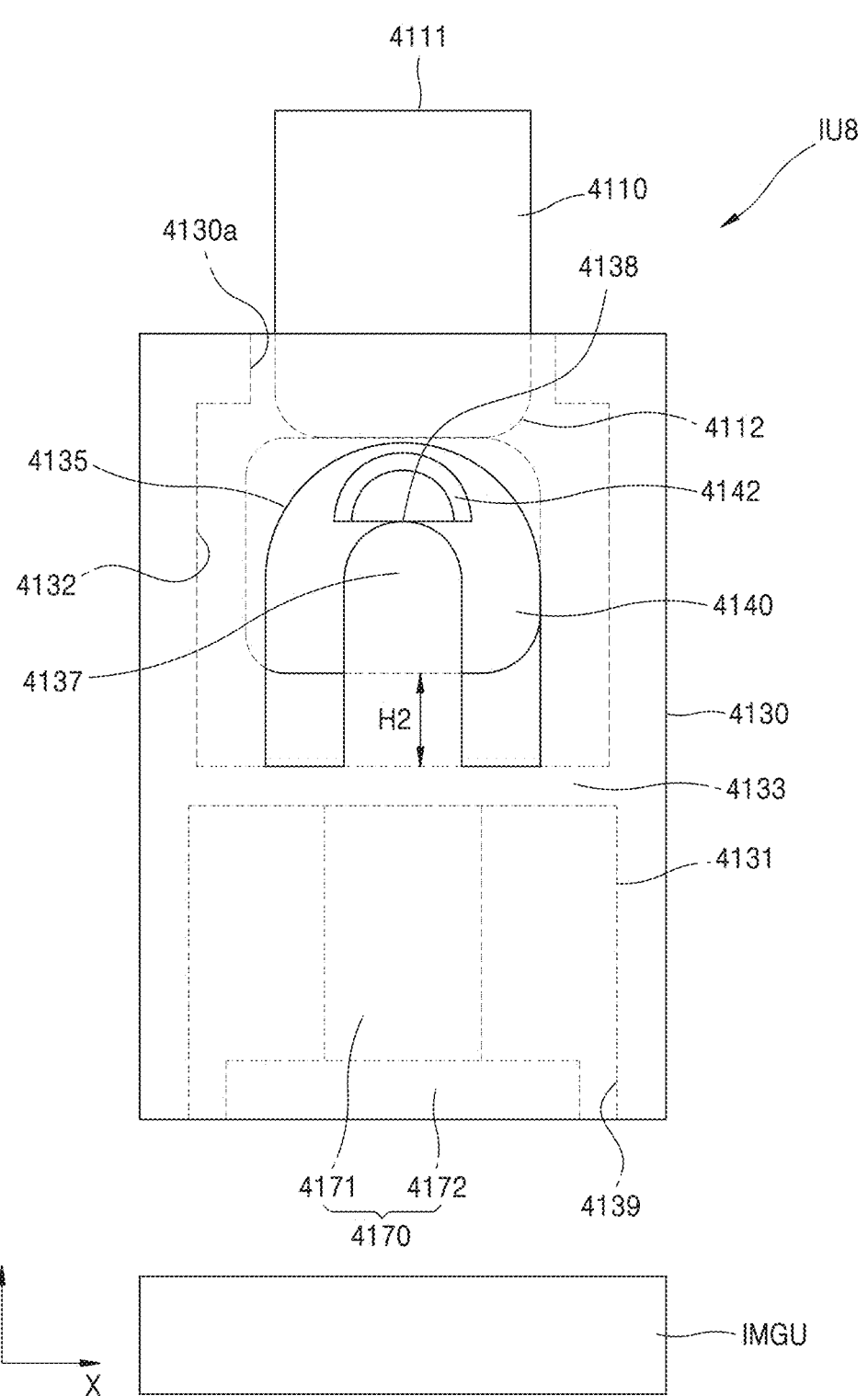

Next, FIG. 71 shows that the driving unit 4140 continuously moves by a magnetic field. In other words, the driving unit 4140 ascends and performed an angular movement as a repulsive force is applied to the first area 4151 of the magnetic unit 4150 and an attractive force is applied to the second area 4152 of the magnetic unit 4150.

At this time, the driving control unit 4142 moves within the guide groove 4135, and thus the driving control unit 4142 may be disposed on the top surface 4138 of the intermediate portion 4137.

Through the driving of the driving unit 4140, the expression unit 4110 may ascend more than in FIG. 70.

Figure 72:
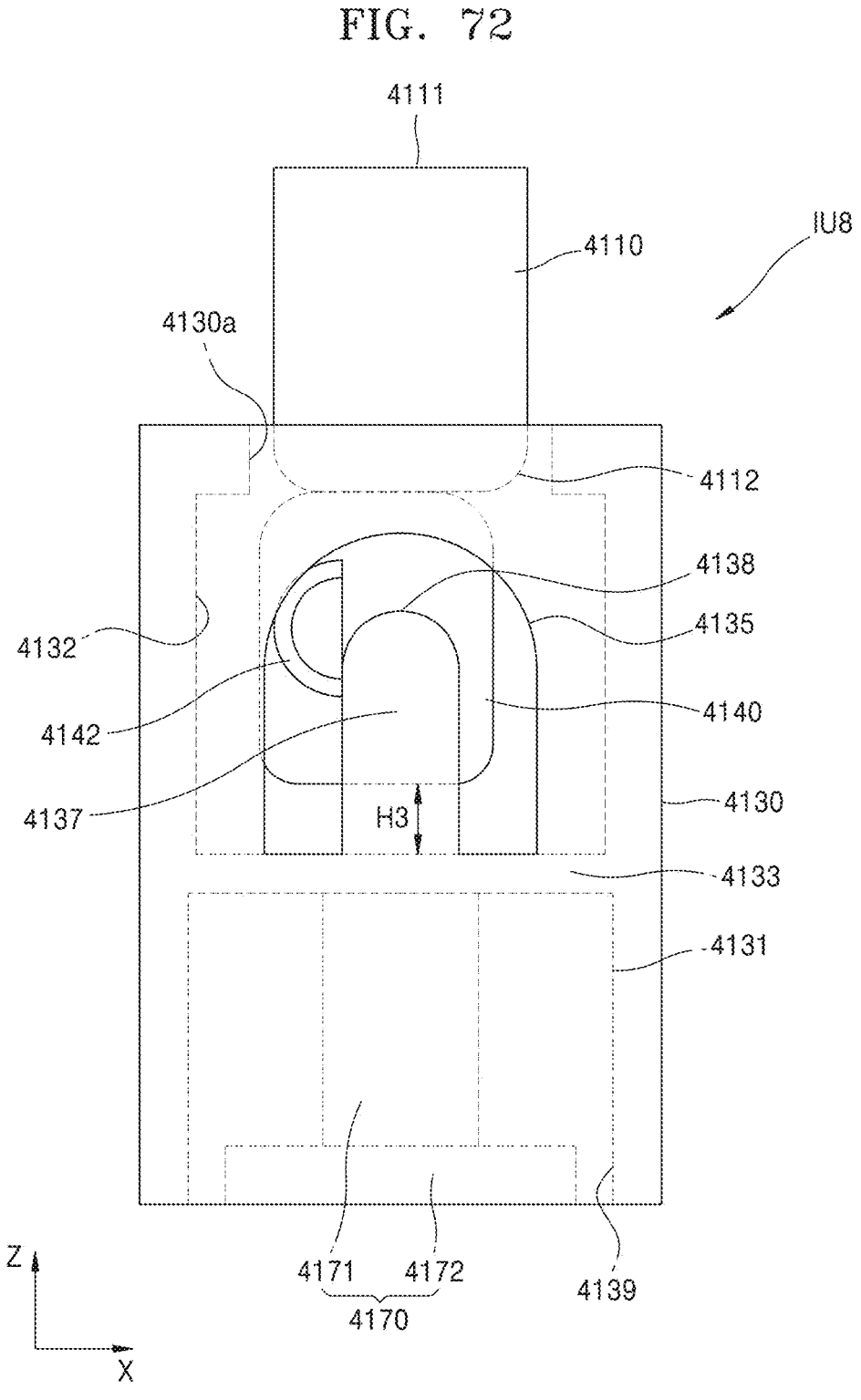

Next, referring to FIG. 72, the expression unit 4110 may further ascend.

At this time, the driving control unit 4142 moves within the guide groove 4135, and thus the driving control unit 4142 may be disposed in the second groove 4135*b* of the guide groove 4135.

Through the driving of the driving unit 4140, the expression unit 4110 may ascend more than in FIG. 70. Also, according to the shape of the driving unit 4140, the expression unit 4110 may be at the highest point.

The state of the expression unit 4110 may be maintained even when the input pen is removed, and a user may sense a protruding state of the expression unit 4110 tactilely or visually.

Figure 73:
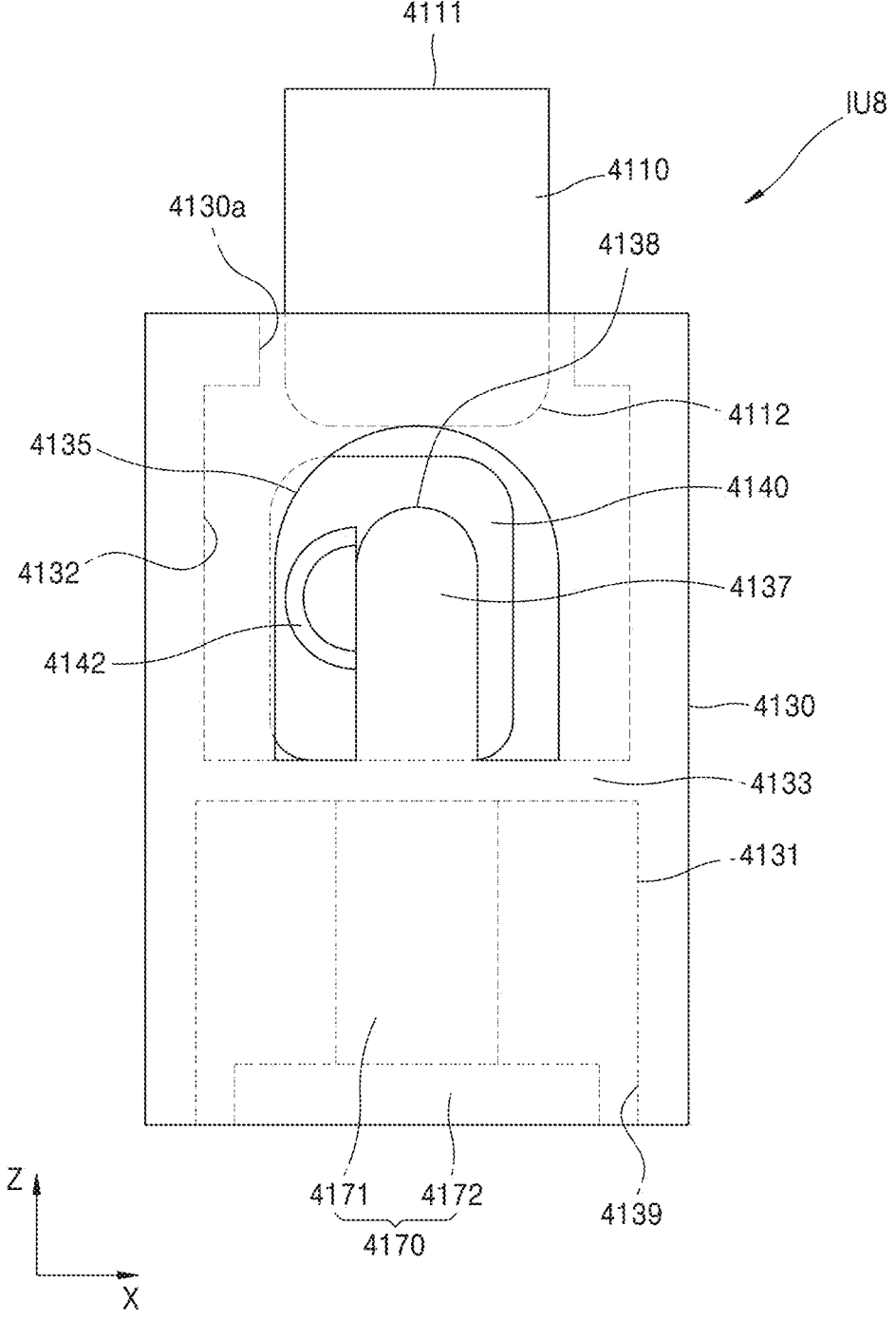

Next, referring to FIG. 73, the driving control unit 4142 may descend more than in FIG. 72 and may be disposed in the second groove 4135*b* of the guide groove 4135.

Through the driving of the driving unit 4140, the expression unit 4110 may be at the same position as in FIG. 70, e.g., the lowest point.

The descending movement may be performed by initialization using a reset member (not shown). For example, the descending movement may be performed by a magnetic field between the reset member and the magnetic unit 4150 of the driving unit 4140.

The driving unit of the output unit of the present embodiment may easily move in the first direction, for example, rise by the magnetic field generated between the input pen and the input pen, and may descend through an initialization process through the reset member.

For example, when an attractive force is generated between the driving unit and an input pen according to the polarity of a magnetic unit disposed inside the driving unit, the driving unit may ascend while performing an angular movement or a rotational movement. At this time, the driving control unit disposed in the driving unit may facilitate ascending and descending according to the shape of a guide groove, and, according to an optional embodiment, the driving unit may move along a gentle path of the driving control unit according to a curved shape or an arc-like shape of a connection groove of the guide groove.

Therefore, ascending and descending of the driving unit become smooth, natural, and precise movements, thereby reducing the irregular intermittentness of ascending and descending of the expression unit and facilitating the control of flexible and precise movements.

The expression unit may ascend and descend, thereby facilitating implementation of an ON state or an OFF state of an output unit.

Also, according to an optional embodiment, the driving control unit may be disposed on the top surface of an intermediate portion after ascending, and, in this case, the driving unit may maintain the state even when a force such as a magnetic field is not applied to the driving unit.

Also, an initialization may be easily performed by making the driving unit to descend by using a reset member. Therefore, the expression unit may ascend and descend, thereby facilitating implementation of an ON state or an OFF state of an output unit.

Therefore, it is possible to easily switch and maintain ON and OFF states of an information output device, reduce power consumption for movement of an expression unit, and improve the overall energy efficiency of the information output device.

According to an optional embodiment, a magnetic unit provided in a driving unit may be disposed to overlap a driving control unit. For example, the center of the magnetic unit may overlap the driving control unit.

Therefore, it is possible to reduce a change in the position of a magnetic unit during the movement of a driving unit based on a driving control unit, reduce the non-uniformity of an effect of a magnetic field on the magnetic unit, and facilitate precise control of a movement of the driving unit.

Figure 74:
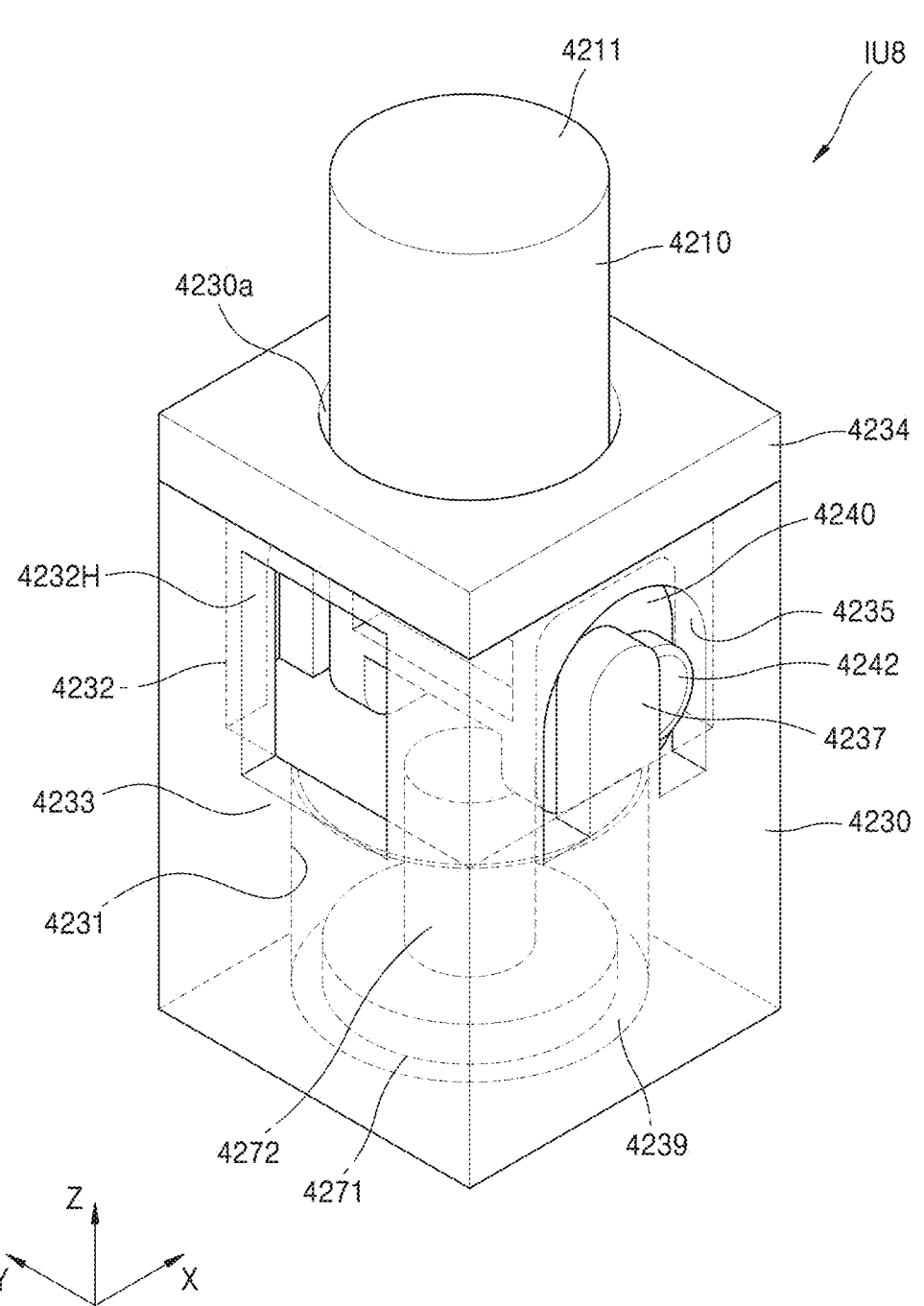
FIG. 74 is a schematic perspective view of an output unit according to another embodiment of the present disclosure.
Figure 75:
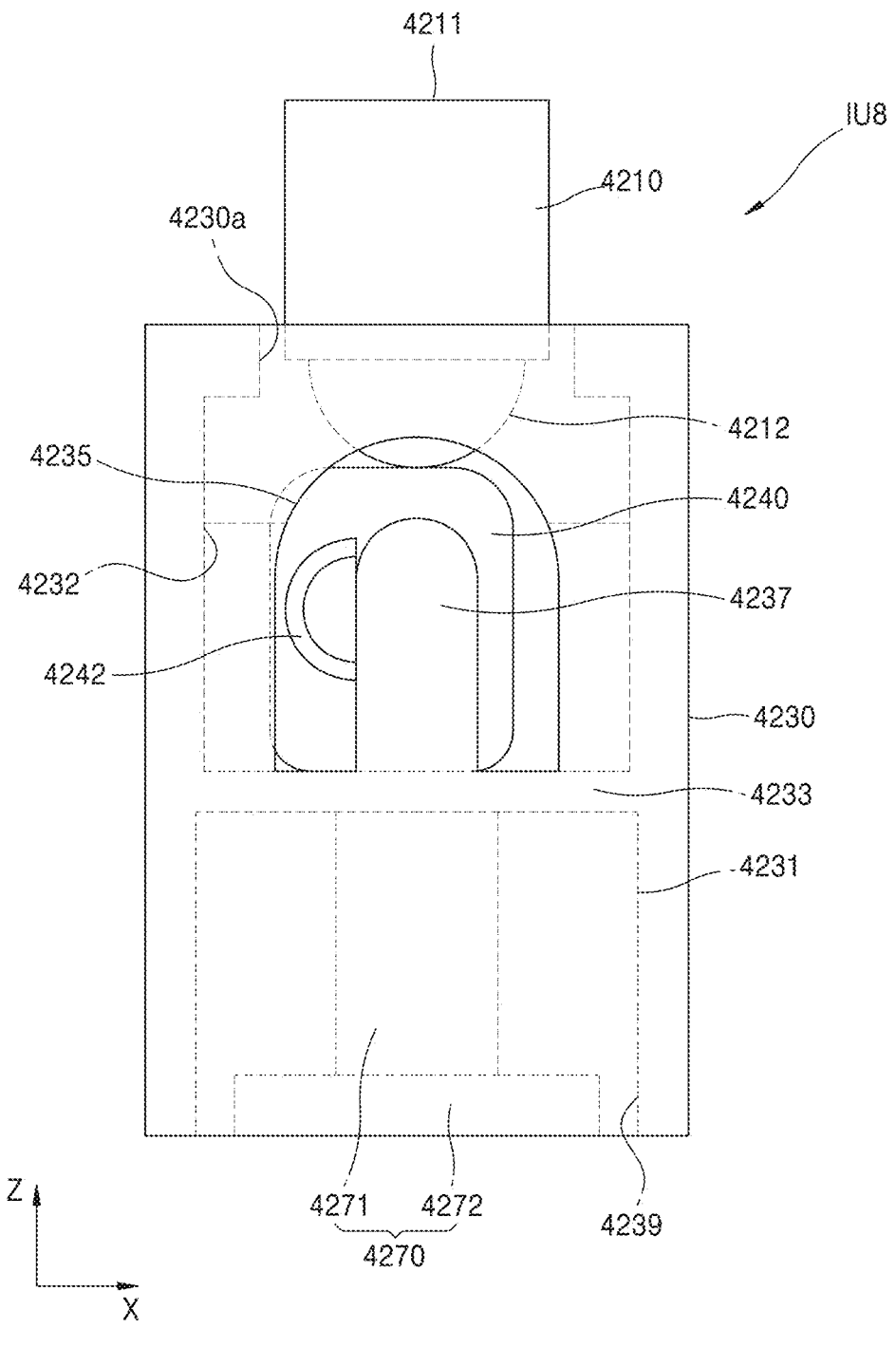
FIG. 75 is a schematic front view viewed from one direction of FIG. 74.
Figure 76:
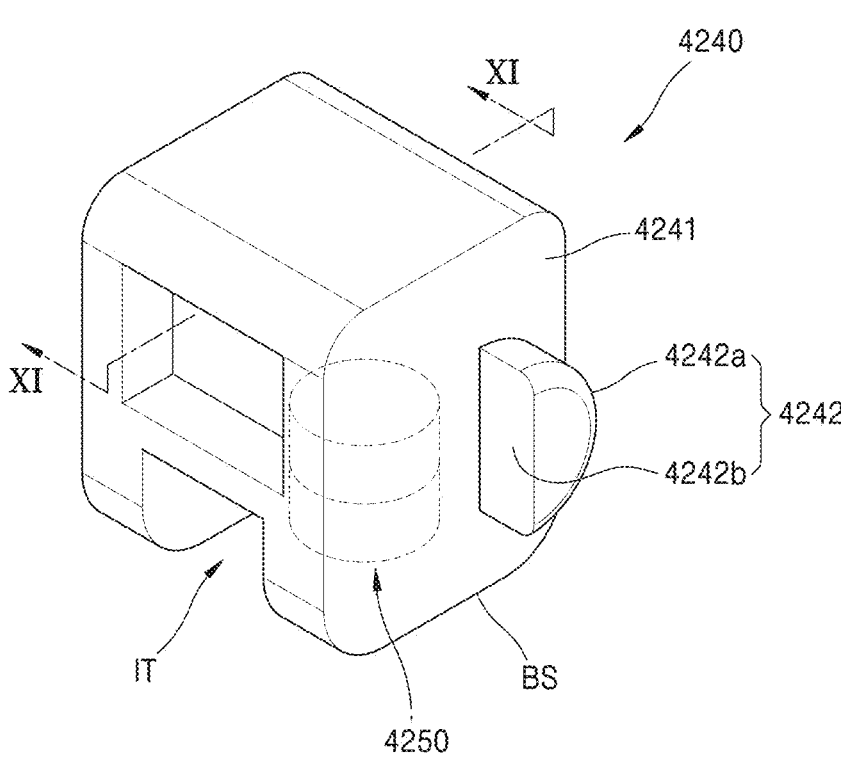
FIG. 76 is a diagram for describing a driving unit of FIG. 74.
Figure 77:
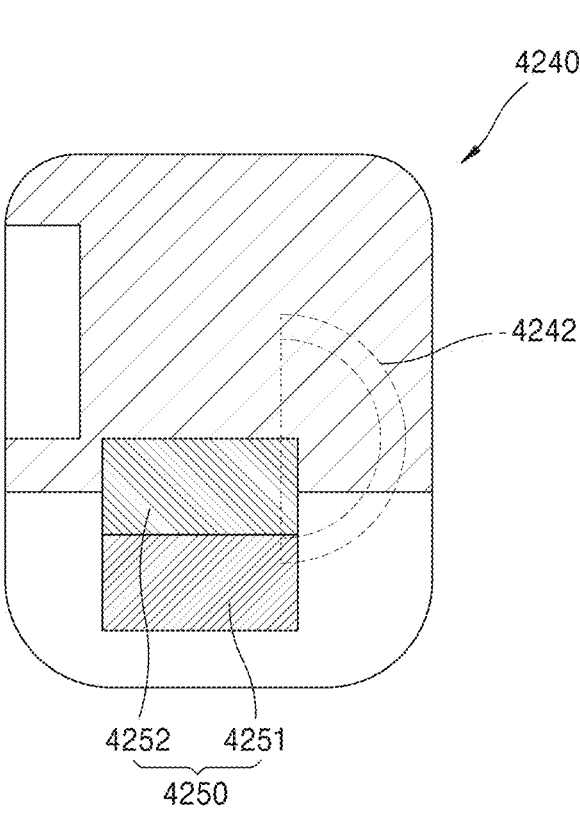
FIG. 77 is a cross-sectional view taken along a line XI-XI of FIG. 76.

FIG. 74 is a schematic perspective view of an output unit according to another embodiment of the present disclosure, FIG. 75 is a schematic front view of the output unit viewed from one direction of FIG. 74, FIG. 76 is a diagram for describing a driving unit of FIG. 74, and FIG. 77 is a cross-sectional view taken along a line XI-XI of FIG. 76.

Referring to FIGS. 74 to 77, the output unit IU8 may include a coil 4220, a base unit 4230, a driving unit 4240, and an expression unit 4210.

Also, the base unit 4230 may include one or more guide grooves 4235.

The expression unit 4210 may move according to the movement of the driving unit 4240 to be described later and may move upward and downward at least in the lengthwise direction of the expression unit 4210. Therefore, the expression unit 4210 may be moved to protrude in one direction, and a user may sense the movement of the expression unit 4210 tactilely or visually.

The expression unit 4210 may include an expression surface 4211 and a support surface 4212.

The support surface 4212 is a surface from among areas of the expression unit 4210 facing the driving unit 4240 and may constitute a lower area of the expression unit 4210 and contact the driving unit 4240. The driving unit 4240 may transmit a force to the expression unit 4210 through the support surface 4212. For example, a driving surface 4240*a* of the driving unit 4240 may contact the support surface 4212 and allow the support surface 4212 to move in a first direction, that is, the Z-axis direction in FIG. 74.

According to an optional embodiment, the support surface 4212 may include a curved surface, thereby implementing flexible driving force transmission through the driving unit 4240.

According to an optional embodiment, the support surface 4212 may have a convex shape having a width smaller than that of a main body area of the expression unit 4210 and, according to an optional embodiment, may include a portion of the sphere.

The expression surface 4211 is an area of the outermost (e.g., the topmost) surface from among areas of the expression unit 4210 and may include an area to be recognized by a user.

For example, the entire area of the expression unit 4210 may be recognized by a user or only the expression surface 4211 may be recognized. For example, a user may sense the movement of the expression unit 4210 through contact with the expression surface 4211, and the user may easily sense the movement of the expression unit 4210 through visual sensing of the expression surface 4211.

According to an optional embodiment, the expression surface 4211 may include a curved surface.

The expression unit 4210 may have various shapes. The expression unit 4210 may include a pillar-like area. For example, the expression unit 4210 may include an area having a shape similar to that of a cylinder.

In this case, a protruding area of the expression unit 4210 may have a curved surface and may also have rounded corners.

The expression unit 4210 may include various materials and may include an insulating material as a light and durable material. For example, the expression unit 4210 may include a resin-based organic material. According to another embodiment, the expression unit 4210 may include an inorganic material, such as a ceramic material.

Also, according to another selective embodiment, the expression unit 4210 may include a material like a metal or glass.

According to an optional embodiment, a support unit 4270 may be further disposed, and, for example, the support unit 4270 may include an extension member 4271.

According to an optional embodiment, one end of the extension member 4271 may be extended to overlap or support one area of the driving unit 4240 to be described later.

According to an optional embodiment, the support unit 4270 may include a body member 4272, and the extension member 4271 may be connected to the body member 4272.

As a specific example, the extension member 4271 may have a shape extending from the body member 4272 in a direction close to the expression unit 4210.

According to an optional embodiment, the body member 4272 and the extension member 4271 of the support unit 4270 may be integrated with each other.

Although not shown, according to an optional embodiment, a base (not shown) may be further included to support the body member 4272, and the body member 4272 may be disposed on the base (not shown).

The base unit 4230 may include a first accommodation unit 4231, a second accommodation unit 4232, and the guide groove 4235.

The first accommodation unit 4231 and the second accommodation unit 4232 may be arranged adjacent to each other and may not overlap each other.

According to an optional embodiment, the first accommodation unit 4231 and the second accommodation unit 4232 may be spaced apart from each other.

According to another selective embodiment, the first accommodation unit 4231 and the second accommodation unit 4232 may be connected through a through hole.

According to an optional embodiment, the above-stated support unit 4270 may be disposed in the first accommodation unit 4231. Although not shown, according to another additional embodiment, an area of the support unit 4270, e.g., an area of the extension member 4271, may be extended and disposed in the second accommodation unit 4232 through the through hole.

The guide groove 4235 may be formed in the second accommodation unit 4232. For example, the guide grooves 4235 may be formed on inner side surfaces of the second accommodation unit 4232 of the base unit 4230 facing each other. According to another selective embodiment, the guide groove 4235 may be formed on only one of the inner side surfaces.

The guide groove 4235 may have a shape of a through-hole. According to another embodiment, the guide groove 4235 may have a shape of a groove that is not exposed to the outside of the base unit 4230.

The guide groove 4235 is identical to that in the above-stated embodiment described above with reference to FIG. 67, and thus detailed descriptions thereof will be omitted.

Also, since an intermediate portion 4237 and the top surface of the intermediate portion 4237 are identical to those in the above-stated embodiment described above, detailed descriptions thereof will be omitted.

The base unit 4230 may have an elongated shape to accommodate the driving unit 4240 and may be formed to completely surround the driving unit 4240.

According to an optional embodiment, the base unit 4230 may include a boundary 4233 between the first accommodation unit 4231 and the second accommodation unit 4232.

The first accommodation unit 4231 and the second accommodation unit 4232 may be separated by the boundary 4233.

Although not shown, according to an optional embodiment, a through hole may be formed in the boundary 4233, and an area of the support unit 4270 may be disposed to extend and pass therethrough.

Also, the base unit 4230 may include an inlet 4230*a*, and the inlet 4230*a* may be connected to the second accommodation unit 4232. The expression unit 4210 may move, such that the length of a portion thereof protruding out of the base unit 4230 through the inlet 4230*a* varies.

According to an optional embodiment, the base unit 4230 may include an open area 4239. In detail, the open area 4239 may be formed to be connected to the first accommodation unit 4231.

The open area 4239 may facilitate placement, replacement, or repair of the support unit 4270.

According to an optional embodiment, a window 4232H connected to one area of the second accommodation unit 4232 of the base unit 4230 may be formed. Even in a state in which the expression unit 4210 is not removed, the state of the second accommodation unit 4232, e.g., the state or driving of the driving unit 4240, may be checked or inspected through the window 4232H.

According to an additional embodiment, the width and the height of the window 4232H may be equal to or greater than the width and the height of the driving unit 4240 in at least one direction. Therefore, when occasions demand, the driving unit 4240 may be easily discharged and put in through the window 4232H and may be easily replaced, repaired, and inspected.

The driving unit 4240 may be disposed at the base unit 4230. The driving unit 4240 may be disposed in the second accommodation unit 4232.

The driving unit 4240 may be driven by a magnetic field generated between the driving unit 4240 and an input pen (or a reset member) and perform an angular movement or a rotational movement. Through the driving unit 4240, the expression unit 4210 may move up and down, e.g., in one direction toward a coil and in a direction opposite thereto.

According to an optional embodiment, a magnetic unit 4250 may be disposed in the driving unit 4240, for example, in the inner space of the driving unit 4240. For example, the magnetic unit 4250 may include a magnetic body, e.g., a permanent magnet.

The magnetic unit 4250 may include a first area 4251 (e.g., an N pole or an S pole) and a second area 4252 (e.g., an S pole or an N pole) having different polarities, and the first area 4251 and the second area 4252 having different polarities may be arranged in a direction toward the expression unit 4210 during a rotation of the driving unit 4240, e.g., the Z-axis direction.

According to an optional embodiment, when the driving unit 4240 is at the lowest point, the center axis of the magnetic unit 4250 may not coaxial with the center axis of the driving unit 4240 and may be misaligned. Therefore, when the driving unit 4240 is driven, a torque may be generated at the driving unit 4240, thereby facilitating a rotational movement or an angular movement of the driving unit 4240.

According to an optional embodiment, the outer surface of the driving unit 4240 may include a driving surface, and at least an area thereof (e.g., a corner area) may include a curved surface. Also, the outer surface of the driving unit 4240 may be formed to support the expression unit 4210, thereby providing a driving force for the vertical movement of the expression unit 4210.

According to an optional embodiment, the driving unit 4240 may have a shape similar to a cuboid and may have a shape with rounded corners.

Also, according to an optional embodiment, one or more grooves may be formed on one surface of the driving unit 4240. For example, the one or more grooves may include two or more grooves. At least one groove IT may include a connection groove IT, and the connection groove IT may be connected to an area where the magnetic unit 4250 is disposed, and thus the magnetic unit 4250 may be partially exposed through the connection groove IT.

In addition, according to an optional embodiment, the connection groove IT may have a width equal to or greater than the width of the magnetic unit 4250 in one direction, and thus, when desired, the magnetic unit 4250 may be introduced or removed through the connection groove IT.

The driving unit 4240 may include a driving control unit 4242. Although not specifically shown, according to an optional embodiment, driving control units 4242 may be arranged on both side surfaces of the driving unit 4240.

The driving position of the driving unit 4240 may be controlled through the driving control unit 4242. For example, when the driving unit 4240 moves, the driving unit 4240 may move while the driving control unit 4242 is being disposed in the guide groove 4235.

According to an optional embodiment, the driving control unit 4242 may perform a movement similar to the shape of the guide groove 4235, e.g., the shape of the alphabet "U".

The driving control unit 4242 may have a protruding shape. For example, the driving control unit 4242 may have a shape protruding from a side surface of the driving unit 4240, and the driving control unit 4242 may be disposed in the guide groove 4235.

According to an optional embodiment, the driving control unit 4242 may include an outer surface 4242a and an inner surface 4242b.

The outer surface 4242a is a surface facing a surface close to the outer surface of the guide groove 4235, e.g., the outer surface of the base unit 4230, when the driving unit 4240 is disposed in the guide groove 4235.

The inner surface 4242b is a surface facing an inner surface of the guide groove 4235, e.g., the intermediate portion 4237, when the driving unit 4240 is disposed in the guide groove 4235.

According to an optional embodiment, the outer surface 4242a may include a curved surface. Therefore, when the driving unit 4240 moves in the guide groove 4235, the outer surface 4242a may stably move in a first groove 4235a, a second groove 4235b, and a connection groove 4235c. According to an optional embodiment, when the connection groove 4235c includes a curved surface or at least one area of an arc, friction with the outer surface 4242a may be reduced, thereby facilitating smooth movement of the driving unit 4240 and improving efficiency of the movement of the driving unit 4240.

According to an optional embodiment, at least one area of the inner surface 4242b may include a flat surface. Therefore, the driving unit 4240 may stably move. For example, when the driving control unit 4242 ascends and is disposed on a top surface 4238 of the intermediate portion 4237, the driving control unit 4242 may be stably placed on the top surface 4238 of the intermediate portion 4237.

A driving unit of an output unit of the present embodiment may easily move in a first direction (e.g., ascend) by a magnetic field generated between the driving unit and an input pen.

The expression unit may ascend and descend, thereby facilitating implementation of an ON state or an OFF state of an output unit.

Figure 78:
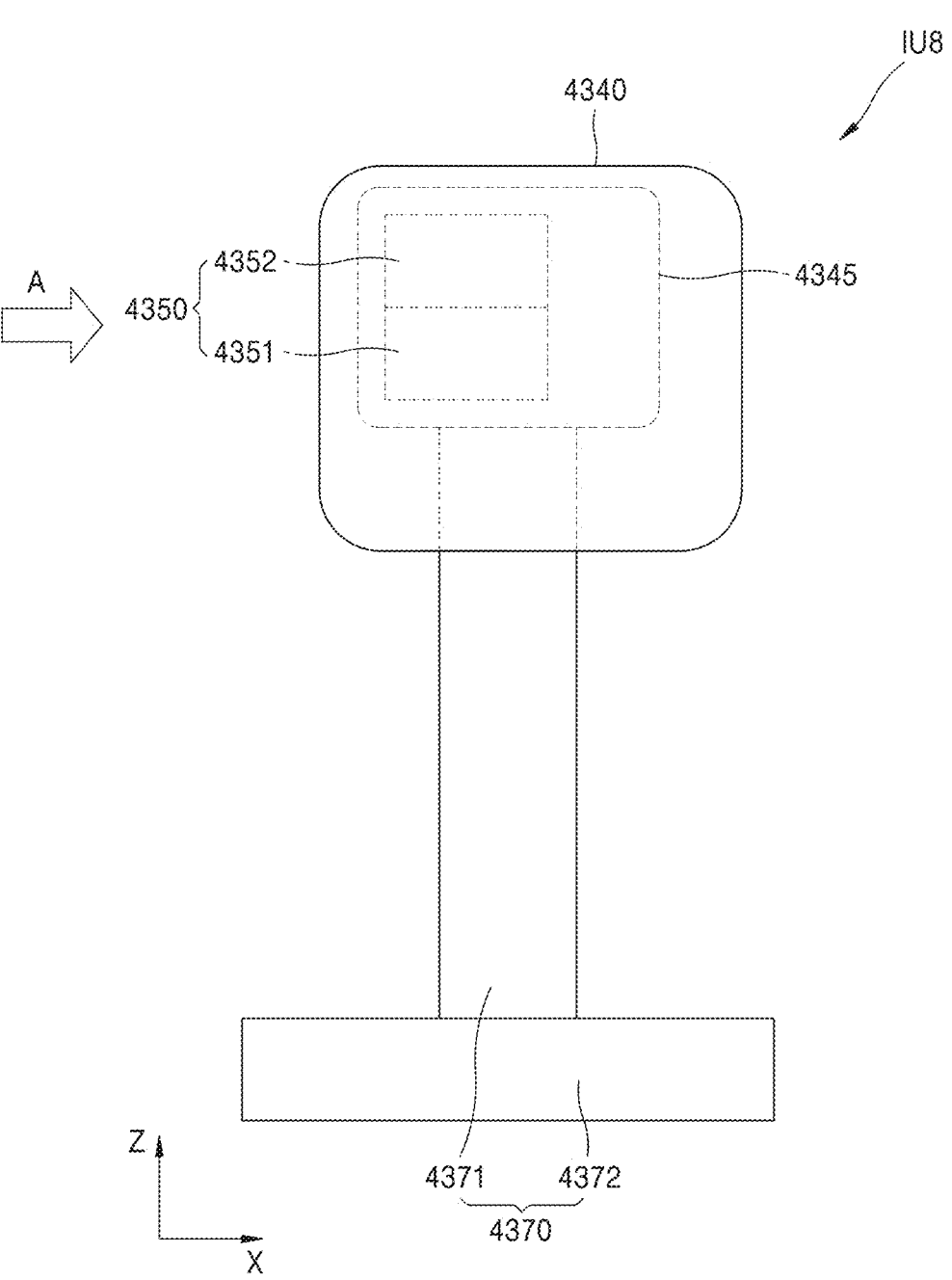
FIGS. 78 and 79 are schematic front views of the operation of an output unit according to another embodiment of the present disclosure.
Figure 79:
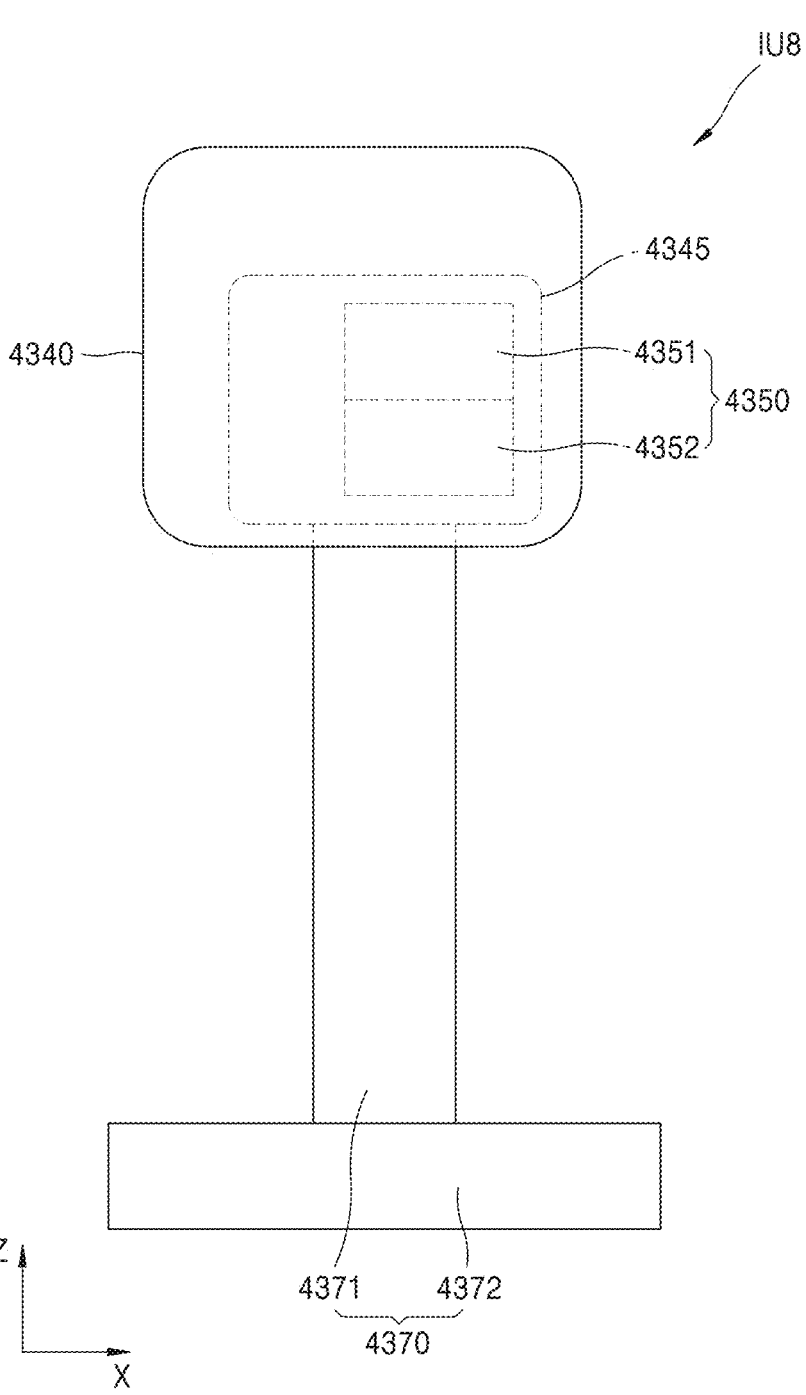
Figure 80:
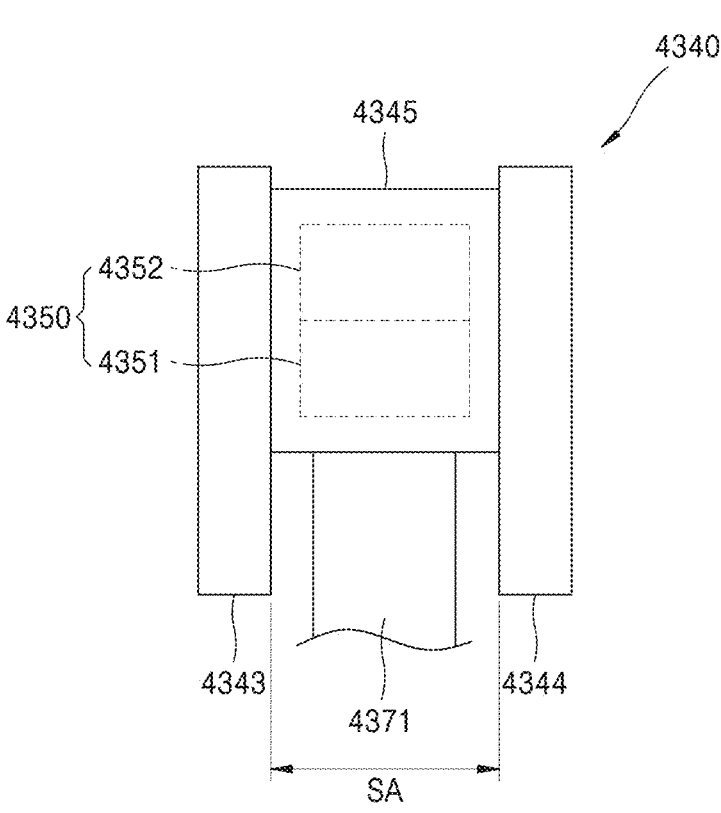
FIG. 80 is a side view viewed in a direction A of FIG. 78.

FIGS. 78 and 79 are schematic front views of the operation of an output unit according to another embodiment of the present disclosure, and FIG. 80 is a side view viewed in a direction A of FIG. 78.

The output unit IU8 of the present embodiment may include a base unit (not shown), a driving unit 4340, and an expression unit (not shown).

For convenience of explanation, descriptions below will focus on differences from the above-described embodiment.

Also, for convenience of explanation, the base unit and the expression unit are not shown in the drawings.

A support unit 4370 may include an extension member 4371, and one end of the extension member 4371 may be extended to overlap or support one area of the driving unit 4340 to be described later.

According to an optional embodiment, the support unit 4370 may include a body member 4372, and the extension member 4371 may be connected to the body member 4372.

A magnetic unit 4350 may be disposed in the inner space of the driving unit 4340. For example, the magnetic unit 4350 may include a magnetic body, e.g., a permanent magnet.

The magnetic unit 4350 may include a first area 4351 (e.g., an N pole or an S pole) and a second area 4352 (e.g., an S pole or an N pole) having different polarities, and the first area 4351 and the second area 4352 having different polarities may be arranged in a direction toward an expression unit 4310 during a rotation of the driving unit 4340, e.g., the Z-axis direction.

The driving unit 4340 may include a first driving member 4343 and a second driving member 4344 and may include the separation space SA therebetween.

External surfaces of the first driving member 4343 and the second driving member 4344 may each include a driving surface on at least one surface to support the expression unit 4310 during a movement of the driving unit 4340, thereby providing a driving force to the expression unit 4310.

According to an optional embodiment, at least one area of the outer surfaces of the first driving member 4343 and the second driving member 4344 may include a curved surface. For example, the first driving member 4343 and the second driving member 4344 may have rounded corners.

Therefore, ascending and descending of the expression unit may be gently switched during a rotation or an angular movement of the first driving member 4343 and the second driving member 4344, thereby allowing the expression unit to efficiently perform a continuous and smooth movement.

Although not shown, driving control units (not shown) may be arranged on at least one side surfaces of the first driving member 4343 and the second driving member 4344, e.g., surfaces of the first driving member 4343 and the second driving member 4344 opposite to side surfaces of the first driving member 4343 and the second driving member 4344 facing each other.

According to an optional embodiment, the driving control unit (not shown) may have a protruding shape and may have the same structure as described in the above-described embodiment.

Also, according to another selective embodiment, a drive control unit (not shown) may have a protruding shape similar to a circle (that is, a cylindrical shape) instead of the shape of the above-described embodiment similar to a semicircle. In this case, a guide groove (not shown) may have a groove-like shape formed in one direction, that is, the Z-axis direction.

A driving proximity portion 4345 may be disposed in the separation space SA between the first driving member 4343 and the second driving member 4344.

According to an optional embodiment, the driving proximity portion 4345 may be disposed at a position overlapping the magnetic unit 4350.

According to an optional embodiment, the driving proximity portion 4345 may overlap the center axis of the extension member 4371.

The driving proximity portion 4345 may move and be supported together with the driving unit 4340 when the driving unit 4340 performs a rotational movement or an angular movement. For example, the driving proximity portion 4345 may be supported by one end of the extension member 4371 of the support unit 4370. According to another example, a base unit (not shown) may include an area extending in a direction toward the extension member 4371, and the area may support the driving proximity portion 4345.

The driving proximity portion 4345 is formed to have a smaller width than the first driving member 4343 and the second driving member 4344, and distances from the outer surface of the driving proximity portion 4345 to the first driving member 4343 and the second driving member 4344 may vary according to areas.

Therefore, the height of the driving unit 4340 may vary according to an angular movement or a rotational movement of the driving proximity portion 4345.

In other words, as compared to FIG. 78, FIG. 79 shows that the driving proximity portion 4345 79 is rotated, for example, 180 degrees, and accordingly, the driving unit 4340 performed a rotational movement and an ascending movement.

In an information output unit of the present embodiment, a driving unit moves by a magnetic field generated between the driving unit and an input pen. Therefore, an expression unit may also easily move in a first direction (e.g., ascend) and may move and rotate while maintaining a certain area through a driving control unit.

Also, in this case, instead of an U-shaped guide groove, only a groove extending in one direction may be included, and, in this case, the groove may overlap the center axis of an extension member.

Figure 81:
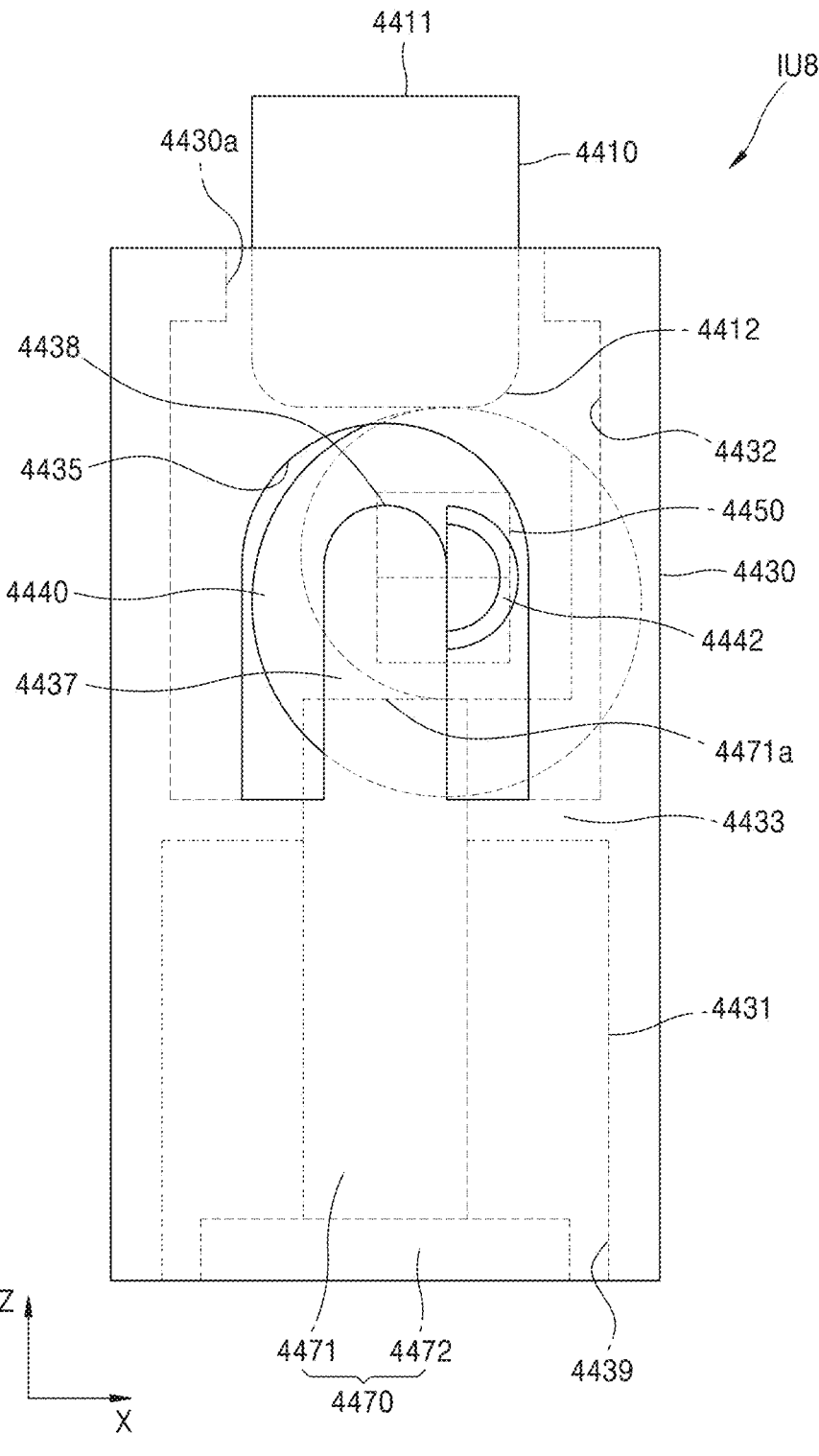
FIG. 81 is a schematic front view of the operation of an output unit according to another embodiment of the present disclosure.
Figure 82:
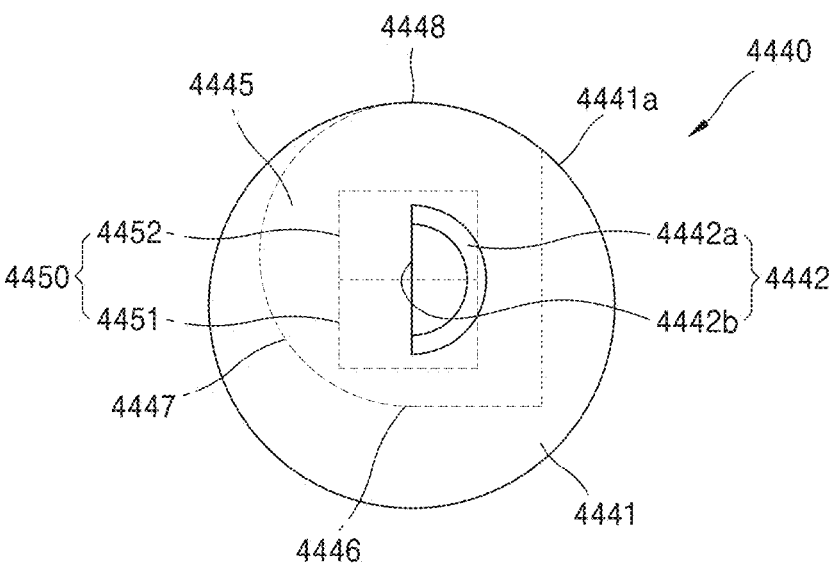
FIG. 82 is a diagram for describing a driving unit of FIG. 81.
Figure 83:
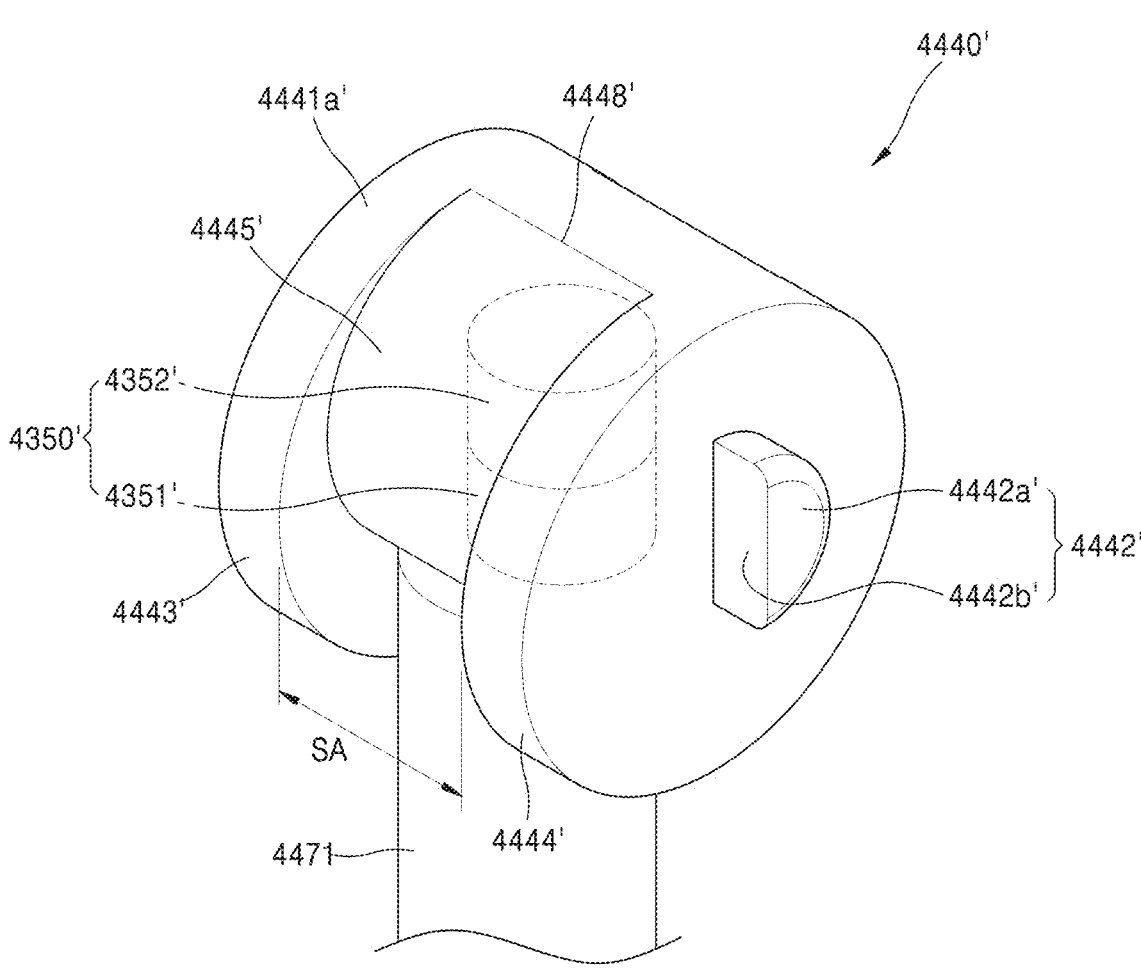
FIG. 83 is a diagram showing one of selective embodiments of the driving unit of FIG. 81.

FIG. 81 is a schematic front view of an output unit according to another embodiment of the present disclosure, FIG. 82 is a diagram for describing a driving unit of FIG. 81, and FIG. 83 is a diagram showing an optional embodiment of the driving unit of FIG. 81.

Figure 84:
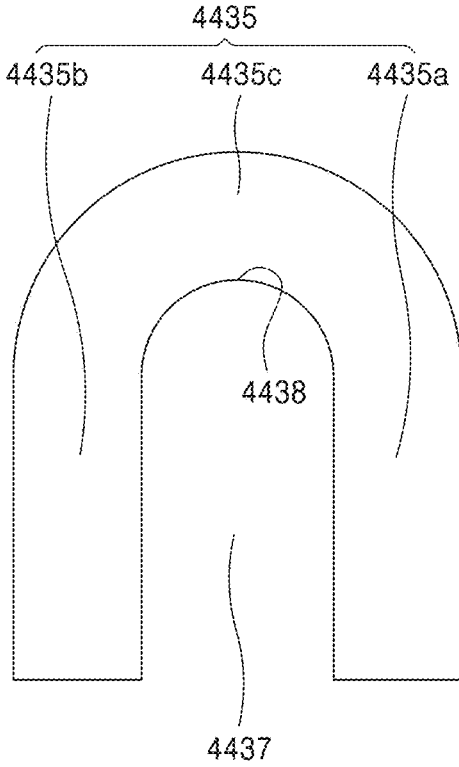
FIG. 84 is a diagram for describing a guide groove of FIG. 81.

FIG. 84 is a diagram for describing a guide groove of FIG. 81.

Figure 85:
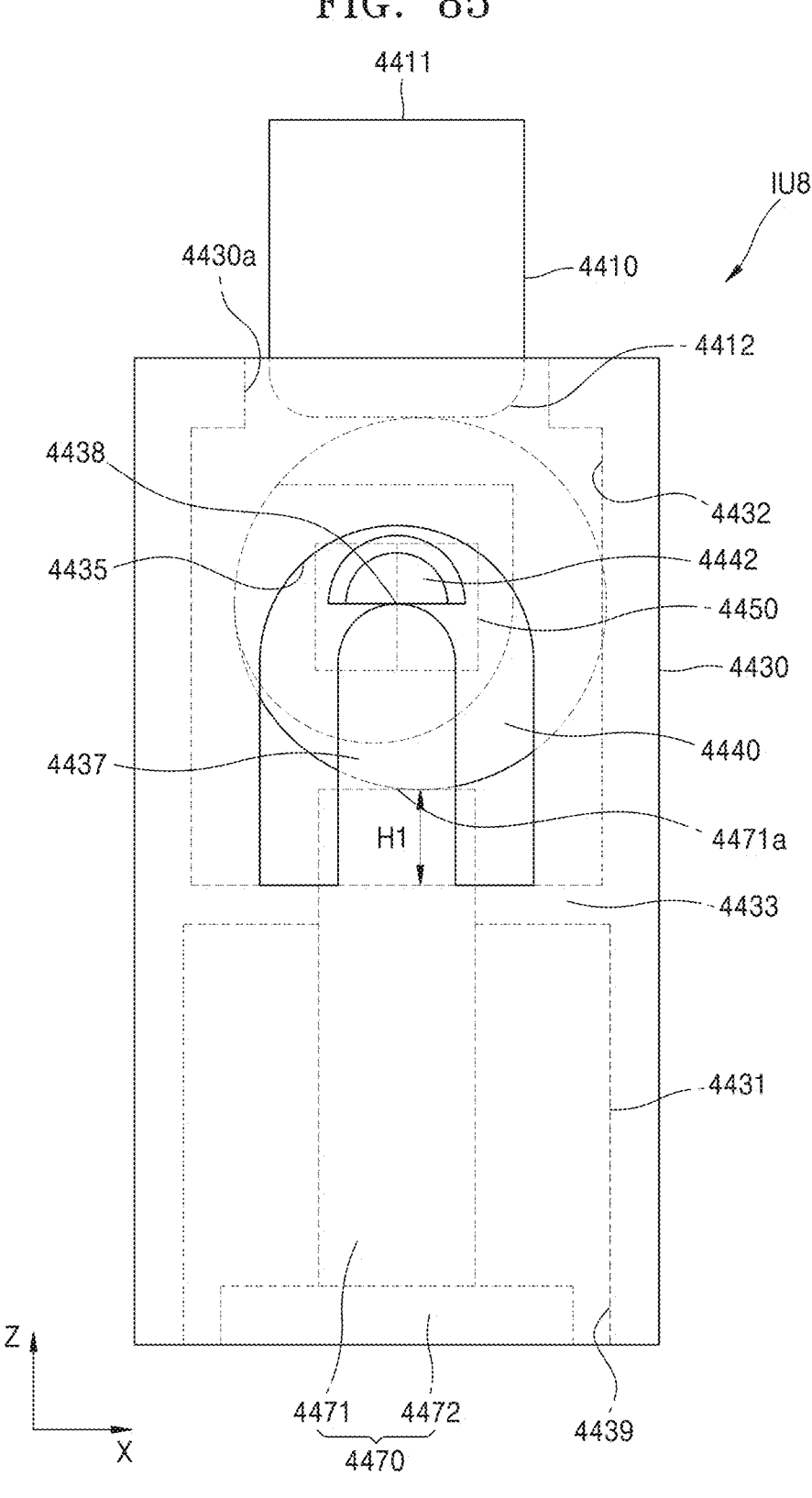
FIGS. 85 and 86 are diagrams for describing the operation of an information output device of FIG. 81.
Figure 86:
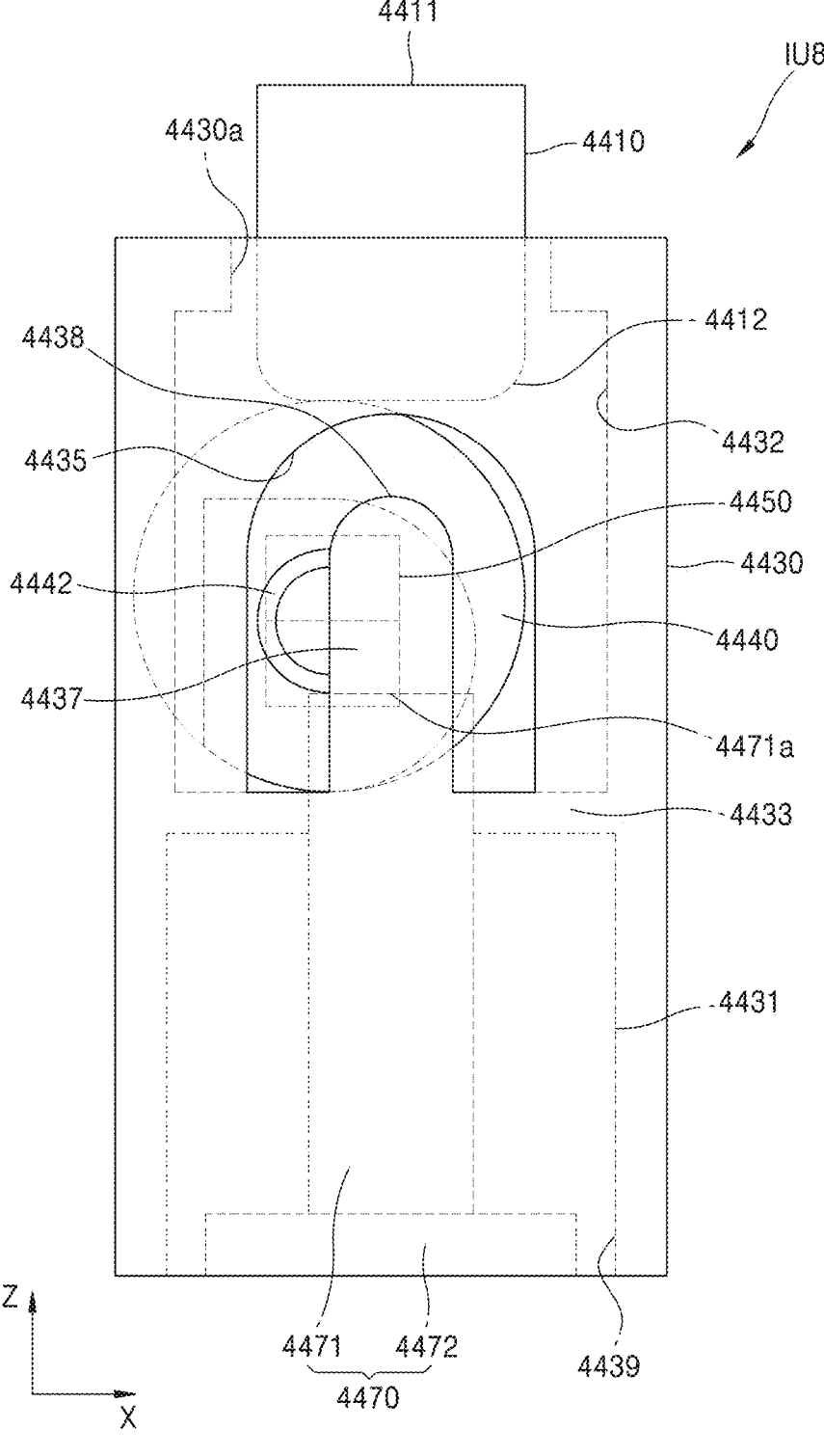

FIGS. 85 and 86 are diagrams for describing the operation of an information output device of FIG. 81.

The output unit IU8 may include a base unit 4430, a driving unit 4440, and an expression unit 4410.

Also, the base unit 4430 may include one or more guide grooves 4435.

The expression unit 4410 may move according to the movement of the driving unit 4440 to be described later and may move upward and downward at least in the lengthwise direction of the expression unit 4410. Therefore, the expression unit 4410 may be moved to protrude in one direction, and a user may sense the movement of the expression unit 4410 tactilely or visually.

The expression unit 4410 may include an expression surface 4411 and a support surface 4412.

The support surface 4412 is a surface from among areas of the expression unit 4410 facing the driving unit 4440 and may constitute a lower area of the expression unit 4410 and contact the driving unit 4440. The driving unit 4440 may transmit a force to the expression unit 4410 through the support surface 4412. For example, a driving surface 4440$a$ of the driving unit 4440 may contact the support surface 4412 and allow the support surface 4412 to move in a first direction, that is, the Z-axis direction in FIG. 81.

According to an optional embodiment, the support surface 4412 may include a curved surface, thereby implementing flexible driving force transmission through the driving unit 4440.

For example, the entire area of the expression unit 4410 may be recognized by a user or only the expression surface 4411 may be recognized. For example, a user may sense the movement of the expression unit 4410 through contact with the expression surface 4411, and the user may easily sense the movement of the expression unit 4410 through visual sensing of the expression surface 4411.

According to an optional embodiment, the expression surface 4411 may include a curved surface.

The expression unit 4410 may have various shapes. The expression unit 4410 may include a pillar-like area. For example, the expression unit 4410 may include an area having a shape similar to that of a cylinder.

In this case, a protruding area of the expression unit 4410 may have a curved surface and may also have rounded corners.

The expression unit 4410 may include various materials and may include an insulating material as a light and durable material. For example, the expression unit 4410 may include a resin-based organic material. According to another embodiment, the expression unit 4410 may include an inorganic material, such as a ceramic material.

Also, according to another selective embodiment, the expression unit 4410 may include a material like a metal or glass.

According to an optional embodiment, one end of the extension member 4471 may be extended to overlap or support one area of the driving unit 4440 to be described later.

According to an optional embodiment, a support unit 4470 may include a body member 4472, and the extension member 4471 may be connected to the body member 4472.

As a specific example, the extension member 4471 may have a shape extending from the body member 4472 in a direction close to the expression unit 4410.

According to an optional embodiment, the body member 4472 and the extension member 4471 of the support unit 4470 may be integrated with each other.

Although not shown, according to an optional embodiment, a base (not shown) may be further included to support the body member 4472, and the body member 4472 may be disposed on the base (not shown).

The base unit 4430 may include a first accommodation unit 4431, a second accommodation unit 4432, and the guide groove 4435.

The first accommodation unit 4431 and the second accommodation unit 4432 may be arranged adjacent to each other and may not overlap each other.

According to an optional embodiment, the first accommodation unit 4431 and the second accommodation unit 4432 may be spaced apart from each other.

According to another selective embodiment, the first accommodation unit 4431 and the second accommodation unit 4432 may be connected through a through hole.

According to an optional embodiment, the above-stated support unit 4470 may be disposed in the first accommodation unit 4431. Although not shown, according to another additional embodiment, an area of the support unit 4470, e.g., an area of the extension member 4471, may be extended and disposed in the second accommodation unit 4432 through the through hole.

The guide groove 4435 may be formed in the second accommodation unit 4432. For example, the guide grooves 4435 may be formed on inner side surfaces of the second accommodation unit 4432 of the base unit 4430 facing each other. According to another selective embodiment, the guide groove 4435 may be formed on only one of the inner side surfaces.

The guide groove 4435 may have a shape of a through-hole. According to another embodiment, the guide groove 4435 may have a shape of a groove that is not exposed to the outside of the base unit 4430.

Referring to FIG. 84, the guide groove 4435 may include a first groove 4435a, a second groove 4435b, and a connection groove 4435c.

The first groove 4435a and the second groove 4435b may be spaced apart from each other, and, according to an optional embodiment, an intermediate portion 4437 may be formed between the first groove 4435a and the second groove 4435b.

The guide groove 4435 is identical to that in the above-stated embodiment described above with reference to FIG. 20, and thus detailed descriptions thereof will be omitted.

The base unit 4430 may have an elongated shape to accommodate the driving unit 4440 and may be formed to completely surround the driving unit 4440.

According to an optional embodiment, the base unit 4430 may include a boundary 4433 between the first accommodation unit 4431 and the second accommodation unit 4432.

The first accommodation unit 4431 and the second accommodation unit 4432 may be separated by the boundary 4433.

Although not shown, according to an optional embodiment, a through hole may be formed in the boundary 4433, and an area of the extension member 4471 of the support unit 4470 may be disposed to extend and pass therethrough.

Also, the base unit 4430 may include an inlet 4430a, and the inlet 4430a may be connected to the second accommodation unit 4432. The expression unit 4410 may move, such that the length of a portion thereof protruding out of the base unit 4430 through the inlet 4430a varies.

According to an optional embodiment, the base unit 4430 may include an open area 4439. In detail, the open area 4439 may be formed to be connected to the first accommodation unit 4431.

The open area 4439 may facilitate placement, replacement, or repair of the support unit 4470.

The driving unit 4440 may be disposed at the base unit 4430. The driving unit 4440 may be disposed in the second accommodation unit 4432.

The driving unit 4440 may be driven by a magnetic field generated between the driving unit 4440 and an input pen (or a reset member) and perform an angular movement or a rotational movement. The expression unit 4410 may move up and down, e.g., ascend and descend, by the driving unit 4440.

A magnetic unit 4450 may be disposed in the inner space of the driving unit 4440. For example, the magnetic unit 4450 may include a magnetic body, e.g., a permanent magnet.

The magnetic unit 4450 may include a first area 4451 (e.g., an N pole or an S pole) and a second area 4452 (e.g., an S pole or an N pole) having different polarities, and the first area 4451 and the second area 4452 having different polarities may be arranged in a direction toward an expression unit 4410 during a rotation of the driving unit 4440, e.g., the Z-axis direction.

The driving unit 4440 may include a driving surface 4441a on at least the outer surface, and the driving surface 4441a may be formed to support the expression unit 4410, thereby providing a driving force for the vertical movement of the expression unit 4410.

According to an optional embodiment, the driving surface 4441a of the driving unit 4440 may include a curved surface as the outer surface. According to a more specific embodiment, the driving surface 4441a of the driving unit 4440 may include a boundary line having a circle-like shape.

The driving unit 4440 may include a driving control unit 4442. Although not specifically shown, according to an optional embodiment, driving control units 4442 may be arranged on both side surfaces of the driving unit 4440.

The driving position of the driving unit 4440 may be controlled through the driving control unit 4442. For example, when the driving unit 4440 moves, the driving unit 4440 may move while the driving control unit 4442 is being disposed in the guide groove 4435.

The driving control unit 4442 may have a protruding shape. For example, the driving control unit 4442 may have a shape protruding from a side surface of the driving unit 4440, and the driving control unit 4442 may be disposed in the guide groove 4435.

According to an optional embodiment, the driving control unit 4442 may include an outer surface 4442a and an inner surface 4442b.

The present embodiment may include a driving proximity portion 4445 formed in one area of the driving unit 4440.

According to an optional embodiment, the driving proximity portion 4445 may be disposed at a position overlapping the magnetic unit 4450.

The driving proximity portion 4445 may move and be supported together with the driving unit 4440 when the driving unit 4440 performs a rotational movement or an angular movement. For example, the driving proximity portion 4445 may be supported by one end of the extension member 4471 of the support unit 4470. According to another example, the base unit 4430 may include an area extending in a direction toward the extension member 4471, and the area may support the driving proximity portion 4445.

The driving proximity portion 4445 may include a first area 4446, a second area 4448, and a connection area 4447 having different distances from the driving surface 4441a of the driving unit 4440, and, as the first area 4446, the second area 4448, and the connection area 4447 of the driving proximity portion 4445 are supported by the extension member 4471 of the support unit 4470, the height of the driving unit 4440 may change.

FIG. 83 is a diagram showing one of selective embodiments of the driving unit of FIG. 81.

A drive unit 4440' may include a magnetic unit 4450' disposed in the inner space thereof. For example, the magnetic unit 4450' may include a magnetic body, such as a permanent magnet.

The magnetic unit 4450' may include a first area (e.g., an N pole or an S pole') and a second area (e.g., an S pole or an N pole') having different polarities from each other.

The driving unit 4440' may include a driving surface 4441a' on at least the outer surface, and the driving surface 4441a' may be formed to support an expression unit 4410', thereby providing a driving force for the vertical movement of the expression unit 4410'.

According to an optional embodiment, the driving surface 4441a' of the driving unit 4440' may include a curved surface as the outer surface. According to a more specific embodiment, the driving surface 4441a' of the driving unit 4440' may include a boundary line having a circle-like shape.

The driving unit 4440' may include a driving control unit 4442'. The driving control unit 4442 may include the outer surface 4442a and the inner surface 4442b, which may be the same or similar as those described in the above-described embodiments, and thus a detailed descriptions thereof will be omitted.

The driving unit 4440' may include a first driving member 4443' and a second driving member 4444' and may include a separation space SA' therebetween.

External surfaces of the first driving member 4443' and the second driving member 4444' may each include the driving surface 4441a' on at least one surface to support the expression unit 4410' during a movement of the driving unit 4440', thereby providing a driving force to the expression unit 4410'.

According to an optional embodiment, outer surfaces of the first driving member 4443' and the second driving member 4444' may include curved surfaces. For example, the first driving member 4443' and the second driving member 4444' may each have a shape similar to that of a rotating body and may each have a disk-like shape.

Therefore, a natural driving force may be provided to a support surface 4412' of the expression unit 4410' during a rotation or an angular movement of the first driving member 4443' and the second driving member 4444', thereby allowing the expression unit 4410' to efficiently perform a continuous and smooth movement.

Driving control units 4442' may be arranged on at least one side surfaces of the first driving member 4443' and the second driving member 4444', e.g., surfaces of the first driving member 4443' and the second driving member 4444' opposite to side surfaces of the first driving member 4443' and the second driving member 4444' facing each other.

A driving proximity portion 4445' may be disposed in the separation space SA' between the first driving member 4443' and the second driving member 4444'. The driving proximity portion 4445' may include a first area 4446', a second area 4448', and a connection area 4447'.

According to an optional embodiment, the driving proximity portion 4445' may be disposed at a position overlapping the magnetic unit 4450'.

According to an optional embodiment, the driving proximity portion 4445' may overlap the center axis of the extension member 4471.

The driving proximity portion 4445' may move and be supported together with the driving unit 4440' when the driving unit 4440' performs a rotational movement or an angular movement. For example, the driving proximity portion 4445' may be supported by one end of the extension member 4471 of the support unit 4470.

The driving proximity portion 4445' is formed to have a smaller width than the first driving member 4443' and the second driving member 4444', and distances from the outer surface of the driving proximity portion 4445' to driving surfaces 4441a' of the first driving member 4443' and the second driving member 4444' may vary according to areas.

For example, a distance between the first area 4446' and the driving surface 4441a' may be greater than a distance between the second area 4448' and the driving surface 4441a'.

Therefore, the height of the driving unit 4440' may change according to an angular movement or a rotational movement of the driving proximity portion 4445'. In this case, a significant change of a distance between the magnetic unit 4450', which overlaps the driving proximity portion 4445' (more particularly, disposed inside the driving proximity portion 4445'), and the extension member 4471 may be reduced and the distance may be maintained constant or within a certain range.

According to an optional embodiment, the connection area 4447' may be disposed between the first area 4446' and the second area 4448', and the connection area 4447' may include a curved surface.

During a rotational movement of the driving unit 4440', the extension member 4471 may support at least one area of the connection area 4447' while supporting the first area 4446' and before supporting the second area 4448', Therefore, the driving unit 4440' may naturally move, and thus the movement of the expression unit 4410 may be precisely controlled.

FIGS. 85 and 86 are diagrams for describing the operation of an information output device of FIG. 81.

FIG. 85 shows that, as compared to FIG. 81, the driving unit 4440 ascends, and thus the expression unit 4410 also ascends.

For example, the driving unit 4440 may be moved by a magnetic field generated between an input pen and the magnetic unit 4450 of the driving unit 4440 as a user moves the input pen. For example, when an attractive force is applied between the second area 4452 of the magnetic unit 4450 disposed in the driving unit 4440 and the input pen, the driving unit 4440 may ascend by the attractive force applied to the magnetic unit 4450. For example, the driving unit 4440 may ascend by the height H1.

Next, referring to FIG. 86, initialization may be performed through a reset member (not shown), and thus the expression unit 4410 may descend.

At this time, the driving control unit 4442 moves within the guide groove 4435, and thus the driving control unit 4442 may pass a top surface 4438 of the intermediate portion 4437 and, in some cases, may be maintained on the top surface 4438.

The driving control unit 4442 may pass the top surface 4438 and may be disposed in the second groove 4435b in the guide groove 4435.

In other words, FIG. 86 shows that the driving unit 4440 descends and the driving control unit 4442 is disposed at the lowest point of the second groove 4435b of the guide groove 4435.

A driving unit of an output unit of the present embodiment may move at least in a first direction or in a direction opposite thereto, and, according to the movement of the driving unit, an expression unit may also move in the first direction or in the direction opposite thereto and output various information that may be sensed by a user.

The expression unit may ascend and descend, thereby facilitating implementation of an ON state or an OFF state of an information output device.

A driving unit of an output unit of the present embodiment includes a driving proximity portion, the driving proximity portion may be supported during a rotational movement or an angular movement of the driving unit, and the driving unit may ascend or descend as a distance between the driving proximity portion and a driving surface of the driving unit is different in each area.

Therefore, it is possible to reduce a change in a vertical moving distance of a magnetic unit, thereby reducing the non-uniformity of a driving force of the driving unit. Therefore, non-uniform ascending and descending characteristics of an expression unit may be reduced.

Also, according to an optional embodiment, a driving surface of the driving unit may have a curved surface (more particularly, a planar shape similar to a circle), and thus movement changes for the expression unit may be controlled precisely.

Figure 87:
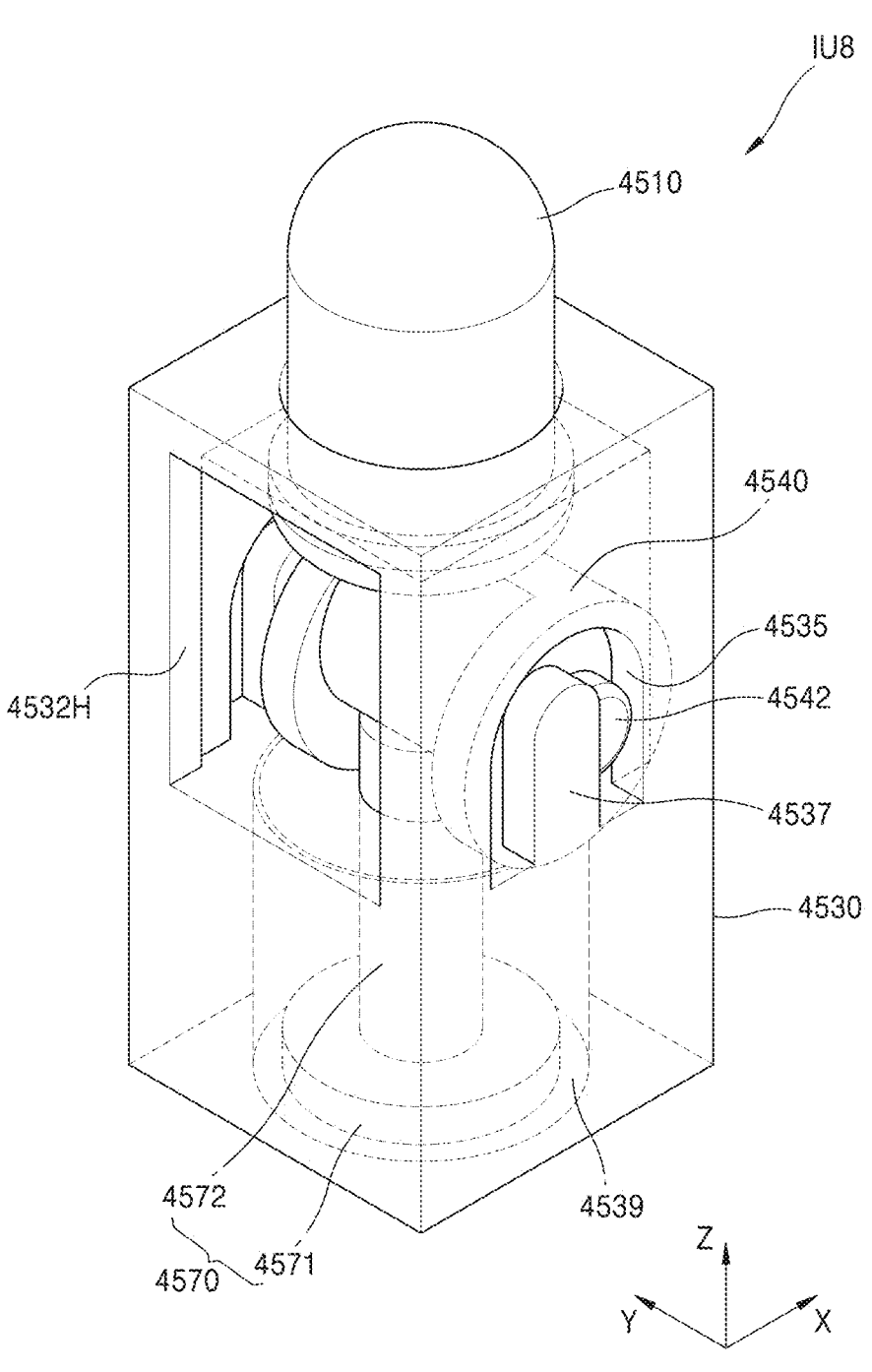
FIG. 87 is a schematic perspective view of the operation of an output unit according to another embodiment of the present disclosure.
Figure 88:
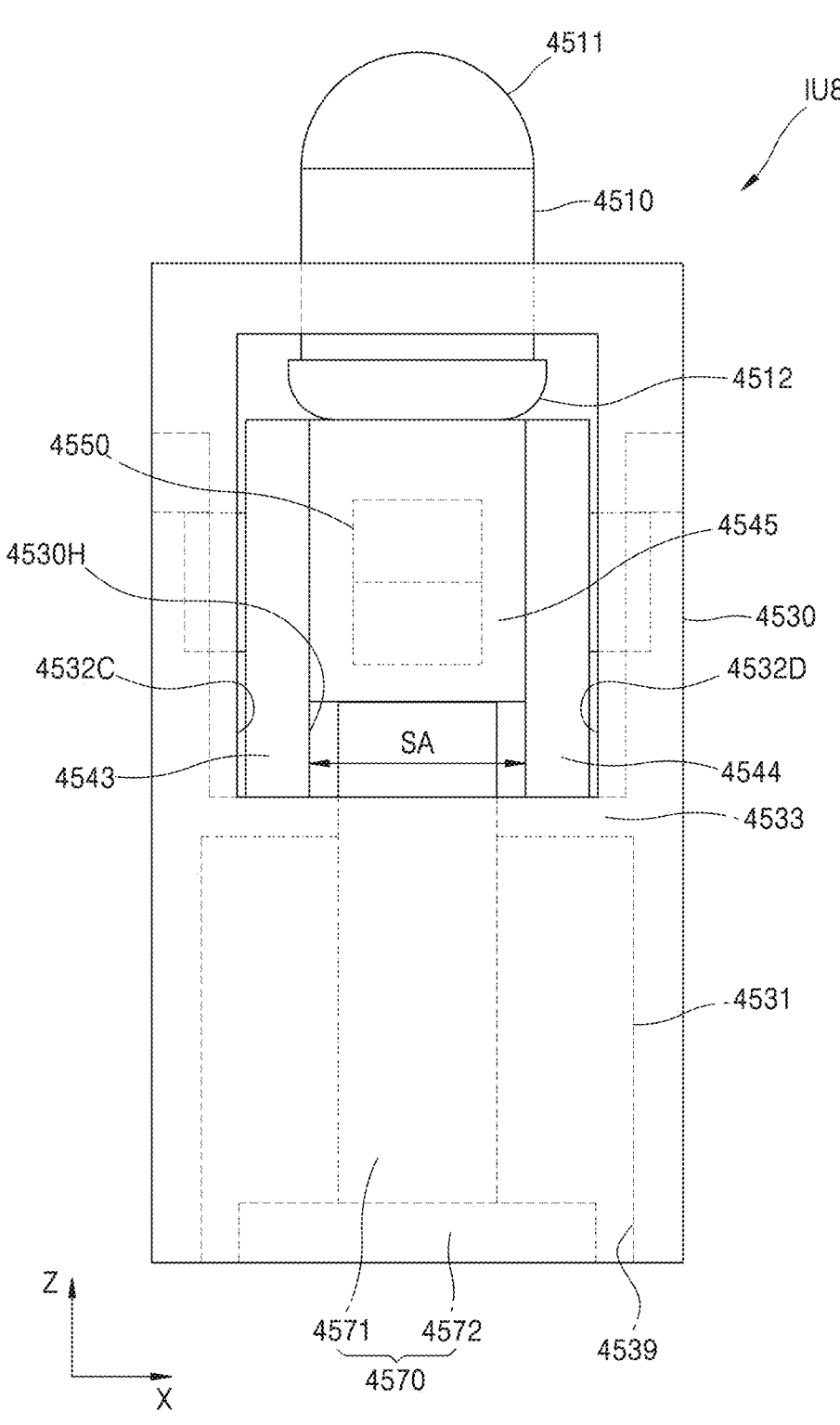
FIG. 88 is a side view viewed in one direction of FIG. 87.

FIG. 87 is a schematic perspective view of the operation of an output unit according to another embodiment of the present disclosure, and FIG. 88 is a side view viewed in one direction of FIG. 87.

Referring to FIGS. 87 and 88, the output unit IU8 according to the present embodiment may include a base unit 4530, a driving unit 4540, and an expression unit 4510.

Also, the base unit 4530 may include one or more guide grooves 4535.

The expression unit 4510 may move according to the movement of the driving unit 4540 to be described later and may move upward and downward at least in the lengthwise direction of the expression unit 4510.

Therefore, the expression unit 4510 may be moved to protrude in one direction, and a user may sense the movement of the expression unit 4510 tactilely or visually.

The expression unit 4510 may include an expression surface 4511 and a support surface 4512.

The support surface 4512 is a surface from among areas of the expression unit 4510 facing the driving unit 4540 and may constitute a lower area of the expression unit 4510 and contact the driving unit 4540. The driving unit 4540 may transmit a force to the expression unit 4510 through the support surface 4512.

According to an optional embodiment, the support surface 4512 may include a curved surface, thereby implementing flexible driving force transmission through the driving unit 4540.

The expression surface 4511 is the outermost (e.g., the topmost) surface from among areas of the expression unit 4510 and may include an area to be recognized by a user.

For example, the entire area of the expression unit 4510 may be recognized by a user or only the expression surface 4511 may be recognized. For example, a user may sense the movement of the expression unit 4510 through contact with the expression surface 4511, and the user may easily sense the movement of the expression unit 4510 through visual sensing of the expression surface 4511.

According to an optional embodiment, the expression surface 4511 may include a curved surface.

The expression unit 4510 may have various shapes. The expression unit 4510 may include a pillar-like area. For example, the expression unit 4510 may include an area having a shape similar to that of a cylinder.

In this case, a protruding area of the expression unit 4510 may have a curved surface and may also have rounded corners.

The expression unit 4510 may include various materials and may include an insulating material as a light and durable material. For example, the expression unit 4510 may include a resin-based organic material. According to another embodiment, the expression unit 4510 may include an inorganic material, such as a ceramic material.

Also, according to another selective embodiment, the expression unit 4510 may include a material like a metal or glass.

According to an optional embodiment, one end of the extension member 4571 may be extended to overlap or support one area of the driving unit 4540.

According to an optional embodiment, a support unit 4570 may include a body member 4572, and an extension member 4571 may be connected to the body member 4572.

As a specific example, the extension member 4571 may have a shape extending from the body member 4572 in a direction close to the expression unit 4510.

According to an optional embodiment, the body member 4572 and the extension member 4571 of a support unit 4570 may be integrated with each other.

Although not shown, according to an optional embodiment, a base (not shown) may be further included to support the body member 4572, and the body member 4572 may be disposed on the base (not shown).

The base unit 4530 may include, for example, a first accommodation unit 4531, a second accommodation unit 4532, and a guide groove 4535.

The first accommodation unit 4531 and the second accommodation unit 4532 may be arranged adjacent to each other and may not overlap each other.

According to an optional embodiment, the first accommodation unit 4531 and the second accommodation unit 4532 may be spaced apart from each other.

According to another selective embodiment, the first accommodation unit 4531 and the second accommodation unit 4532 may be connected through a through hole 4530H.

According to an optional embodiment, the above-stated support unit 4570 may be disposed in the first accommodation unit 4531. According to an additional embodiment, an area of the support unit 4570, e.g., an area of the extension member 4571, may be extended and disposed in the second accommodation unit 4532 through the through hole 4530H.

The guide groove 4535 may be formed in the second accommodation unit 4532. For example, the guide grooves 4535 may be formed on inner side surfaces of the second accommodation unit 4532 of the base unit 4530 facing each other. According to another selective embodiment, the guide groove 4535 may be formed on only one of the inner side surfaces.

The guide groove 4535 may have a shape of a through-hole. According to another embodiment, the guide groove 4535 may have a shape of a groove that is not exposed to the outside of the base unit 4430.

Since the guide groove 4535 is identical to that of the above-described embodiment, detailed descriptions thereof will be omitted.

The base unit 4530 may have an elongated shape to accommodate the driving unit 4540 and may be formed to completely surround the driving unit 4540.

According to an optional embodiment, the base unit 4530 may include a boundary 4533 between the first accommodation unit 4531 and the second accommodation unit 4532.

The first accommodation unit 4531 and the second accommodation unit 4532 may be separated by the boundary 4533.

Also, the base unit 4530 may include an inlet 4530*a*, and the inlet 4530*a* may be connected to the second accommodation unit 4532. The expression unit 4510 may move, such that the length of a portion thereof protruding out of the base unit 4530 through the inlet 4530*a* varies.

According to an optional embodiment, the base unit 4530 may include an open area 4539. In detail, the open area 4539 may be formed to be connected to the first accommodation unit 4531.

The open area 4539 may facilitate placement, replacement, or repair of the support unit 4570.

According to an optional embodiment, a window 4532H connected to one area of the second accommodation unit 4532 of the base unit 4530 may be formed. Even in a state in which the expression unit 4510 is not removed, the state of the second accommodation unit 4532, e.g., the state or driving of the driving unit 4540, may be checked or inspected through the window 4532H.

According to an additional embodiment, the width and the height of the window 4532H may be equal to or greater than the width and the height of the driving unit 4540 in at least one direction. Therefore, when occasions demand, the driving unit 4540 may be easily discharged and put in through the window 4532H and may be easily replaced, repaired, and inspected.

The driving unit 4540 may be disposed at the base unit 4530. The driving unit 4540 may be disposed in the second accommodation unit 4532.

The driving unit 4540 may be driven by a magnetic field generated between the driving unit 4540 and an input pen (or a reset member) and perform an angular movement or a rotational movement. The expression unit 4510 may move up and down by the driving unit 4540.

A magnetic unit 4550 may be disposed in an inner space of the driving unit 4540. For example, the magnetic unit 4550 may include a magnetic body, e.g., a permanent magnet.

The magnetic unit 4550 may include a first area 4551 (e.g., an N pole or an S pole) and a second area 4552 (e.g., an S pole or an N pole) having different polarities, and the first area 4551 and the second area 4552 having different polarities may be arranged in a direction toward an expression unit 4510 during a rotation of the driving unit 4540, e.g., the Z-axis direction.

The driving unit 4440 may include a driving surface on at least the outer surface, and the driving surface may be formed to support the support surface 4512 of the expression unit 4510, thereby providing a driving force for the vertical movement of the expression unit 4510.

The driving unit 4540 may include a driving control unit 4542.

The present embodiment may include a driving proximity portion 4545 formed in one area of the driving unit 4540.

According to an optional embodiment, the driving proximity portion 4545 may be disposed at a position overlapping the magnetic unit 4550.

The driving unit 4540 may include a first driving member 4543 and a second driving member 4544 and may include the separation space SA therebetween.

A driving proximity portion 4545 may be disposed in the separation space SA between the first driving member 4543 and the second driving member 4544.

Since the driving unit 4540 and the driving control unit 4542 are the same as or similar to those of the above-described embodiments, detailed descriptions thereof will be omitted.

The second accommodation unit 4532 of the base unit 4530 may include a first groove 4532*c* and a second groove 4532*d*.

The first groove 4532*c* and the second groove 4532*d* may extend long. The first driving member 4543 and the second driving member 4544 may be arranged in correspondence to the first groove 4532*c* and the second groove 4532*d*, respectively. Therefore, the driving unit 4540 may perform an angular movement, or a rotational movement, or a vertical movement while The first driving member 4543 and the second driving member 4544 of the driving unit 4540 are being arranged in correspondence to the first groove 4532*c* and the second groove 4532*d*. Therefore, the driving unit 4540 may stably move, thereby facilitating precise movement control for the expression unit 4510.

According to an optional embodiment, a protrusion may be formed between the first groove 4532*c* and the second groove 4532*d*. For example, the through hole 4530H may be formed in the protrusion.

The extension member 4571 of the support unit 4570 may correspond to the through hole 4530H. At this time, the extension member 4571 may protrude through the through hole 4530H and protrude more than the protrusion, and, according to an optional embodiment, the extension member 4571 may not protrude more than the protrusion or may protrude to the same height as the protrusion.

A driving unit of an output unit of the present embodiment may easily move in a first direction (e.g., ascend) by a magnetic field generated between the driving unit and an input pen and may descend through an initialization process using a reset member.

Also, a first groove and a second groove are formed in a second accommodation unit of a base unit in correspondence to one area of a first driving member and a second driving member of the driving unit. Therefore, when a driving unit moves, an abnormal change of the position of the driving unit may be reduced or prevented, thereby securing stable movement of the driving unit and precisely controlling a movement of an expression unit.

Figure 89:
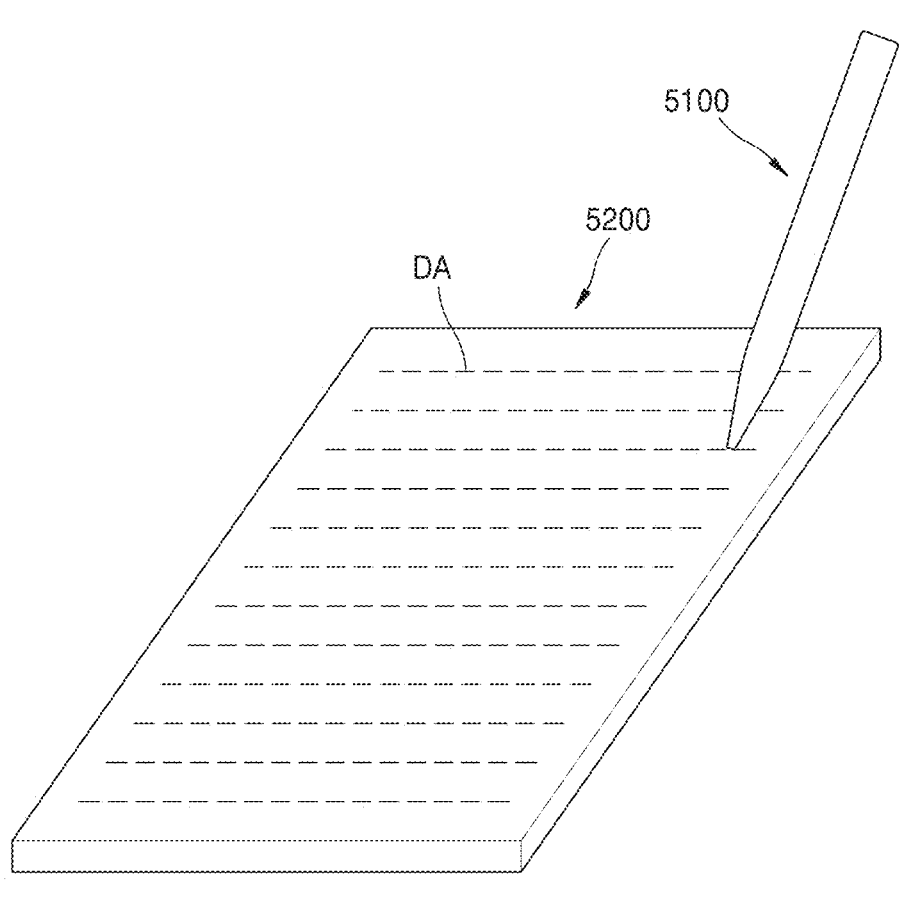
FIGS. 89 and 90 are diagrams for describing a protruding feedback-based smart tablet and a reset member according to another embodiment of the present disclosure.
Figure 90:
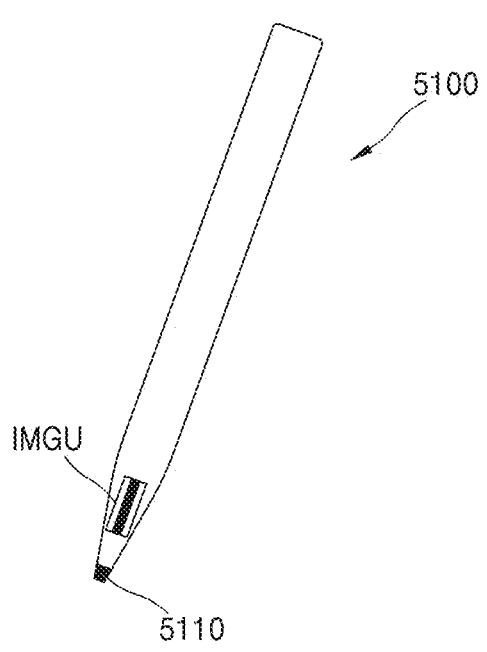

FIGS. 89 and 90 are diagrams for describing a protruding feedback-based smart tablet and a reset member according to another embodiment of the present disclosure.

Referring to FIG. 89, a plurality of output units may be provided in the expression area DA of a protruding feedback-based smart tablet 5200.

With respect to the expression area DA, a user may perform an input operation by using an input pen 5100.

Therefore, the plurality of output units in the expression area DA of the protruding feedback-based smart tablet 5200 may protrude. Since detail descriptions thereof are identical to those given above for the above-described embodiments, detailed descriptions thereof will be omitted.

Referring to FIG. 90, the input pen 5100 may include a magnetic body 5110. Since the magnetic body 5110 provided in the input pen 5100 is the same as that of the above-described embodiment, detailed descriptions thereof will be omitted. For example, the magnetic body 5110 may generate a magnetic field between the input pen 5100 and a driving unit disposed in one area of an output unit, and, as a specific example, the driving unit of the output unit may protrude by an attractive force.

Also, the input pen 5100 may include the reset member IMGU.

The reset member IMGU may specifically include a coil member (not shown). For example, the reset member IMGU may have the form of a wound coil that generates a magnetic field when a current is applied thereto. As a specific example, a current may be applied to the coil member provided in the reset member IMGU through a power supply unit (not shown) to generate a magnetic field around the coil member. For example, a magnetic field may be generated between the coil member and a driving unit disposed in one area of an output unit. and, as a specific example, a repulsive force to the driving unit of the output unit may be generated.

Therefore, the reset member IMGU may correspond to a plurality of output units of the protruding feedback-based smart tablet 5200 and initialize the plurality of output units at the same time. For example, the reset member IMGU may control protruding output units to descend again to return to a non-protruding state.

As a result, since it is not necessary to prepare a space for arranging the reset member IMGU in the protruding feedback-based smart tablet 5200, the thickness of the protruding feedback-based smart tablet 5200 may be easily reduced.

According to an optional embodiment, a button member (not shown) may be formed at the input pen 5100, and, by applying a current to a coil member provided in the reset member IMGU through a power supply unit (not shown) only when the button member (not shown) is selected (e.g., pressed), an initialization process may be selectively performed.

Figure 91:
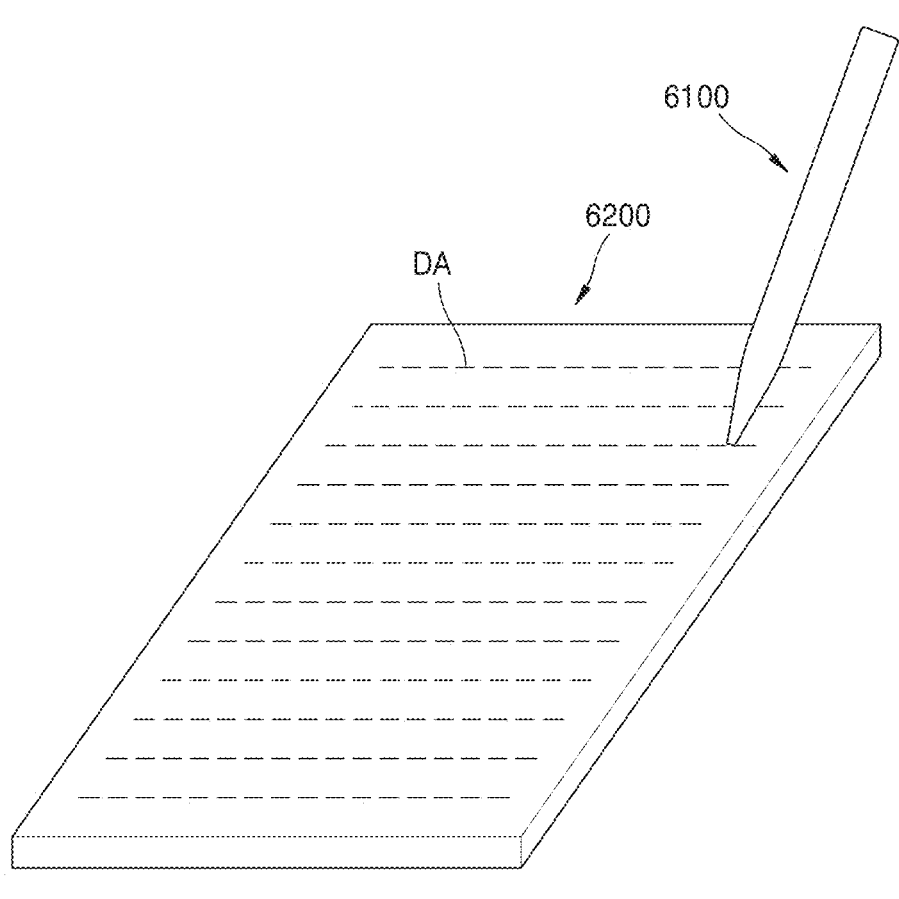
FIG. 91 is a diagram for schematically describing a protruding feedback-based smart tablet according to another embodiment of the present disclosure.
Figure 92:
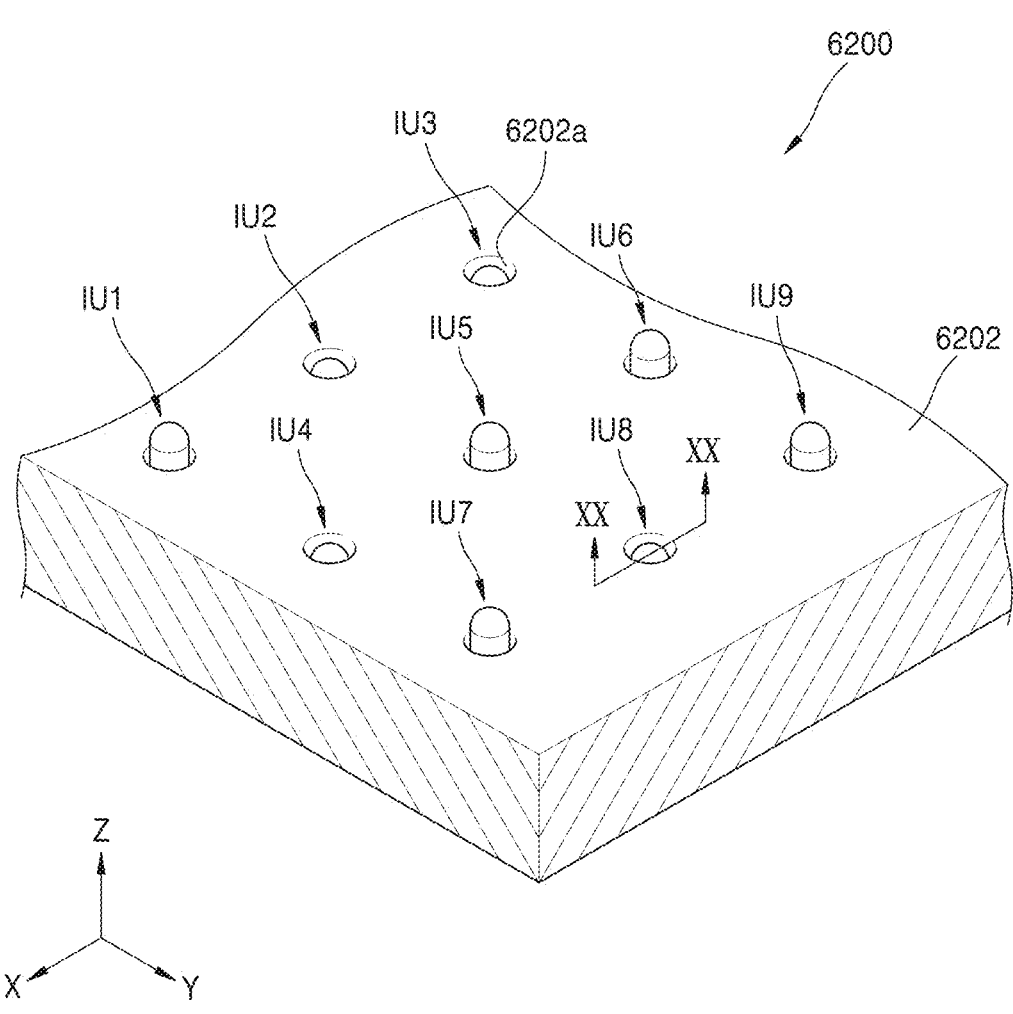
FIG. 92 is an enlarged view of an area of the protruding feedback-based smart tablet FIG. 91.

FIG. 91 is a diagram schematically showing a protruding feedback-based smart tablet according to another embodiment of the present disclosure, and FIG. 92 is an enlarged view of an area of the protruding feedback-based smart tablet of FIG. 91.

Figure 93:
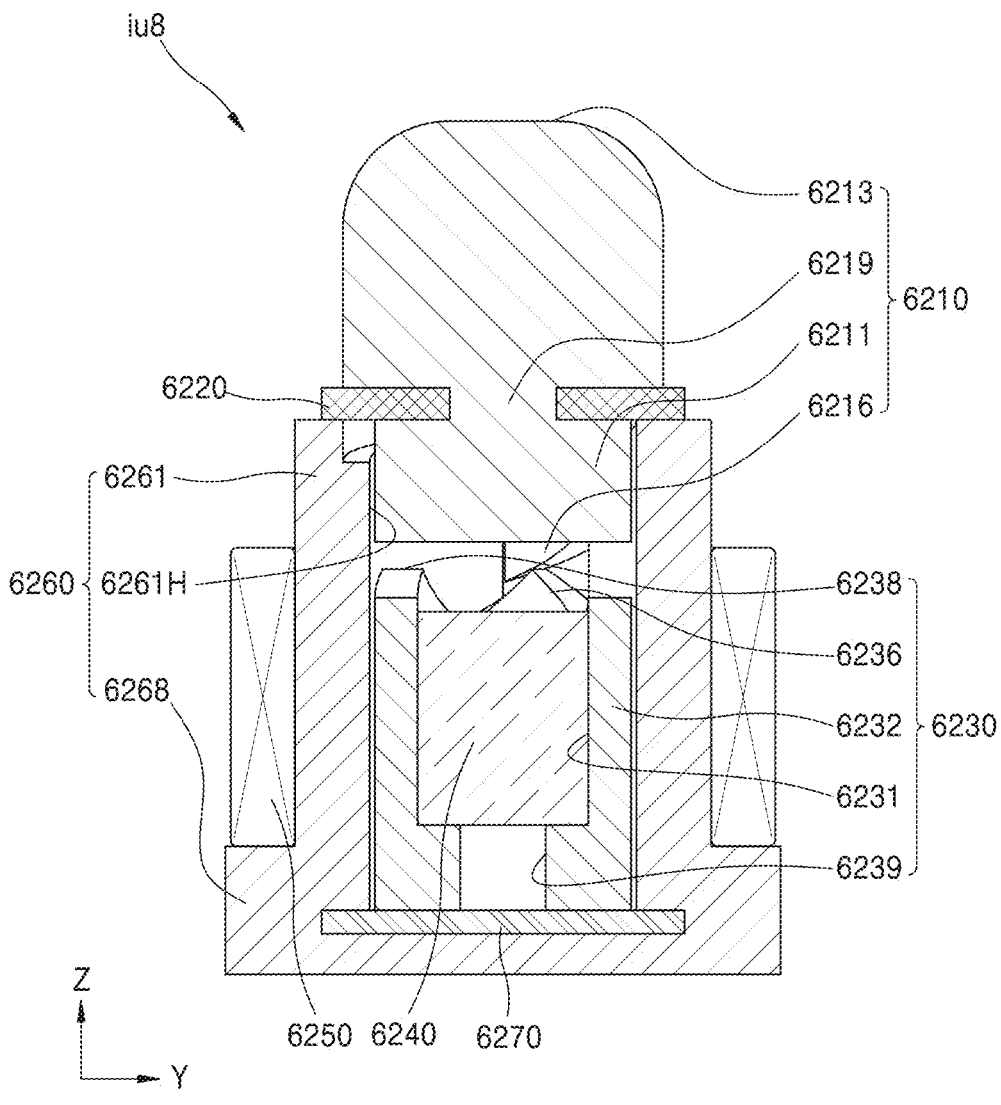
FIG. 93 is a cross-sectional view taken along a line XX-XX of FIG. 92.

FIG. 93 is a cross-sectional view taken along a line XX-XX of FIG. 92.

A protruding feedback-based smart tablet 6200 of the present embodiment may include an expression area DA.

A user may make various inputs to the expression area DA by using an input pen 6100. For example, a user may write characters, draw figures, and make inputs in various other forms.

The expression area DA of the protruding feedback-based smart tablet 6200 includes a plurality of output units. For example, in FIG. 92, nine output units IU1 to IU9 are shown. However, it is for merely convenience of explanation, and the number of output units included in the expression area DA of the protruding feedback-based smart tablet 6200 may vary in consideration of the size of the expression area DA, the resolution of an output shape, etc.

The protruding feedback-based smart tablet 6200 may include a reset member. For example, reset members may be formed in correspondence to the plurality of output units, respectively, and the reset members may be controlled individually or at once. As a specific example, a current may be applied in correspond to each output unit, and an initialization may be performed by using a magnetic field generated through the applied current.

Referring to FIG. 93, the output unit IU8 may include an expression unit 6210, a moving unit 6230, a magnetic unit 6240, a coil 6250, and a base unit 6260.

Since the expression unit 6210, the moving unit 6230, the magnetic unit 6240, and the base unit 6260 are identical to those described above with reference to FIGS. 23 and 24, detailed descriptions thereof will be omitted.

For example, the structure of FIG. 93 may correspond to the structure shown in FIGS. 23 and 24 to which the coil 6250 is added.

The coil 6250 may be disposed to surround the outer circumferential surface of a body area 6261 of the base unit 6260, and may have, for example, the shape of a wound coil.

By applying a current to the coil 6250, a magnetic field for the magnetic unit 6240 may be generated. For example, an attractive force or a repulsive force may be generated.

Therefore, an initialization may be performed through the reset member IMGU as shown in FIG. 38D.

In the present embodiment, since an initialization process is performed by controlling application of a current to a coil, a process using the movement of the reset member IMGU as shown in FIG. 38D separately provided is not needed.

For example, an initialization process for one expression unit 6210 or all expression units 6210 may be easily performed through a signal for applying a current to the coil 6250.

Figure 94:
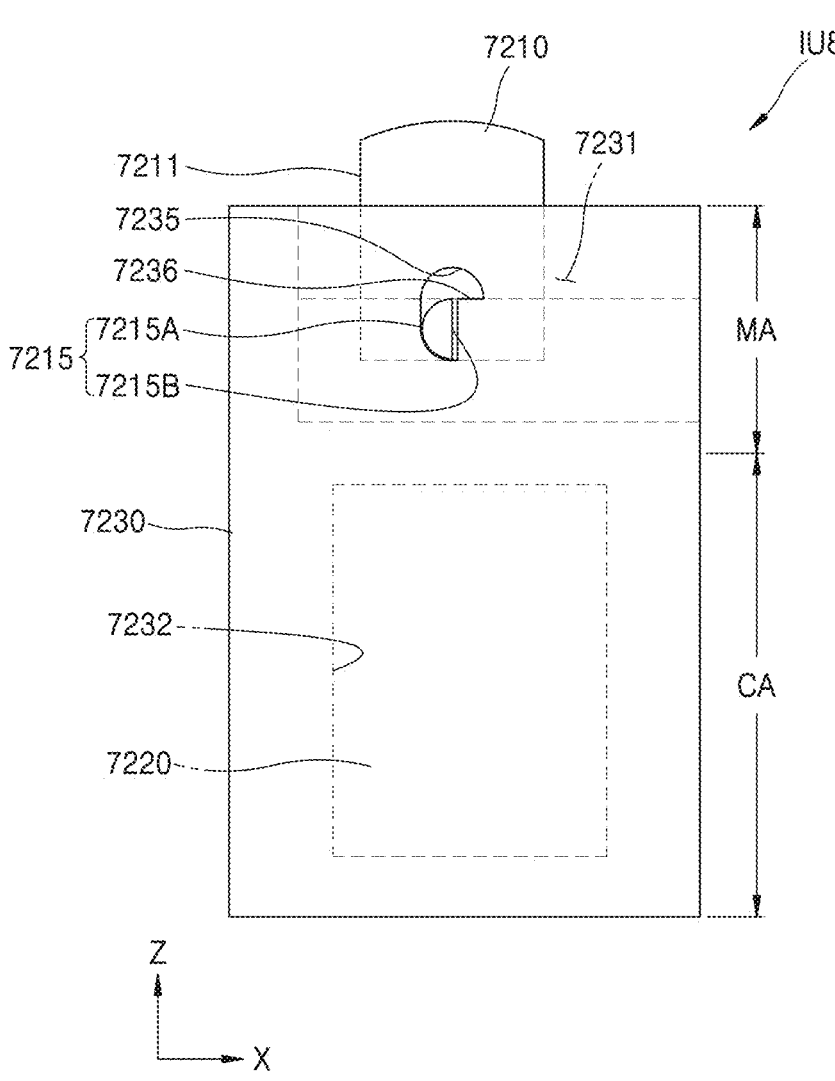
FIG. 94 is a diagram for explaining an output unit according to another embodiment of the present disclosure.

FIG. 94 is a diagram for explaining an output unit according to another embodiment of the present disclosure.

Referring to FIG. 94, the output unit IU8 may include a driving expression unit 7210, a coil 7220, and a base unit 7230.

Since the driving expression unit 7210 and the base unit 7230 are identical to those of the above-stated embodiment described above with reference to FIG. 42, detailed descriptions thereof will be omitted.

For example, the structure of FIG. 94 may correspond to the structure shown in FIG. 42 to which the coil 7220 is added.

The coil 7220 may be disposed in a second area CA distinguished from the first area MA of the base unit 7230. For example, the coil 7220 may be disposed in a second accommodation unit 7232 spaced apart and distinguished from a first accommodation unit 7231.

By applying a current to the coil 7220, a magnetic field for the driving expression unit 7210 may be generated. For example, an attractive force or a repulsive force may be generated.

Therefore, an initialization may be performed through the reset member IMGU as shown in FIG. 44C.

In the present embodiment, since an initialization process is performed by controlling application of a current to a coil, a process using the movement of the reset member IMGU as shown in FIG. 44C separately provided is not needed.

For example, an initialization process for one driving expression unit 7210 or all driving expression units 7210 may be easily performed through a signal for applying a current to the coil 7220.

Figure 95:
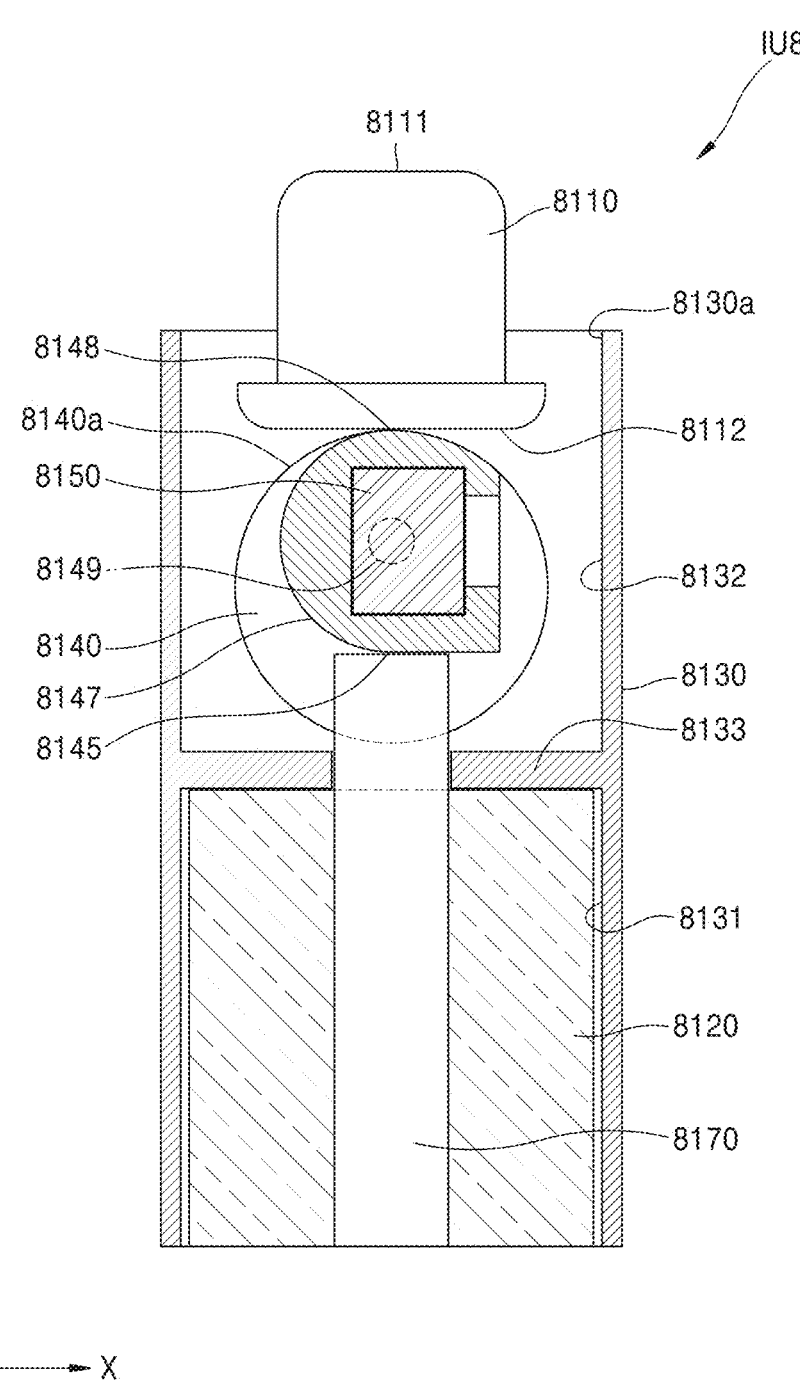
FIG. 95 is a schematic perspective front view of an output unit according to another embodiment of the present disclosure.

FIG. 95 is a schematic perspective front view of an output unit according to another embodiment of the present disclosure.

Referring to FIG. 95, the output unit IU8 of the present embodiment may include a base unit 8130, a driving unit 8140, an expression unit 8110, and a coil 8120.

Since the base unit 8130, the driving unit 8140, and the expression unit 8110 are identical to those of the above-stated embodiment described above with reference to FIG. 53, detailed descriptions thereof will be omitted.

For example, the structure of FIG. 95 may correspond to the structure shown in FIG. 53 to which the coil 8120 is added.

The coil 8120 may be disposed in a first accommodation unit 8131 of the base unit 8130. For example, the coil 8120 may have a shape of a coil would around a support unit 8170 to surround the support unit 8170.

By applying a current to the coil 8120, a magnetic field for the driving unit 8140 may be generated. For example, an attractive force or a repulsive force may be generated.

Therefore, an initialization may be performed through the reset member IMGU as shown in FIG. 55.

In the present embodiment, since an initialization process is performed by controlling application of a current to a coil, a process using the movement of the reset member IMGU as shown in FIG. 55 separately provided is not needed.

For example, an initialization process for one expression unit 8110 or all expression units 8110 may be easily performed through a signal for applying a current to the coil 8120.

Figure 96:
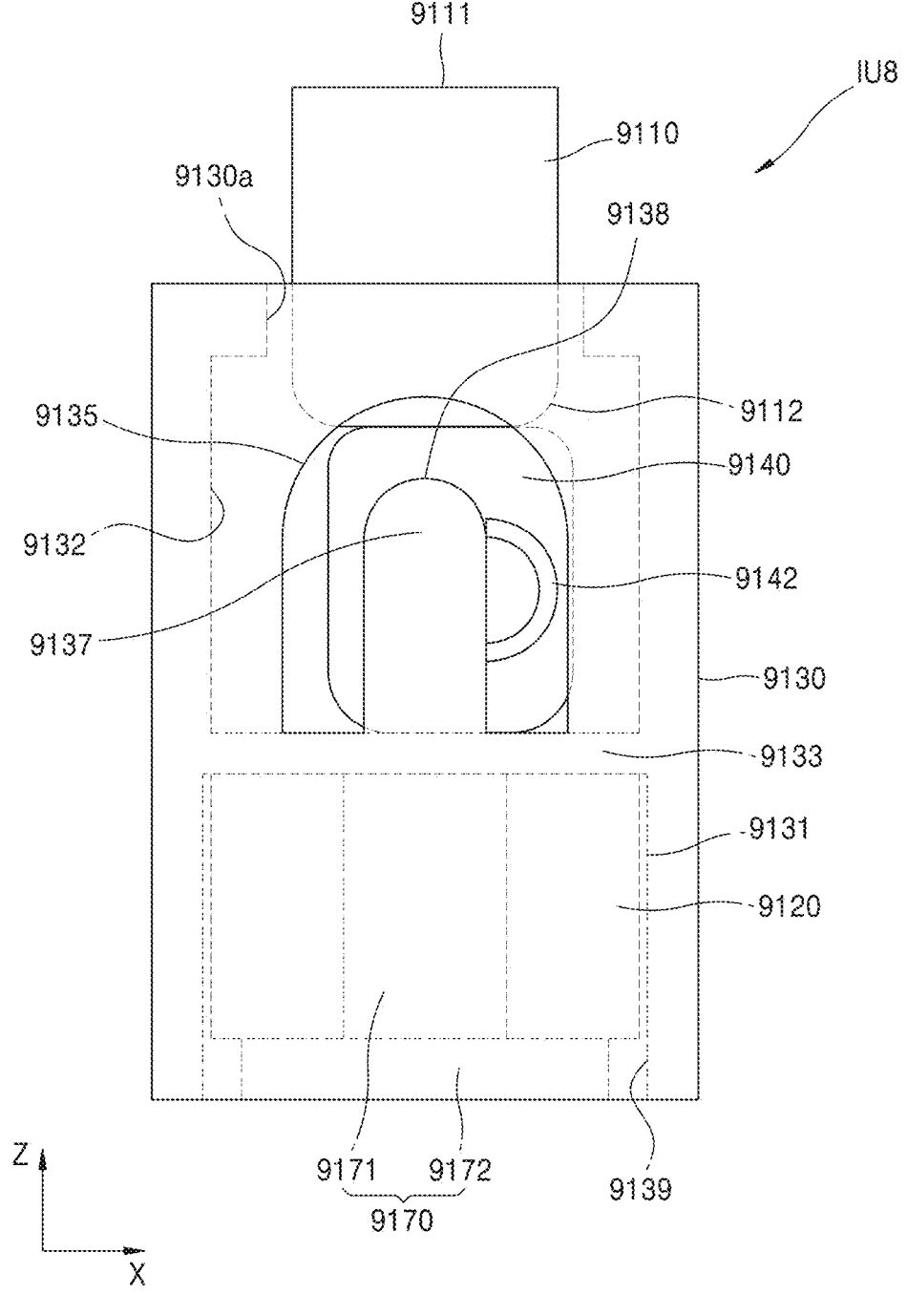
FIG. 96 is a schematic perspective front view of an output unit according to another embodiment of the present disclosure.

FIG. 96 is a schematic perspective front view of an output unit according to another embodiment of the present disclosure.

Referring to FIG. 96, the output unit IU8 of the present embodiment may include a base unit 9130, a driving unit 9140, an expression unit 9110, and a coil 9120.

Since the base unit 9130, the driving unit 9140, and the expression unit 9110 are identical to those of the above-stated embodiment described above with reference to FIG. 65, detailed descriptions thereof will be omitted.

For example, the structure of FIG. 96 may correspond to the structure shown in FIG. 65 to which the coil 9120 is added.

The coil 9120 may be disposed in a first accommodation unit 9131 of the base unit 9130. For example, the coil 9120 may have a shape of a coil would around an extension member 9171 of a support unit 9170 to surround the extension member 9171.

By applying a current to the coil 9120, a magnetic field for the driving unit 9140 may be generated. For example, an attractive force or a repulsive force may be generated.

Therefore, an initialization may be performed through the reset member IMGU as shown in FIG. 71.

In the present embodiment, since an initialization process is performed by controlling application of a current to a coil, a process using the movement of the reset member IMGU as shown in FIG. 71 separately provided is not needed.

For example, an initialization process for one expression unit 9110 or all expression units 9110 may be easily performed through a signal for applying a current to the coil 9120.

Figure 97:
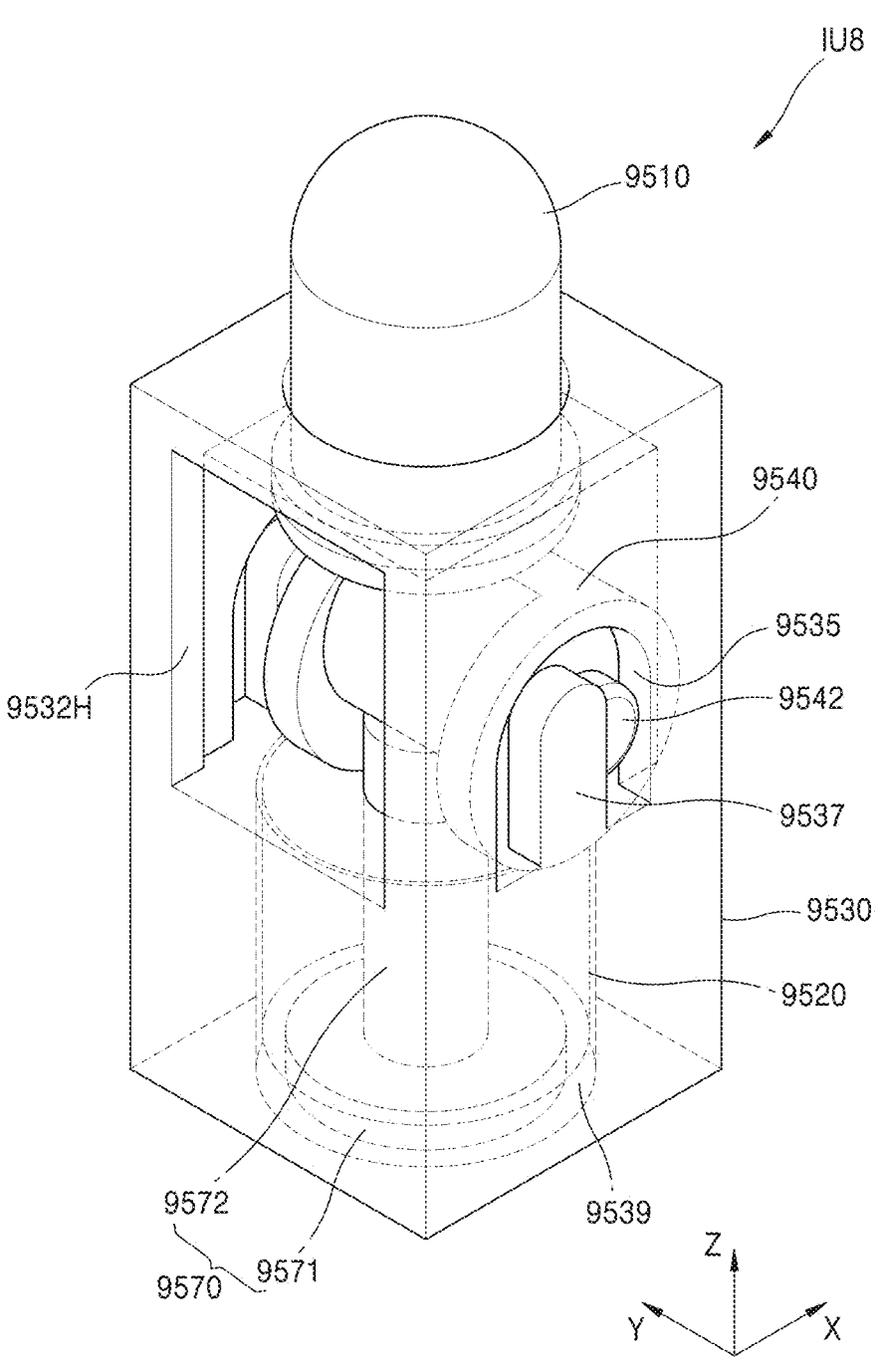
FIG. 97 is a schematic perspective front view of an output unit according to another embodiment of the present disclosure.

FIG. 97 is a schematic perspective front view of an output unit according to another embodiment of the present disclosure.

Referring to FIG. 97, the output unit IU8 of the present embodiment may include a base unit 9530, a driving unit 9540, an expression unit 9510, and a coil 9520.

Since the base unit 9530, the driving unit 9540, and the expression unit 9510 are identical to those of the above-stated embodiment described above with reference to FIG. 87, detailed descriptions thereof will be omitted.

For example, the structure of FIG. 97 may correspond to the structure shown in FIG. 87 to which the coil 9520 is added.

The coil 9520 may be disposed in a first accommodation unit of the base unit 9530. For example, the coil 9520 may have a shape of a coil would around an extension member 9571 of a support unit 9570 to surround the extension member 9571.

By applying a current to the coil 9520, a magnetic field for the driving unit 9540 may be generated. For example, an attractive force or a repulsive force may be generated.

Therefore, an initialization process may be performed.

In the present embodiment, since an initialization process is performed by controlling application of a current to a coil, a process using the movement of the reset member IMGU separately provided is not needed.

For example, an initialization process for one expression unit 9510 or all expression units 9510 may be easily performed through a signal for applying a current to the coil 9520.

While the present disclosure has been described with reference to exemplary embodiments, it is to be understood that the present disclosure is not limited to the disclosed example embodiments, but, on the contrary, is intended to cover various modifications and equivalent arrangements included within the spirit and scope of the appended claims. Accordingly, the true scope of protection of the present disclosure should be determined by the technical idea of the appended claims.

The specific implementations described in embodiments are illustrative and do not in any way limit the scope of the present disclosure. For clarity of description, descriptions of conventional electronic configurations, control systems, software, and other functional aspects of such systems may be omitted. Also, connections of lines or connecting members between the components shown in the drawings are example illustrations of functional connections and/or physical or circuit connections, which may be replaced with or additionally provided by various functional connections, physical connections, or circuit connections. Also, unless there is a specific reference such as "essential" or "importantly", it may not be a necessary component for the application of the present disclosure.

In the specification of embodiments (especially in the claims), the use of the term "above" and similar referential terms may correspond to both the singular and the plural. also, when a range is stated in the embodiment, it includes the disclosure to which individual values belonging to the range are applied (unless there is a description to the contrary) and is equivalent to that to individual values constituting the range is stated in the detailed description. Finally, the operations constituting the method according to the present disclosure may be performed in an appropriate order, unless explicitly stated or stated otherwise. Embodiments are not necessarily limited to the order in which the operations are described. The use of any and all examples, or exemplary language (e.g., "such as") provided herein, is intended merely to better illuminate the invention and does not pose a limitation on the scope of the present disclosure unless otherwise claimed. Also, one of ordinary skill in the art will understand that various modifications, combinations, and changes may be made in accordance with design conditions and factors within the scope of the appended claims or their equivalents.

The invention claimed is:

1. A protruding feedback-based smart tablet comprising a plurality of output units, wherein the protruding feedback-based smart tablet comprises an expression area in which the plurality of output units are arranged, wherein the plurality of output units each comprises an expression unit which is sensible by a user and formed to protrude in response to a movement of an input pen when the user performs an input operation, wherein the expression unit of at least one output unit of the plurality of output units is formed to protrude by a magnetic field, wherein, after removing the magnetic field, the protruded form of the expression unit is maintained for a certain period of time by a support structure, and wherein the protruded form of the expression unit is performed by an angular or rotational movement, via the magnetic field, of either the expression unit or a member configured to move the expression unit.

2. The protruding feedback-based smart tablet of claim 1, wherein the output unit comprises a magnetic body to generate the magnetic field.

3. The protruding feedback-based smart tablet of claim 1, further comprising a reset member configured to release a protruding state of the expression unit to maintain a non-protruding state of the expression unit.

4. The protruding feedback-based smart tablet of claim 3, wherein the reset member controls a movement for the expression unit by using a magnetic field.

5. The protruding feedback-based smart tablet of claim 4, wherein the reset member simultaneously releases a protruding state of a plurality of expression units to maintain a non-protruding state of the expression units.

* * * * *